Fig.36.
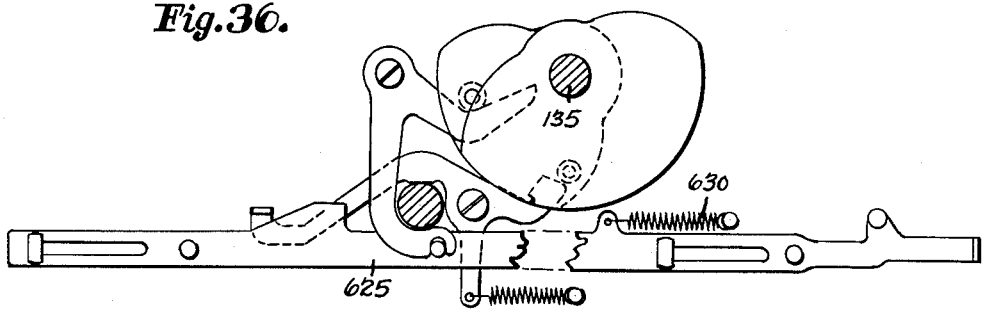
Fig.34.
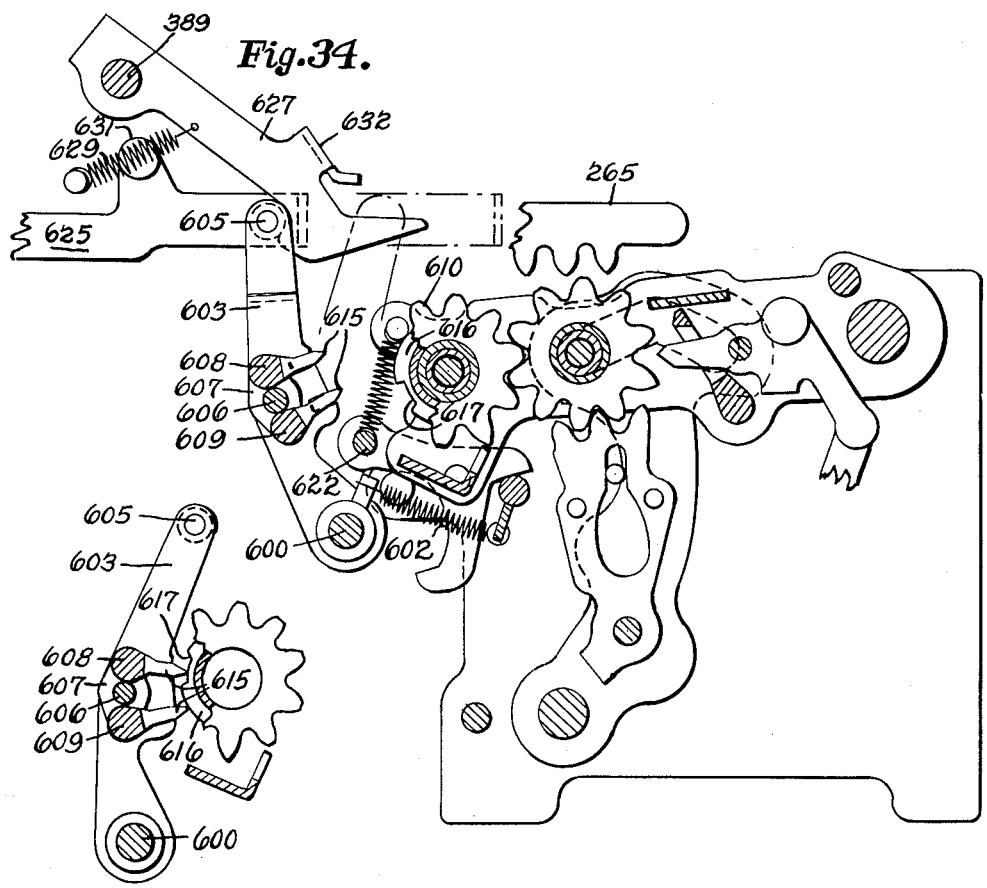
Fig.35.

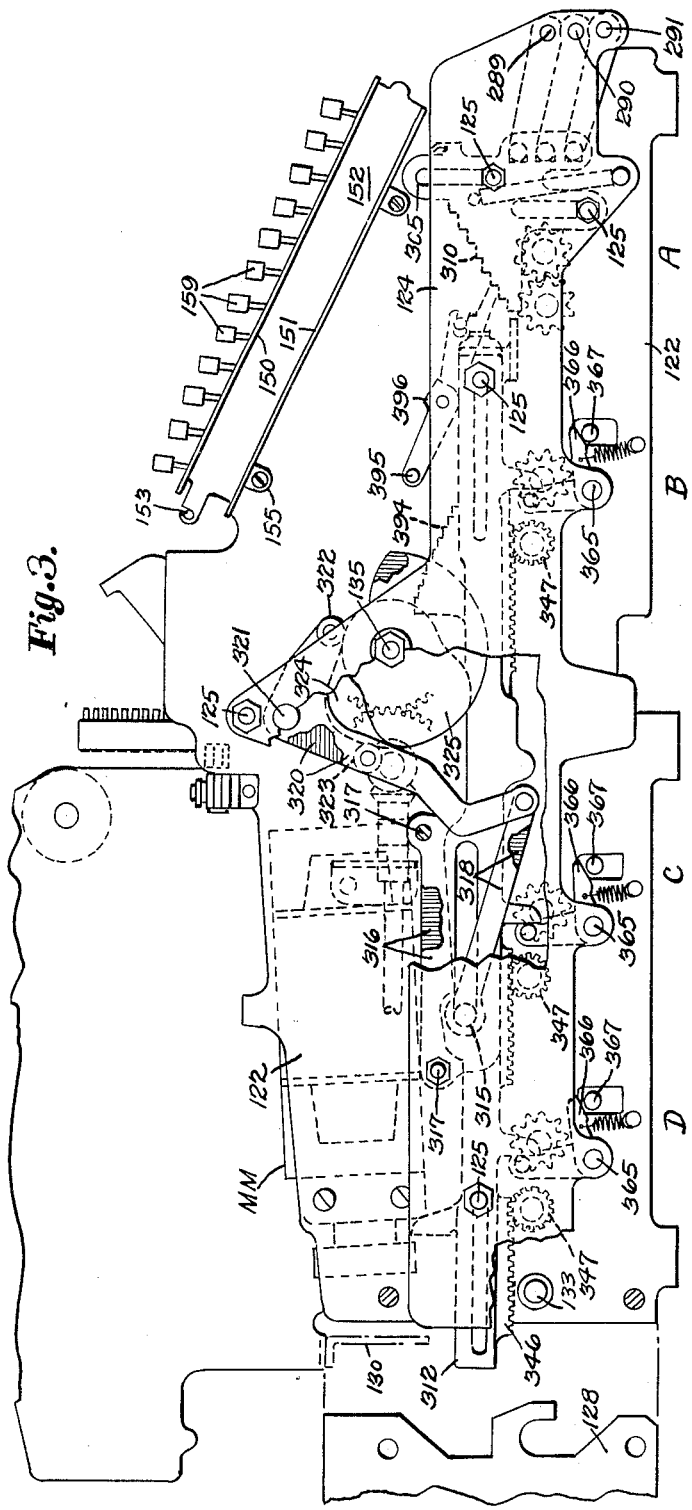

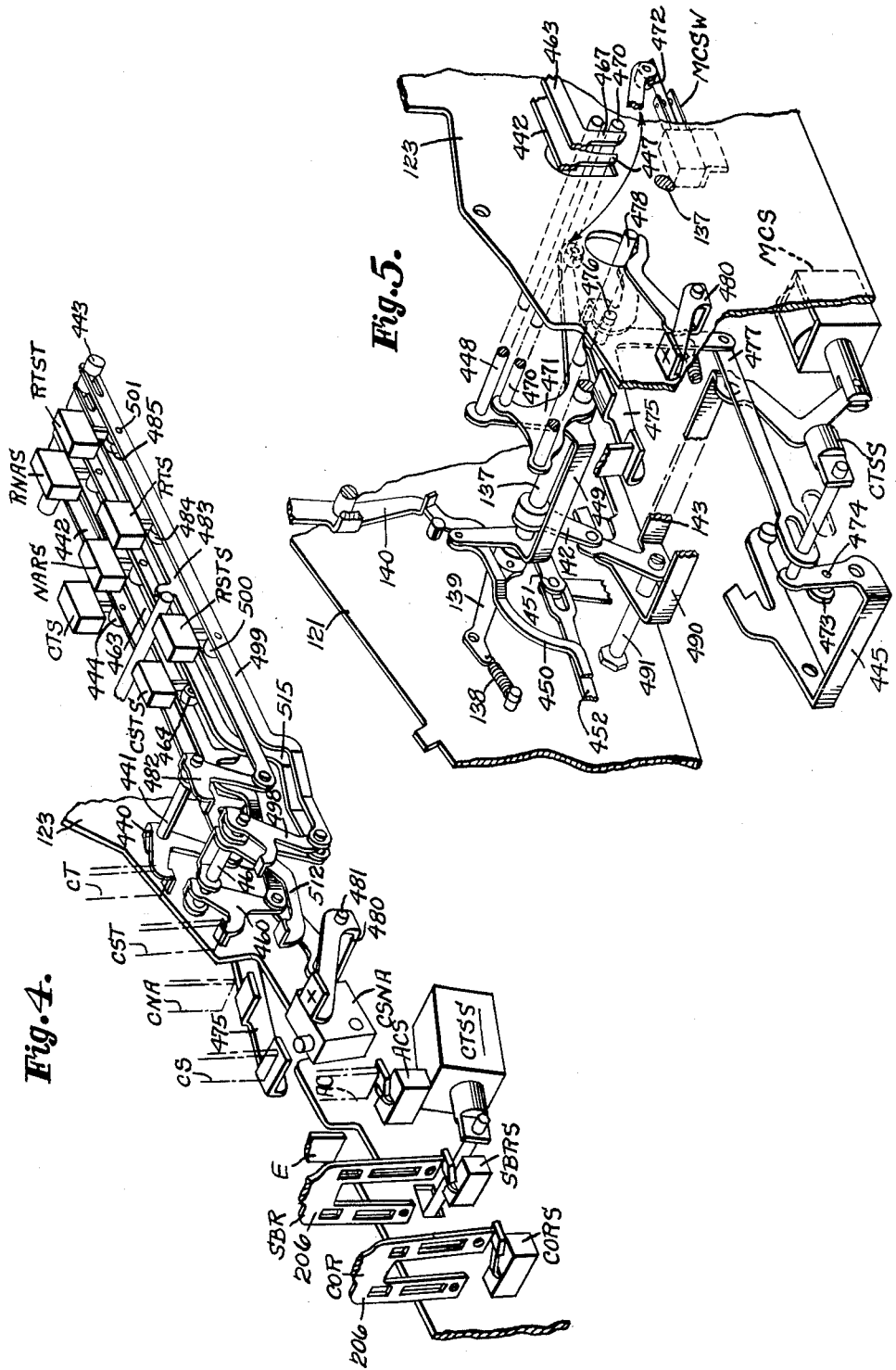

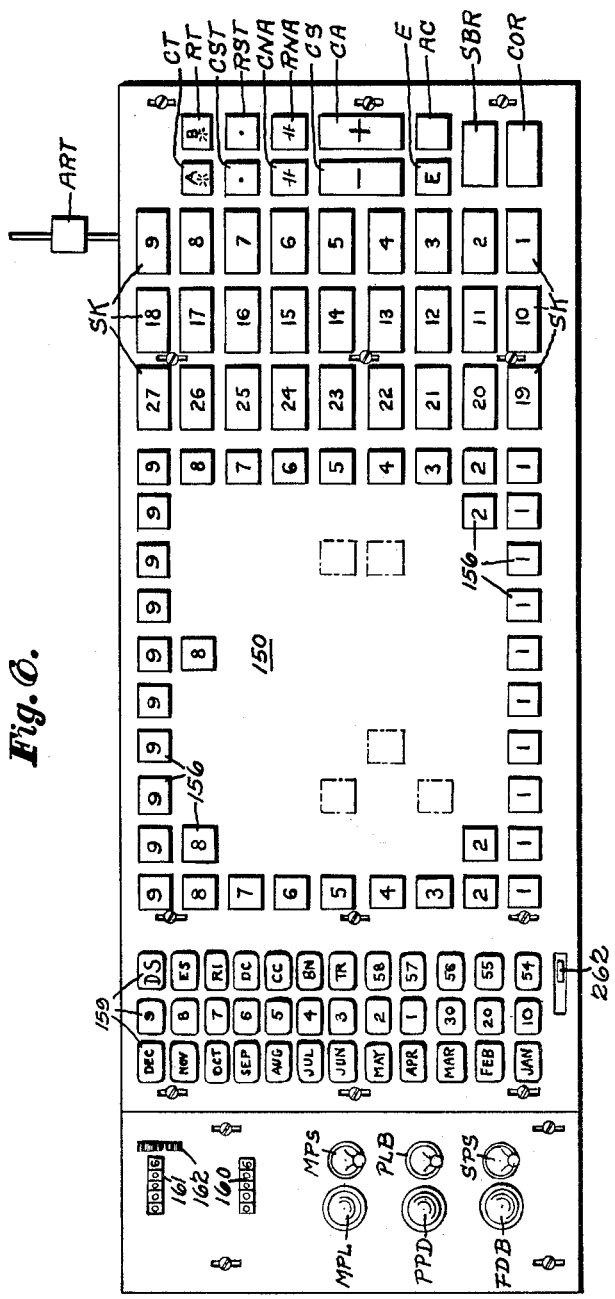

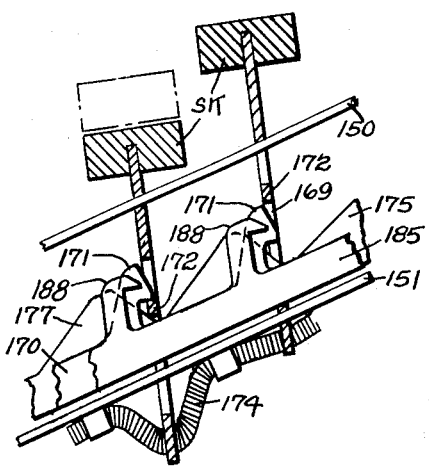
Fig. 8.
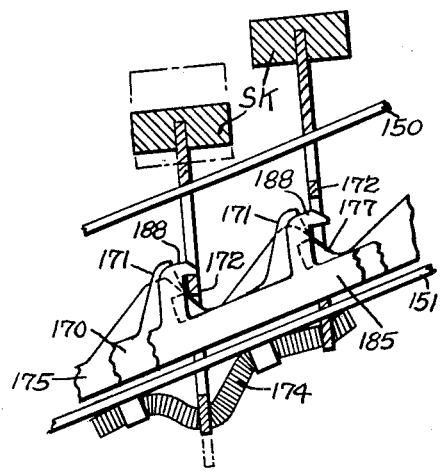
Fig. 9.
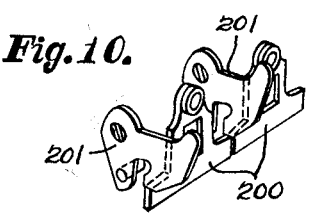
Fig. 10.
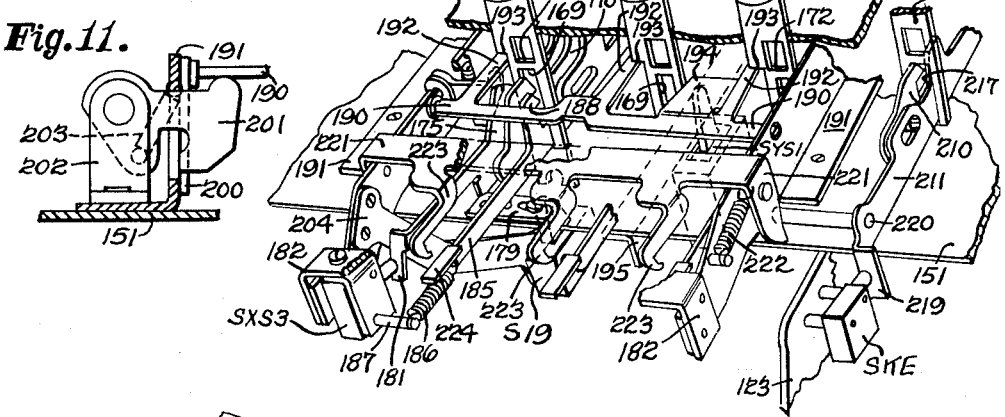
Fig. 11.
Fig. 7.
Fig. 12.

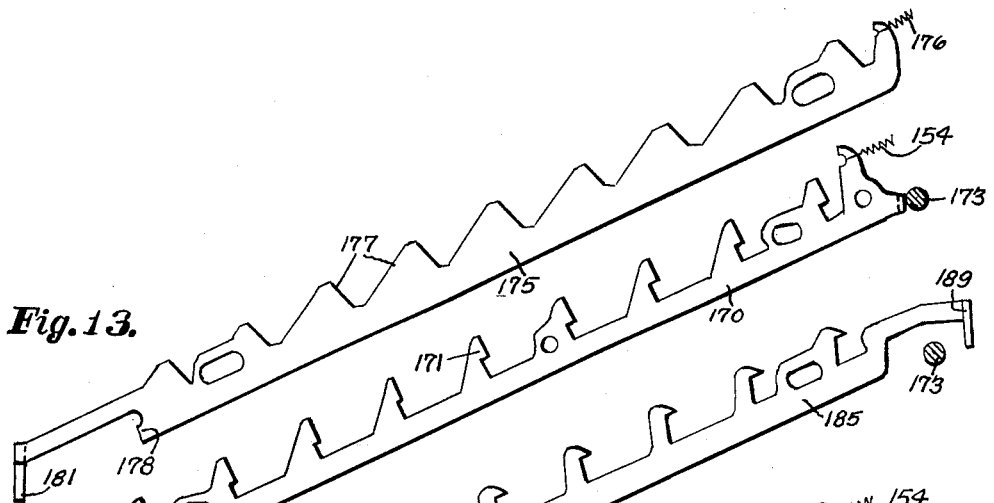
Fig. 13.
Fig. 14.
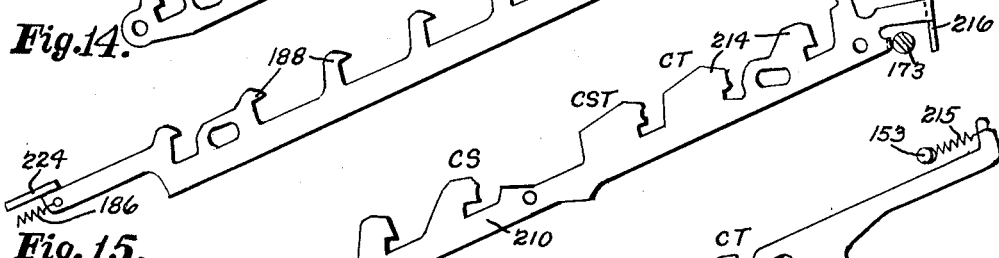
Fig. 15.
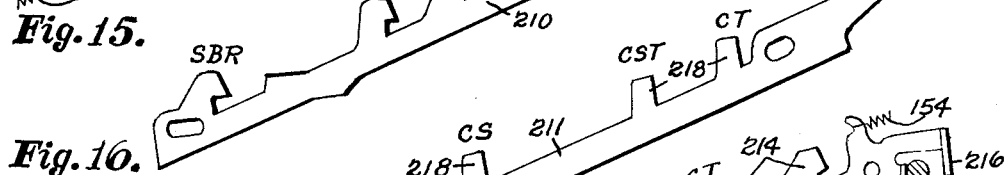
Fig. 16.
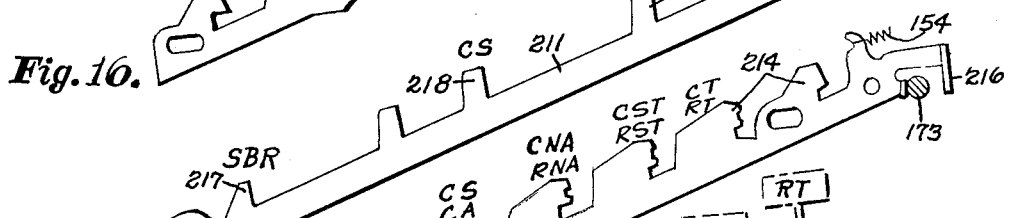
Fig. 17.
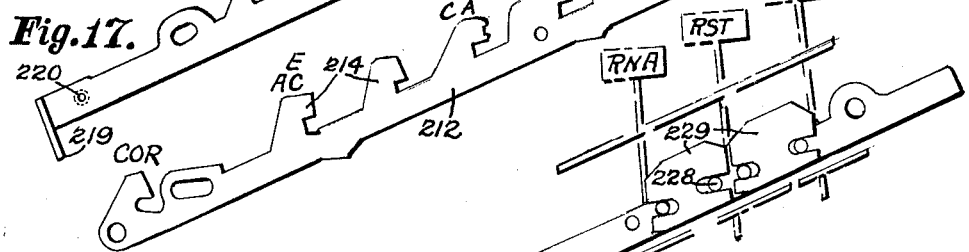
Fig. 18.
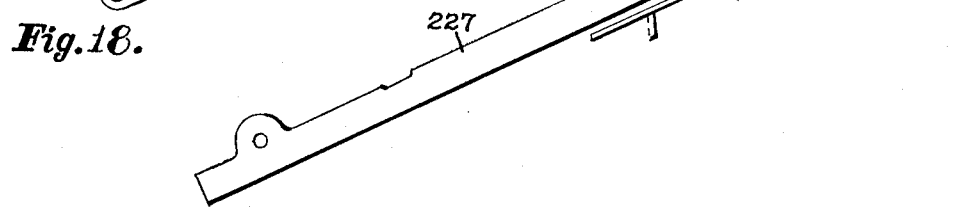
Fig. 19.

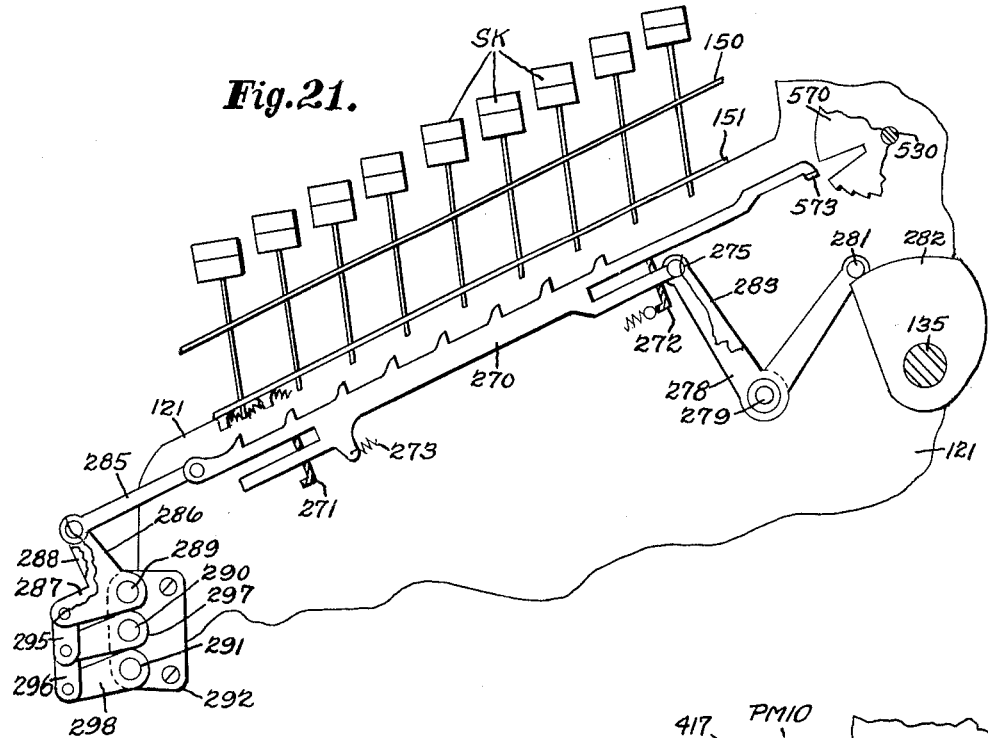
Fig. 21.
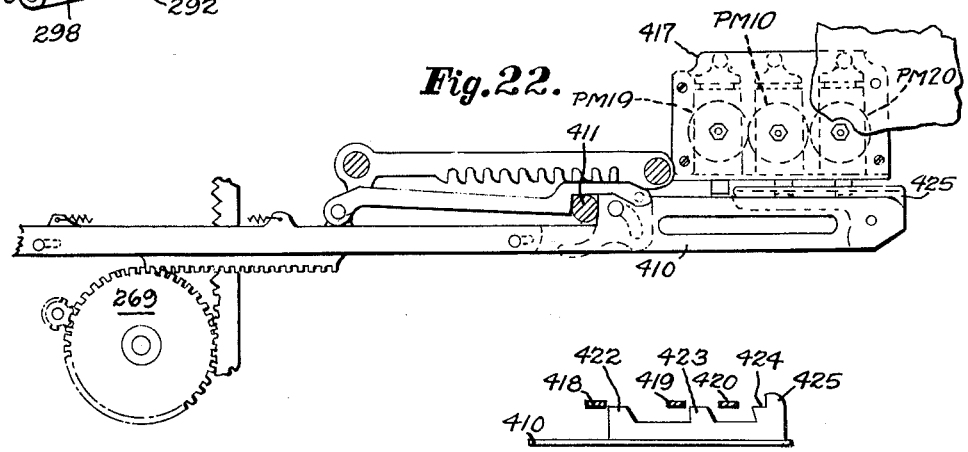
Fig. 22.
Fig. 23.

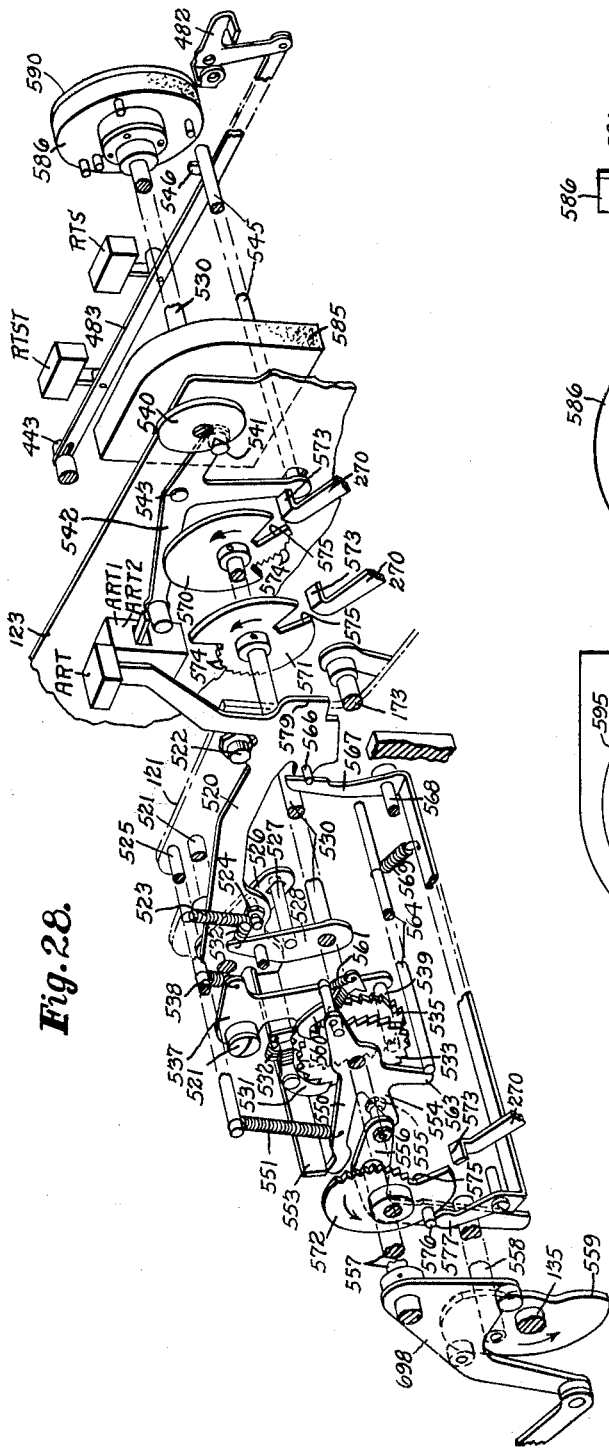
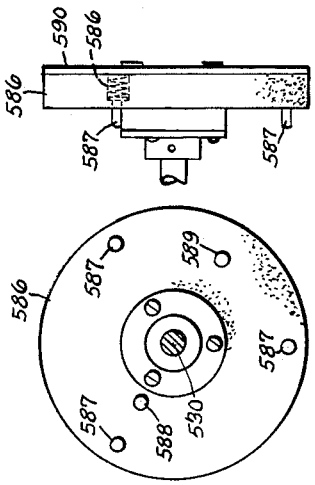
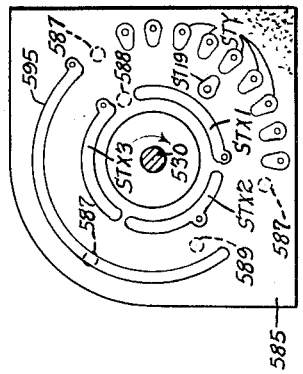
Fig. 28.
Fig. 31.
Fig. 30.
Fig. 29.

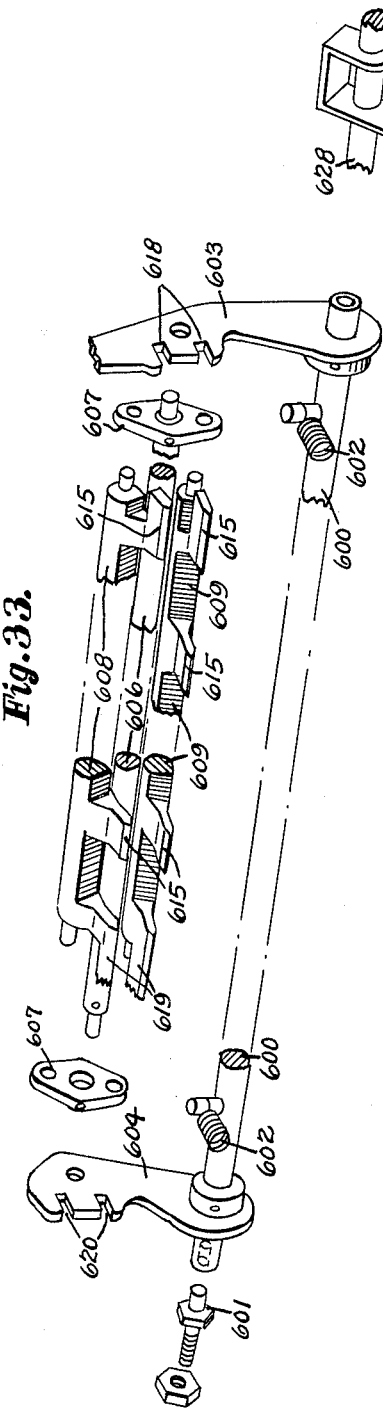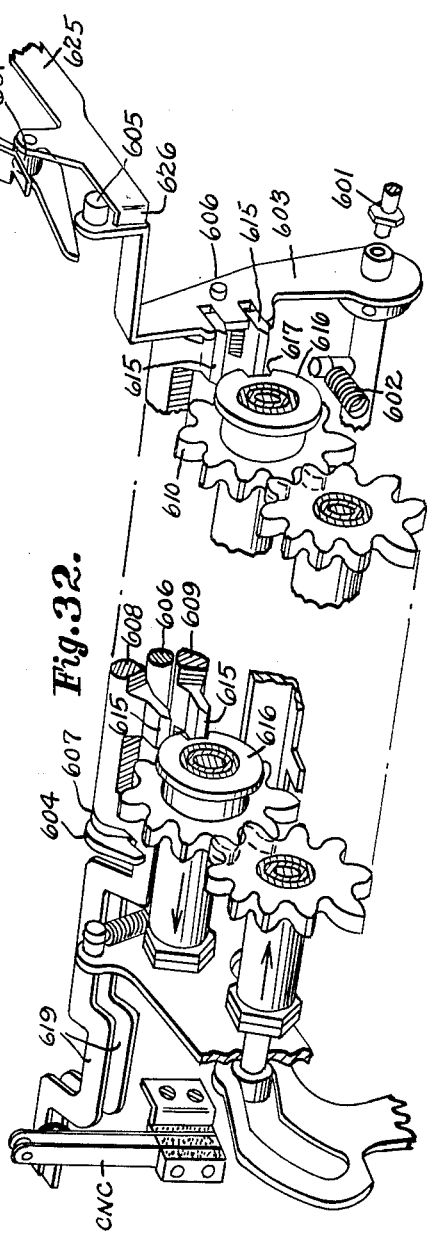

May 14, 1963
A. J. FETTIG ETAL
3,089,641
COMBINED DOCUMENT SORTER, PRINTER
AND ACCOUNTING MACHINE SYSTEM
Filed Dec. 26, 1957
68 Sheets-Sheet 17
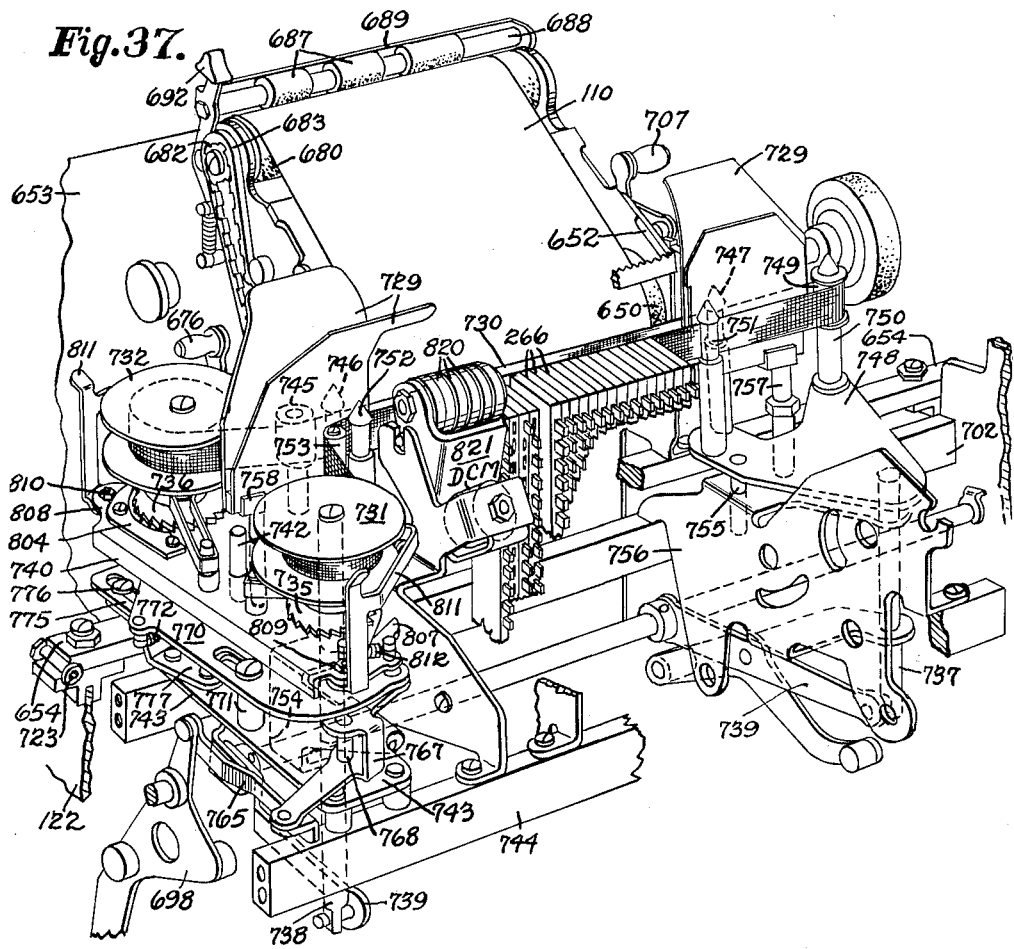
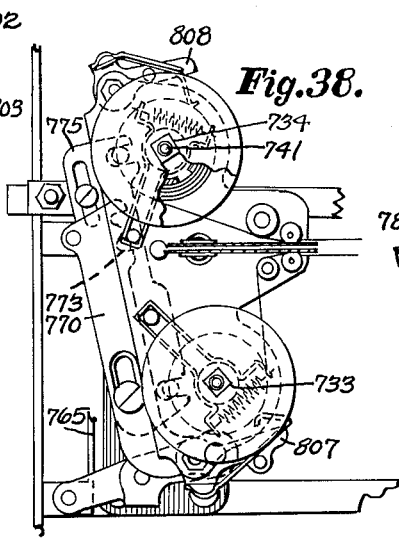
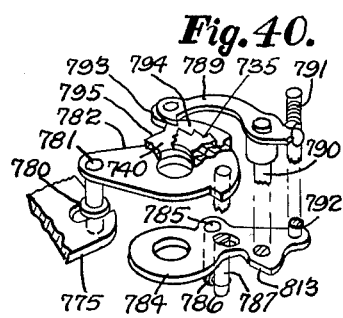

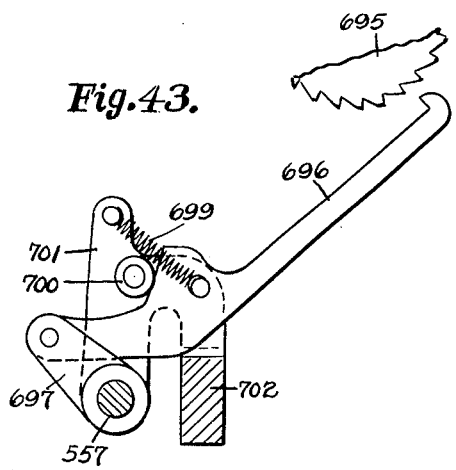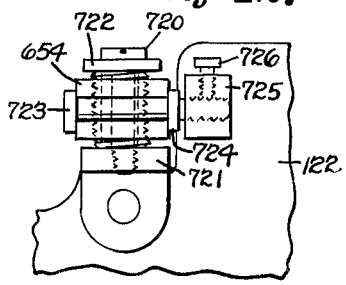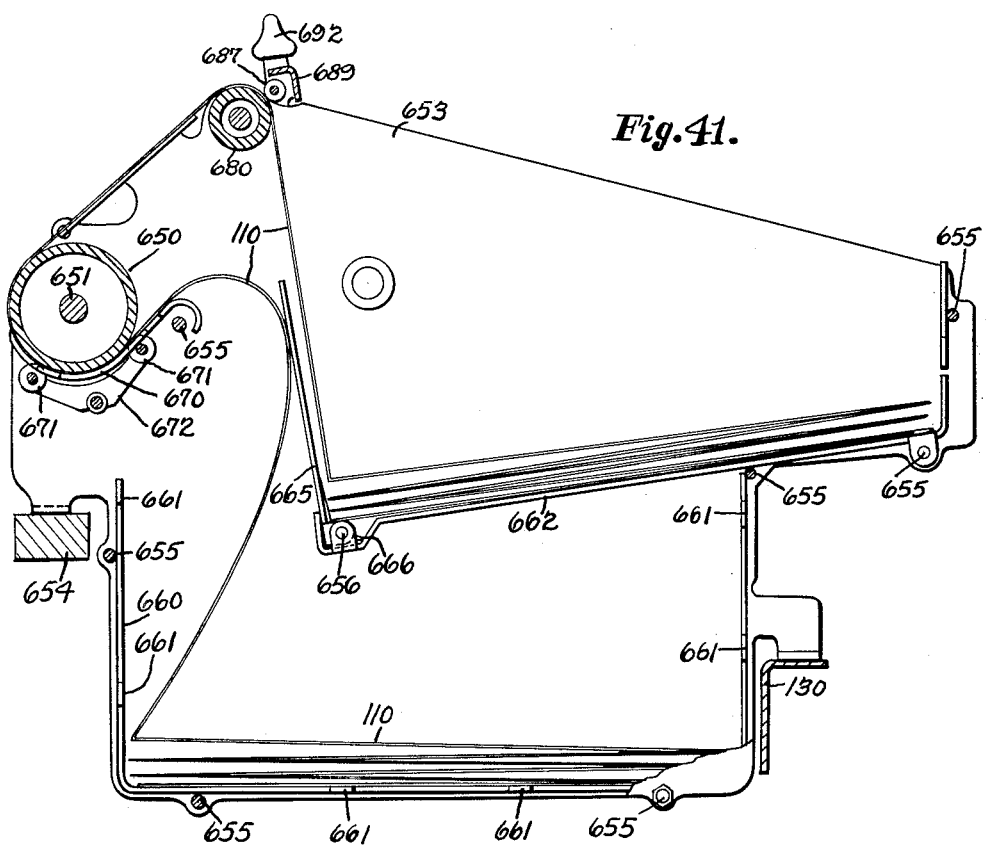

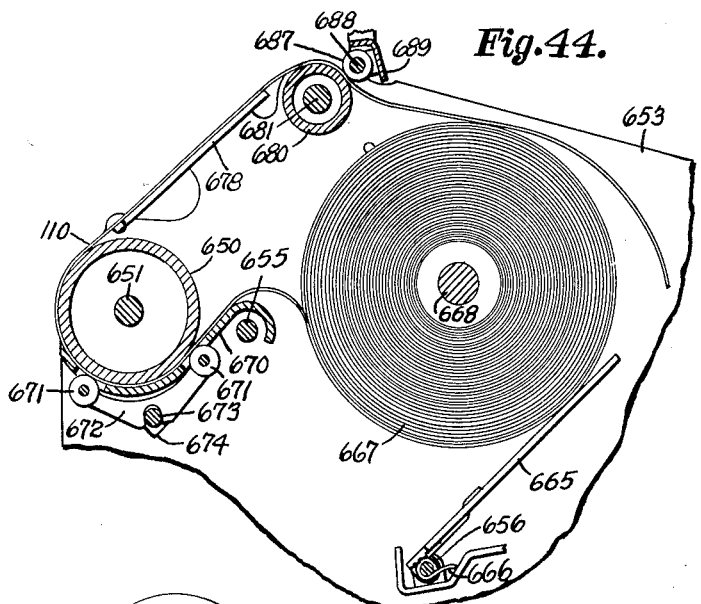
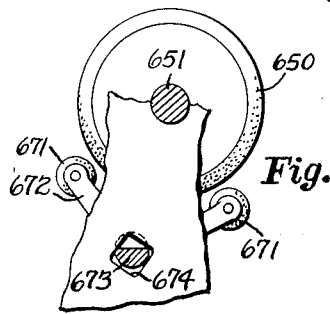
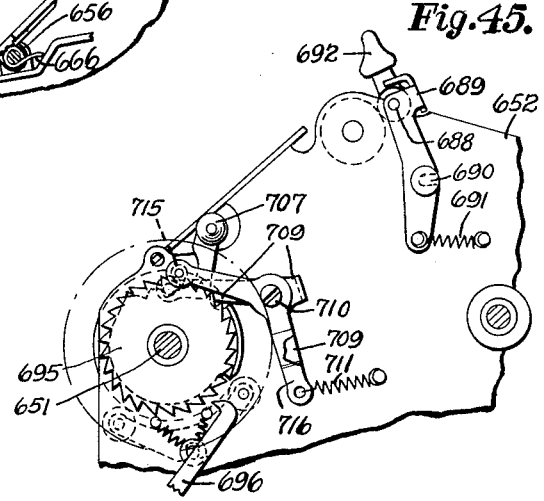
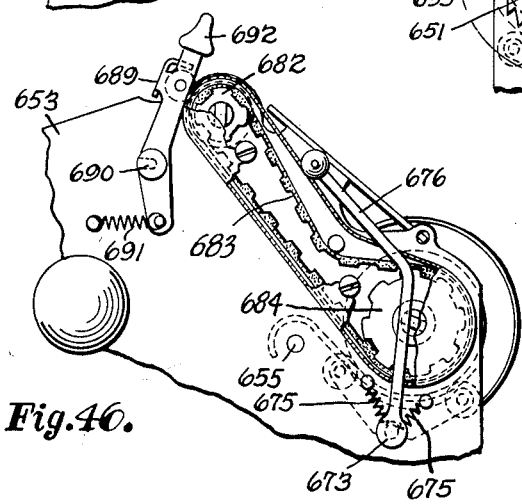
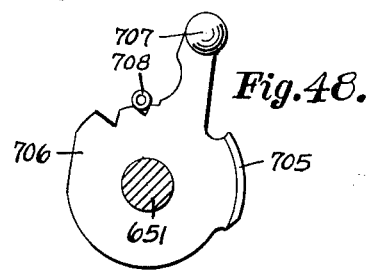

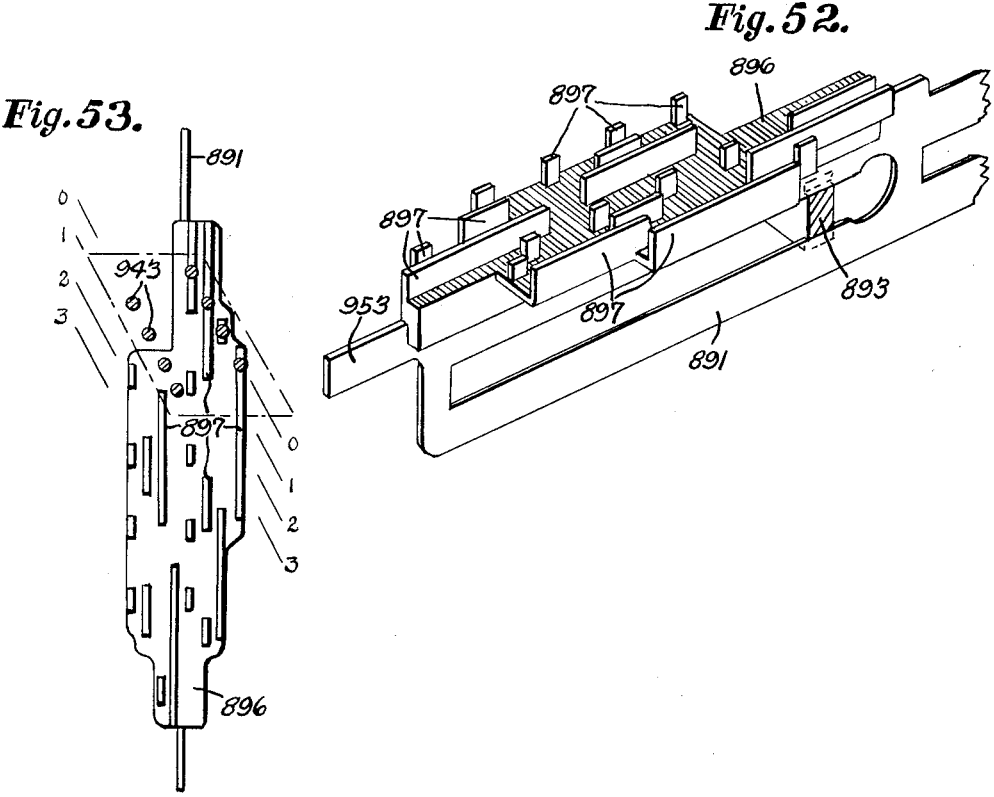

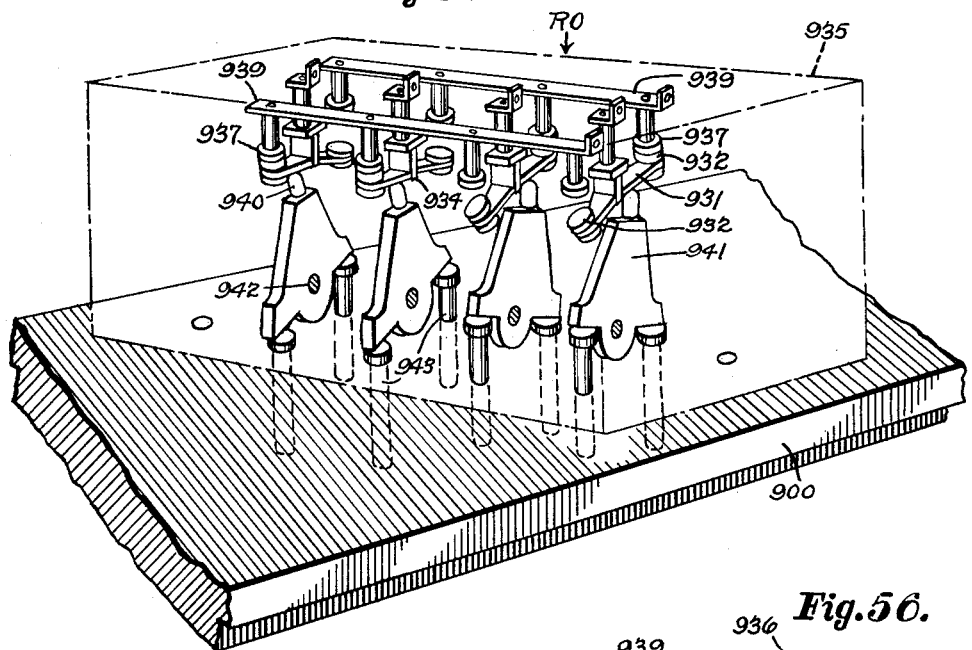
Fig.55.
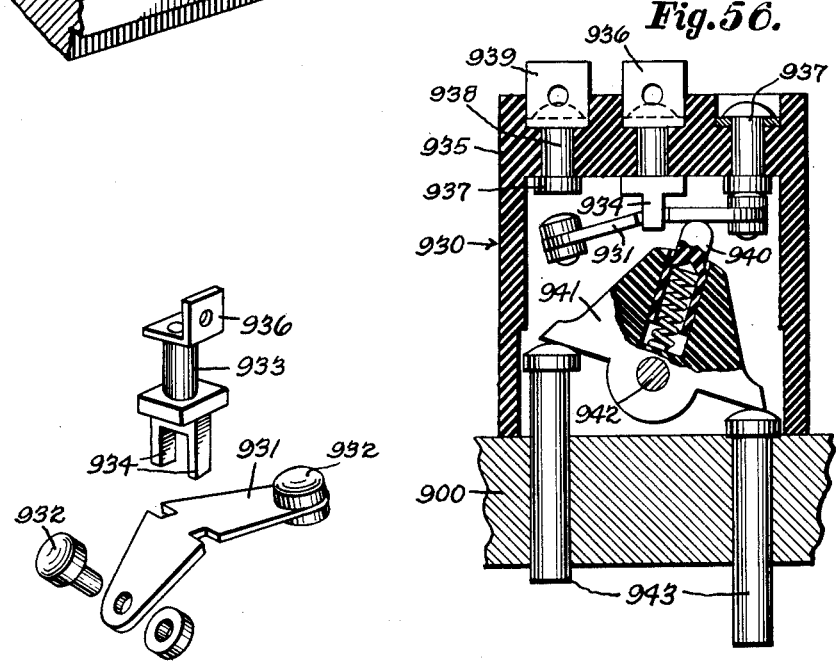
Fig.56.
Fig.57.

Fig.59.
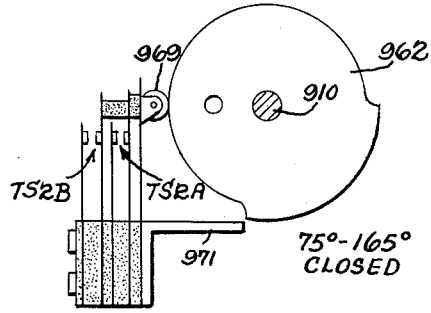
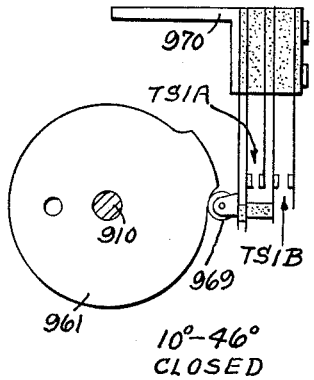
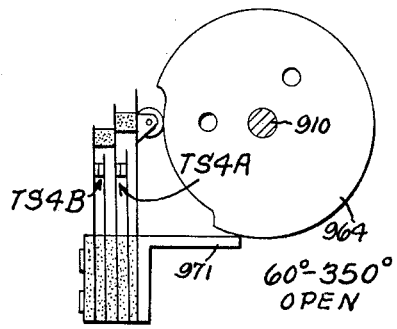
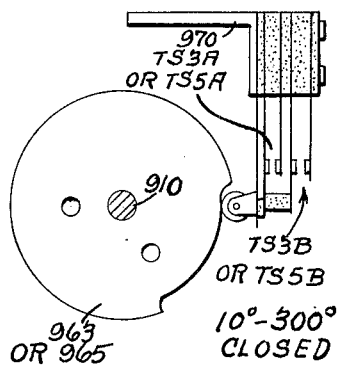
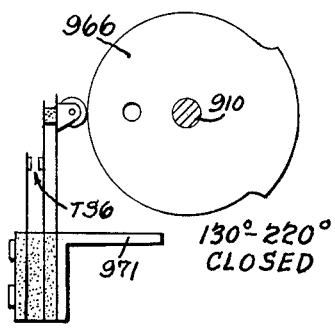
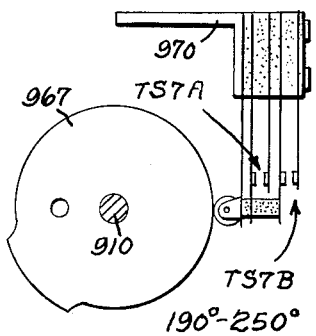
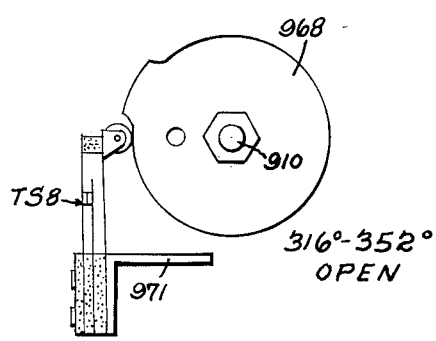

May 14, 1963

A. J. FETTIG ETAL 3,089,641

COMBINED DOCUMENT SORTER, PRINTER
AND ACCOUNTING MACHINE SYSTEM

Filed Dec. 26, 1957

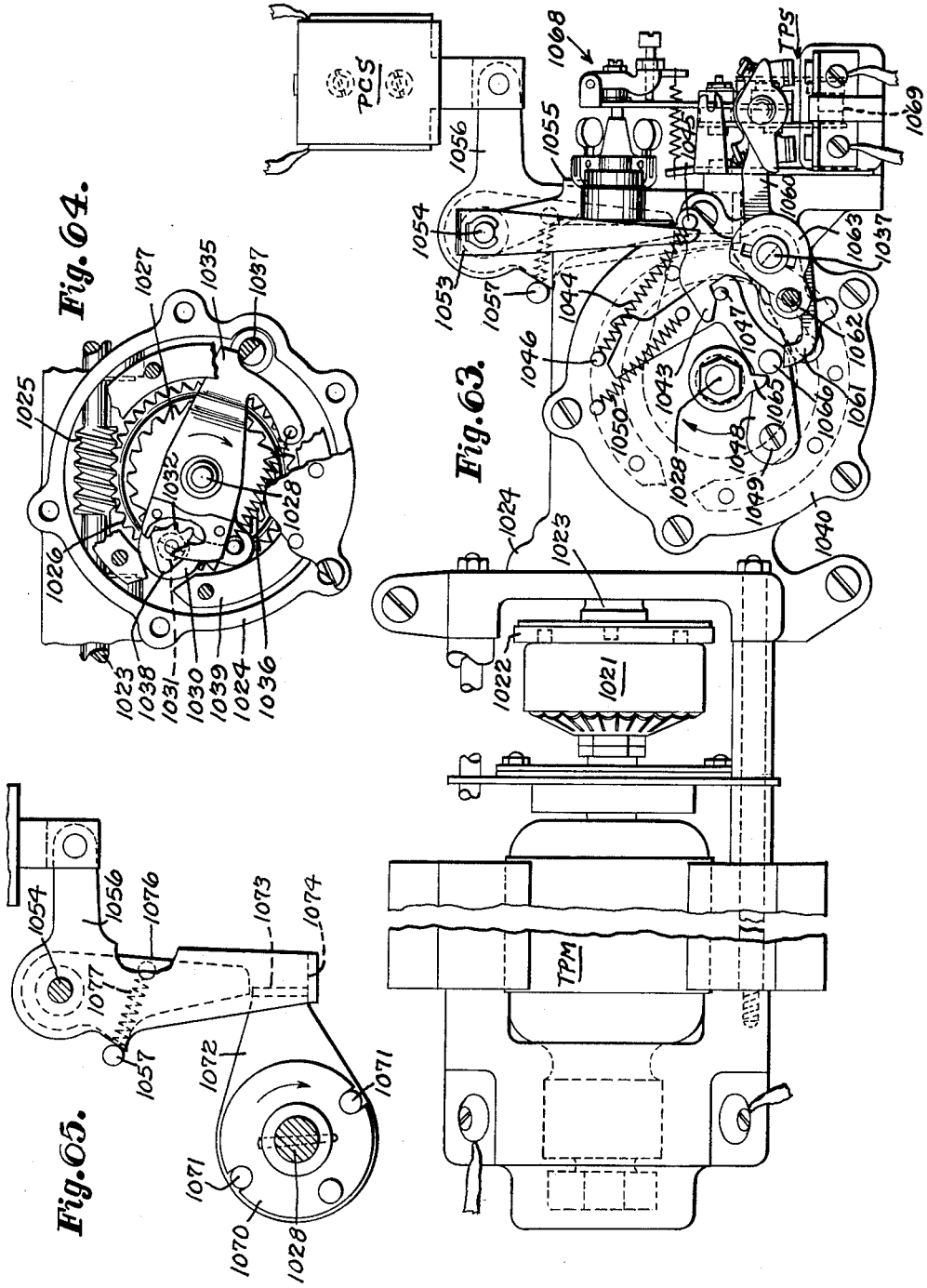

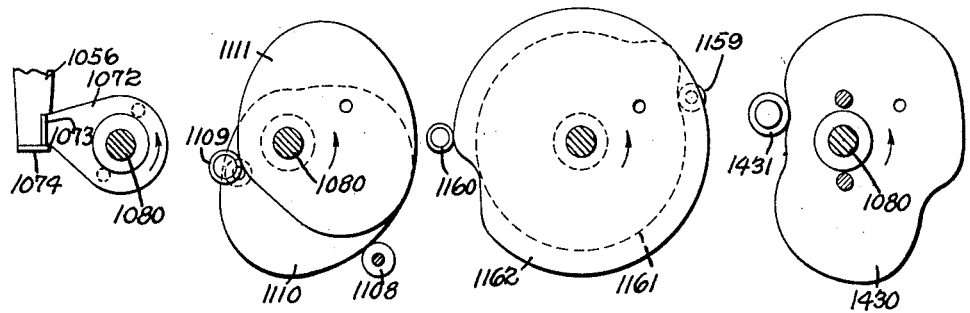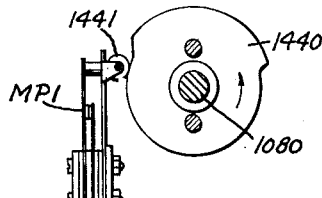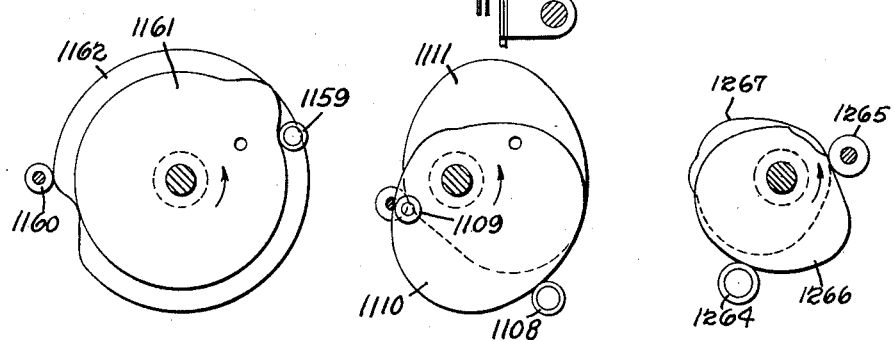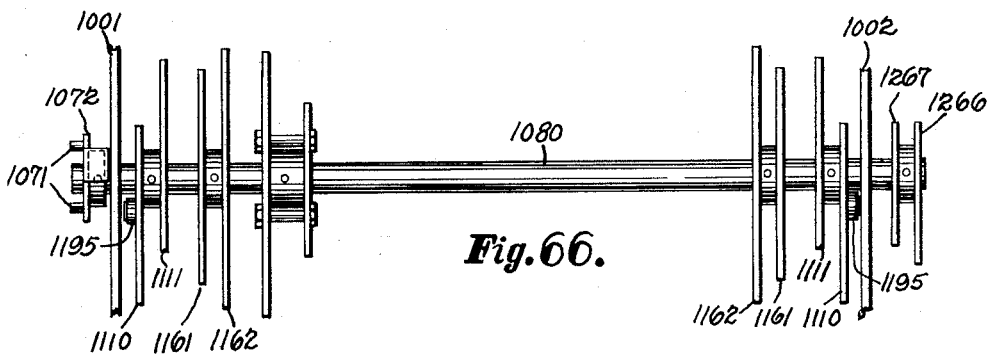

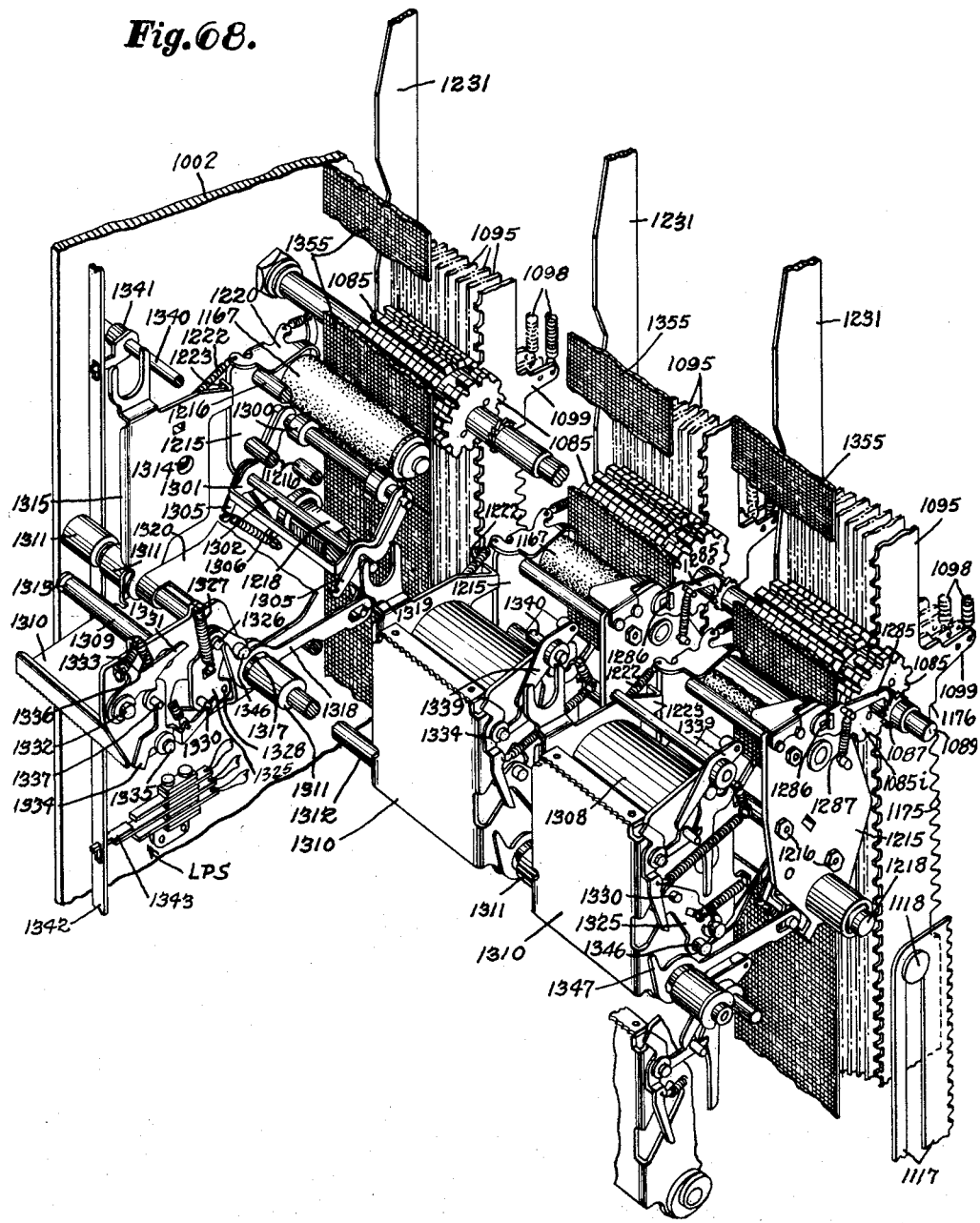

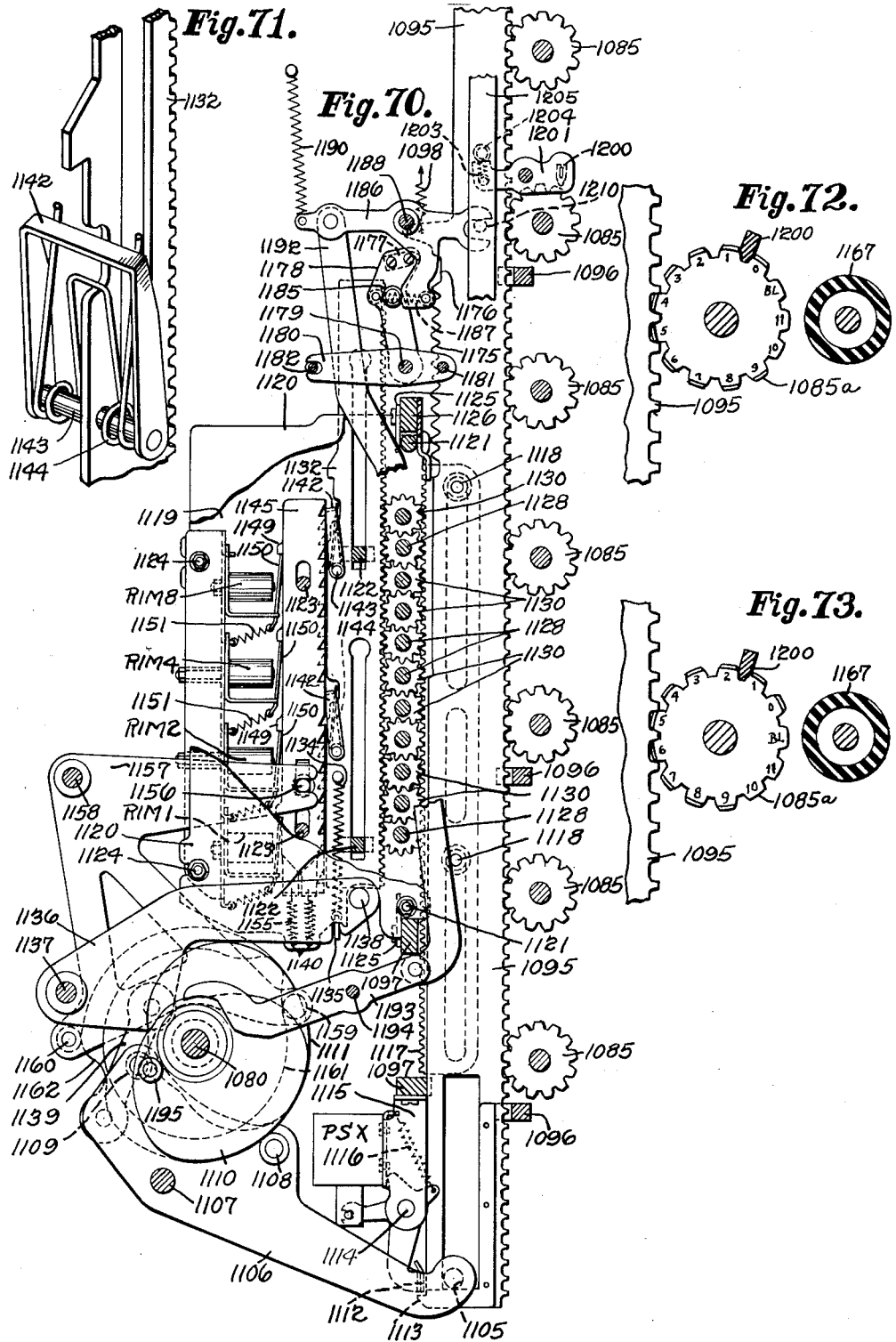

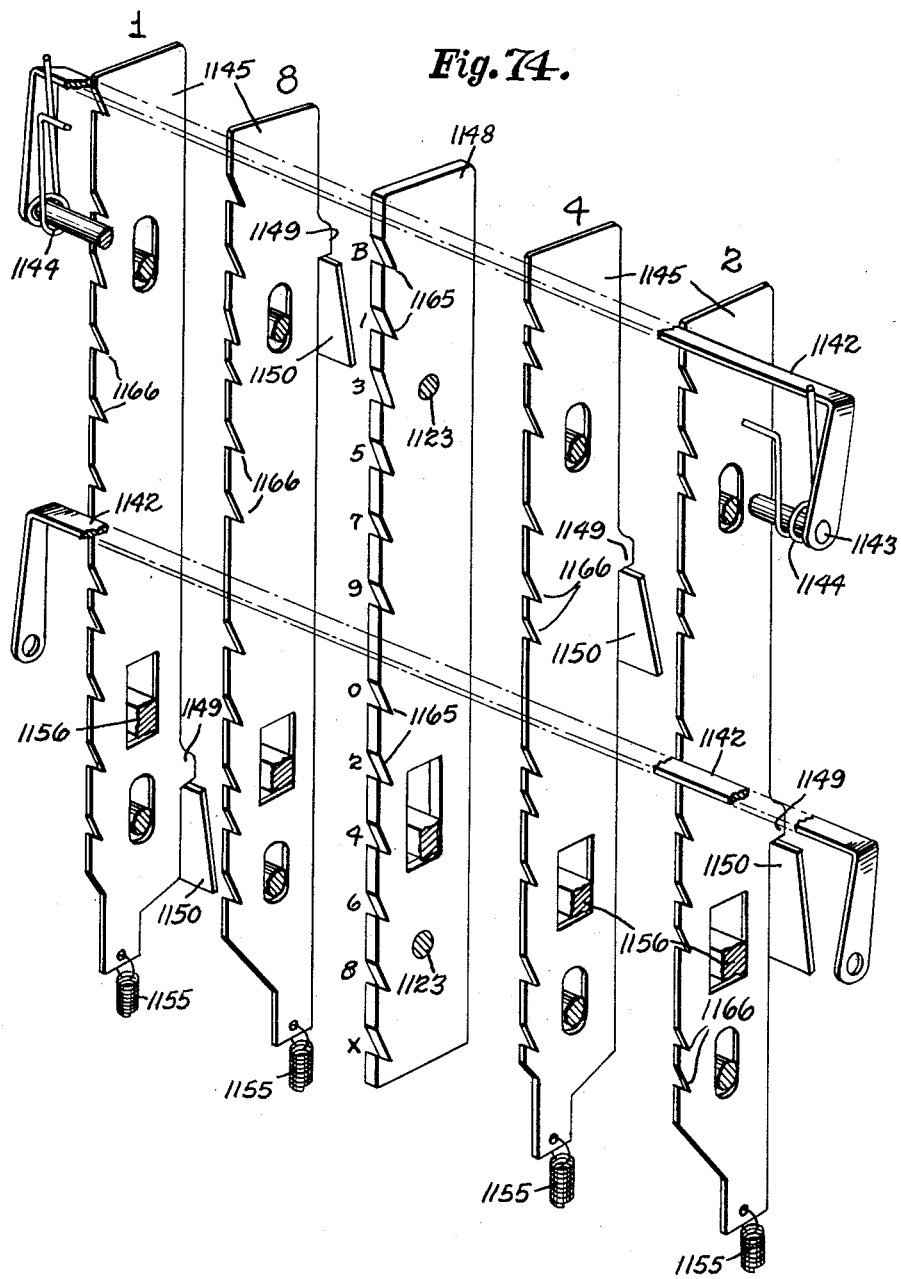

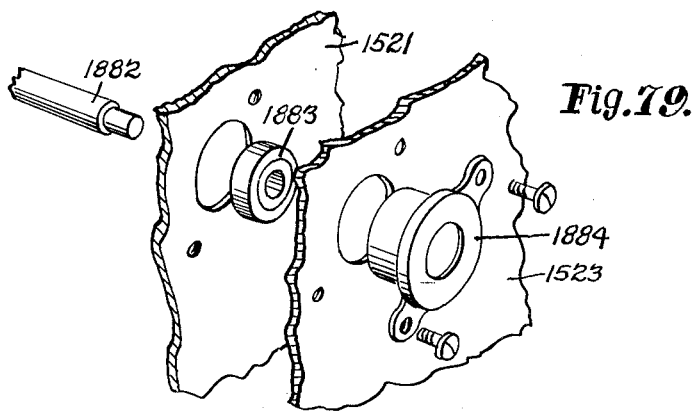
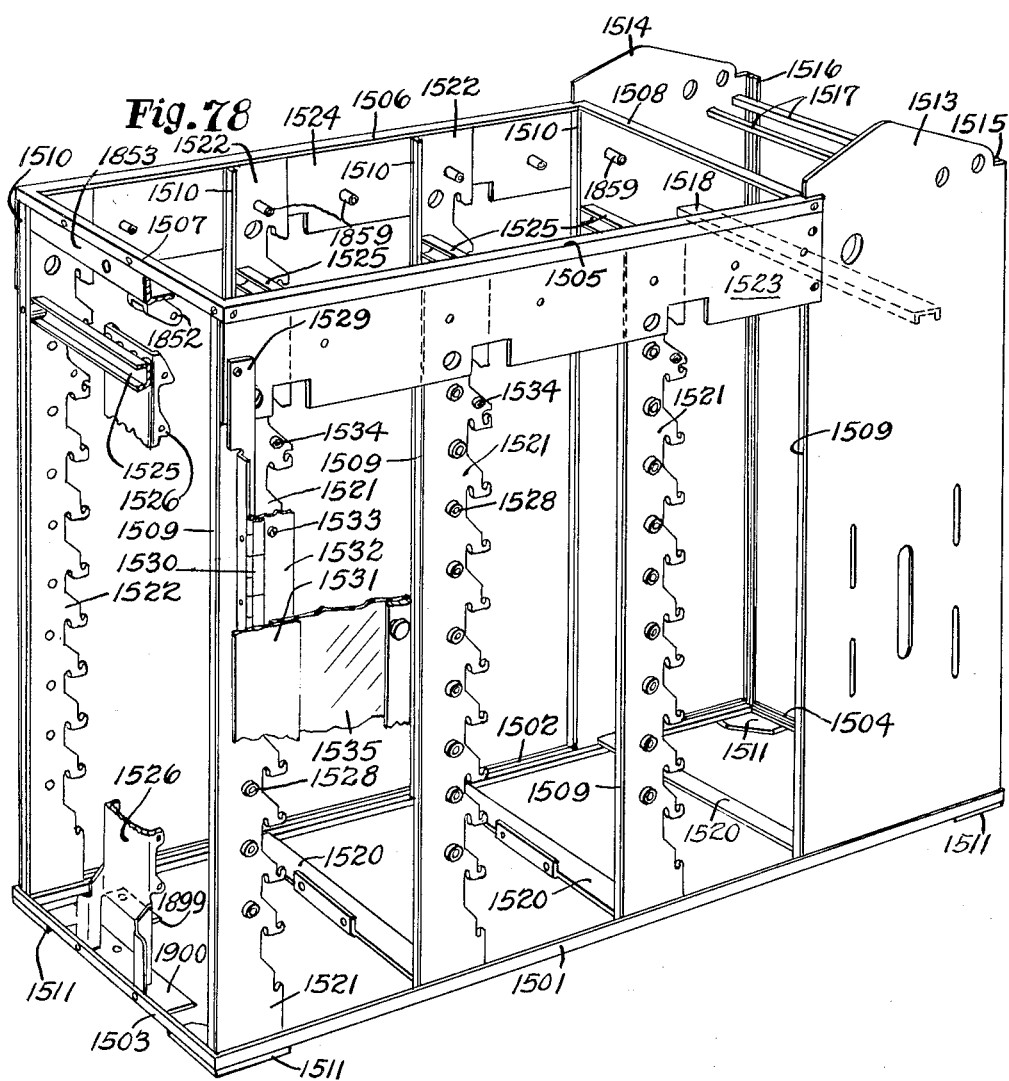

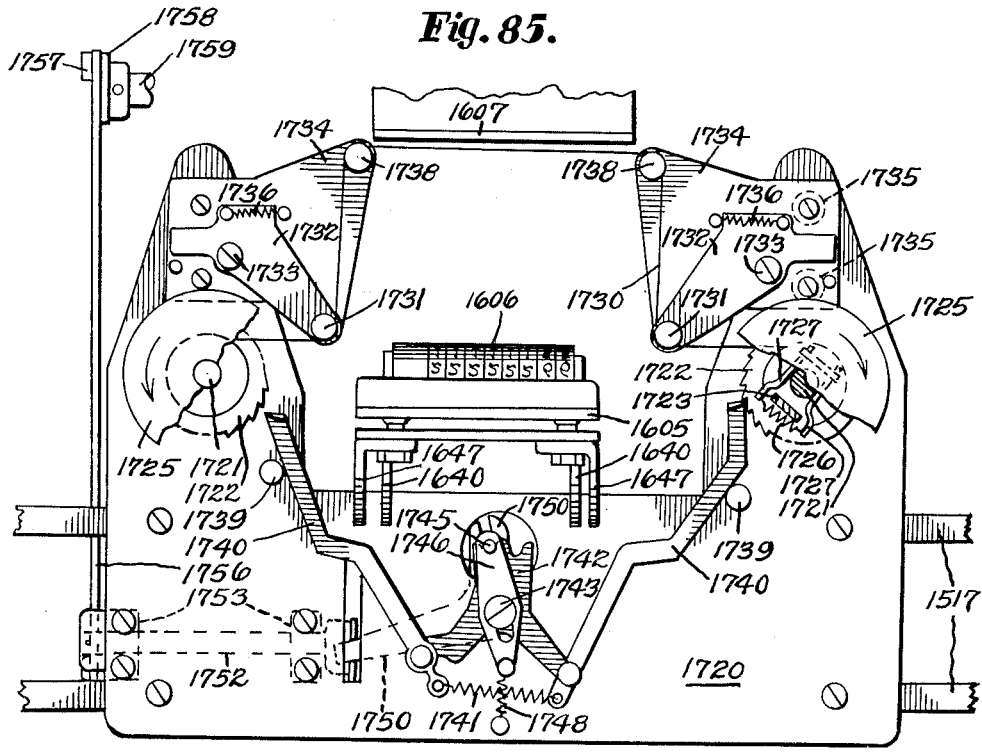
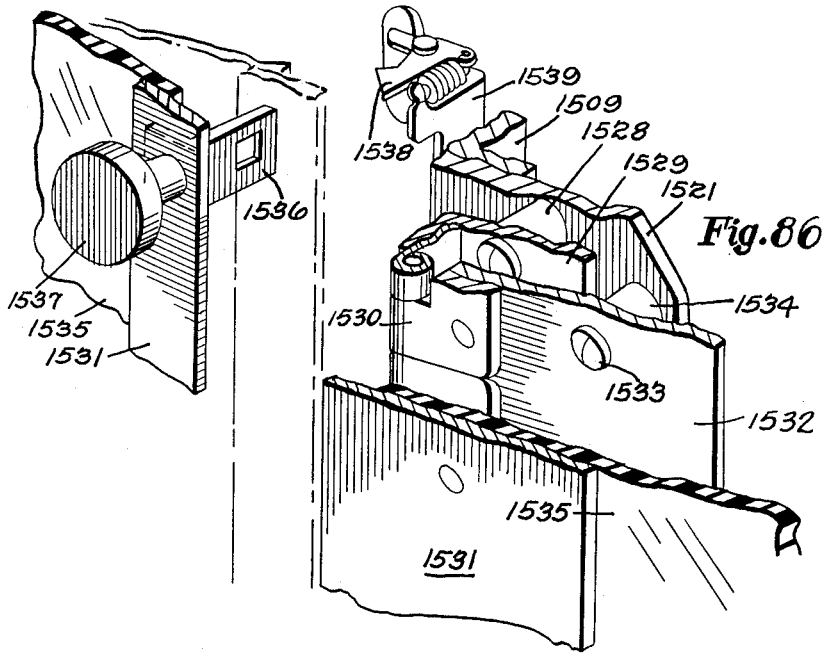

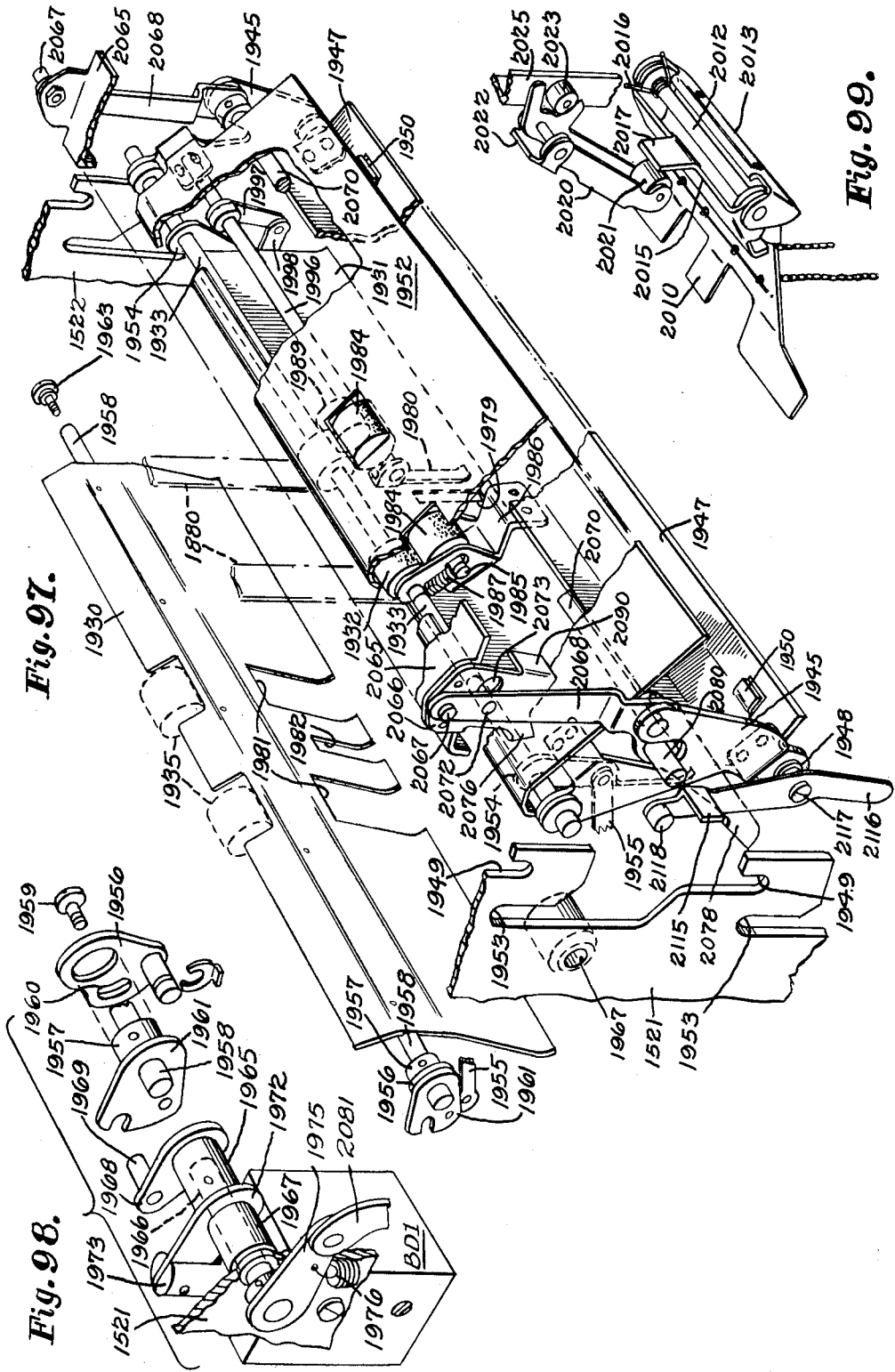

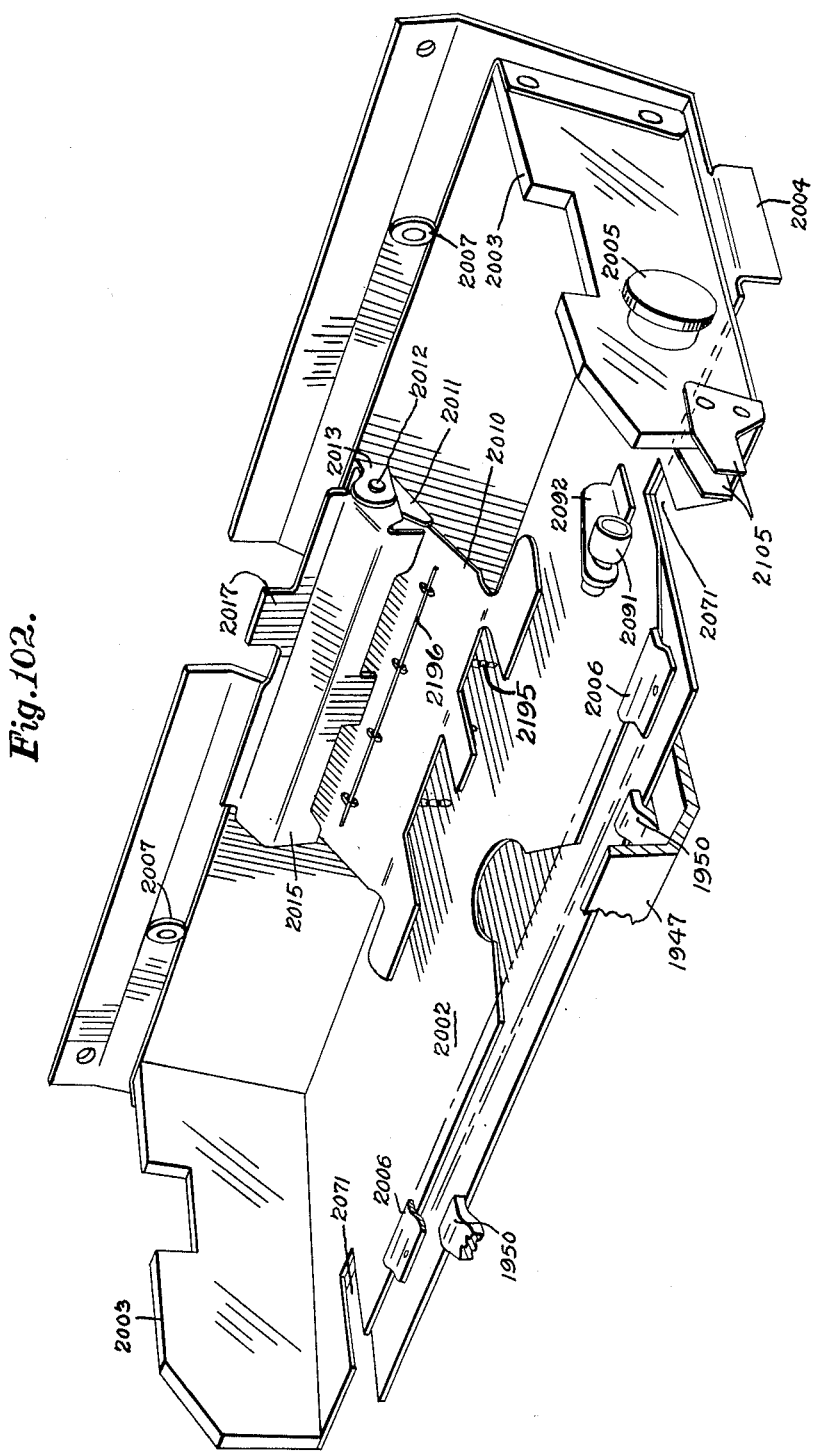

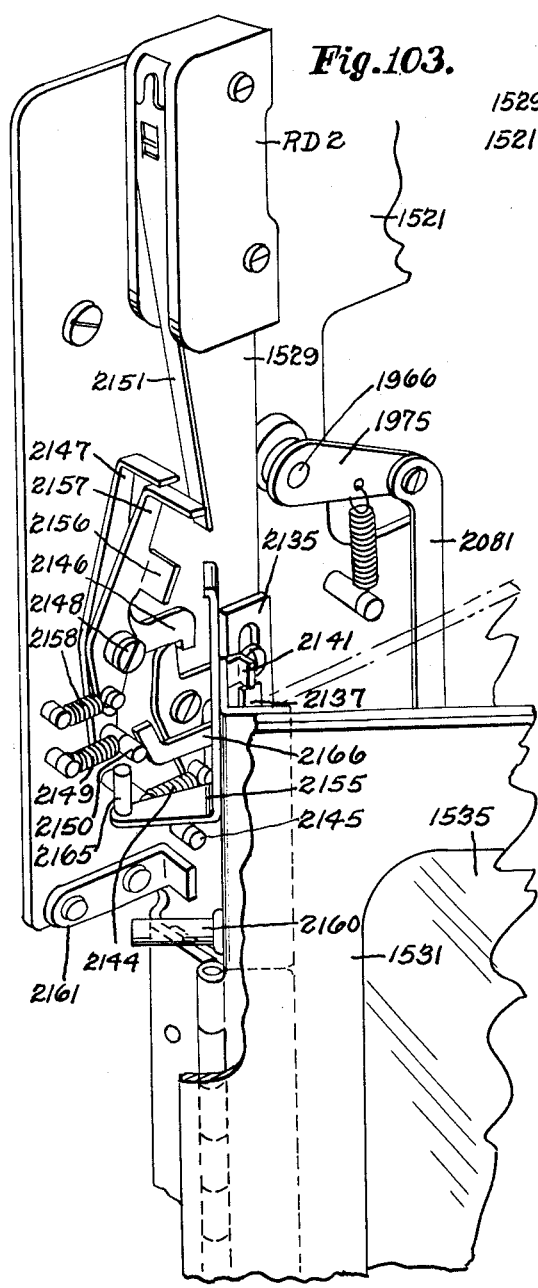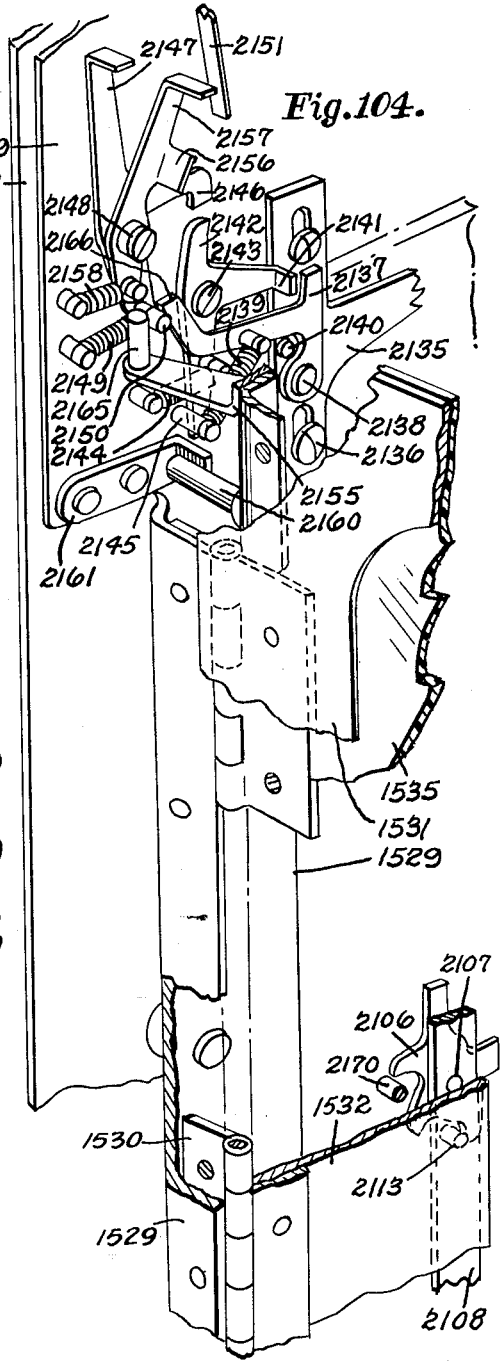

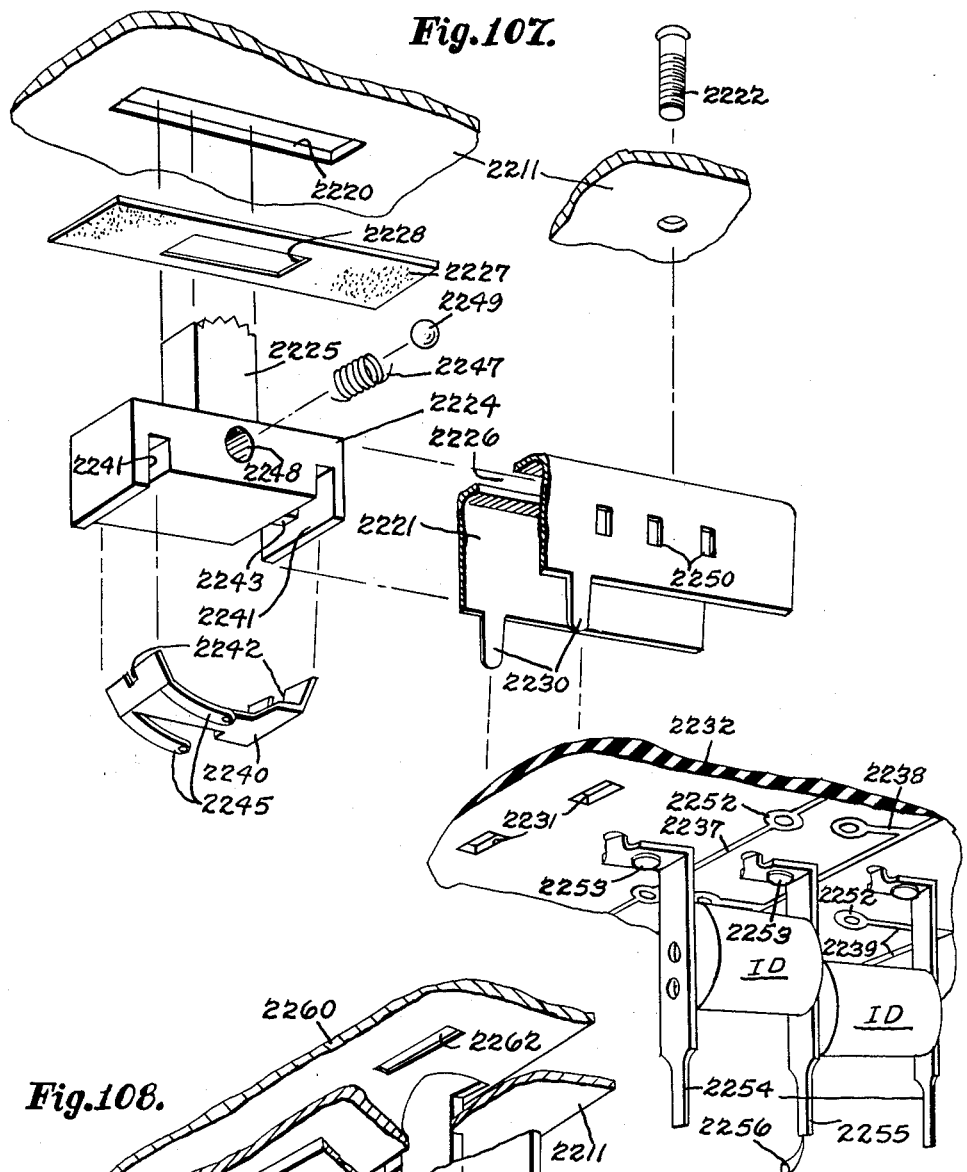
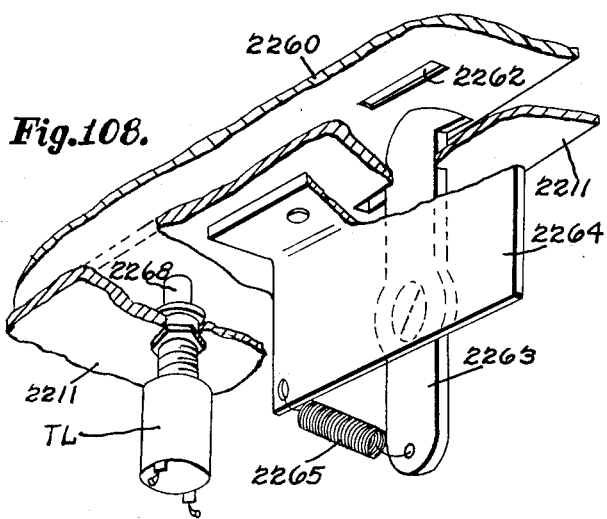

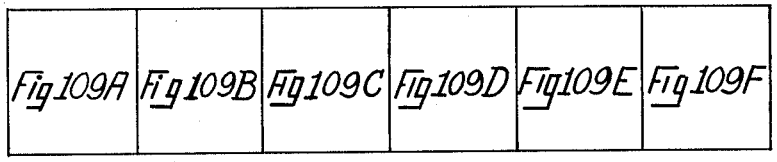
Fig. 109.
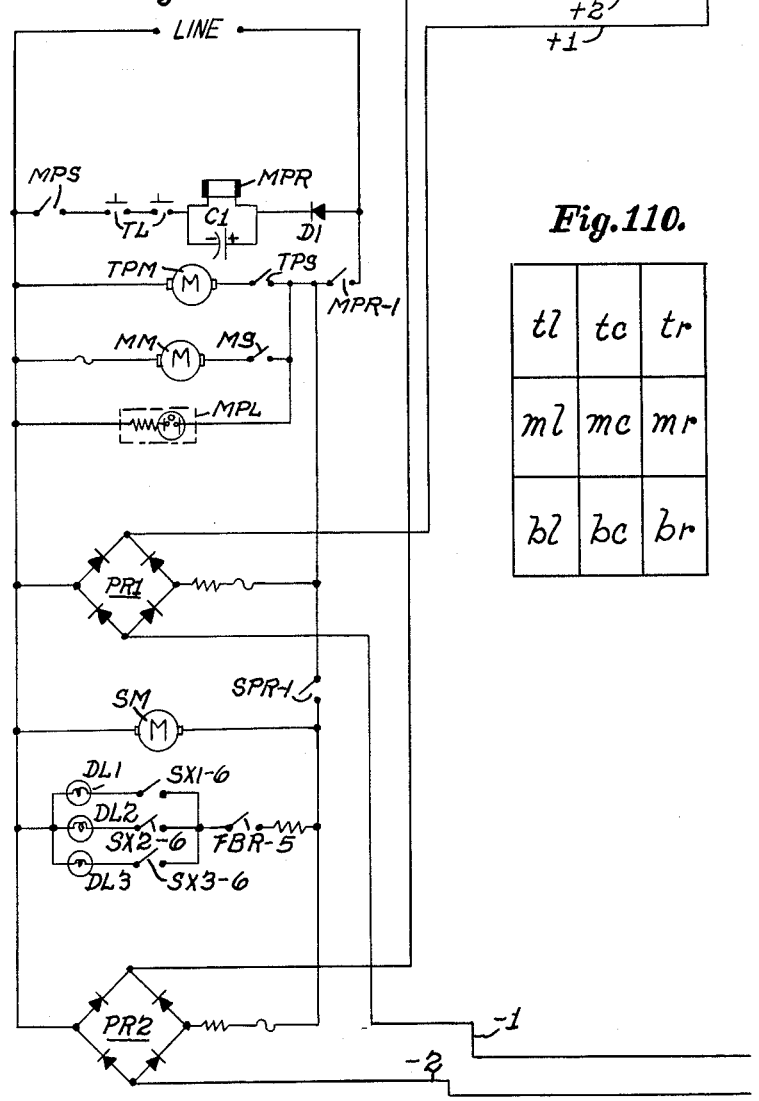
Fig. 109A.
Fig. 110.
| tl | tc | tr |
| ml | mc | mr |
| bl | bc | br |

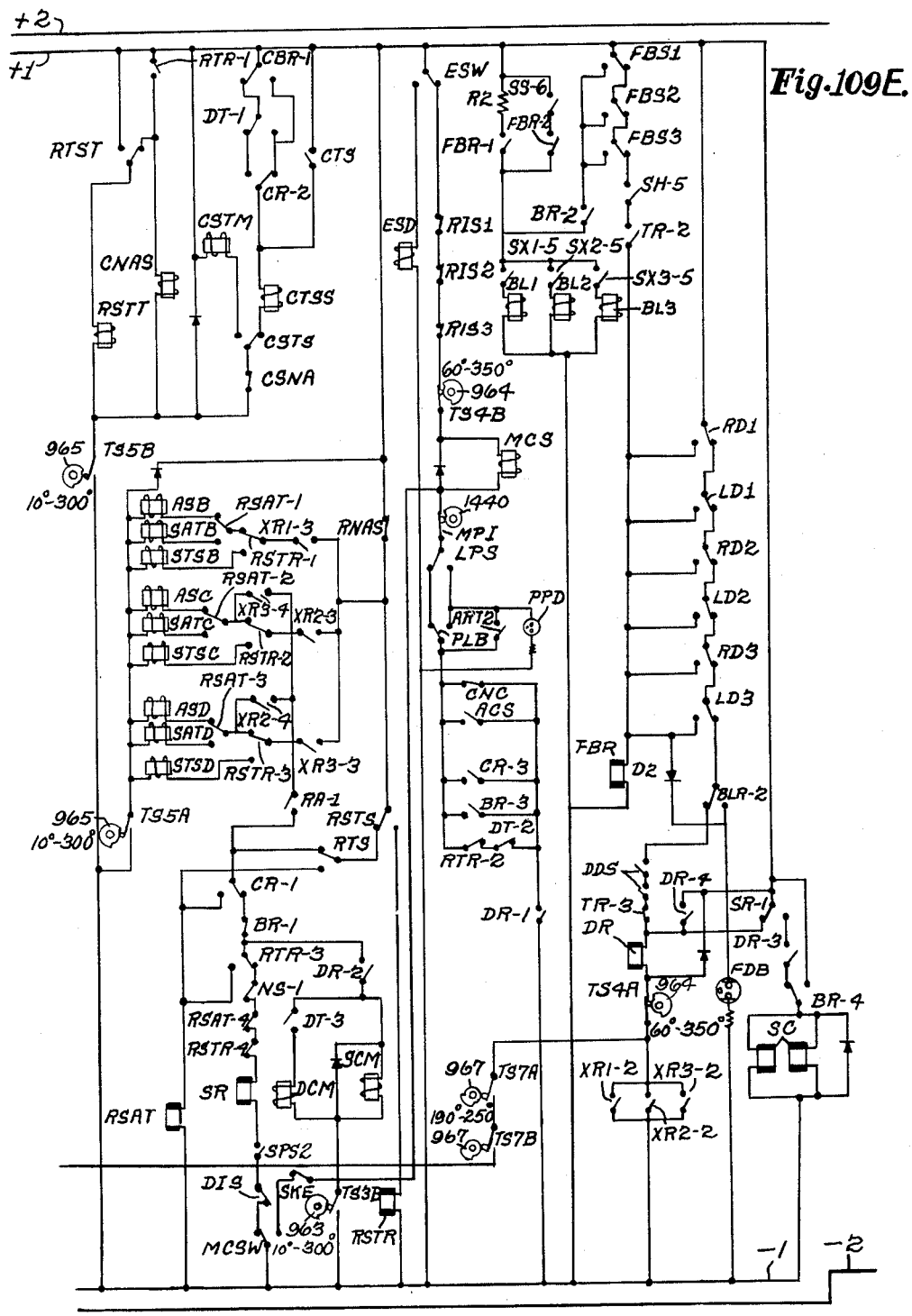

Fig. 111.

| | | | | |
|---|---|---|---|---|
| | JAN 27'57 | .00* | 0* | 1 |
| 4 4 5 0 2 0 | JAN 27'57 | 180.00- | 1 | 2 |
| | JAN 27'57 | 50.00 | 12 | 3 |
| | JAN 27'57 | 100.00 | 26 | 4 |
| | JAN 27'57 | 30.00 | 16 | 5 |
| | JAN 27'57 | .00*10* | | 6 |
| | JAN 27'57 | 50.00*19* | | 7 |
| 4 4 5 0 2 1 | JAN 27'57 | 200.00- | 2 | 8 |
| | JAN 27'57 | 100.00- | 7 | 9 |
| | JAN 27'57 | 135.00 | 26 | 10 |
| | JAN 27'57 | 175.00 | 22 | 11 |
| | JAN 27'57 | 200.00 | 2- | 12 |
| 4 4 5 0 2 2 | JAN 27'57 | 210.00- | 2 | 13 |
| | JAN 27'57 | 175.00*10* | | 14 |
| | JAN 27'57 | .00*19* | | 15 |
| 4 4 5 0 2 3 | JAN 27'57 | 225.00- | 1 | 16 |
| 4 4 5 0 2 4 | JAN 27'57 | 150.00- | 6 | 17 |
| | JAN 27'57 | 375.00 | 26 | 18 |
| | JAN 27'57 | .00*10* | | 19 |
| | JAN 27'57 | .00*19* | | 20 |
| 4 4 5 0 2 5 | JAN 27'57 | 664.00- | 1 | 21 |
| | JAN 27'57 | 255.00 | 12 | 22 |
| | JAN 27'57 | 45.00 | 26 | 23 |
| | JAN 27'57 | 84.00 | 12 | 24 |
| | JAN 27'57 | 136.00 | 12 | 25 |
| | JAN 27'57 | 180.00 | 16 | 26 |
| | JAN 27'57 | .00 | 12 | 27 |
| | JAN 27'57 | 84.00-12- | | 28 |
| | JAN 27'57 | 48.00 | 12 | 29 |
| | JAN 27'57 | .00*10* | | 30 |
| | JAN 27'57 | 439.00*19* | | 31 |
| | JAN 27'57 | 1,069.00- | 1* | 32 |
| | JAN 27'57 | 210.00- | 2* | 33 |
| | JAN 27'57 | 150.00- | 6* | 34 |
| | JAN 27'57 | 100.00- | 7* | 35 |
| | JAN 27'57 | 1,529.00CR | 0* | 36 |
| | JAN 27'57 | .00 | 1* | 37 |
| | JAN 27'57 | .00 | 2* | 38 |
| | JAN 27'57 | .00 | 3* | 39 |
| | JAN 27'57 | .00 | 4* | 40 |
| | JAN 27'57 | .00 | 5* | 41 |
| | JAN 27'57 | .00 | 6* | 42 |
| | JAN 27'57 | .00 | 7* | 43 |
| | JAN 27'57 | .00 | 8* | 44 |
| | JAN 27'57 | .00 | 9* | 45 |
| | JAN 27'57 | .00 | 10* | 46 |
| | JAN 27'57 | .00 | 11* | 47 |
| | JAN 27'57 | 489.00 | 12* | 48 |
| | JAN 27'57 | .00 | 13* | 49 |
| | JAN 27'57 | .00 | 14* | 50 |
| | JAN 27'57 | .00 | 15* | 51 |
| | JAN 27'57 | 210.00 | 16* | 52 |
| | JAN 27'57 | .00 | 17* | 53 |
| | JAN 27'57 | .00 | 18* | 54 |
| | JAN 27'57 | .00 | 19* | 55 |
| | JAN 27'57 | .00 | 20* | 56 |
| | JAN 27'57 | .00 | 21* | 57 |
| | JAN 27'57 | 175.00 | 22* | 58 |
| | JAN 27'57 | .00 | 23* | 59 |
| | JAN 27'57 | .00 | 24* | 60 |
| | JAN 27'57 | .00 | 25* | 61 |
| | JAN 27'57 | 655.00 | 26* | 62 |
| | JAN 27'57 | .00 | 27* | 63 |
| | JAN 27'57 | .00CR | 0* | 64 |

1170:

| | | |
|---|---|---|
| N 1 | .00* | 1 |
| A 1 | 180.00 | 2 |
| B 1 | 225.00 | 3 |
| A 1 | 664.00 | 4 |
| G 1 | 1,069.00* | 5 |
| N 1 | .00* | 6 |

| | | |
|---|---|---|
| A 2 | .00* | 1 |
| M 2 | 200.00 | 2 |
| O 2 | 200.00- | 3 |
| T 2 | 210.00 | 4 |
| A 2 | 210.00* | 5 |
| A 2 | .00* | 6 |

| | | |
|---|---|---|
| A 6 | .00* | 1 |
| T 6 | 150.00 | 2 |
| A 6 | 150.00* | 3 |
| B 6 | .00* | 4 |

| | | |
|---|---|---|
| G 7 | .00* | 1 |
| N 7 | 100.00 | 2 |
| H 7 | 100.00* | 3 |
| H 7 | .00* | 4 |

| | | |
|---|---|---|
| M 10 | .00* | 1 |
| O 10 | .00* | 2 |
| T 10 | 175.00* | 3 |
| T 10 | .00* | 4 |
| A 10 | .00* | 5 |
| B 10 | .00* | 6 |

| | | |
|---|---|---|
| M 12 | .00* | 1 |
| O 12 | 50.00 | 2 |
| T 12 | 255.00 | 3 |
| T 12 | 84.00 | 4 |
| A 12 | 136.00 | 5 |
| B 12 | .00 | 6 |
| A 12 | 84.00- | 7 |
| G 12 | 48.00 | 8 |
| B 12 | 489.00* | 9 |

| | | |
|---|---|---|
| A 16 | .00* | 1 |
| B 16 | 30.00 | 2 |
| A 16 | 180.00 | 3 |
| G 16 | 210.00* | 4 |

| | | |
|---|---|---|
| M 19 | .00* | 1 |
| C 19 | 50.00* | 2 |
| A 19 | .00* | 3 |
| M 19 | .00* | 4 |
| O 19 | 439.00* | 5 |
| T 19 | .00* | 6 |

| | | |
|---|---|---|
| C 22 | .00* | 1 |
| A 22 | 175.00 | 2 |
| M 22 | 175.00* | 3 |

| | | |
|---|---|---|
| B 26 | .00* | 1 |
| H 26 | 100.00 | 2 |
| H 26 | 135.00 | 3 |
| C 26 | 375.00 | 4 |
| A 26 | 45.00 | 5 |
| M 26 | 655.00* | 6 |

| REF. | CCT. | MEC.FIGS. | REF. | CCT. | MEC.FIGS. | REF. | CCT. | MEC.FIGS. |
|---|---|---|---|---|---|---|---|---|
| ACS | Emc | 2,4,25 | ECA | Ftc | 81,84 | RFM | Ftr | 81 |
| AF1- | | | ECB | Ftc | 84 | RIM1- | | |
| AF27 | B | 106 | ESD | Etc | 20 | RIM4 | Dr | 69,70 |
| ART1 | Cmc | 28 | ESW | Etc | 20 | RNAS | Emc | 4 |
| ART2 | Emc | 28 | FBR | Emr | 95 | RIS1 | Etc | 24 |
| ASB | Eml | 2 | FBR-1 | Etc | | RIS2 | Etc | 24 |
| ASC | Eml | 2 | FBR-2 | Etc | | RIS3 | Etc | 24 |
| ASD | Eml | 2,27 | FBR-3 | Ctc | | RO1- | | |
| BD1- | | | FBR-4 | Ftl | | RO10 | Dc | 2,26,51 |
| BD27 | Fl | 94,98,101 | FBR-5 | Ab | | ROS | Dtc | 2,26,51 |
| BL1 | Etc | 101 | FBS1 | Etr | 100 | RSAT | Ebl | 105 |
| BL2 | Etc | 101 | FBS2 | Etr | 100 | RSAT-1 | Eml | |
| BL3 | Etc | 101 | FBS3 | Etr | 100 | RSAT-2 | Eml | |
| BLR | Cmc | 101 | FDB | Ebr | 6 | RSAT-3 | Eml | |
| BLR-1 | Cmc | | FE | Bbc | 105 | RSAT-4 | Ebl | |
| BLR-2 | Emr | | FE-1 | Ftc | | RSTR | Ebc | 105 |
| BR | Fml | 105 | LD1 | Emr | 94 | RSTR-1 | Eml | |
| BR-1 | Ebl | | LD2 | Emr | 94 | RSTR-2 | Eml | |
| BR-2 | Etr | | LD3 | Emr | 94 | RSTR-3 | Eml | |
| BR-3 | Emc | | LPS | Emc | 68 | RSTR-4 | Ebl | |
| BR-4 | Ebr | | M19 | Ctr | 24 | RSTS | Emc | 2,4 |
| BR-5 | Ftl | | MCS | Emc | 5 | RSTT | Etl | 2,27 |
| C1 | At | | MCSW | Ebl | 5 | RTR | Bbc | 105 |
| C2 | Fbr | | MM | At | 3 | RTR-1 | Etl | |
| CBR | Bbc | 105 | MPI | Emc | 61A,67 | RTR-2 | Emc | |
| CBR-1 | Etl | | MPL | Am | 6 | RTR-3 | Ebl | |
| CCS | Ftc | 87 | MPR | At | 105 | RTS | Eml | 2,4,28 |
| CD2 | Ftc | 90,96 | MPS | At | 6 | RTST | Etl | 2,4,28 |
| CD3 | Ftc | 91,96 | MS | At | | S19 | Ctr | 7 |
| CNAS | Etl | 2 | NARS | Bbc | 4 | SATB | Eml | 2 |
| CNC | Emc | 32 | NE | Bbl | 105 | SATC | Eml | 2 |
| CORS | Ctr | 2,4,25 | NE-1 | Fmc | | SATD | Eml | 2,27 |
| CR | Ctr | 105 | NS | Bbl | 105 | SBRS | Fml | 2,4,25 |
| CR-1 | Ebl | | NS-1 | Ebl | | SC | Ebr | 105 |
| CR-2 | Etl | | PB1 | Fbr | 100 | SC-1- | | |
| CR-3 | Emc | | PB2 | Fbr | 100 | SC-9 | Cc | |
| CSNA | Etl | 4 | PB3 | Fbr | 100 | SC-10 | Ctc | |
| CSTM | Etl | 2,27 | PCS | Dbr | 61A,63 | SCM | Ebc | 50 |
| CSTS | Etl | 4 | PLB | Emc | 6 | SD1- | | |
| CTS | Etl | 4 | PM10 | Cmr | 22 | SD27 | Fr | 100 |
| CTSS | Etl | 2,4,5,27 | PM19 | Ctr | 22 | SF1- | | |
| D1 | At | | PM20 | Cmr | 22 | SF27 | B | 106 |
| DCM | Ebl | 39,47 | PPD | Emc | 6 | SH | Fmc | 95 |
| DDS | Ebr | 81,82 | PR1 | Am | 105 | SH-1 | Ftc | |
| DIS | Ebl | | PR2 | Ab | 95 | SH-2 | Ftc | |
| DL1 | Ab | 101 | PS1 | Fmc | 100 | SH-3 | Ctc | |
| DL2 | Ab | 101 | PS2 | Fmc | 100 | SH-4 | Ftr | |
| DL3 | Ab | 101 | PS3 | Fmc | 100 | SH-5 | Etr | |
| DR | Ebr | 105 | PSX1 | Cbr | 61A,70 | SKE | Ebl | 7 |
| DR-1 | Ebc | | PSX2 | Cbr | 61A,70 | SM | Ab | 80,95 |
| DR-2 | Ebl | | PSX3 | Cbr | 61A,70 | SPR | Cmc | 95 |
| DR-3 | Ebr | | PSY1- | | | SPR-1 | Am | |
| DR-4 | Ebr | | PSY9 | Cl | 60,62,77 | SPS-1 | Ctr | 6 |
| DRS | Ftc | 81,82 | RA | Bbl | 105 | SPS-2 | Ebl | 6 |
| DT | Bbc | 105 | RA-1 | Eml | | SR | Ebl | 105 |
| DT-1 | Etl | | RD1 | Emr | 101,103 | SR-1 | Ebr | |
| DT-2 | Emc | | RD2 | Emr | 101,103 | SR-2 | Fbc | |
| DT-3 | Ebl | | RD3 | Emr | 101,103 | SR-3 | Fmc | |

*Fig.112.*

| REF. | CCT. | MEC.FIGS. | REF. | CCT. | MEC.FIGS. | REF. | CCT. | MEC.FIGS. |
|---|---|---|---|---|---|---|---|---|
| SS | Fbc | 95 | SXS1 | Ctr | 7 | TS5B | Eml | |
| SS-1 | Fbc | | SXS2 | Ctr | 7 | TS6 | Ftr | |
| SS-2 | Fmc | | SXS3 | Ctr | 7 | TS7A | Ebc | |
| SS-3 | Ftr | | SY1- | | | TS7B | Ebc | |
| SS-4 | Ftr | | SY9 | Cc | 95 | TS8 | Ctc | |
| SS-5 | Ftr | | SY1-1- | | | X1 | Ctr | 105 |
| SS-6 | Etc | | SY9-1 | Cc | | X1-1- | | |
| ST19 | Ctr | | SY1-2- | | | X1-9 | Br | |
| STSB | Emr | 2 | SY9-2 | Ftl | | X1-10 | Cmr | |
| STSC | Emr | 2 | SY1-3- | | | X1-11 | Ctc | |
| STSD | Emr | 2,27 | SY9-3 | Fml | | X2 | Ctr | 105 |
| STX1 | Cmr | 29 | SY1-4- | | | X2-1- | | |
| STX2 | Cmr | 29 | SY9-4 | Fbl | | X2-9 | Br | |
| STX3 | Cmr | 29 | SYS1- | | | X2-10 | Cmr | |
| STY1- | | | SYS9 | Cl | 7 | X2-11 | Ctc | |
| STY9 | Cl | 29 | TL | At | 108 | X3 | Ctr | 105 |
| SX1- | Ctc | | TPM | At | 61A,63 | X3-1- | | |
| SX3 | Cmc | 95 | TPS | At | 63 | X3-9 | Br | |
| SX1-1- | Ctc | | TR | Fmr | 95 | X3-10 | Cmc | |
| SX3-1 | Cmc | | TR-1 | Ftr | | X3-11 | Cmc | |
| SX1-2- | | | TR-2 | Etr | | XR1- | | |
| SX3-2 | Fbl | | TR-3 | Ebr | | XR3 | Cmr | |
| SX1-3- | | | TR-4 | Fbr | | XR1-1- | | |
| SX3-3 | Fbr | | TR-5 | Ftl | | XR3-1 | Cbr | |
| SX1-4- | | | TS1A | Fmc | 59 | XR1-2- | | |
| SX3-4 | Ftr | | TS1B | Fbc | 59 | XR3-2 | Ebr | |
| SX1-5- | Etc | | TS2A | Ftc | 59 | XR1-3- | | |
| SX3-5 | Etr | | TS2B | Ftr | 59 | XR3-3 | Eml | |
| SX1-6- | | | TS3A | Ftl | 59 | XR2-4 | Eml | |
| SX3-6 | Ab | | TS3B | Ebl | 59 | XR3-4 | Eml | |
| SXM1 | Cmr | 24,25 | TS4A | Ebr | 59 | ZE3- | | |
| SXM2 | Cmr | 24,25 | TS4B | Etc | 59 | ZE10 | Dr | |
| SXM3 | Cmr | 24,25 | TS5A | Emr | 59 | | | |

*Fig.112A.*

United States Patent Office 3,089,641
Patented May 14, 1963

3,089,641
COMBINED DOCUMENT SORTER, PRINTER AND ACCOUNTING MACHINE SYSTEM
Arthur J. Fettig, Grosse Pointe Farms, Don M. Jenks, Ferndale, Charles Lasdine, Detroit, Earl P. Maidment, Royal Oak, and Byron A. Runde, Farmington, Mich., assignors to Burroughs Corporation, Detroit, Mich., a corporation of Michigan
Filed Dec. 26, 1957, Ser. No. 705,443
27 Claims. (Cl. 235—60.13)

This invention relates to a document sorting and accounting system and apparatus and more particularly to a system and apparatus by means of which documents may be sorted very rapidly with a minimum of human effort while figures related to the documents are entered into computing mechanism and computations involving those figures are performed and while records of the figures of each of a plurality of sorted groups of documents and a record of all of the figures and computations are also produced.

The invention is of great utility in carrying out various kinds of accounting work requiring the rapid sorting of documents, such for example, as the work which is performed in the proof departments of banks and in which "over-the-counter" deposits are to be proved and the checks and sometimes other documents accompanying the "Deposit" slips are to be sorted and each of certain sorted groups of checks is to be provided with a transit letter showing the amount of each check of the group and the total thereof for forwarding with the group of checks to another bank or a clearing house for clearing and settlement.

An object of the present invention is to provide an accounting and document sorting apparatus comprising computing mechanism including amount entering mechanism, a plurality of registers, register selecting means to select the registers for cooperation with said amount entering means, and manipulative means for controlling the register selecting means, and document sorting apparatus having a plurality of sorted document bins, an inserted document receiver, means for conveying an inserted document from said receiver to any of said bins, and means controlled by said register selecting manipulative means to direct the document conveyed from said receiver into a selected one of the bins corresponding to the selected register.

A further object of the invention is to provide an accounting and document sorting apparatus according to the preceding paragraph, and provided also with a plurality of printers having indexable type members, means controlled by said amount entering means for indexing the type members of said printers and means controlled by said register and sorting bin selecting manipulative means to select individual printers for operation to record amounts entered into corresponding individual ones of the registers.

A further object of the invention is to provide apparatus of the character stated, having also program control means including means settable for control by said register and bin selecting means to prevent operation of the sorting apparatus in operations in which predetermined registers are selected for operation.

A further object of the invention is to provide a system of the kind above specified in which, when predetermined ones of the registers are selected for operation, operation is prevented unless a document for sorting is inserted in the document receiver.

A further object of the invention is to provide printing means associated with the document receiver for printing on documents therein prior to the sorting thereof and means controlled by the register and bin selecting manipulative means for controlling the operation of said printing means.

A further object of the invention is to provide an accounting and sorting apparatus of the last stated kind wherein the programming control means includes provisions to render the register and bin selecting manipulating means effective to cause the printing mechanism associated with the document receiver to be rendered operative when said selecting means is conditioned for selecting predetermined registers and bins but inoperative when said selecting means is conditioned for selecting other registers and bins.

A further object of the invention is to provide means for the detection of the actual delivery of documents into the selected sorting bins and to control the apparatus in a manner to insure the delivery to the selected bin of each document being sorted.

A further object of the invention is to provide means normally preventing access by the operator to the sorter bins and means operable to release said preventing means to permit access by the operator to a selected bin.

A further object of the invention is to provide means controlled by said bin release control means to prevent the apparatus from being operated otherwise in a special manner.

A further object of the invention is to provide means controlled by said bin release control means to require, in an operation following the release of the bin, the selection of the same bin and the corresponding register.

A further object is to provide means for proving the accuracy of the accounting work related to the documents being sorted.

A further object is to provide means for blocking operation of the apparatus with respect to a further transaction when an error exists with respect to the computation relating to the transaction last previously computed.

A further object of the invention is to provide an accounting and document sorting system and apparatus comprising computing mechanism capable of a plurality of controlled variations of computation, a sorting apparatus adapted to sort inserted documents to a plurality of bins, selecting means to select the bins to which documents are to be sorted, and programming control means associated with said selecting means and settable to enable said selecting means to control said computing means to perform predetermined ones of said variations of computation when said selecting means is operated to select predetermined ones of said sorting bins to receive sorted documents.

A further object is to provide an accounting and document sorting system and apparatus comprising computing mechanism comprising a plurality of totalizers and totalizer selecting means, a sorting apparatus having a document receiver and a plurality of bins to which it can selectively sort documents entering said receiver, means to select the bins for receiving sorted documents and means to sense the presence of a document in said receiver, manipulative means to control both said totalizer selecting means and said bin selecting means, means controllable by said sensing means to prevent an operation when no document is in said receiver, and programming control means associated with said selection control manipulative means to disable said preventing means when said manipulative means is manipulated to select predetermined ones of said totalizers.

A further object is to provide a system and apparatus of the last-stated kind, wherein said computing mechanism includes also a transaction computing totalizer capable of a plurality of kinds of computing functions, and wherein said programming control means is settable to predetermine the kind of computing function which will be performed by said transaction computing totalizer when predetermined ones of said previously mentioned totalizers are selected by said manipulative means.

The foregoing and other objects, features and advantages of the invention will be explained in the following description of a preferred embodiment of the invention illustrated in the accompanying drawings in which:

FIGURE 3 is a left side elevation of the master accounting machine with its casing removed;

FIGURE 4 is a detail in perspective of control elements associated with certain function control keys;

FIGURE 5 is a detail in perspective of certain function control and cycle initiating elements;

FIGURE 6 is a plan showing the arrangement of the keys and certain switches and signal lamps on the keyboard of the master machine;

FIGURE 7 is a detail in perspective of certain control elements associated with the selection keys;

FIGURE 8 is a detail illustrating the latching of a selection key in fully depressed position;

FIGURE 9 is a detail illustrating the retention of a selection key in partially depressed position following an operation in which the sorter bin corresponding to the latched key has been unlatched;

FIGURES 10 and 11 are details of interlock devices associated with the selection keys;

FIGURE 12 is a detail in perspective of control elements associated with the selection keys;

FIGURES 13, 14 and 15 are right side elevations of slides associated with each bank of selection keys;

FIGURES 16, 17 and 18 are right side elevations of slides associated with the function control keys;

FIGURE 19 shows interlock elements associated with certain function control keys;

Figure 24:
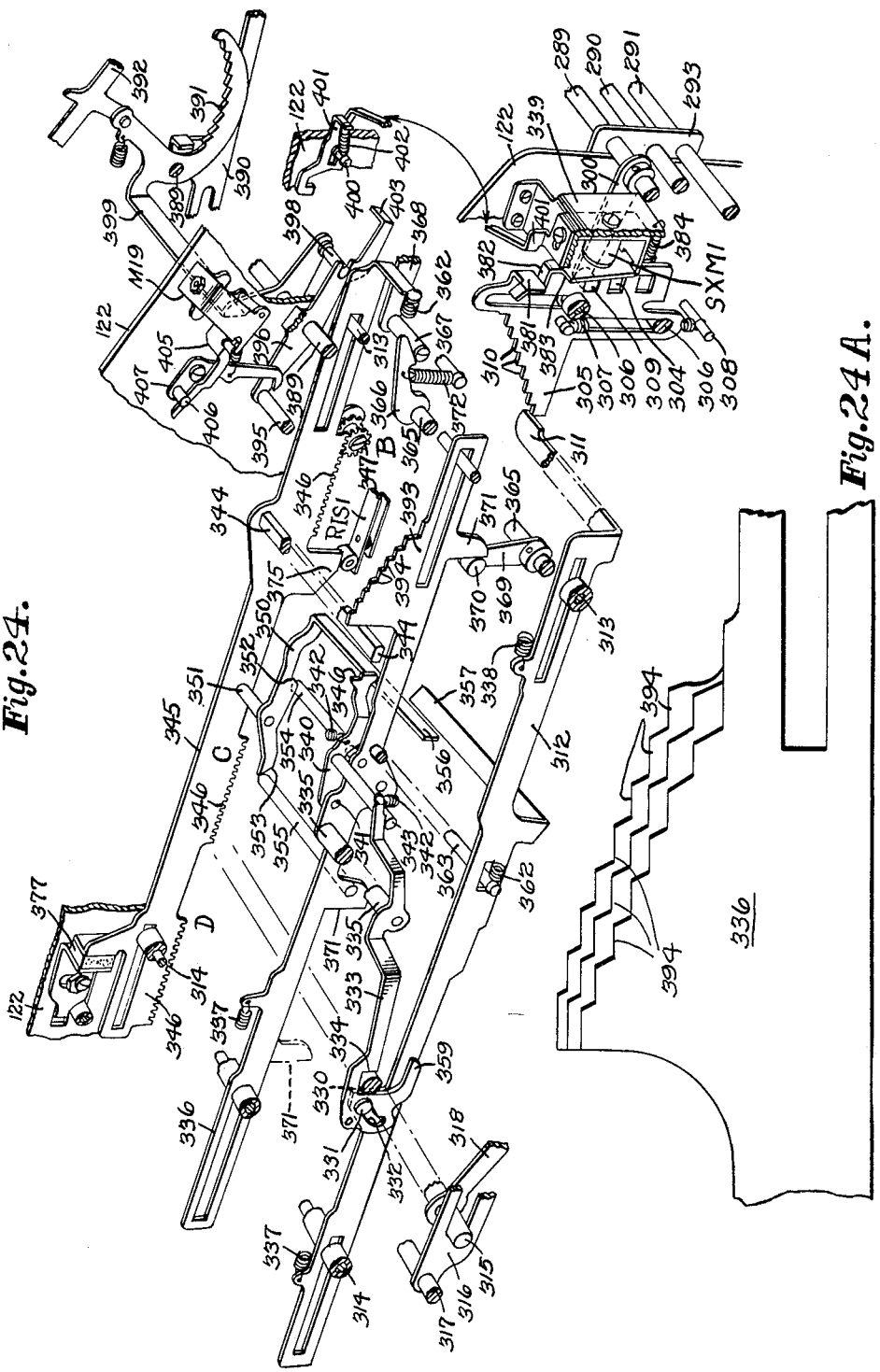
Figure 25:
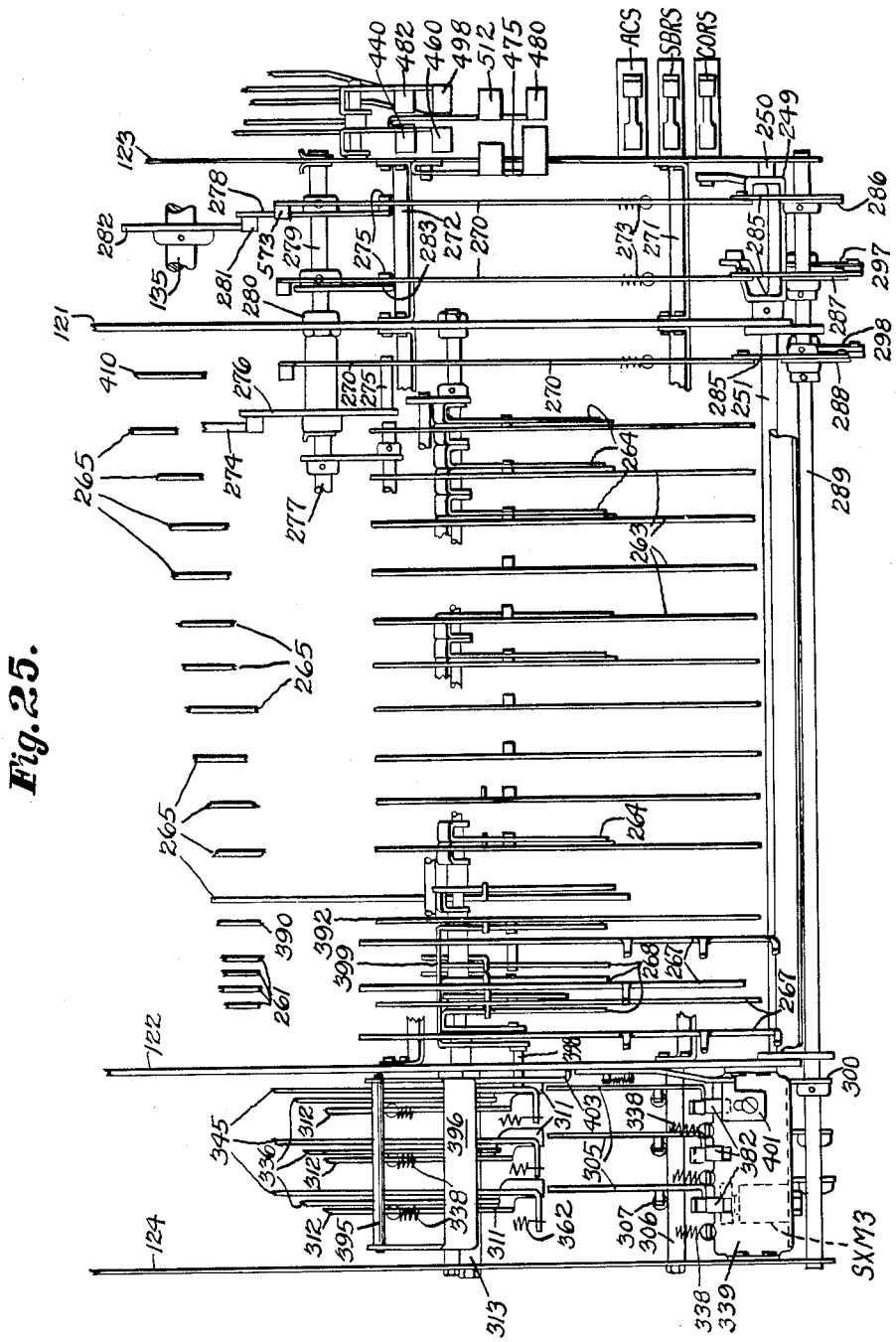
Figure 26:
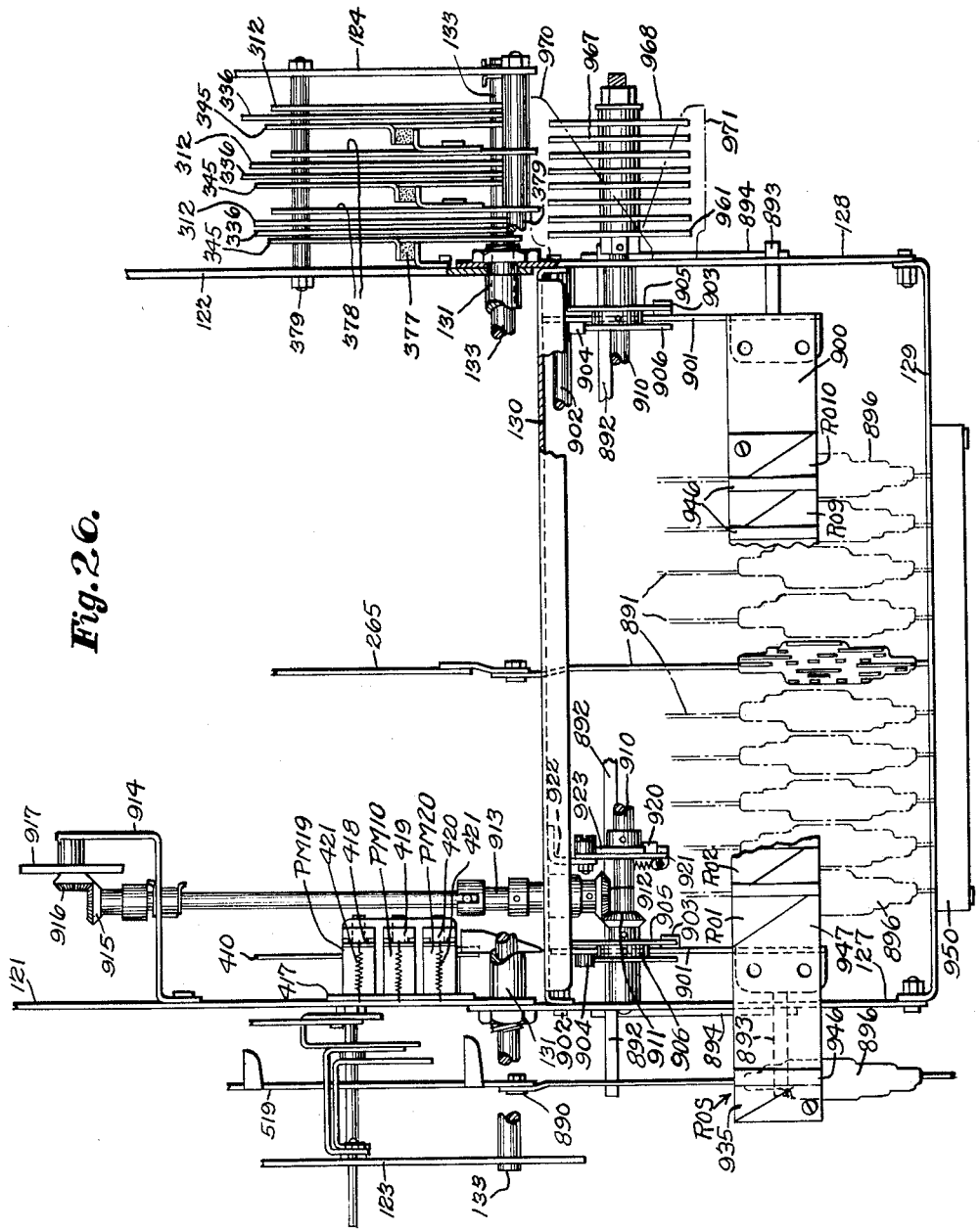
Figure 27:
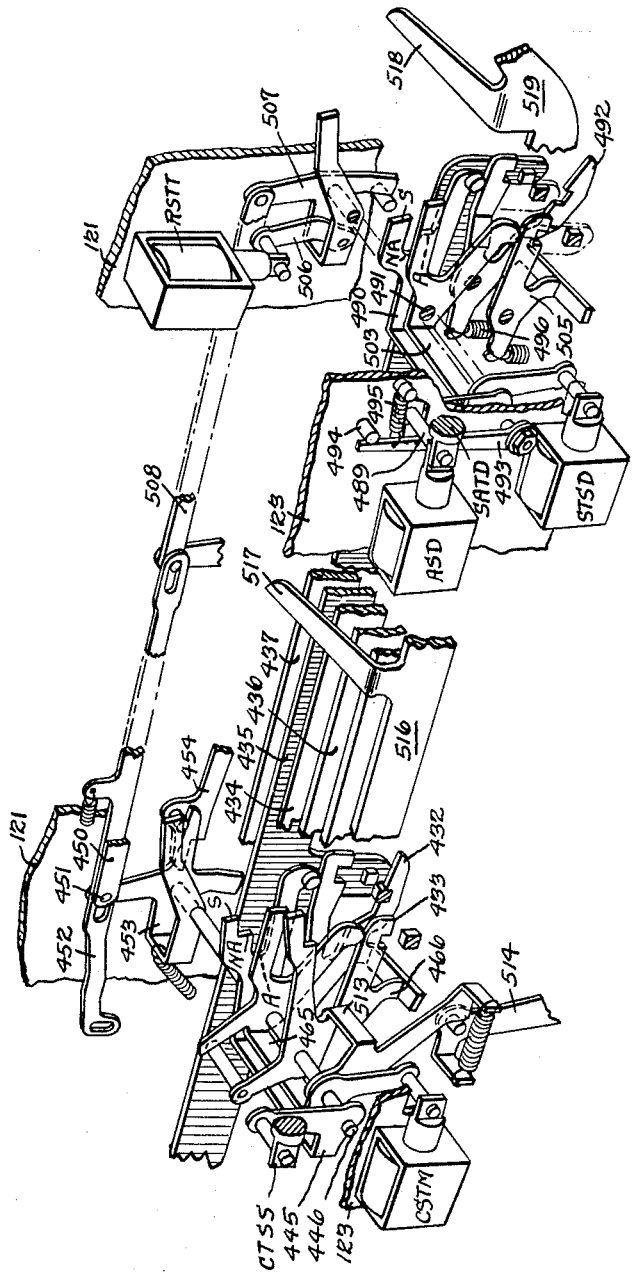

FIGURE 21 has a partial right side elevation of certain elements of the register selecting mechanism;

FIGURE 22 has a partial right side elevation of certain elements of the register designation printing control mechanism;

FIGURE 23 is a detail mechanism shown in FIGURE 22;

FIGURE 24 is a spread perspective as viewed from the left, above, and in front, of certain elements at the left side of the machine associated with the register selecting mechanism for one line of the registers;

FIGURE 24A is a detail of portions of the register selecting mechanism for controlling the printing of register designations;

FIGURE 25 is a horizontal section as viewed from above, of the forward portion of the machine illustrating the arrangement of certain elements of the amount differential mechanism and register selecting mechanisms;

FIGURE 26 is a horizontal section as viewed from above of the rear portion of the machine showing the portions of the register selecting mechanism, register designation printing control means, and data "read out" means associated with the differential actuator members;

FIGURE 27 is a detail in perspective of certain crossfooter and register function control elements;

FIGURE 28 is a spread perspective as viewed from the left, above, and in front, of an automatic control mechanism;

FIGURES 29, 30 and 31 are details of the rotary switch of FIGURE 28;

FIGURE 32 is a perspective detail of certain elements of the crossfooter and a crossfooter non-clear switch associated therewith;

FIGURE 33 is a partial spread perspective of certain elements associated with the crossfooter for control of the non-clear switch;

FIGURE 34 is a vertical fore and aft section through certain elements of the crossfooter and crossfooter non-clear switch control means;

FIGURE 35 is a detail showing in section certain of the elements of FIGURE 34 in different operated positions;

FIGURE 36 is a left side elevation of certain elements involved in the control of the crossfooter non-clear switch operating means;

FIGURE 37 is a perspective of portions of the master machine detail tape printing mechanism with parts broken away for clarity;

FIGURES 38, 39 and 40 are details of certain elements of FIGURE 37;

FIGURE 41 is a vertical fore and aft section of the paper supply and feed means of the master machine, illustrating the use of fan-folded paper;

FIGURE 42 is a detail of an adjustable mounting means for the platen supporting frame of the master machine;

FIGURE 43 is a detail of the platen line spacing means.

Figure 49:
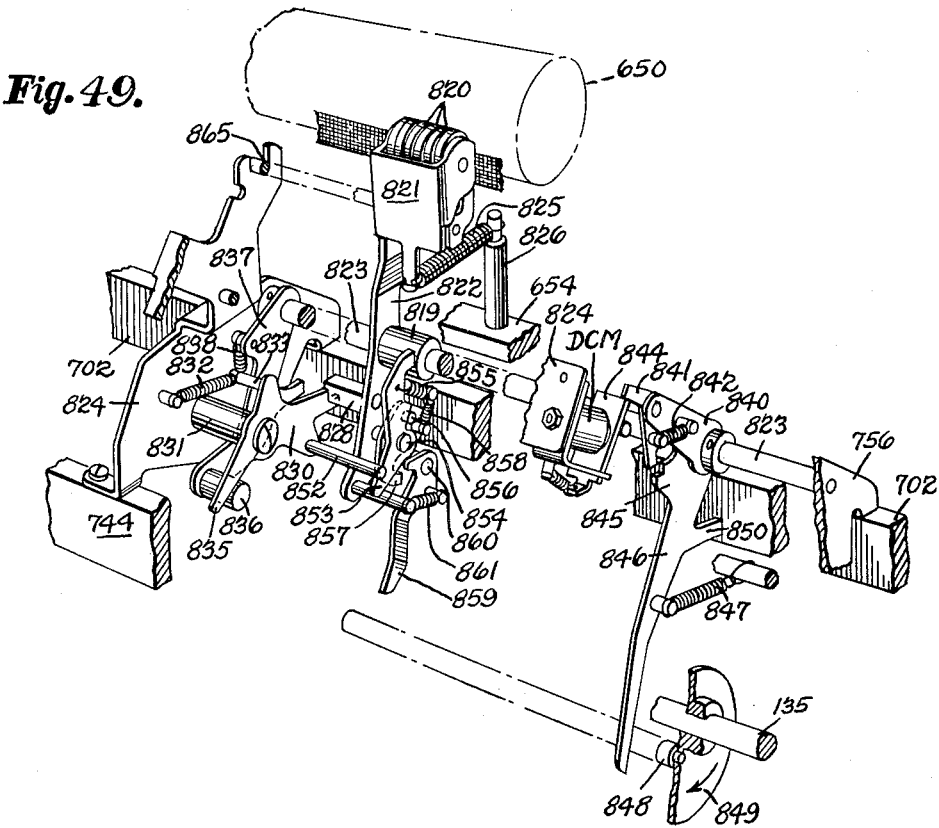
Figure 51:
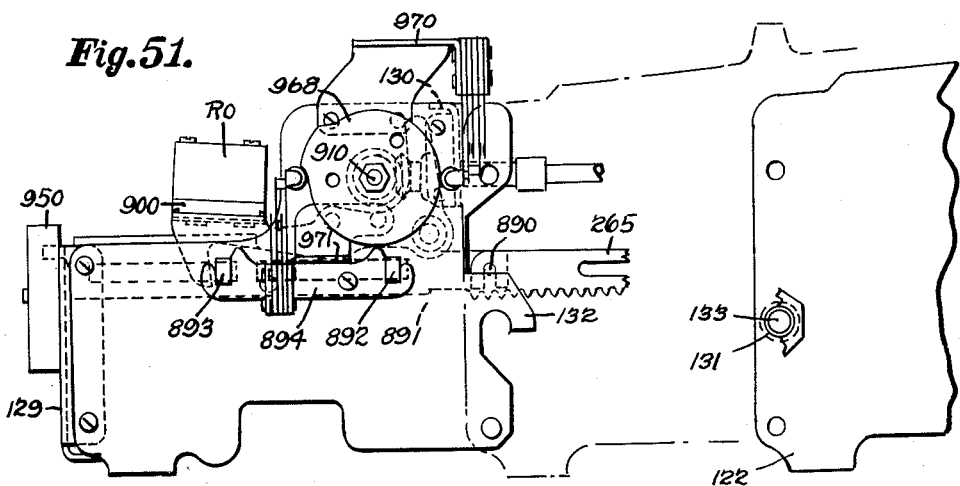
Figure 50:
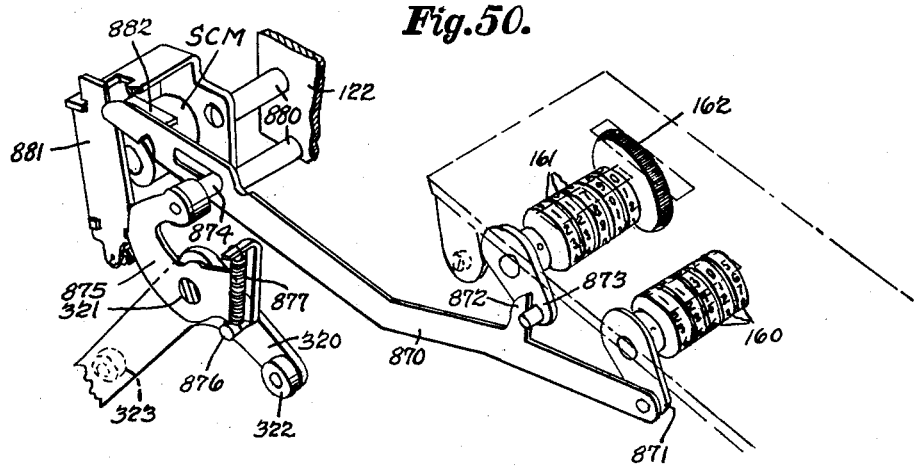
Figure 58:
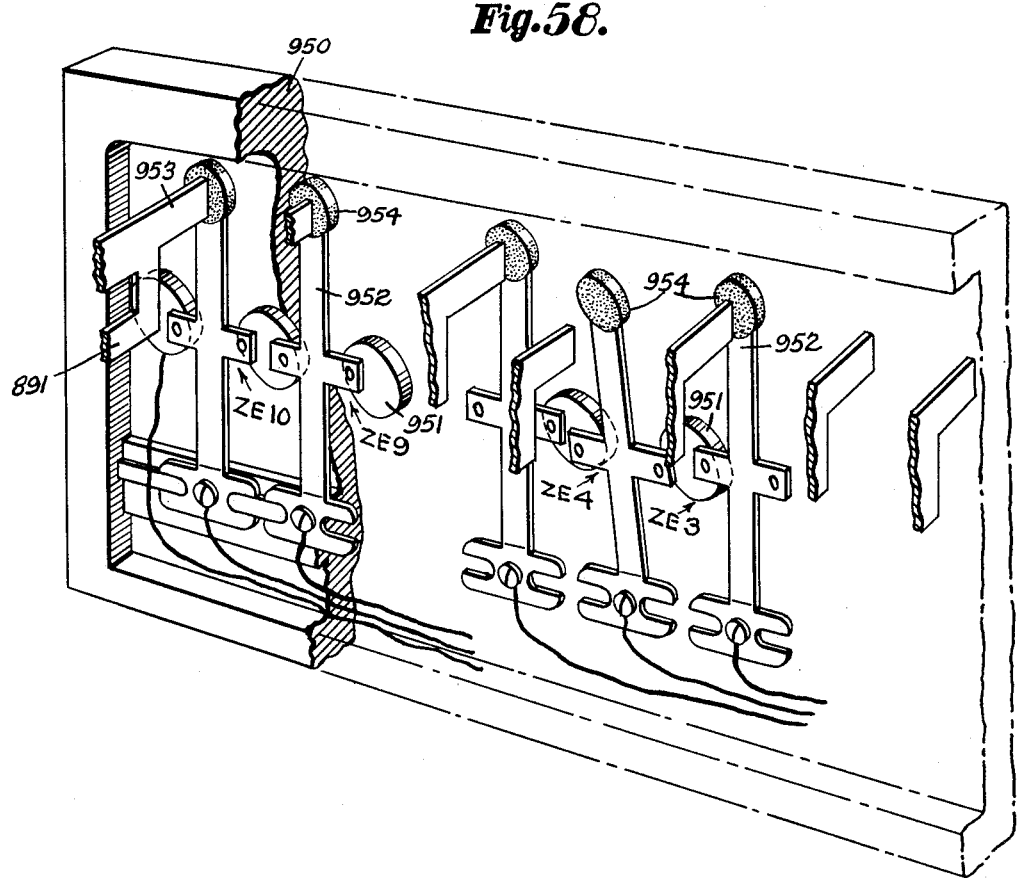
Figures 60, 60A:
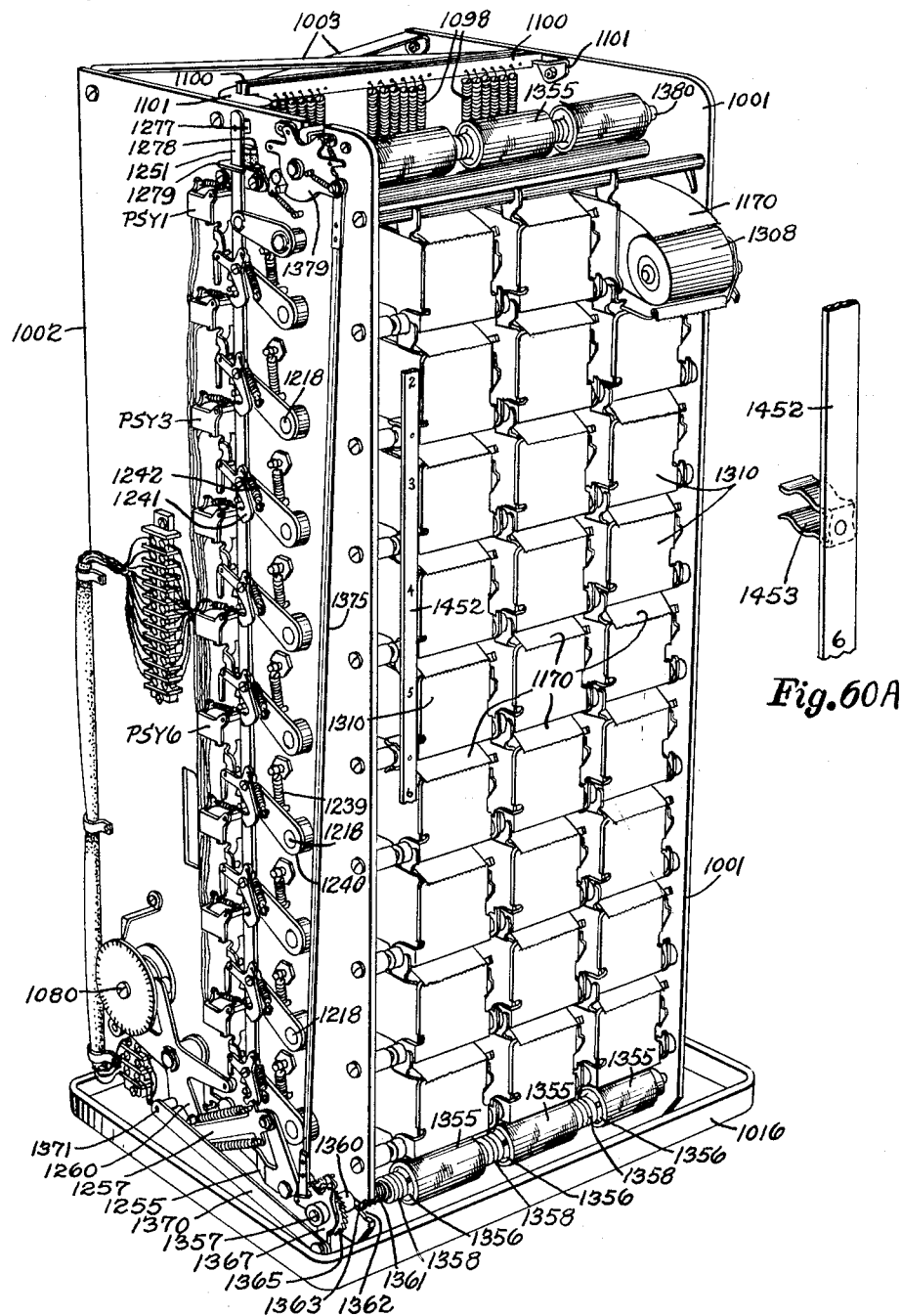

FIGURE 44 is a section of the paper supply and feed means of the master machine illustrating the use of roll paper;

FIGURE 45 is a side elevation of portions of the paper supply and feed means;

FIGURE 46 is a left side elevation of portions of the paper supply and feed means;

FIGURE 47 is a detail of the paper feed means;

FIGURE 48 is a detail of the line spacing control;

FIGURE 49 is a perspective of portions of the consecutive number printing means and control means therefor;

FIGURE 50 is a detail in perspective of the dial counter actuating means and control means therefor;

FIGURE 51 is a partial left side elevation of portions of the data read-out mechanism of the master machine;

FIGURES 52 and 53 are details of the code plates of the data read-out means;

FIGURE 54 is a tabular representation of the read-out code;

FIGURE 55 is a perspective of portions of a read-out switch unit;

FIGURE 56 is a transverse section through a data read-out switch device;

FIGURE 57 shows certain elements of the data read-out switch means in disassembled condition;

FIGURE 58 is a detail in perspective of zero eliminating switches;

FIGURE 59 illustrates a plurality of cam operated switches in the master machine and the operating cams therefor;

FIGURE 60 is a perspective of the multiple tape printer unit with the casing removed and as seen from the front, above, and the left.

Figure 61A:
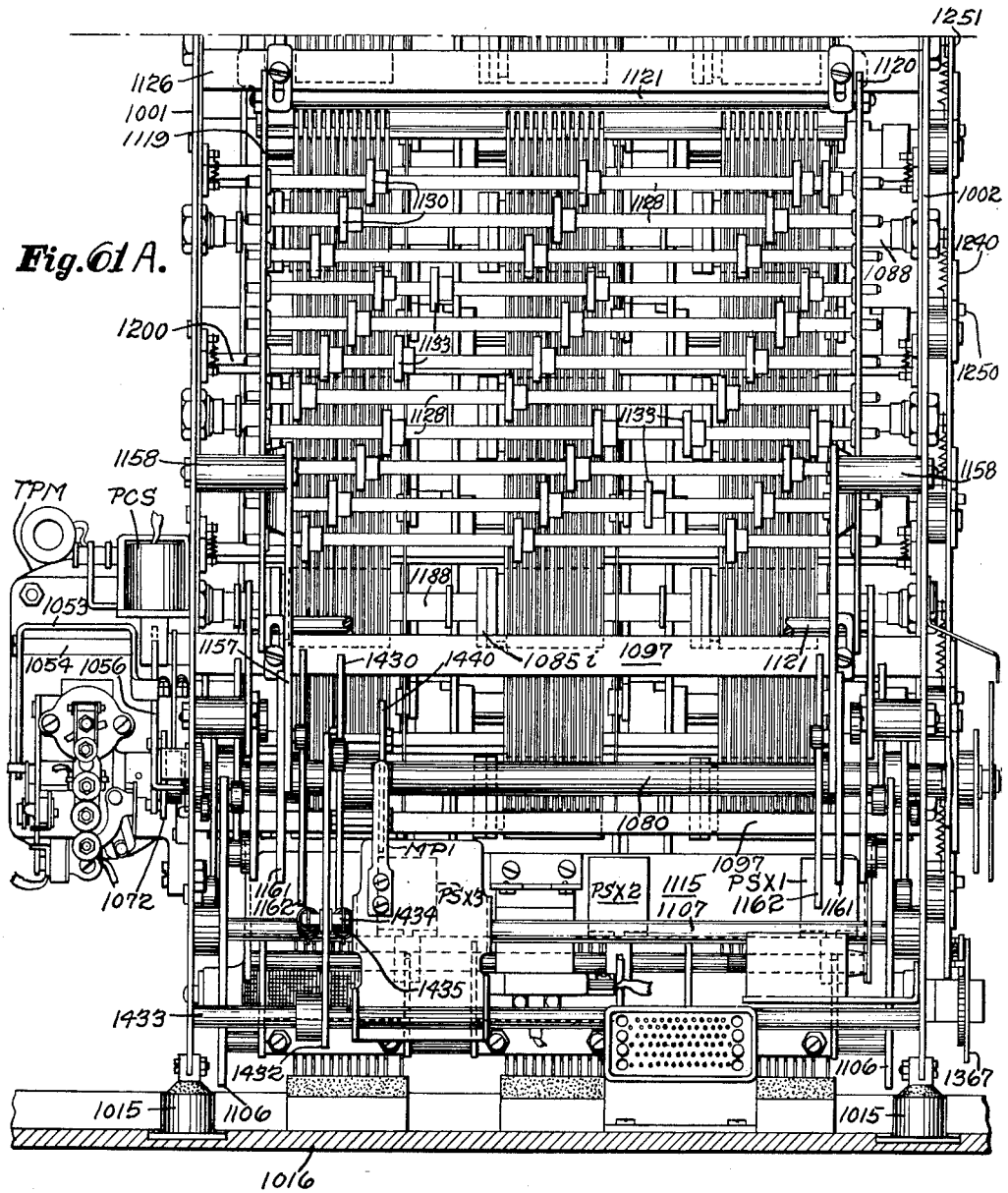
Figure 61B:
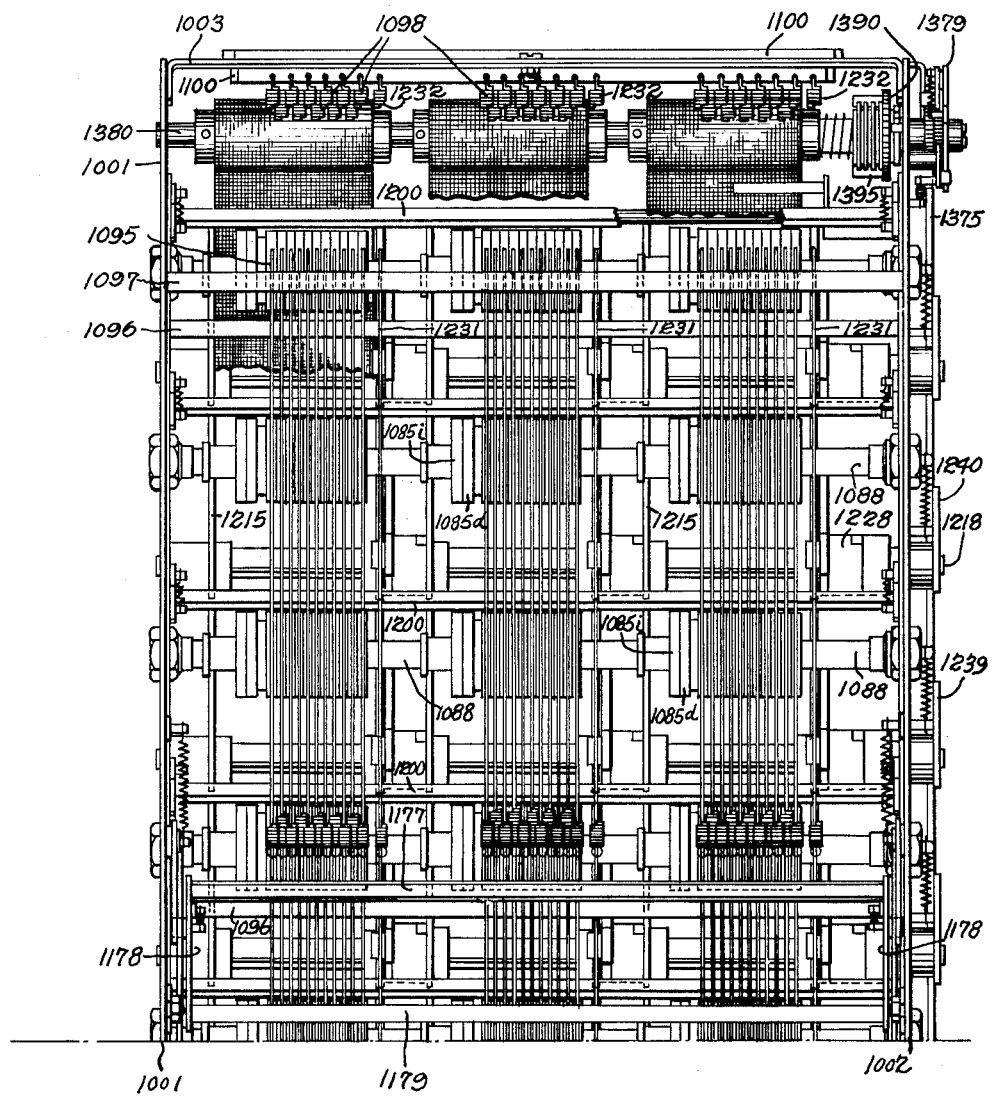
Figure 62:
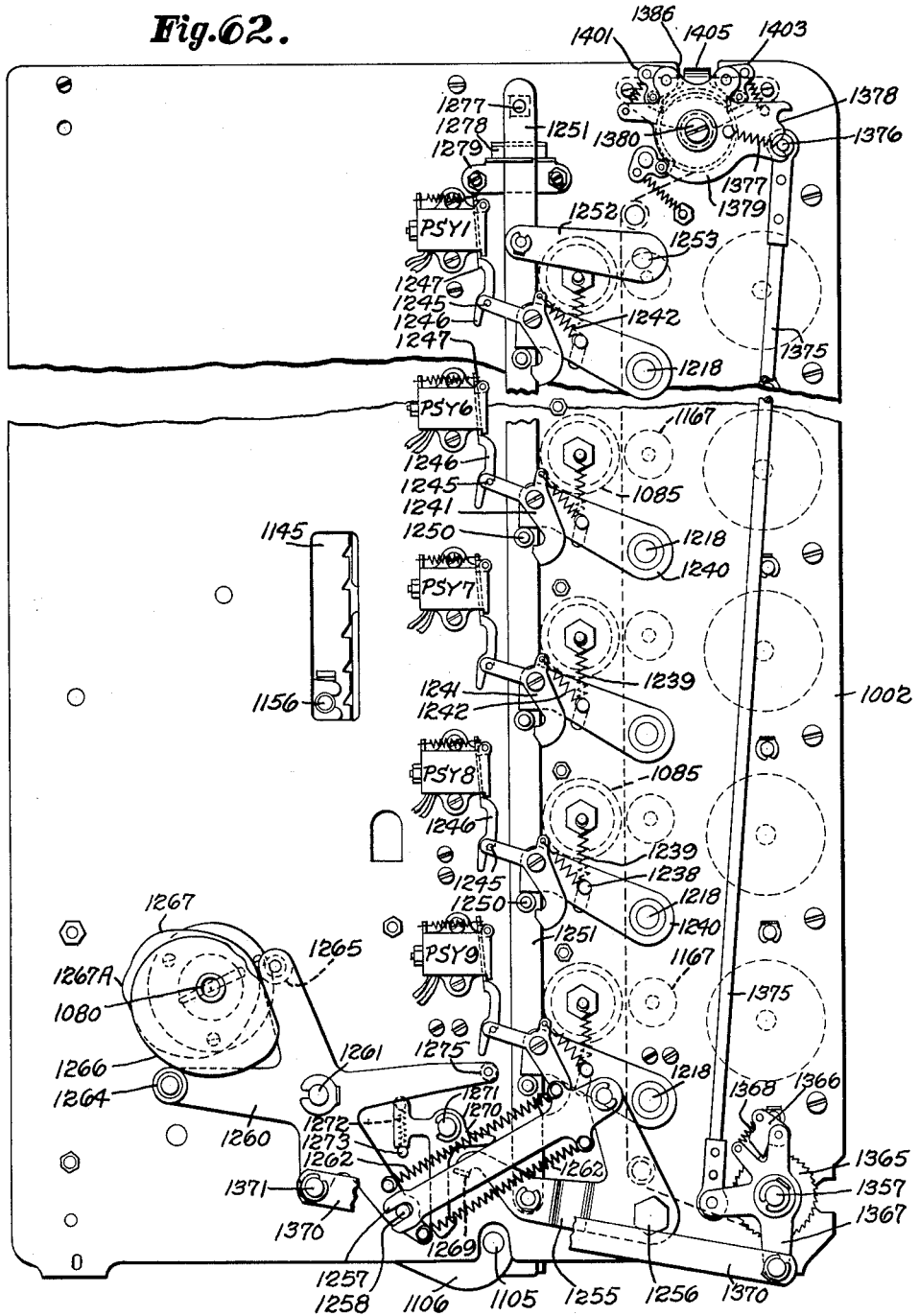
Figure 69:
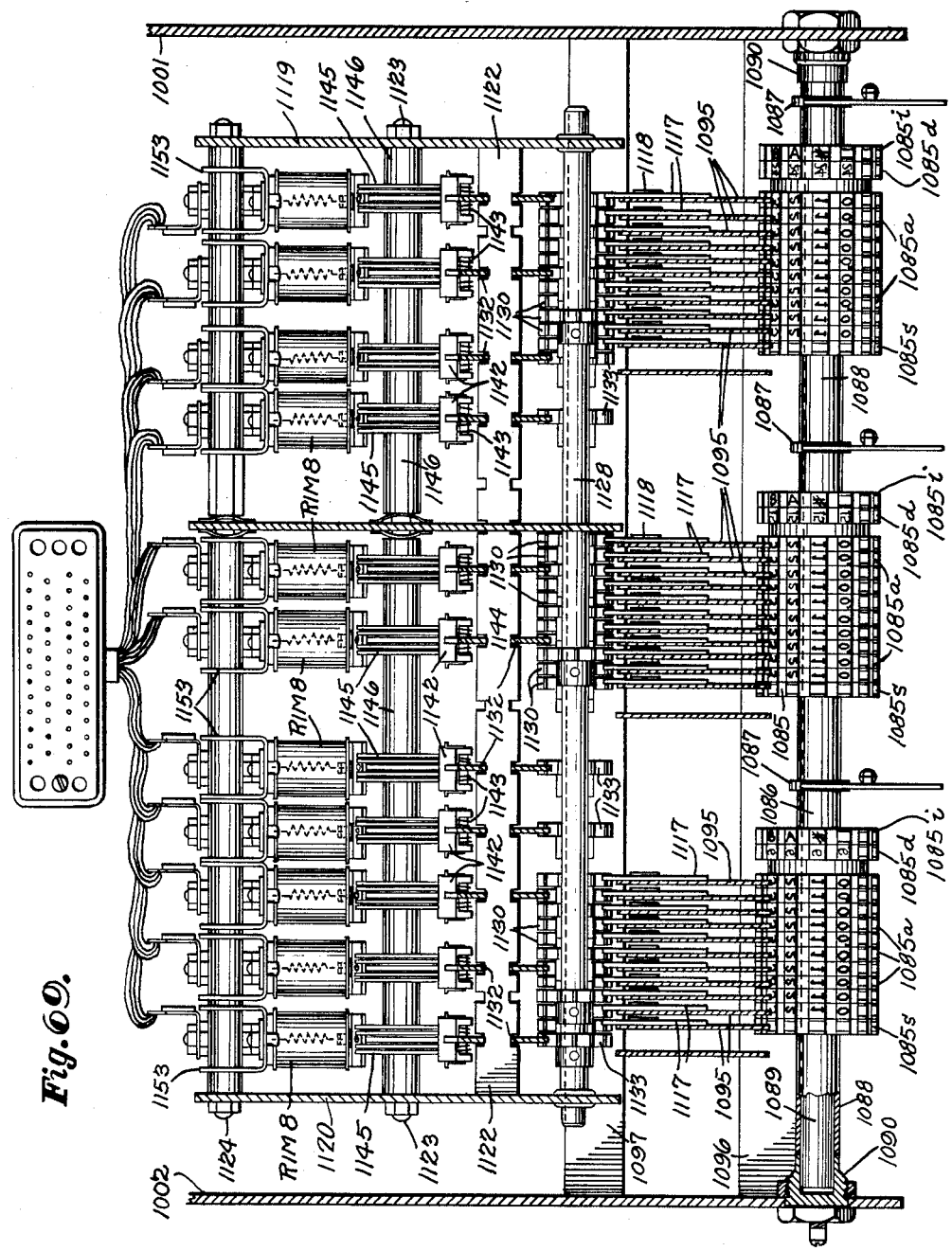
Figure 76:
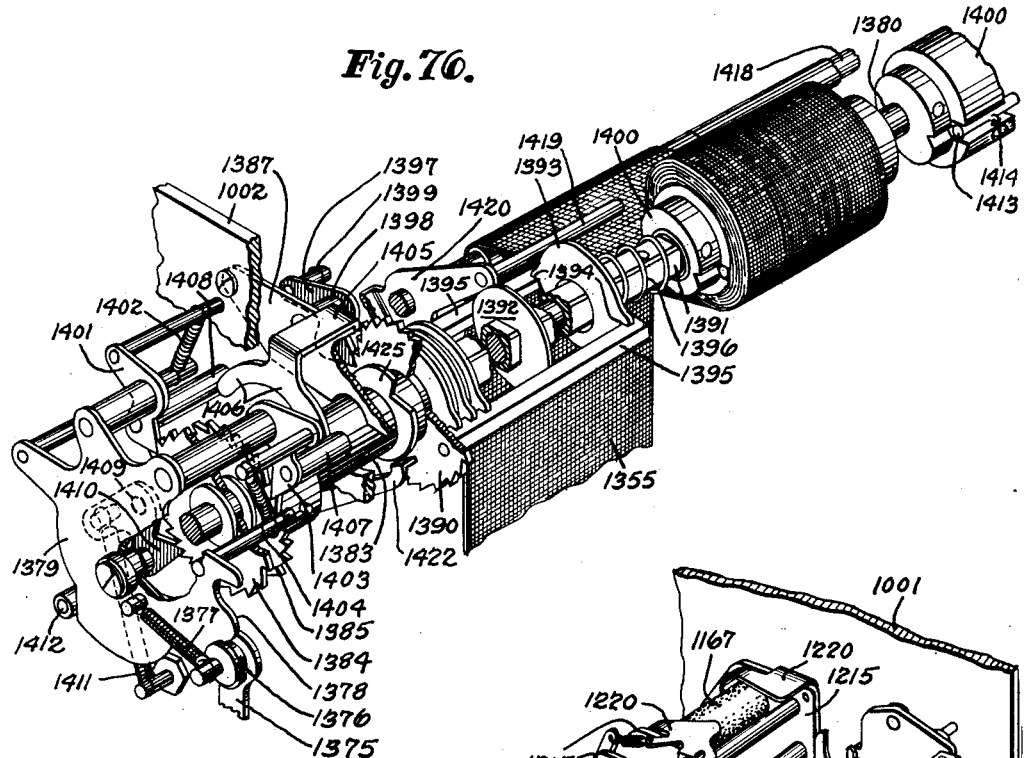
Figure 75:
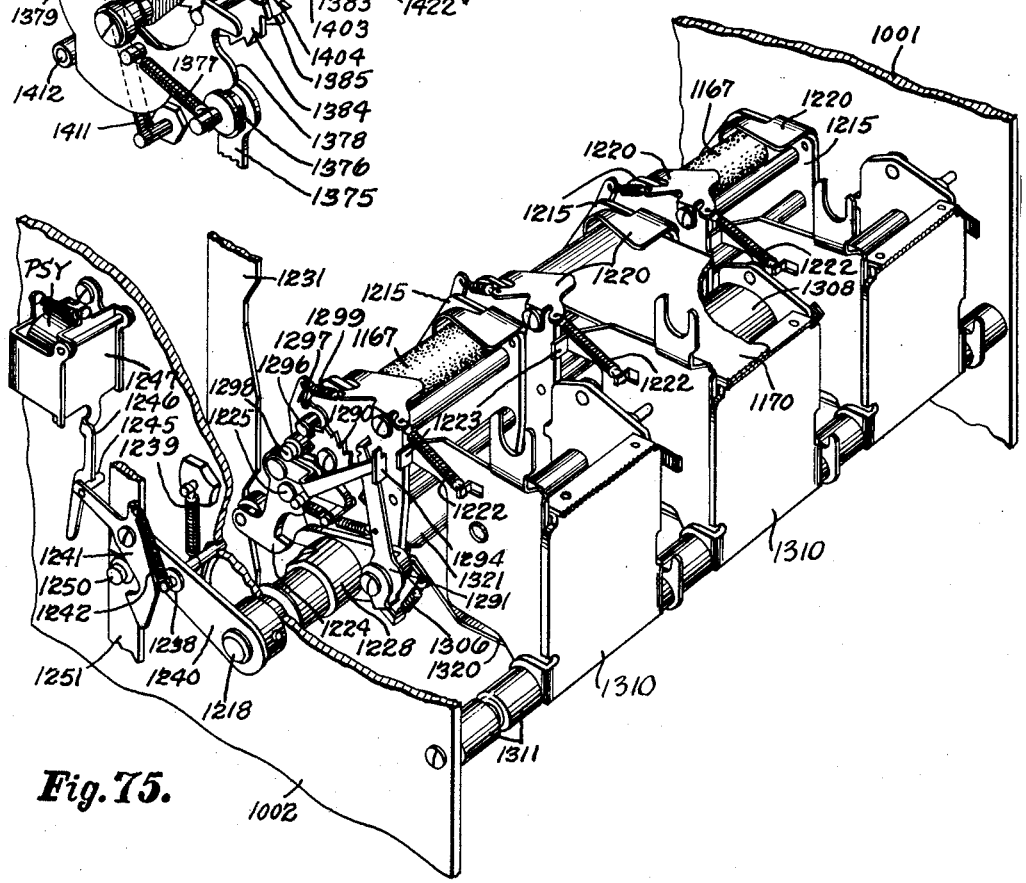
Figure 77:
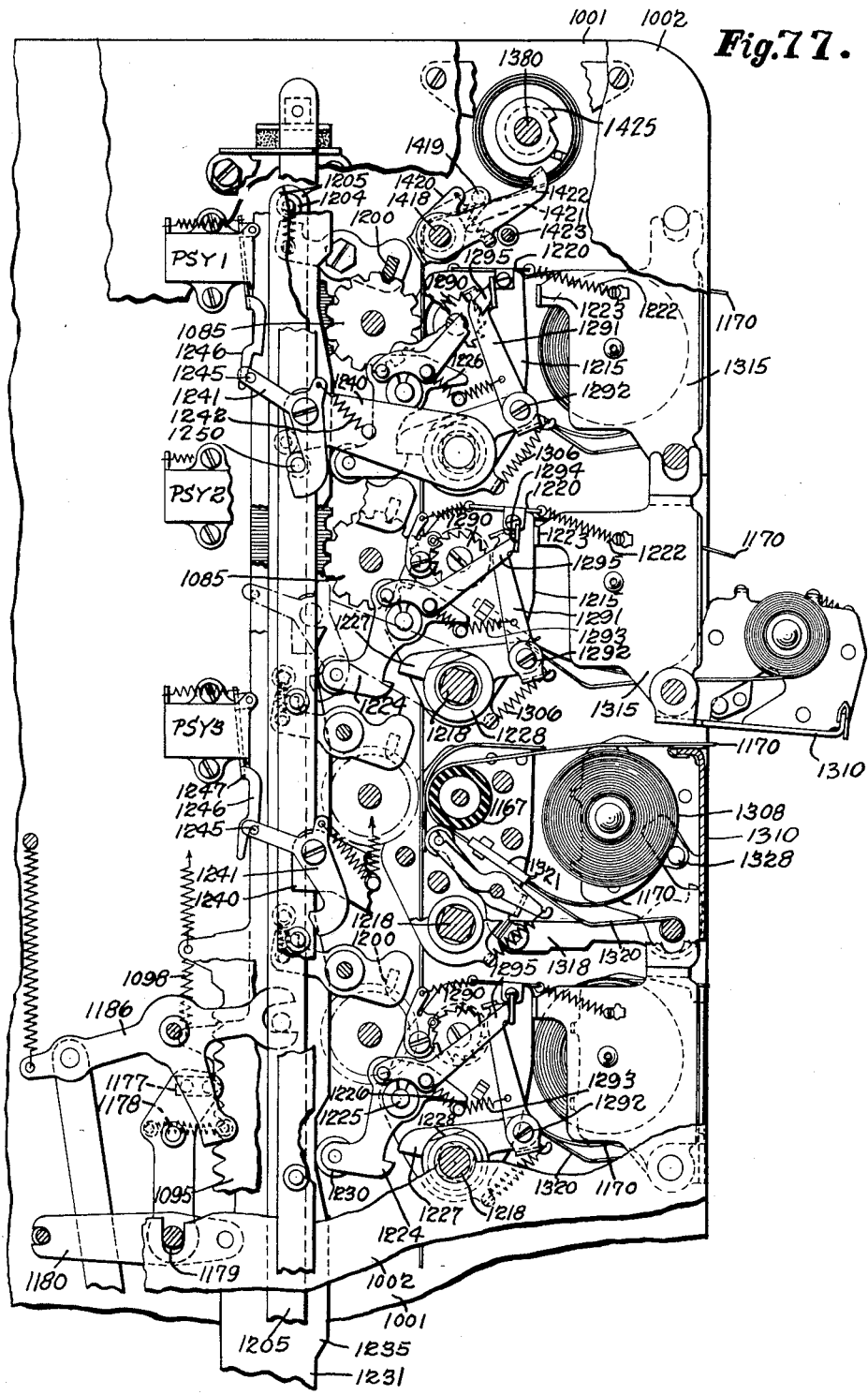
Figure 80:
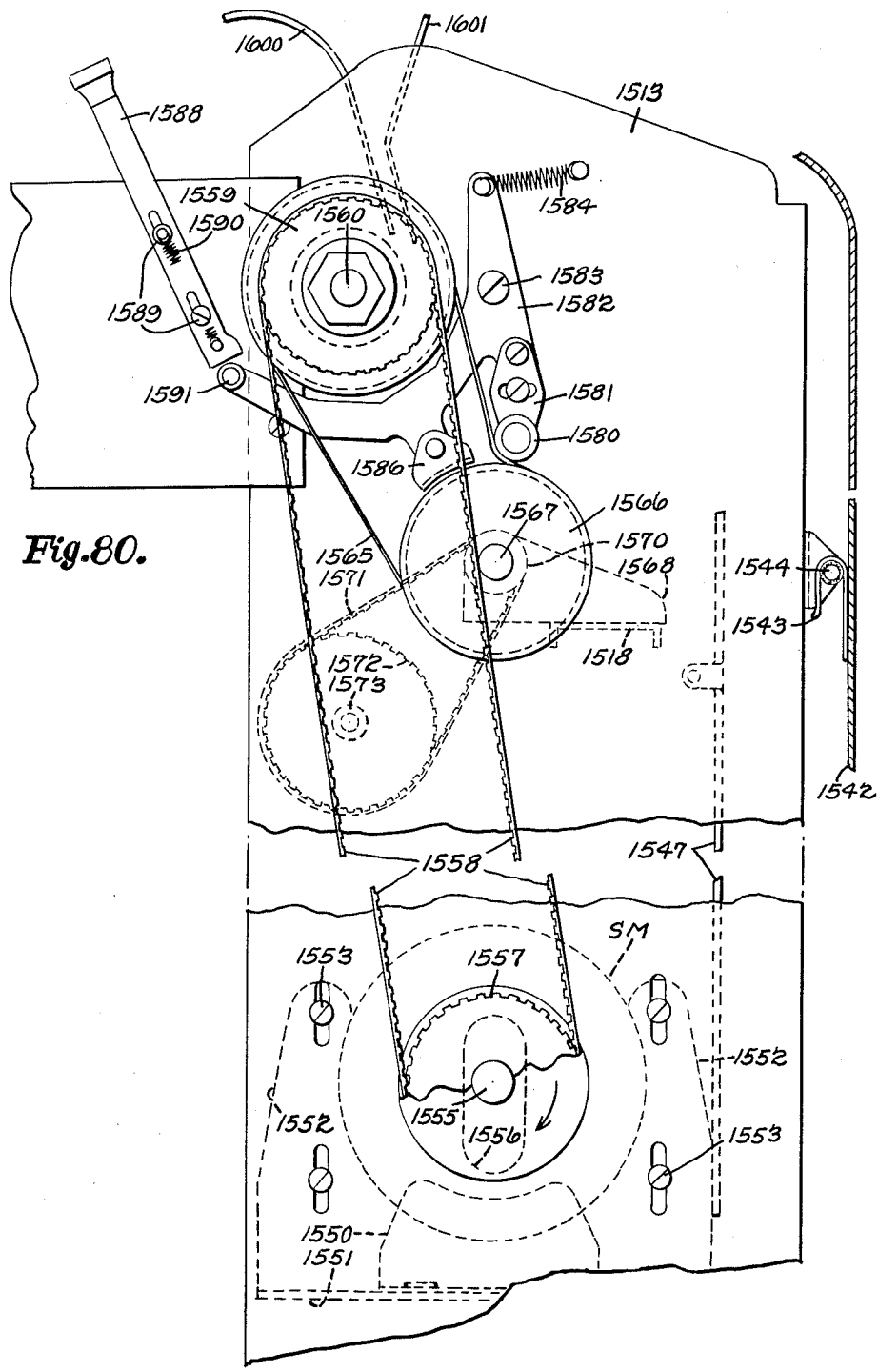
Figure 81:
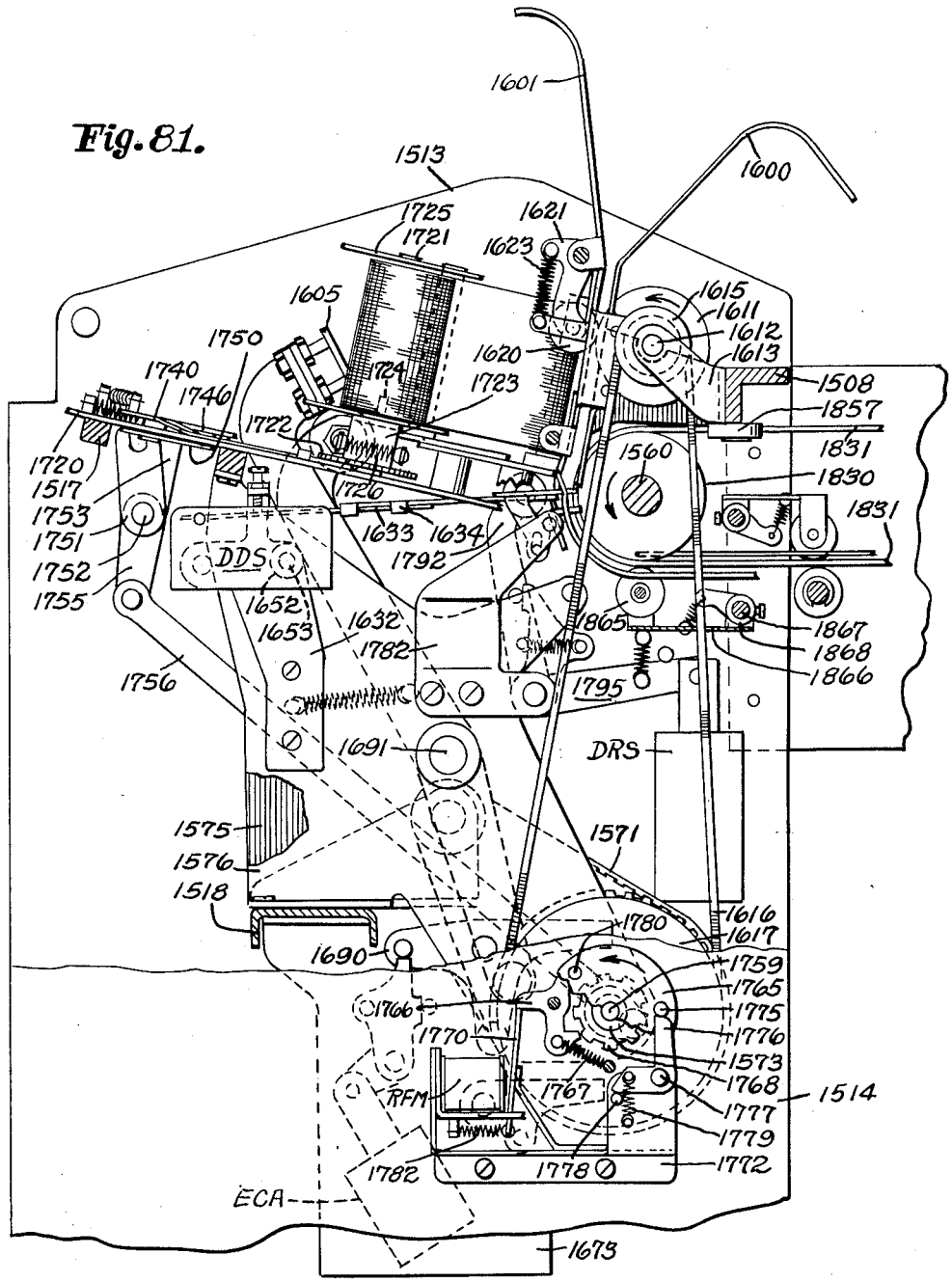
Figures 82, 83:
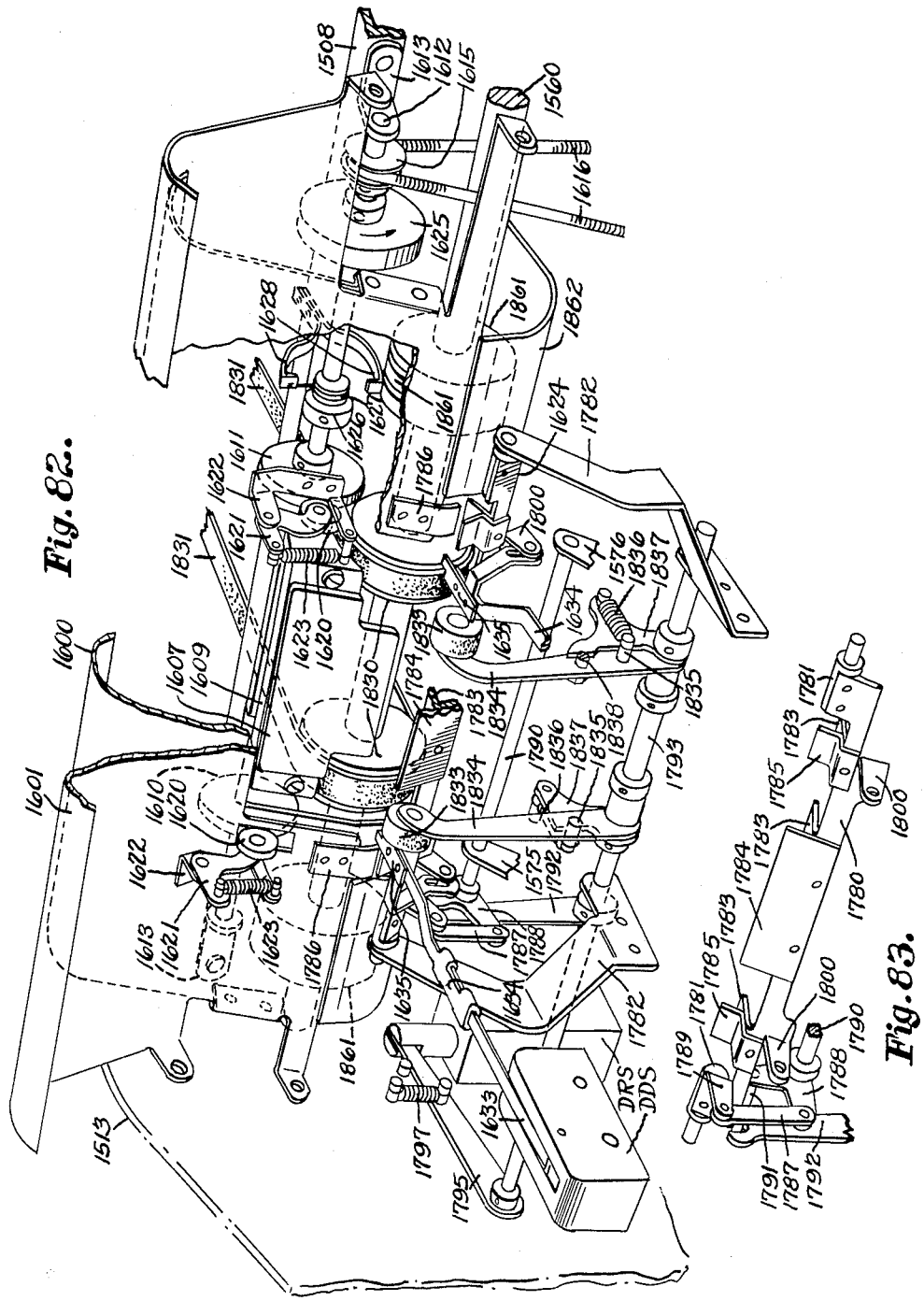
Figure 84:
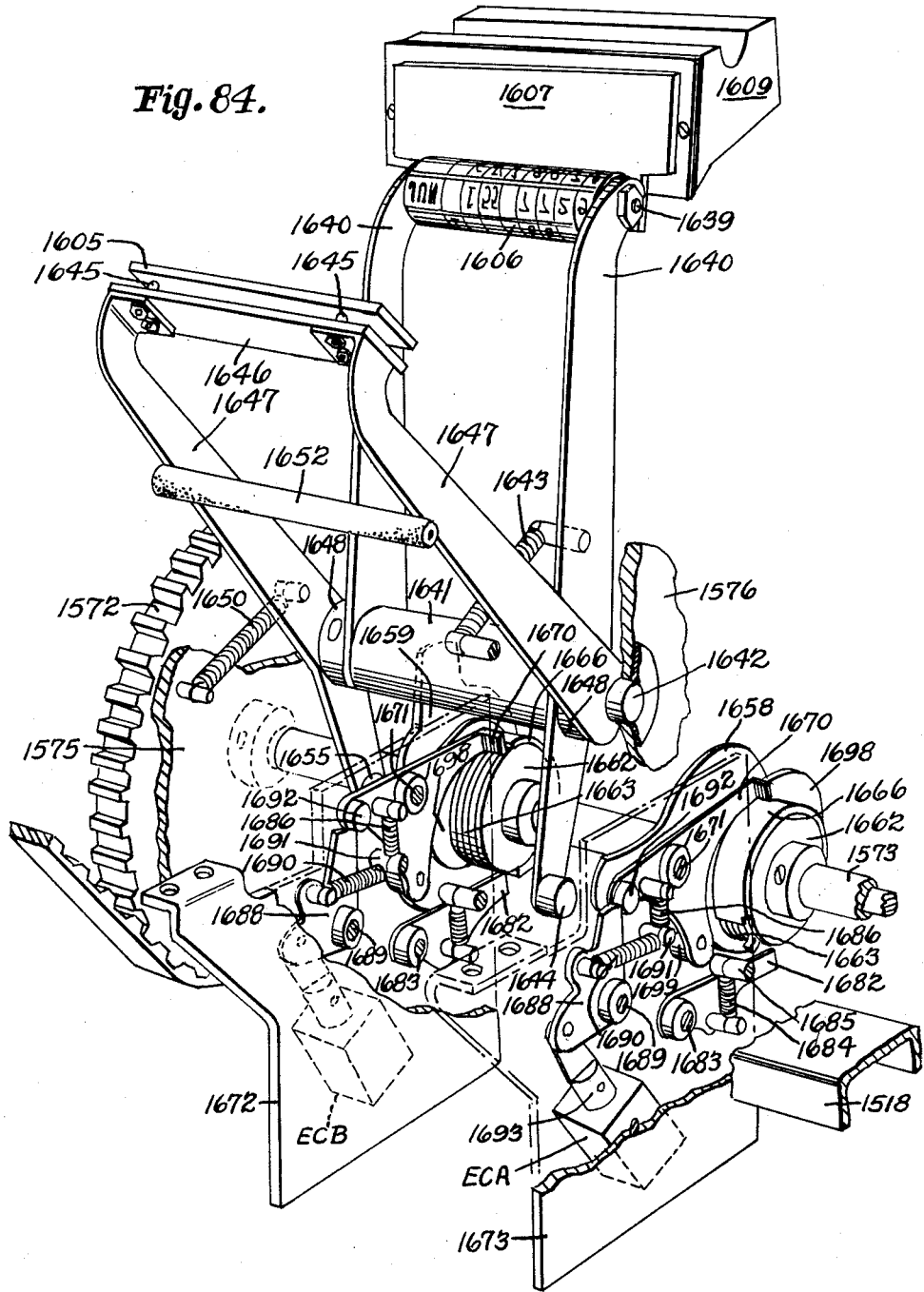
Figure 87:
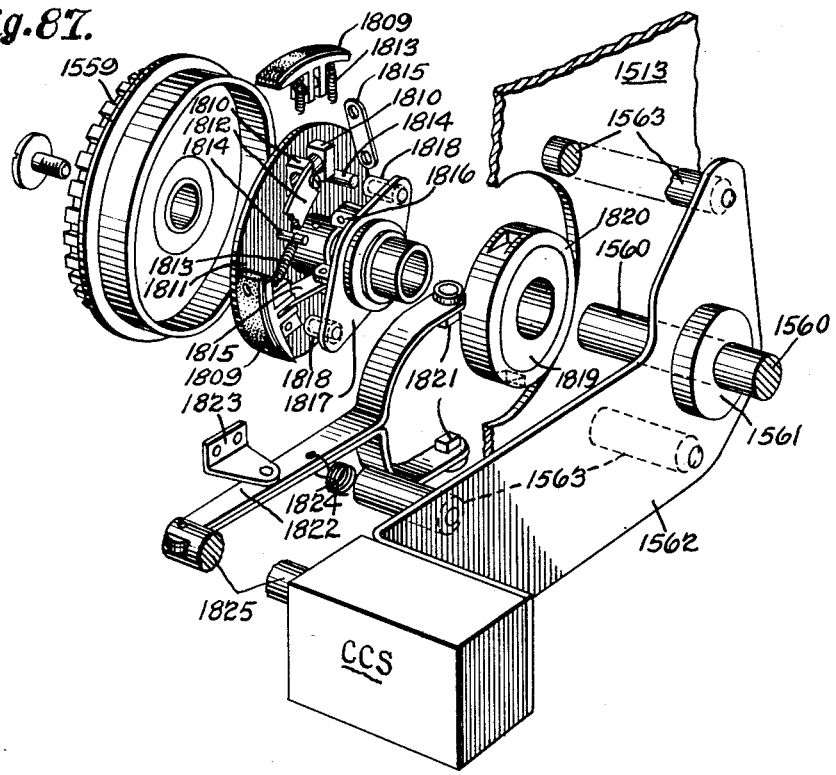
Figure 88:
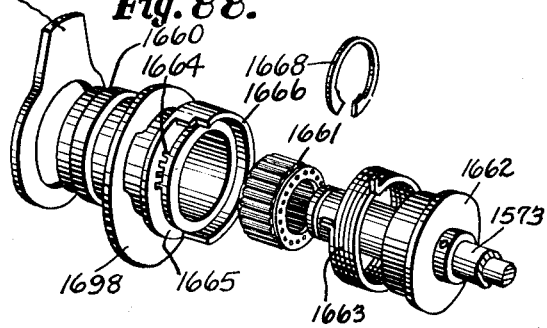
Figure 89:
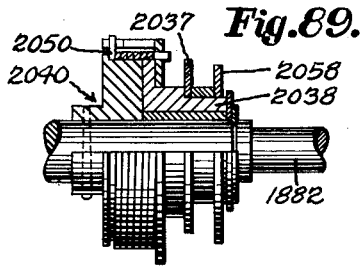

FIGURE 60A is a detail of an element of the multiple tape printer unit;

FIGURES 61A and 61B are the lower and upper portions, respectively, of a rear elevation of the multiple tape printer unit with casing removed and with the data read-in mechanism removed;

FIGURE 62 is a partial left side elevation of the multiple tape printer unit with the casing removed;

FIGURE 63 is a partial left side elevation of the drive motor drive clutch and motor control switch of the multiple tape printer unit;

FIGURE 64 is a detail of the clutch of FIGURE 63 with part of the casing and other elements broken away;

FIGURE 65 is a detail of the clutch control;

FIGURE 66 is an elevation of the multiple tape printer cam shaft and the cams thereon;

FIGURE 67 illustrates the elements, including the cams, mounted on the cam shaft in FIGURE 66, and the switch operated by one of said cams;

FIGURE 68 is a detail in perspective of some of the individual tape printers of the multiple tape printer unit;

FIGURE 69 is a horizontal section through the multiple tape printer;

FIGURE 70 shows, in left side elevation, portions of the data read-in and type indexing mechanism of the multiple tape printer;

FIGURE 71 is a detail of the type indexing mechanism;

FIGURES 72 and 73 are details of the type wheels;

FIGURE 74 is a spread perspective of the decoding bars of the data read-in mechanism;

FIGURE 75 is a perspective of certain tape printers and portions of the tape printer selecting means of the multiple tape printer;

FIGURE 76 is a perspective of portions of the ink ribbon feeding and reversing means of the multiple tape printer;

FIGURE 77 is a partial vertical section of the multiple tape printer unit as viewed from the left;

FIGURE 78 illustrates the main frame of the sorter unit;

FIGURE 79 is a detail of a shaft mounting;

FIGURE 80 is a right side elevation of a portion of the sorter unit showing the arrangement of the motor and drive pulleys and belts;

FIGURE 81 is a partial vertical section of a portion of the sorter unit showing the document receiving chute, the document detecting switches and endorser mechanisms;

FIGURE 82 is a perspective of portions of the document chute and elements associated therewith as viewed from the left and rear;

FIGURE 83 is a detail in perspective of the document stop means associated with the document chute;

FIGURE 84 shows, in perspective, the operating means for the endorsers;

FIGURE 85 is a partial top plan of the ink ribbon feeding and reversing mechanism for the endorsers;

FIGURE 86 is a detail of the door mounting and latch means of the sorter unit;

FIGURE 87 is a spread perspective of the drive clutch and clutch control means of the sorter unit;

FIGURE 88 is a spread perspective of an endorser drive clutch;

FIGURE 89 is a partial section and elevation of a packer bail clutch;

FIGURES 90, 91, 92 and 93 show the general arrangement of the document conveyors, document bins, and column and bin deflectors as seen in vertical fore and aft section, these four figures showing respectively the upper front, upper rear, lower rear and lower front portions of the sorter unit.

Figure 94:
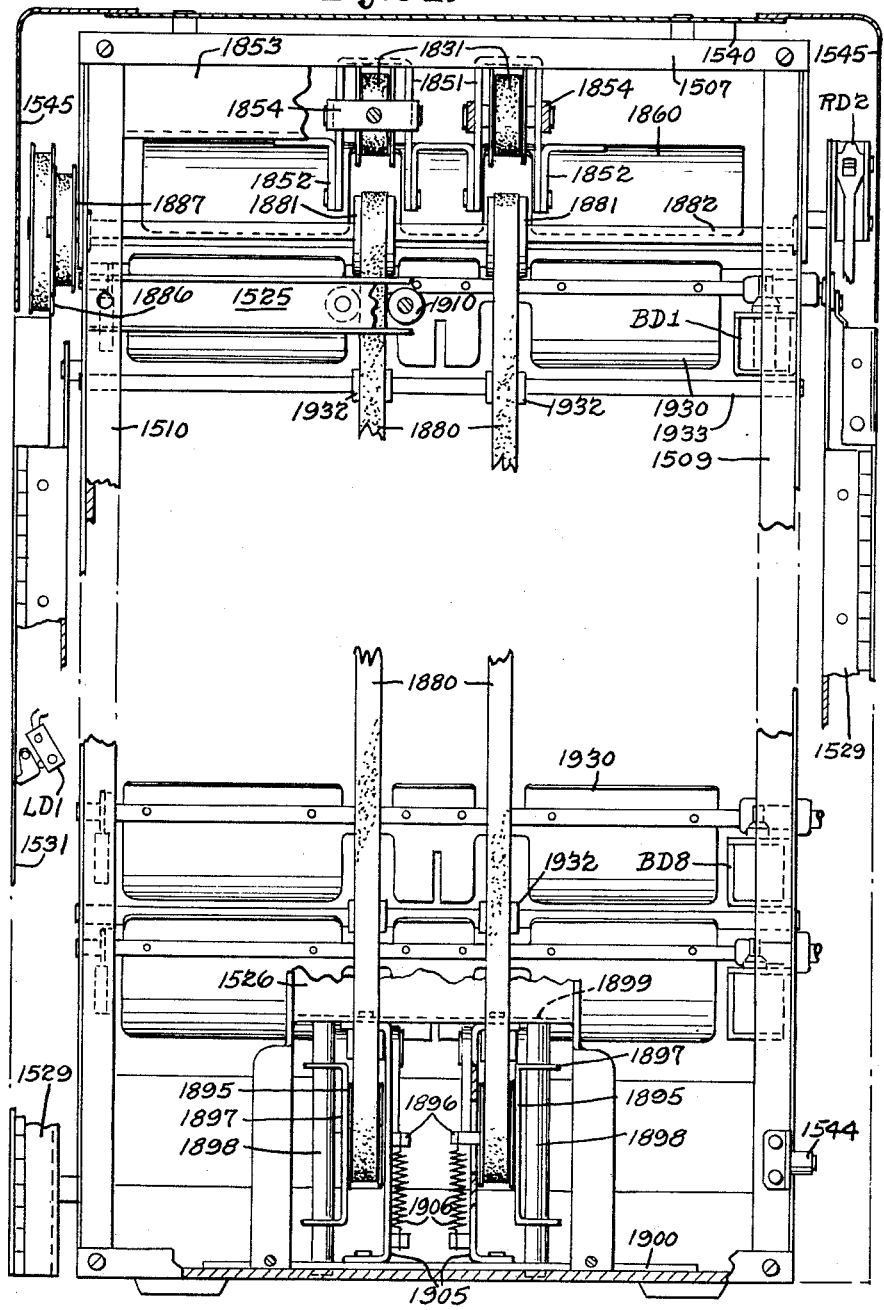
Figure 95:
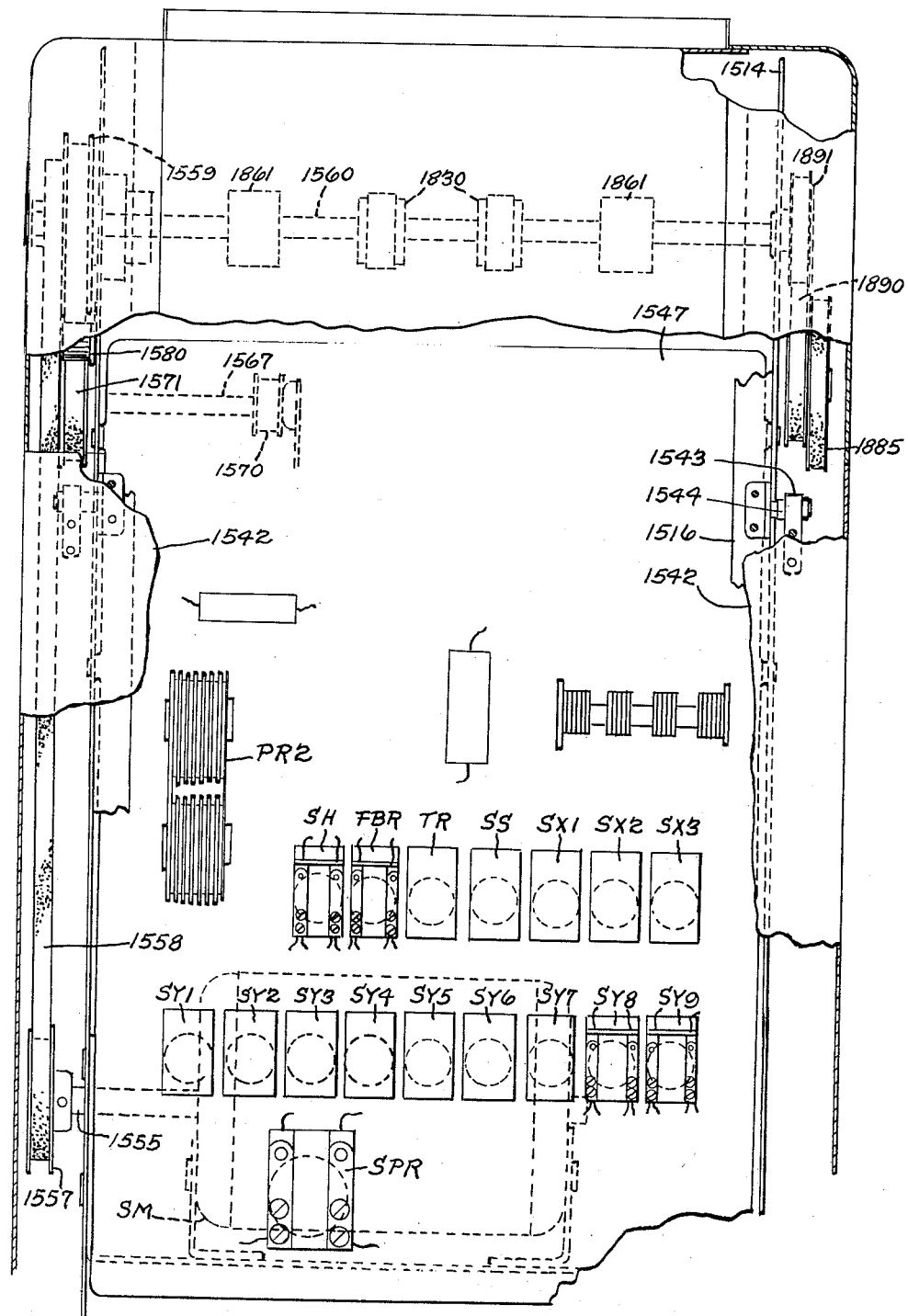
Figure 96:
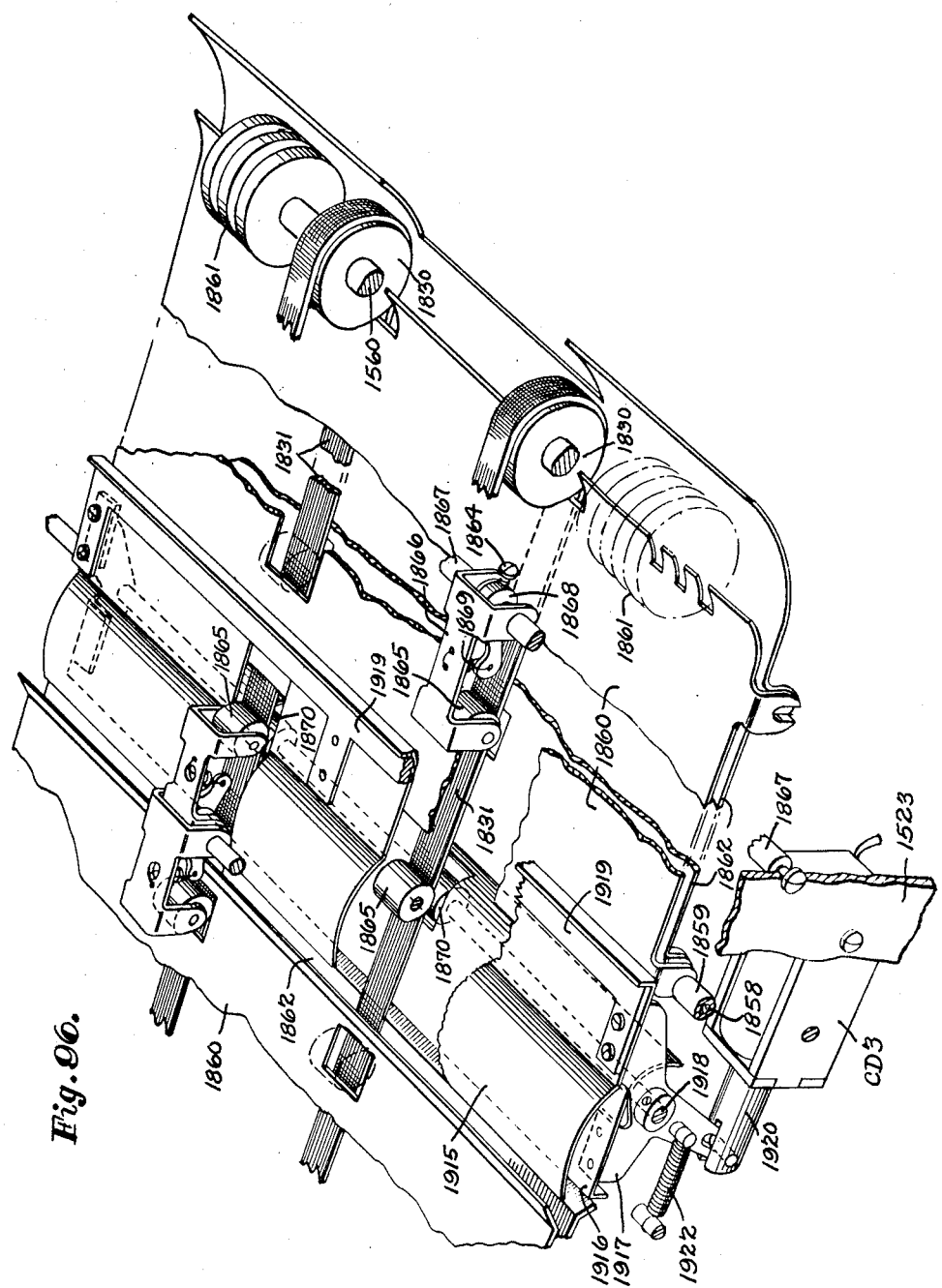
Figure 100:
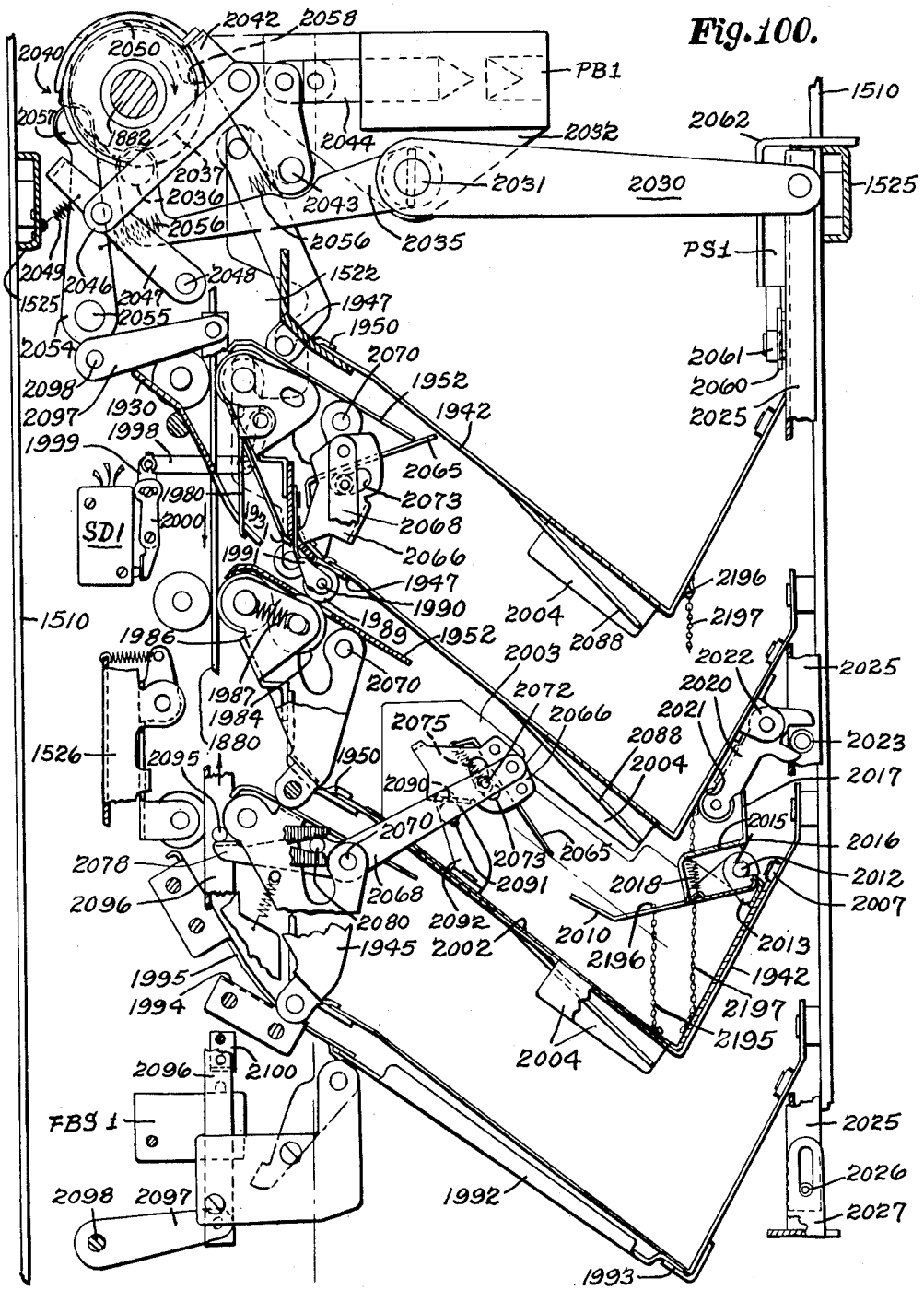
Figure 101:
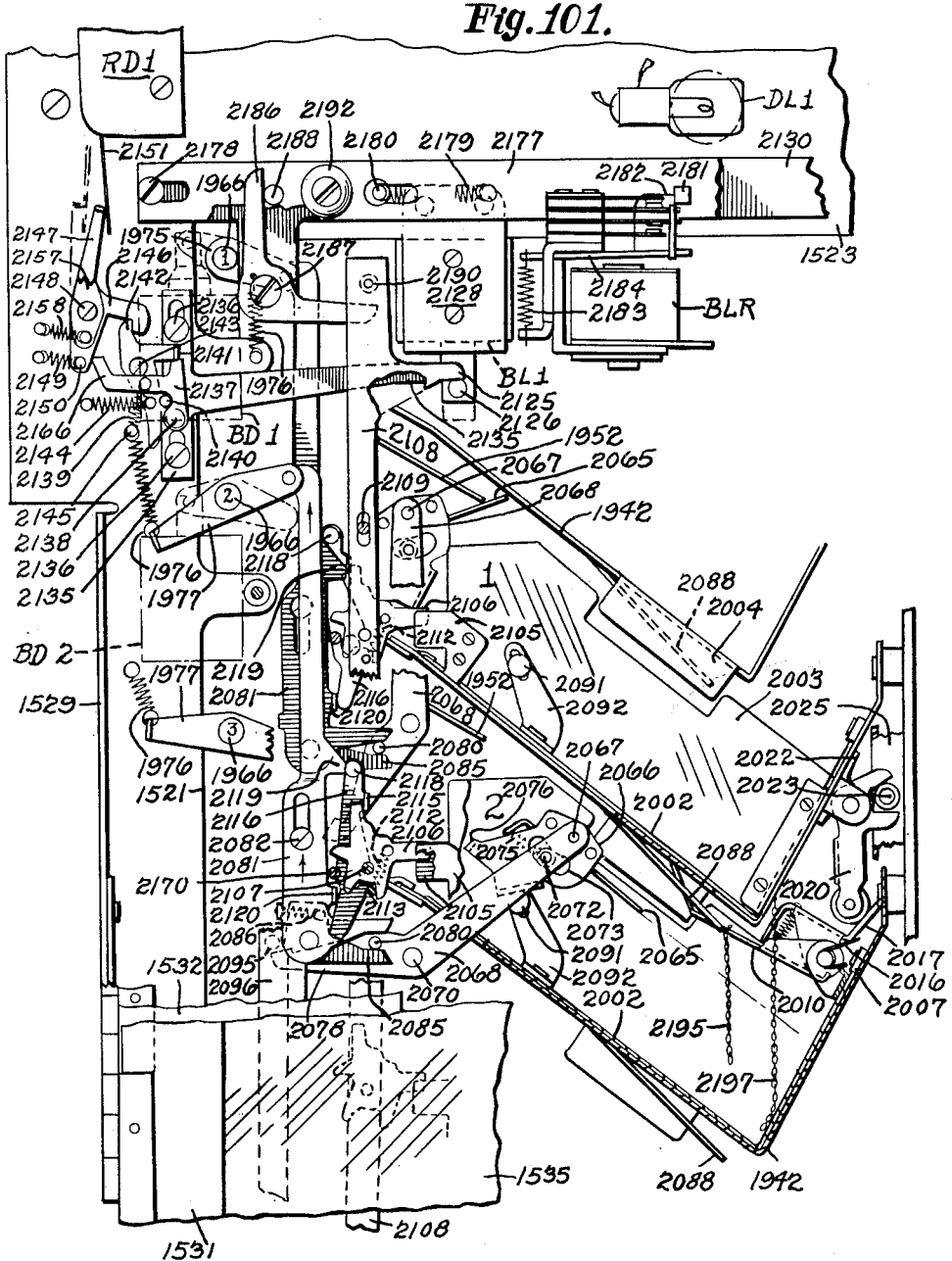
Figure 105:
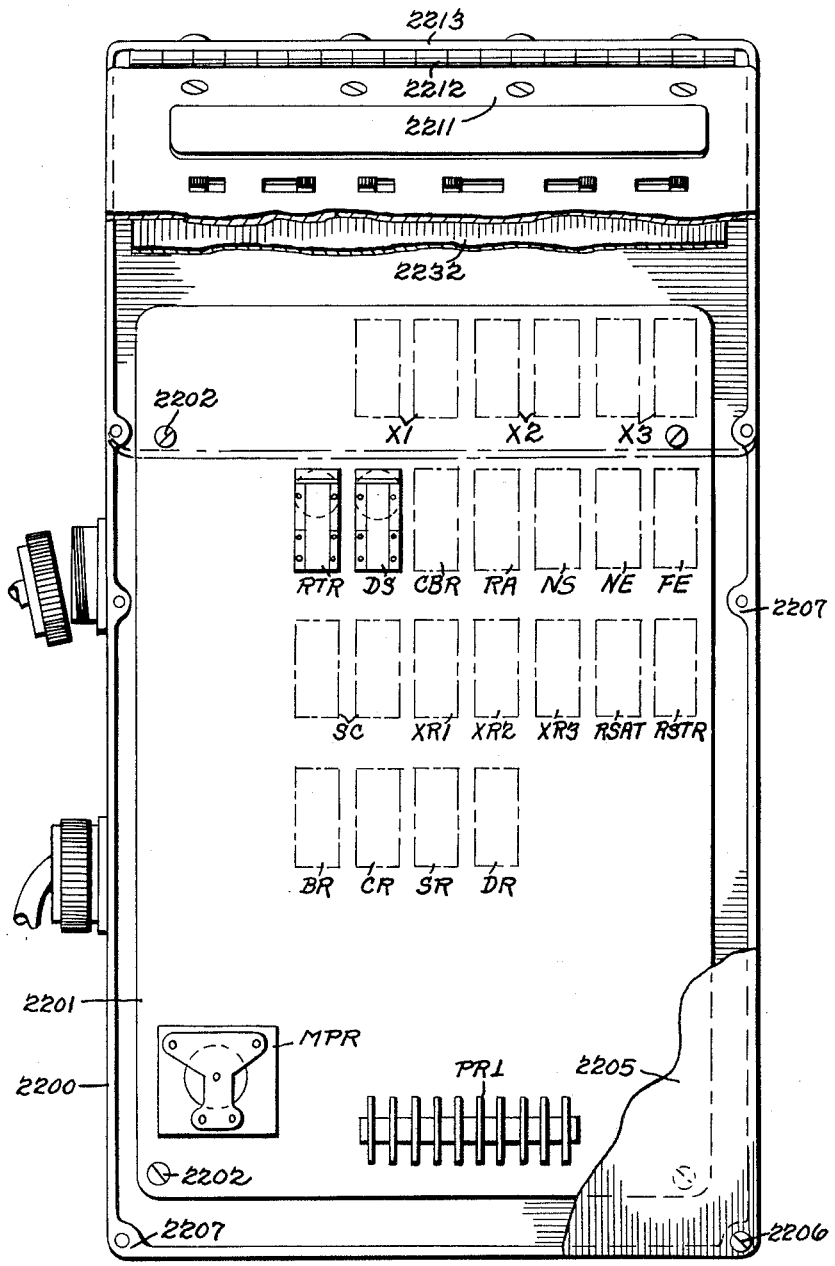
Figure 106:
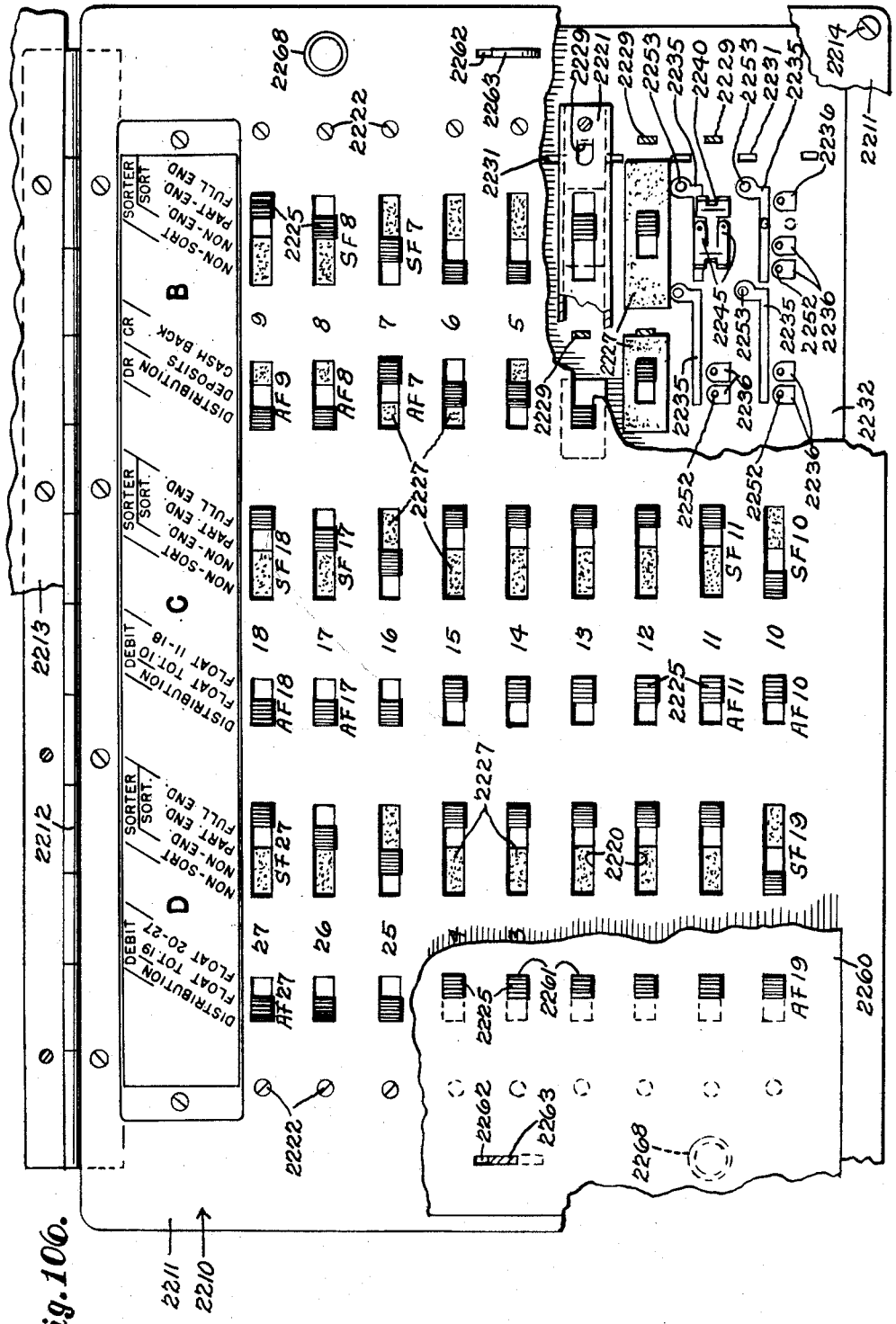

FIGURE 94 is a partial front elevation of the sorter unit with a front casing panel removed;

FIGURE 95 is a partial rear elevation of the sorter unit with part of the rear casing panel broken away;

FIGURE 96 is a detail in perspective of the rear portion of the horizontal document conveyor;

FIGURE 97 is a spread perspective of portions of a bin deflector and associated parts;

FIGURE 98 is a detail of the bin deflector operating means;

FIGURE 99 is a detail in perspective of a packer bail;

FIGURE 100 is a partial vertical section as viewed from the right, showing the packer bail drive associated with one column of bins, auxiliary bails and elements associated therewith and a sorted document detecting switch associated with a bin deflector;

FIGURE 101 is a partial vertical section showing auxiliary bail operating means associated with one of the bins, the bin latching and unlatching means, and elements associated therewith;

FIGURE 102 is a detail in perspective of a document tray;

FIGURES 103 and 104 show, in perspective, a switch means and operating elements therefor controlled by a door of the sorter unit;

FIGURE 105 is a partial left side elevation of a control unit with most of the left side casing panel broken away;

FIGURE 106 is a partial plan of the program control switch panel of the control unit;

FIGURE 107 is a detail of a program control switch in disassembled condition;

FIGURE 108 is a detail of an interlock switch controlled by a control panel template;

FIGURE 109 is a diagram showing the manner of assembly in a complete control circuit diagram of the several portions of the control circuit diagram shown in FIGURES 109A to 109F;

FIGURE 110 is a diagram showing the areas of each of FIGURES 109A to 109F designated by the letter combinations used to indicate the location of various circuit elements in the circuit diagram;

FIGURE 111 illustrates an abbreviated example of work performed with the apparatus of the present invention;

FIGURES 112 and 112A are an index of control circuit components showing, by means of the letter designations A to F of FIGURES 109A to 109F and the area letter designations in FIGURE 110, the location of the listed circuit components in the circuit diagram and further indicating the figures of mechanical drawings in which the components are also illustrated.

Figure 1:
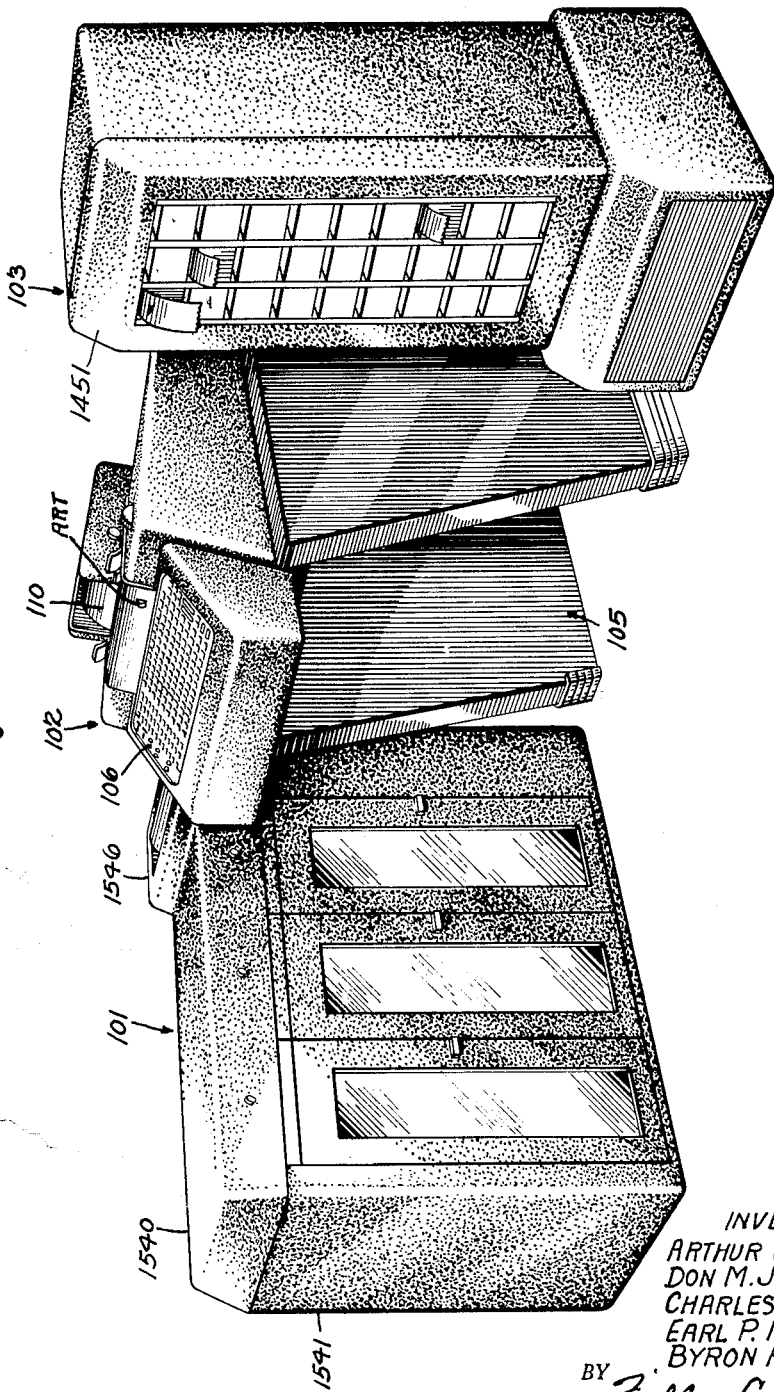
FIGURE 1 is a perspective of the master accounting machine and its stand, the sorter unit, and the multiple tape printer unit in one arrangement for convenient use by operator seated in front of the master accounting unit.

In this specification, the terms clockwise and counterclockwise will be employed uniformly as denoting the directions of rotary or arcuate movements as viewed from the tops, fronts or right sides of the machine units which are viewed from a point forwardly, rightwardly and above them in FIG. 1. All other terms denoting directions of movements and relative positions of parts will be employed to describe such positions and movements as viewed from in front of the machine units.

MASTER RECORD TAPE AND ACCOUNTING UNIT

The master record tape and accounting machine unit 102, which is supported on a suitable stand 105 at a height convenient to the operator, has a keyboard 106 (FIGS. 1 and 6) with ten rows of amount keys 156, three rows of date keys and designation keys 159, twenty-seven register selecting keys SK for selecting any one of twenty-seven registers included in three multiple register lines of nine registers each and likewise selecting a corresponding one of twenty-seven document bins in the sorter unit 101 to receive a document as well as selecting a corresponding tape printer of the multiple tape printing unit 103 to print the value of the document on the corresponding one of twenty-seven tapes. The master machine 102 also has a number of function control keys and a printing mechanism, as later described, to print a running record of all operations on a master tape 110.

A substantial amount of detailed description and illustration of the master tape and accounting machine 102 may be saved by pointing out that certain elements and mechanisms thereof are substantially the same as or similar to mechanisms included in the Burroughs Series F "Sensimatic" (Reg. T.M.) machines disclosed in the T. M. Butler Patent No. 2,629,549 and in the Butler and Runde Patent No. 2,721,695, hereinafter referred to as the Butler patent and the Butler and Runde patent.

The computer (crossfooter and multiple register) units will be referred to generally in accordance with their positions in the master accounting machine, the said positions being designated A, B, C and D (FIG. 2) from front to rear. Thus, the present master machine has in the front or A position a computing unit like that in the front position in the machines of the Butler patent and the Butler and Runde patent, and, in the three rearward positions lettered B, C and D successively, three multiple register units each like the one in the C position in the Butler and Runde patent.

*Frame*

Figure 2:
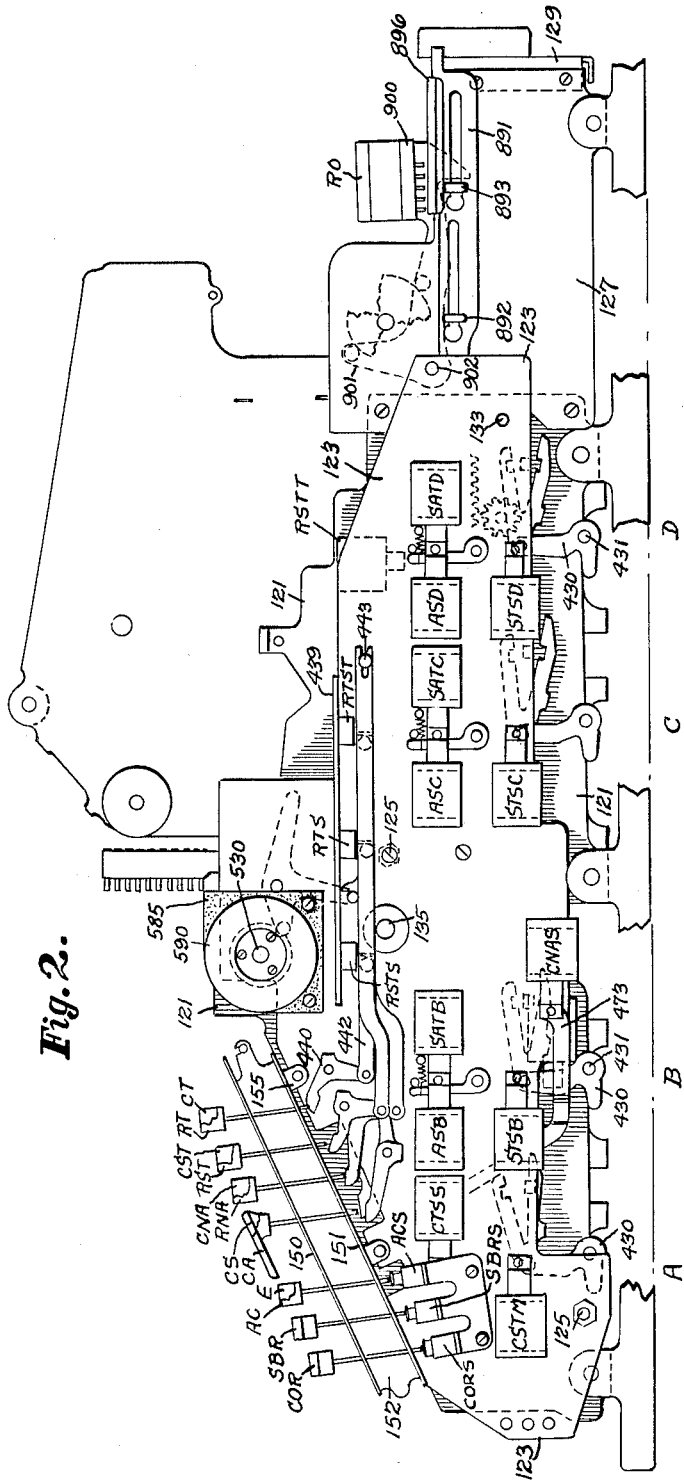
FIGURE 2 is a right side elevation of the master accounting machine with its casing removed.

The main frame of the master tape and accounting unit is generally like that disclosed in the Butler patent with modifications resulting principally from the omission of the traveling paper carriage, the carriage tabulating and return mechanism, and the carriage governed automatic function control mechanism of the Butler patent and Butler and Runde patent, modifications of the printing and paper mechanisms, and additions of other mechanisms herein disclosed. Those changes in the frame which are significant will be pointed out specifically. The frame (best seen in FIGS. 2, 3 and 5), includes right and left main side plates 121 and 122 (generally like the plates 27 and 28 of the Butler patent) connected and held in laterally spaced relation by a number of cross members generally as in the Butler patent, some of which will be referred to specifically hereinafter. Because of the addition of a number of elements and devices on the outer sides of the plates 121 and 122, added auxiliary right and left side plates 123 and 124 are supported in outwardly spaced relation from the main side plates 121 and 122, respectively by a plurality of rods or studs, such as shown at 125 in FIGS. 2 and 3, secured in the respective plate 121 or 122. To the rear ends of the main side plates 121 and 122, the right and left side plates 127 and 128, respectively, of a data read-out section or unit have been detachably secured, the rear ends of the latter plates being secured to forwardly turned flanges on the sides of a back plate 129 (FIGS. 2, 26 and 51). Near their forward edges, the plates 127 and 128 are secured to rearwardly turned flanges on the sides of a cross plate 130 (FIGS. 3, 26 and 51).

The rearward ends of the plates 121 and 122 are also held in accurately spaced relation by a tube 131 (FIG. 26) shouldered to engage against the inner sides of the plates 121 and 122 and having reduced ends passing through said plates and through hook portions 132 of the plates 127 and 128 and secured by nuts threaded on the ends of said tube. A rod 133 passing through the tube 131 has its ends secured in the rear ends of the plates 123 and 124 for additional support of the latter.

*Drive*

Figure 20:
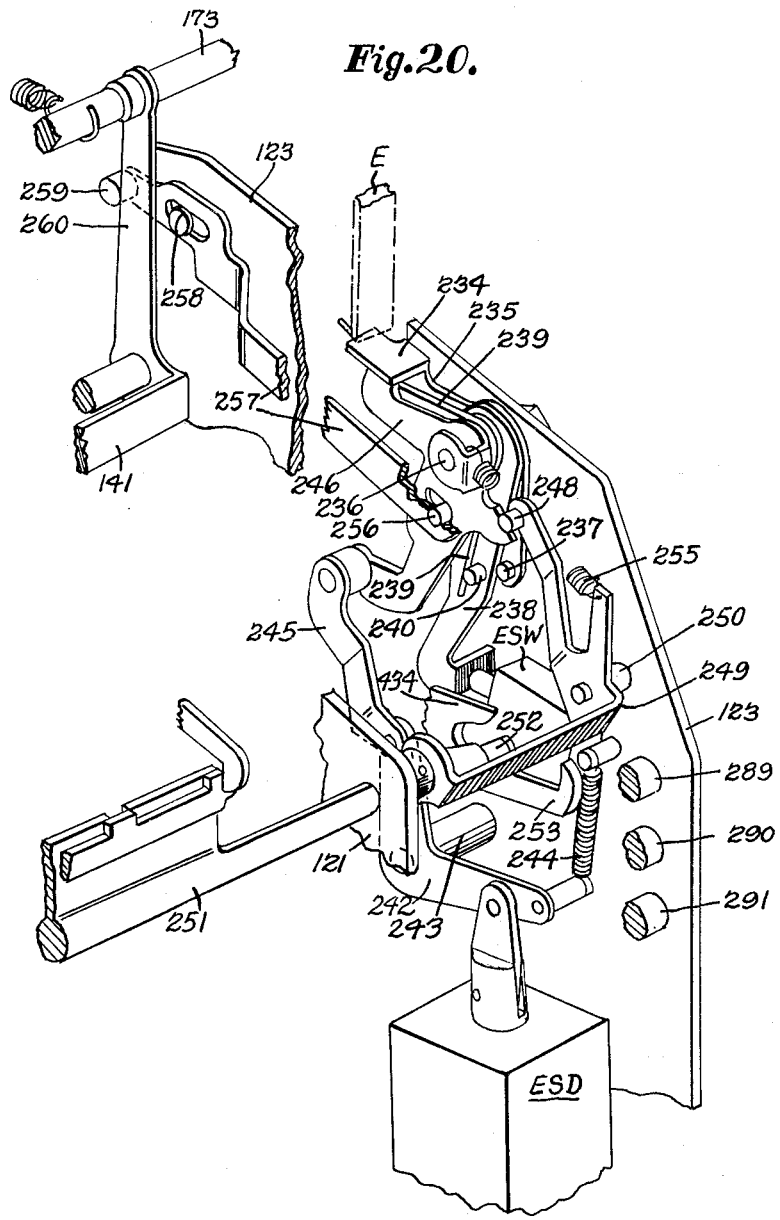
FIGURE 20 shows in perspective electromagnetically operable means to assist the operation of the error key.

The master machine drive is generally like that of the Butler patent, differing principally by the omission of the carriage opening, closing, tabulating and return, the platen line spacing drive connections, and the carriage-controlled interlocks of the patent. The drive motor MM (FIG. 3) through a single revolution cycling clutch (not shown) like that of the Butler patent, drives a main cam shaft 135 (FIGS. 2, 3, 21 and 36) which is journaled in bearings secured in the plates 121 and 122 and has secured on it cams, gears and other elements for actuating the various devices and mechanisms of the machine in proper timing. The cycling clutch as well as a cycling switch MS (FIG. 109A) are controlled by mechanism (not shown but generally like that disclosed in FIGS. 21, 22 and 23 of the Butler patent) which is set in motion to initiate a cycle of operation of the machine by clockwise rocking of a shaft 137 part of which is shown in FIG. 5 (and generally like the shaft 139 of the Butler patent). The shaft 137 is urged counterclockwise to normal non-cycling position by a tension spring 138 connected to the forward arm of a two-armed lever 139 which is secured upon the shaft 137 just rightward of the plate 121 (replacing the three-armed lever 231 of the Butler patent, the middle arm of which is not here needed because the present machine does not have the motor bars 291, 292, 293 and 294 of the Butler patent). The rearward arm of the lever 139 cooperates with a downward left side arm 140 of a bail 141 (corresponding to the arm 229 and bail 217 of FIG. 23 of the Butler patent) of the motor switch and cycling clutch control means. A portion of the bail 141 appears in FIG. 20.

Intermediate the plates 121 and 123, a downwardly extending arm 142 is secured to the shaft 137. The lower end of the arm 142 has a stud and slot connection with an upward left side arm of a yoke 143 pivoted on a stud 491 (replacing the stud 936 of the Butler patent) which is the foremost one of three such studs 491 referred to hereinafter. The yoke member 143 has a downward right side arm having a pin and slot connection with the plunger of a master machine cycling solenoid MCS which may be energized, as will be explained later, to rock the shaft 137 clockwise to initiate a cycle of operation of the machine comprising one full revolution of the main cam shaft 135.

*Keyboard*

The keyboard of the master machine comprises a top plate 150 and a bottom plate 151 (FIGS. 2, 3 and 7) secured to a plurality of vertical spacing strips 152 having rearward extensions supporting an anchor rod 153 for biasing springs 154 for key latch slides. The bottom plate 151 is secured by lugs 155 to the plates 122 and 123.

The ten rows of amount keys 156 (FIG. 6) and the key latching and releasing means therefor are substantially the same as disclosed in the Butler patent. Also, each of the amount key latch slides cooperates in the same way with a bail rod of the motor switch and cycling clutch control mechanism to prevent a machine cycle from being initiated while any amount key is only partially depressed. Also the three rows of date and commercial symbol keys 159, including, from left to right, a row of months keys, a row of days keys and a row of years and commercial designation keys as well as the key latching and releasing means for those three rows of keys are substantially the same as disclosed in the Butler patent.

To the left of the months key row are a row of three switches and, next, a row of three lamps. The rearmost switch is a main power control switch MPS. Leftward of the switch MPS is a lamp MPL which lights whenever the power is "on" and the switch MPS closed. Next below the lamp MPL is a printer-unit-paper depletion warning lamp PPD which lights whenever the paper tape supply for any printer in the multiple printer unit runs low. Rightward of the lamp PPD is a low-paper-lock by-pass switch PLB which, when closed, will permit further operations of the apparatus without replenishing the low paper supply in the multiple printer unit after the lamp PPD has lighted. The front switch is a sorter unit power switch SPS which must be closed to supply power to the sorter unit. Leftward of the switch SPS is a lamp FDB which lights when a document bin of the sorter unit is filled.

Rearward of the switches and lamps are two counters 160 and 161 and a resetting wheel 162 for the rear counter 161.

Rightward of the amount key section of the keyboard are twenty-seven selection keys SK1–SK27 in three rows of nine keys each. Each of the keys SK, when depressed, effects selection of a respective one of the twenty-seven registers, the selection of a corresponding document bin if the control program which is in effect requires the sorting of a document, the selection of a respective one of the printers of the multiple tape printing unit, the selection of selection key and register identifying type for printing in the master tape and accounting unit, and initiates a cycle of operation if no document is required to be sorted or prepares for the initiation of a cycle of operation when a document required to be sorted is placed in the chute of the sorter unit.

Constructional details of the selection key section of the keyboard are shown in FIGS. 7 to 15. For each of the three rows of selection keys SK, there are three slides 170, 175 and 185 supported for forward and rearward sliding movement between the plates 150 and 151 on cross-rods (not shown) of the keyboard and passing through the lower portion of a wide slot 169 in the stem of each key of the row. The middle slide 170 (FIGS. 7, 8, 9 and 14) of each set of three is formed with a normal key latching hook 171 for each key of its row to cooperate with the cross bar 172 of the stem of the respective key. The slides 170 for the three rows each are urged rearwardly by a spring 154 which normally holds the rear end of the slide 170 against the bail rod 173 (a rightwardly lengthened counterpart of the bail rod 215 of the Butler patent) of the cycling clutch and switch control means. The springs 154 and bail rod 173 normally position the slides 170 with their key latch hooks 171 located as shown in FIG. 8 relative to the stems of the selection keys SK, so that they will permit and will be cammed forwardly by depression of a key SK and will return rearwardly to latch the key down when it is fully depressed. As the bail rod 173 moves rearwardly as a master machine cycle is being initiated, the three slides 170 are pulled rearwardly by their springs 154 to lock all of the selection keys SK. Movement of the bail rod 173 forwardly beyond its normal position in the latter part of each master machine cycle effects release of the depressed selection key for return to normal by the restoring spring 174 for the key row at about the 318° point of the cycle.

The left hand slide 175 (FIGS. 7, 8, 9 and 13) of the set of three for each selection key row is urged rearwardly to the limit of its movement on the supporting cross rods by a tension spring 176 connected to the rear end of the slide and anchored on the rod 153. Each of the slides 175 is formed with nine cams 177, one for each key of its row, each having a downwardly sloping rear cam edge, the forward upper end portion of which is positioned directly under the cross bar 172 of the respective key while no selection key in its row is depressed, so that as any selection key SK is depressed, it will move the slide 175 for its row forwardly throughout nearly all of the downstroke of the key. Near its forward end, each slide 175 has a downwardly and forwardly extending projection 178 (FIG. 12) to cooperate with at least one of two interlock slides 179 resting flatwise on the forward edge portion of the lower keyboard plate 151 and guided for limited leftward and rightward sliding movement thereon by pairs of studs 180 secured in the plate 151. The slides 179 are so dimensioned and their sliding movement is so limited by the studs 180 that only one of the three slides 175 can at any one time occupy a position forwardly of its normal position so that a selection key in only one of the three selection key rows can be in even a partially depressed position at any one time.

At its forward end, each slide 175 has a leftwardly turned, downwardly extending finger 181 to cooperate with the operating element of a respective one of three switches SXS1, SXS2 and SXS3 supported by brackets 182 secured to fixed elements of the keyboard. Each of the three switches SXS has a single pair of normally open contacts which are closed only when a key SK in its key row is substantially fully depressed. One of the functions of the switches SXS, as described more fully hereinafter, is an indirect control of the energizing circuit of the master machine cycling solenoid MCS to initiate a machine cycle when any one of selection keys SK is depressed and a document, if one is required to be sorted, is in the chute of the sorter. The keys SK are, therefore, "live" keys.

The rightward slide 185 (FIGS. 7, 8, 9 and 15) for each selection key row is connected at its front end to a tension spring 186 which is anchored on a stud 187 supported by the switch bracket 182. The spring 186 normally holds a rightwardly turned, downwardly extending finger 189 on the rear end of the slide 185 against the rear side of the bail rod 173. Each slide 185 has, for each selection key in its row, a latch hook 188 normally positioned as shown in FIG. 8 so that it does not interfere with depression on release of its key. When the slide 185 is in its active rearward position, its latch hooks are adopted to limit the upward return of any depressed selection key in the row to a partially depressed position, as shown in FIG. 9, such that the slide 175 for the same row is held sufficiently forwardly of its normal position to position the slides 179 to prevent depression of any selection key in either of the other two selection key rows. The bail rod 173 moves the slides 185 to the FIG. 9 position as each master machine cycle is initiated and normally permits them to restore to normal position shortly after the 300° point in the cycle. Further control of the slides 185 will be described later.

For each of the nine transverse lines of three selection keys SK, there is a bail 190 (FIG. 7) pivotally supported at its ends in small bushings set in the upright flanges of two angle members 191, the lateral flanges of which are secured flat on the lower keyboard plate 151 just outwardly from the outer rows of selection key stems. Each of the nine bails 190 has three rearwardly extending fingers 192 each engaged under a shoulder 193 on the stem of a respective one of the associated three keys. Full depression of any selection key SK will rock the associated bail 190 so that a fourth rearward extension 194 thereof will actuate the operating element of a respective one of nine switches SYS1 to SYS9 to close the single pair of normally open contacts of said switch. All nine switches SYS1–SYS9 are secured against the side of the downward flange of an angle member 195 having its lateral flange secured flat against the under side of the plate 151. The operating members of the nine switches SYS project through openings in the plate 151 into cooperative relation with the extensions 194 of the respective bails 190.

On the rightward face of the upright flange of the leftward angle member 191 there is a series of eight inverted T-shaped interlock pendants 200 (FIG. 10) each pivotally suspended on the bushing supporting the adjacent end of a respective one of the bails 190. Nine pawls 201 are pivoted on studs carried by individual angle brackets 202 (FIG. 11) secured on top of the lateral flange of the left angle member 191 and each extends rightward through an opening in the upright flange of said member 191 and under the leftmost finger 192 of a respective bail 190. Each pawl is urged counterclockwise by a spring 203 and has a downward extension which is normally above the adjacent sides of the inverted T-heads of two adjacent pendants 200 except that the foremost and rearmost pawls 201 are each above one side of the T-head of only one pendant. The T-heads of the pendants 200 are so dimensioned that only one pawl can be clockwise from its normal position at any one time and consequently only one bail 190 may occupy a rocked position in consequence of even partial depression of a selection key at any one time. Thus, the interlock slides 179 and the pendants 200 together prevent more than one selection key SK from being in even partially depressed position at any one time.

A bracket 204 secured to a forward extension of the upright flange of the left angle member 191 supports a switch S19 below the keyboard bottom plate 151 in such position that the stem of the selection key SK19 at the front of the leftmost row of selection keys, when fully depressed, actuates the operating member of the switch S19 to close its single pair of normally open contacts.

Rightward of the selection key section of the master machine keyboard is a group of twelve control keys, ten of which are arranged in two rows of five keys each while each of the remaining two extends across both of said rows at the front. In the left row, in order starting at the rear, are a crossfooter total key CT, a crossfooter subtotal key CST, a crossfooter non-add key CNA, a crossfooter subtract key CS, and a general error key E. In the right row, starting from the rear, are a register total key RT, a register subtotal key RST, a register non-add key RNA, a crossfooter add key CA and an "additional credit" key AC. Next in front of the error and "additional credit" keys E and AC is a sorter bin release key SBR and a correction key COR. Each of the two keys SBR and COR has a double stem 205 (FIG. 4) with one stem portion aligned with the stems of the keys CT, CST, CNA, CS and E in the left row and another stem portion aligned with the stems of the keys RT, RST, RNA, CA and AC in the right-hand row.

Three slides 210 (FIG. 16), 211 (FIG. 17) and 212 (FIG. 18) extend side by side through the left row of control key stems. The middle slide 211 is urged to its forward limit of sliding movement on the keyboard cross rods by a tension spring 215 anchored on the rod 153 whereas the outer slides are urged rearwardly by springs 154 but normally limited by engagement against the bail rod 173 in a normal key-latching, non-locking position. The slides 210 and 212 are moved rearwardly to key locking positions by their springs 154 as the bail rod 173 moves rearwardly as a master machine cycle is initiated, and have lugs 216 extending downward behind the bail rod 173 to prevent the latter from moving rearwardly sufficiently to initiate a machine cycle if any key cooperating with either or both of the slides 210 or 212 is only partially depressed and thus holds the slide or slides forwardly of normal key-latching position.

The leftmost slide 210 of the three has six latch hooks 214 including, from rear to front, an unused latch hook 214, latch hooks for the keys CT, CST and CS, a second unused latch hook and a latch hook for the sorter bin release key SBR but none for the keys CNA, E, or COR. The rightmost slide 212 has eight key latch hooks 214 including, from rear to front, an unused latch hook, latch hooks for the keys CT, CST, CNA and CS, a second unused latch hook, and latch hooks for the keys E and COR. It will be seen that the keys CT, CST and CS cooperate with latch hooks on both slides 210 and 212, whereas the key SBR, when depressed, will not move the slide 212 forwardly to release the key CNA if the latter is latched down, and the latter key, when depressed, will not move the slide 210 to release the key SBR if the latter is in depressed position. The latch hook for the key E on the slide 212 is not permitted to latch the error key in depressed position but, as the spring 154 moves the slide 212 rearward with the bail rod 173 as a master machine cycle is being initiated, it locks the error key against depression until the time for normal automatic key release in the machine cycle.

The middle slide 211 has a projection 217 with a downwardly and forwardly sloping cam edge which is acted upon by the cross bar of the left stem portion of the key SBR, when the latter is depressed, to cam the slide 211 rearwardly and thereby place projections 218 on said slide under the cross bars of the keys CT, CST and CS to block depression of any of the latter three keys while the key SBR is depressed. At its forward end, the slide 211 has a finger 219 which engages the operating member of a switch SKE (FIG. 7) to normally hold its single pair of self-opening contacts in closed condition but permit them to open when the slide 211 is moved rearwardly by depression of the key SBR. The slide 211 also carries, near its forward end, a leftwardly extending stud 220 which normally engages the rear edge of a downward right side arm of a bail 221 pivoted on studs secured in the angle members 191 and urged counterclockwise by a tension spring 222. The bail 221 has three forwardly extending hook fingers 223, the forward hook ends of which are normally held above rightwardly bent lugs 224 on the forward ends of the three selection key locking slides 185.

When the slide 211 and its stud 220 are moved rearwardly by depression of the key SBR, the spring 222 is permitted to move the hooks of the fingers 223 against the lugs 224. Then, as the slides 185 are pulled rearwardly by the bail rod 173 as a master machine cycle is initiated, the lugs 224 are moved rearwardly of the hooks 223 which are pulled down in front of the lugs 224 by the spring 222. When, shortly after the 300° point in the machine cycle, the rod 173 moves forwardly again, it permits the springs 186 to move the lugs 224 into the hooks of the fingers 223 before it moves the slide 210 forwardly far enough to release the key SBR and permit restoration of the slide 211. The lugs 224 then prevent disengagement of the hooks 223 and the latter hold the slides 185 in such position that a previously depressed selection key SK is held in partially depressed position by its latch hook 188 on one of the slides 185 after the latch slides 170 have been moved to key releasing position by the bail rod 173 at about the 318° point of the machine cycle. The slides 185 are not moved rearwardly by the bail rod 173 to disengage their lugs 224 from the hooks 223 and thereby permit the bail 221 and slide 211 to restore to normal until the bail rod 173 has moved rearwardly far enough to lock the keyboard and initiate a cycle of operation. The previously depressed selection key SK, thus held in a partially depressed position, holds the interlock elements 179 and 200 in position to prevent depression of any other selection key SK but permits restoration of the associated slide 175 far enough rearwardly by its spring 176 to permit the contacts of the associated switch SXS to open, and permits the associated bail 190 to restore sufficiently to open the associated switch SYS.

The key SBR is released and restored in the machine cycle, but the bail 221, being held in counterclockwise position by the lug 224 on the slide 185 preventing full restoration of the depressed selection key SK, holds the slide 211 in rearward position, holding the switch SKE open and blocking the keys CT, CST and CS against depression after the machine cycle has ended. The purpose of holding the depressed selection key SK in partially depressed position, keeping the switch SKE open, and blocking depression of the keys CT, CST and CS but permitting reopening of the switches SXS and SYS after a master machine cycle performed with the key SBR depressed is, as later explained more fully, to compel depression of the same selection key for the next machine cycle.

For the right-hand row of control key stems there is a slide 212 like the slide 212 for the left-hand row and having latch hooks 214 for the keys RT, RST, RNA, CA, AC and COR and two unused latch hooks, but none for the right-hand stem portion of the key SBR. A stationary strip 227 (FIG. 19) supported on the keyboard cross rods also passes through the control key stems of the right-hand row and carries studs 228 which slidably support two interlock slides 229 which cooperate with the crossbars of the stems of the keys RT, RST and RNA to prevent depression of more than one of these keys at the same time.

Immediately under the lower end of the stem of the error key E (FIG. 20) is a lateral flange 234 on the end of a rearward arm of a bell crank 235 which is pivotally mounted next to the left face of the auxiliary frame plate 123 on a stud 236 secured in said plate. A downward arm of the bell crank 235 carries a leftwardly projecting stud 237 which is normally engaged by the forward edge of a lever 238 pivotally mounted at its upper end on the stud 236. A torsion spring 239 coiled about the stud 236 has one straight end extending rearwardly under the lug of the rear arm of the crank 235, and another straight end extending downwardly and engaging behind a stud 240 secured in the lever 238, and normally yieldingly holds the lever 238 pressed forwardly against the stud 237. The lower end of the lever 238 has a lug turned rightwardly behind the operating member of a transfer switch ESW secured to the left side of the plate 123.

As later explained more fully, the normally closed contacts of the switch ESW are connected in the circuit of the master machine control solenoid MCS, and the normally open contacts are in the circuit of a solenoid ESD which is also mounted on the left side of the plate 123 below the switch ESW. The upper end of the plunger of the solenoid ESD is linked to the forward arm of a bell crank 242 pivoted on a stud 243 secured in the plate 123. The forward arm of the crank 242 is also connected to a tension spring 244 which yieldingly maintains said arm and the solenoid plunger in a raised position. An upward arm of the crank 242 is connected by a link 245 to a downward and rearward arm of a bell crank 246 pivoted on the stud 236 and having a rearward arm terminating immediately beneath the lug on the rearward arm of the crank 235.

Slight manual depression of the error key transfers the contacts of the switch ESD so that the solenoid ESW is immediately energized and pulls down its plunger, thereby rocking the crank 242 counterclockwise and the crank 246 clockwise. The downward arm of the crank 246 has a forward projection engaging against a stud 248 secured in an upward and rearward right side arm of a bail 249 which, at its right side, is pivoted on a stud 250 secured in the plate 123 and at its left side is secured just leftward of the frame plate 121 to the amount and date key release shaft 251 (which corresponds to the key release shaft 402 of the Butler patent).

The bail 249 and the shaft 251 are yieldingly urged clockwise by a tension spring 255 connected to an upward right side arm of the bail 249 (and replacing the spring 413 of the Butler patent). A downwardly and rightwardly extending left side arm of the bail 249 carries a stud 252 which, in each cycle of operation of the master machine, is operated by a hook 253 on the forward end of an addition control slide 434 so as normally to release the amount and date keys at about the 190° point in each machine cycle (in the same manner that the corresponding addition control slide 444 of the Butler patent operates the key release shaft 402 of said patent).

A stud 256 projecting through a short arcuate slot in the crank 246 is secured in the forward end of a link 257 which is forwardly and rearwardly slidably guided at its rear end on a stud 258 secured in the plate 123. The rear end of the link 257 carries a stud 259 which engages the rear edge of an upward right side arm 260 of the bail 141 suporting the bail rod 173 (the link 257 and stud 259 replacing the link 435 and stud 438 of the Butler patent). The slack in the stud and slot connection between the link 257 and crank 246 is taken up in a small initial clockwise rocking of the crank 246 by the initial portion of the depression of the error key and/or a short initial portion of the stroke of the plunger of the solenoid ESD.

It will be apparent that when the solenoid ESD is energized upon initial depression of the error key E, it will assist the error key in the further depression thereof to rock the bail 249 and shaft 251 to release depressed amount keys and date keys and to pull the link 257 forwardly for moving the bail rod 173 forwardly to release depressed control keys and any depressed selection key SK, provided that the latter is not locked in a partially depressed position by a slide 185.

In front of the date and designation key section of the keyboard (FIG. 6) there is a small finger piece 262 (corresponding to the finger piece 478 of the Butler patent) which extends upwardly through a slot in the keyboard and may be set by the operator to any of three positions for permitting or preventing release of selected kinds or all of the date keys automatically in machine cyles or upon depression of the error key.

Differential Mechanism

The differential mechanisms for the amount, date, and designation orders of the master tape and accounting machine unit of the present invention are substantially the same as the differential mechanisms for the corresponding orders of the machine disclosed in the Butler patent. In the present master machine there are ten rows or orders of amount keys 156 instead of eleven as in the Butler patent. Beneath the stems of the keys of each row of amount keys 156, there is a differential stop bar 263 (FIG. 25) corresponding to the stop bars 483 of the Butler patent and which positions a stop sector 264 corresponding to stop sectors 491 of the Butler patent which variably limits forward movement of an amount differential actuator rack 265 (FIGS. 25, 26 and 34) corresponding to the actuator racks 511 of the Butler patent.

As in the Butler patent, the date and designation keys control four differential stop bars 267 like the stop bars 485, 486, 487 and 488 of the Butler patent and which position stop sectors 268 corresponding to the stop sectors 492, 493, 494 and 495 of the Butler patent and each of which controls a differential slide 261 like the differential slides 512 of the Butler patent.

The ten amount differential actuator racks 265 and the four date and designation differential slides 261 have indexing connections with corresponding ones of ten amount and four date and commercial designation printing type bars 266 (FIG. 37) through gear trains included in a gear cluster unit (similar to that shown in FIG. 60 of the Butler patent), a portion of which is shown at 269 in FIG. 22.

Under the stems of the keys of each row of selection keys SK in the present machine there is a forwardly and rearwardly slidably mounted differential stop slide 270 FIGS. 21 and 25). The leftmost stop slide 270 is supported and guided (in the same manner as the register selecting stop slide 3110 of the Butler and Runde patent) in two slotted cross members of the machine main frame just leftwardly of the frame plate 121, and the remaining two stop slides 270 are similarly supported and guided in slots in two added cross members 271 and 272 secured between the plates 121 and 123. Each stop slide 270 is urged rearwardly by an individual tension spring 273 connected between an ear on the forward portion of the slide and the rearward one of the cross members supporting the stop slide, but is normally held in a forward normal position by a stud 275 carried by a lever which is actuated by a cam on the main cam shaft 135. For the stop slide 270 for the leftmost row of selection keys SK, such stud 275, lever 276, and cam 274 are essentially like those disclosed in the Butler and Runde patent (at 3115—3118 in FIG. 2 of said patent), the lever 276 being rockably supported but axially confined on the rightward end portion of the shaft 277 (corresponding to the shaft 500 of those patents), inwardly of the plate 121.

The stud 275 for the rightmost stop slide 270 is carried on an added bell crank 278 which is secured on an added short shaft 279 rotatably supported in the plates 121 and 123 in axial alignment with the shaft 277, the adjacent ends of the two shafts being journaled in a single bushing 280 secured in the plate 121. The added bell crank 278 on the shaft 279 has on its rearward arm a roller 281 bearing on the edge of an added second cam disc 282 identical with the cam disc 274 and secured on the rightward portion of the main shaft 135. The stud 275 for the middle stop slide 270 is carried on an arm 283 also secured on the shaft 279, so that all three studs 275 are driven in unison to reciprocate their respective stop slides 270.

Each of the stop slides is connected at its forward end through a link 285 to an upward arm of a respective one of three bell cranks 286, 287 and 288 carried on the uppermost one of three shafts 289, 290 and 291 which extend across the front of the machine and are rotatably supported in the plate 124 (FIG. 3) and in small plates 292 and 293 (FIGS. 21 and 24 respectively) secured to and extending forwardly from the frame plates 121 and 122 respectively. The rightmost bell crank 286 is secured to the shaft 289 and its forward arm is unneeded, but the remaining two bell cranks 287 and 288 are independently rockably supported on the shaft 289 and their forward arms are connected by links 295 and 296 with the forward ends of arms 297 and 298 secured to the shafts 290 and 291 respectively. Thus, each of the shafts 289, 290 and 291 is rotated by indexing movement of a respective one of the three differential stop slides 270. Between the plates 122 and 124 each of the shafts 289, 290 and 291 has a rearwardly extending arm 300 secured thereto to control a respective one of three register indexing mechanisms, one for each of the three multiple register units.

*Register Indexing Mechanisms*

One or the three multiple register indexing mechanisms, that for the multiple register unit in the B position, is shown in a laterally spread perspective in FIG. 24. Each register indexing mechanism comprises a plate 305 upwardly and downwardly slidably guided between spacing collars on a pair of rods 306 secured at their ends in the plates 122 and 124. Each plate is urged downwardly by a tension spring 307 connected at its upper end to a stud in the plate 305 and anchored at its lower end on a rod 308 supported in the plates 122 and 124. The forward portion of each plate 305 is formed with three forwardly and rearwardly elongated slots 304, one of which receives a stud 309 secured on the rearward end of a respective one of the arms 300, so that each plate 305 will be moved downwardly by the rearward indexing movement of the stop slide 270 for a respective one of the three rows of selection keys SK. Each plate 305 has a rearwardly extending portion formed with a series of stepped shoulders 310 descending from front to rear and engageable by a lateral lug 311 on the forward end of a slide 312 forwardly and rearwardly slidably guided between spacing collars on a pair of rods 313 and 314 supported in the plates 122 and 124.

Forward and rearward movement of the three slides 312 for the three register indexing mechanisms is effected by a common drive bail 315 which is forwardly and rearwardly slidably guided at its ends in a pair of slotted plates 316 supported adjacent the facing sides of the plates 122 and 124 respectively on a pair of rods 317 (FIG. 3) which are supported at their ends in the plates 122 and 124.

Adjacent each of the facing sides of the guide plates 316 the drive bail 315 passes through the rearward end of a respective one of two drive links 318, each of which is pivotally connected at its forward end to the lower end of a downward arm of a respective one of two bell cranks 320 freely pivotally supported on a shaft 321 which is supported at its ends in the plates 122 and 124. Each bell crank 320 carries two rollers 322 and 323 on opposite sides and engaged against the edges of the respective ones of two cams 325 and 324 secured on the main drive shaft 135. The two pairs of cams are identical and the two cams 324 and 325 of each pair are complementarily formed to oscillate the respective one of the two bell cranks positively in both directions to drive the bail 315 forwardly in the very early portion of the master machine cycle and to return it rearwardly to normal position at about the 285° point of the master machine cycle.

The slide 312 of each register selecting mechanism has an upwardly extending shoulder 330 which normally bears against the rear side of the drive bail 315 and carries a stud 331 which extends through a rearwardly and downwardly curved slot 332 formed in the rear end of a coupling pawl 333. The slot 332 has a short, straight, vertical, rear end portion. The rear end of the coupling pawl 333 normally occupied a lower position in which the stud 331 is in the forward end portion of the slot 332, and a downward shoulder 534 on the pawl 333 is immediately in front of the drive bail 315 so that the latter, in moving forwardly, will drive the pawl 333 forwardly. The pawl 333 is pivotally supported on the stud 335 secured in a second slide 336 likewise supported for forward and rearward sliding movement on the guide rods 313 and 314 and is driven forwardly and rearwardly by the drive bail 315 through the pawl 333. However, when the slide 312 is arrested by engagement of its lug 311 against the rear stepped portion of the corresponding plate 305, the stud in the slide 312 cams the rear end of the pawl 333 upwardly as the forward movement of the pawl 333 and slide 336 is continued for a short distance until the shoulder 334 on the pawl 333 is lifted clear of the drive bail 315, thereby uncoupling the pawl 333 and slide 336 as well as the slide 312 from the drive bail. A tension spring 337, connected at its rear end to the slide 312 and at its forward end to the slide 336, urges the slide 312 fowardly and the slide 336 rearwardly, each relative to the other, such relative movement, however, being limited by the engagement of the stud 331 on the slide 312 in the slot 332 of the pawl 333. A tension spring 338 is connected at its rear end to the slide 312 and at its forward end to a bracket 339 (FIG. 25) secured to the upper forward portions of the plates 122 and 124. The spring 338 urges its slide 312 forwardly to prevent rebounding of the slide when it is arrested by the stepped plate 305.

A pawl 340 is pivotally supported at its rear end on a stud 341 in the slide 336. The pawl 340 is urged upwardly by a tension spring 342, but a stud 343 projecting leftwardly from the pawl 340 is engaged by the under edge of a forwardly extending arm of the pawl 333 to which the upper end of said spring 342 is connected. The pawl 333 thus normally positions the forward end of the pawl 340 behind a stud 344 secured in a third slide 345 likewise supported and guided for forward and rearward sliding movement on the rods 313 and 314. A short forward movement of the slide 336 brings the forward end of the pawl 340 into driving engagement with the stud 344, after which the slide 345 is likewise driven forward with the slides 336 and 312 by the bail 315. When the slide 312 is arrested as previously mentioned and the pawl 333 is thereupon rocked to uncouple it from the drive bail 315, the forward arm of the pawl 333 depresses the forward end of the pawl 340 so that a small notch or recess 346 at the top of the forward end of the pawl is aligned with the stud 344 to allow the latter and the slide 345 to drop back slightly for a purpose explained later.

Slide 345 is the slide which drives the register pinion assembly of the appropriate multiple register unit to the selected register position so that identically formed slides 345 may be used in each of the three register selecting mechanisms for the three multiple register units. The slide 345 is formed with three toothed rack portions 346 with one or another of which the pinion 347 (corresponding to the pinion 2833 of the Butler and Runde patent) of the pinion assembly cross-shifting means of the respective multiple register unit is meshed. In the register selecting means shown in FIG. 24 for the multiple register unit in the B position, the cross-shifting drive pinion 347 of the B unit meshes with the front rack portion 346 of the slide 345. In the register selecting mechanisms for the C and D multiple register units the middle and rear rack portions 346 mesh with the cross-shifting drive pinions 347 (FIG. 3) for the C and D multiple register units respectively, the hub of the pinion 347 of the several register units being in each case of appropriate length.

As in the multiple register unit of the Butler and Runde patent, the pinions of the #1 register are aligned with the differential actuator racks when the multiple register pinion assembly and the selecting mechanism associated therewith are in normal positions.

The pawl 340 is of such length as to effect a slight overdrive of the slide 345 to insure a slight clearance in the latch means (not shown herein, but corresponding to the latch means 2840—2845 of the Butler and Runde patent) for latching the multiple register pinion assembly in the selected cross-shifted register position, after which the lowering of the front end of the pawl 340 to align its notch with the stud 344 permits the multiple register pinion assembly to drop back into accurate selected register position against the above-mentioned latching means.

To prevent undesired overthrow of the slide 345 and multiple register pinion assembly driven thereby, a pawl 350 is pivotally mounted on a stud 351 secured in the slide 345. The lower edges of the forward and rearward arms of the pawl 350 are formed with cam portions 352 and 353 to cooperate with studs 354 and 355 secured in and extending rightwardly from the slide 336. Normally the forward stud 354 holds the forward portion of the pawl 350 upwardly in a position such that a leftward lug 356 on its front end is above the path of a lug 357 extending rightwardly from the slide 312, but as the slide 336 moves forwardly to bring the front end of its pawl 340 into engagement with the stud 344, the stud 354 moves forwardly of the cam edge 352 and the stud 355 acts on the cam edge 353 of the pawl 350 to lower the lug 356 immediately behind the upper rear edge of the lug 357 so that when the forward movement of the slide 312 is arrested by engagement of its lug 311 against a step 310 of the plate 305, the lugs 356 and 357 prevent undesired overthrow of the slide 345 and the multiple register pinion assembly driven thereby.

As in the machine of the Butler and Runde patent, the multiple register pinion assembly, and thus also the slide 345, remain latched in selected register position until slightly after the 360° point or end of the machine cycle, but the register selection drive bail 315 of the present machine effects its return stroke between about the 235° to 285° portion of the machine cycle, returning the slides 336 and 312 to normal, while the slide 345 remains in selected register position. During its return stroke, the bail 315 encounters the upwardly curved rear upper edge portion of a finger 359 extending forwardly from the lower rear end portion of the coupling pawl 333 and cams the rear end of said pawl downwardly again into normal coupled relation with the drive bail 315 during a short initial portion of the return movement of the pawl 333 and slide 336, after which the bail 315 engages the shoulder 330 of the slide 312 and effects the return of the slide 312 simultaneously with the remainder of the return of the slide 336.

During the initial portion of the return movement of the slide 336, the stud 354 acts on the cam edge 352 of the pawl 350 to again elevate the lug 356 above the path of the lug 357. As the slides 312 and 336 are returned to normal while the slide 345 carrying the pawl 350 remains in selected register position, the stud 354 moves rearwardly relative to the pawl 350 sufficiently, if the slide 345 is in one of the higher numbered register positions, to permit the lug 356 to be lowered in front of the lug 357. However, during subsequent return to normal of the slide 345, the lug 356 encounters the upwardly and rearwardly inclined front face of the lug 357 and is thereby cammed up and over the latter lug without interfering with complete return of the slide 345.

As in the machine of the Butler and Runde patent, the multiple register pinion assembly is returned to normal by spring means contained within the multiple register unit when, slightly after the end of the machine cycle, the multiple register pinion assembly is unlatched for return to normal. The same spring reversely rotating the drive pinion 347 will also return the slide 345 to normal, but the return of the slide 345 and parts coupled thereto is assisted in the present machine by a tension spring 362 connected between a leftward lug on the front end of the slide 345 and a stud 363 secured in the slide 336 and extending leftwardly through a clearance slot in the slide 312.

The above-mentioned latch tripping device in the multiple register unit which times the release of the multiple register pinion assembly for return to normal requires resetting at the beginning of each register selecting operation to permit the latch means to latch the pinion assembly in selected register position. For that purpose there is provided for each multiple register unit and its register selecting mechanism, an individual shaft 365 journaled in the plates 122 and 124 below and a little forwardly of the axis of the drive pinion 347 for the respective multiple register unit. The shaft 365 has secured to it near the plate 122, an arm 366 extending forwardly over the stud 367 on an arm 368 (corresponding to the stud 2856 and arm 2854 of the Butler and Runde patent) operatively connected with said tripping means. A second arm 369 secured on the shaft 365 below the slide 336 for the respective register unit carries a stud normally engaged with the rear edge of a downward projection 371 on the slide 336 to prevent the arm 366 from being rocked downward far enough to depress the stud 367 by a tension spring 372 connected between said arm 366 and a stud secured in the plate 122. However, movement of the slide 336 forwardly from its normal position as far as its #2 register selecting position permits sufficient movement of the arm 369, shaft 365 and arm 366 by the spring 372 to permit the arm 366 to depress the stud 367 and arm 368 to move said latch tripping means to reset position to permit the register pinion assembly to be latched in the selected register position.

The projection 371 for the C register unit is provided on all three of the slides 336 as it supports the stud 355. The slide 336 for the B register unit has an additional projection 371 on its forward portion and the slide 336 for the D register unit has an additional projection 371 on its rearward poriton in the position indicated by dot-dash lines in FIG. 24.

The slide 345 of each register selecting means has a cam projection 375 which cooperates with and normally holds the operating member of an individual switch RIS1, RIS2 or RIS3 in position to close a pair of self-opening contacts of said switch. The slide 345, upon movement forwardly to a point a little short of its #2 register position, releases the operating member of the associated switch RIS sufficiently to permit its contacts to open and remain open until the slide 345 again passes its #2 register position in its restoring movement. The switches RIS for all three register selecting mechanisms are connected in the circuit of the master machine cycling clutch solenoid MCS, as later described more fully, to prevent initiation of a further machine cycle before an operated multiple register unit pinion assembly has restored to at least past its #2 register position from which point the multiple register pinion assembly may complete its restoration without danger of any interference or misoperation in the initial portion of the new machine cycle.

Each of the three slides 345 is provided with an adjustable resilient bumper means indicated generally at 377 in FIGS. 24 and 26 similar to that disclosed (at 2934, 2935) in the Butler and Runde patent, that for the B slide 345 being mounted on the plate 122 as in the Butler and Runde patent and those for the C and D slides 345 being mounted on plates 378 supported between spacing sleeves on a pair of rods 379 supported at their ends in the plates 122 and 124.

Each vertically movable register selecting plate 305 is normally blocked against movement downward from its normal #1 register selecting position by a lug 381 on said plate extending leftwardly above a rearwardly bent lug 382 on the free upper end of the armature 383 of an electromagnet SXM1, SXM2 or SXM3 mounted on the bracket 339. The restoring spring 384 normally holds the armature with its lug 382 in active position blocking downward movement of its associated plate 305. The winding of each magnet SXM is, as hereinafter more fully described, connected in a circuit governed by the switch SXS associated with the appropriate one of the three banks of selection keys SK so that movement from normal of the plate 305 and the corresponding differential stop slide 270 of each register selecting mechanism is prevented in any machine cycle in which a selection key SK in the corresponding row of selection keys is not depressed.

*Selection Key and Register Designation Type Selection*

The printing mechanism, later described more particularly, of the master machine includes two type bars for printing identification of the depressed selection key SK, and thus also identification of the operated one of the multiple registers. Although the registers of the three groups could be identified as B1–9, C1–9 and D1–9 conveniently, it is usually demanded that all of the 27 registers be identified by the numbers 1 to 27 respectively, and this requires a special control for the indexing of the two register designating type bars inasmuch as there are nine registers in each of the three groups so that the first register of the C group is designated by the number 10 and the first and second registers of the D group are designated by the numbers 19 and 20 respectively. The indexing of the type bar for the units order of register designation is controlled by a differential actuator slide 390 (FIG. 24) which is mounted and guided for forward and rearward movement in the same manner as the date and commercial designation differential slides and is located next rightwardly from the year and commercial designation differential actuator slide. It effects indexing of a units order register designation type bar through a gear train included in the previously mentioned gear cluster unit similar to that shown in FIG. 60 of the Butler patent. The differential actuator slide 390 is controlled by a differential stop sector 391 which is mounted on the shaft 389 and connected with a differential stop slide 392, which is similar to the differential stop slides for the amount orders, and reciprocated rearwardly and forwardly by the same bail (not shown, but corresponding to the bail rod 498 of the Butler patent), but does not cooperate with any row of keys for positioning the stop sector 391 and serves only for moving the sector 391 with proper timing. The stop sector 391, similarly to the other differential stop sectors of the machine, is normally in a position in which it does not limit forward movements of its associated differential actuator slide 390. The arrest of the differential stop sector 391 in its several differential positions for limiting movement of the differential slide 390 is effected by upward extensions 393 of the three slides 336, each of which upward extensions 393 is formed with a series of steps 394 rising progressively from front to rear and adapted to limit downward movement of a bail rod 395 supported in the rear ends of right and left side arms of a yoke 396 pivoted on a leftward extension of the shaft 389 (a leftwardly lengthened counterpart of the shaft 496 of the Butler patent) passing through the plate 122 and having its leftward end journaled in the plate 124. The right side arm of the yoke 396 has a forward extension formed with a slot embracing a stud 398 on a forward left side arm of a yoke 399 integral with the stop sector 391. Thus the position to which the stop sector 391 will be indexed in each machine operation will be determined by the position in which the bail rod 395 is arrested by a step 394 on one of the three slides 336.

Now it will be apparent that as the keys SK in the first or rightmost row are allotted the numbers 1 to 9 consecutively from front to rear, those in the second or middle row are given the numbers 10 to 18, and the numbers 19 to 27 are applied consecutively to the keys SK of the third or leftmost row, the steps on the stepped extensions 393 of the three slides 336 must be differently arranged on each of the three slides, the step in each position lengthwise of the leftmost and middle slides in all but the front position on the slide being one step less in height than the step in the same longitudinal position on the slide 336 next to the right. The foremost of the steps 394 on all three slides 336 are in the path of the bail rod 395 in machine operations in which the front key SK in any of the three rows of such keys is depressed. Thus the foremost step on the rightward slide 336 must be cut down to the 0 level as shown in FIG. 24A in order to permit the bail rod 395 to descend to the 0 level in a machine operation in which either the front key in the middle row of keys SK is depressed, or in which the second key (the #20 key) in the third or leftmost row of keys SK is depressed, and an additional means is necessary to limit the downward travel of the bail rod 395 at the "1" level in a machine operation in which the foremost key of the rightmost row of keys SK is depressed. This additional means comprises a small slide 401 slidably mounted on a stud on the bracket 339 above the magnet SXM1 for the B multiple register selecting means, which magnet is energized when any key in the rightmost row of keys SK is depressed, and on a stud 400 secured in the plate 122. The slide 401 is normally held at its forward limit by a tension spring 402 connected between a lug on said slide and the stud 400. The slide 401 has a rearward portion extending across the path of a rightwardly bent lug 403 on a forward extension of the right side arm of the yoke 396, said rearward extension of the slide 401 being notched to permit the bail rod 395 and yoke 396 to swing upwardly to zero position in any machine operation in which the slide 401 is in its normal rearward position in consequence of no key in the rightmost row of keys SK being depressed. However, when any key in the rightmost row of keys SK is depressed, the magnet SXM1 is energized and pulls up its armature 383 which engages the slide 401 and moves it forwardly against the tension of the spring 402 sufficiently to place the rear end portion of the rearward extension of the slide 401 in the path of the lug 403 to limit the movement of the bail rod 395 and yoke 396 to the 1 position in the event that the depressed key SK is the first key in the rightmost row so that the slide 336 for the B multiple register unit is held in normal position. It will be apparent that in a machine cycle in which the front key SK in the middle row (the 10 key) or the second foremost key SK in the leftmost row (the 20 key) is depressed, the bail rod 395, yoke 396 and stop sector 391 will be permitted to move to 0 position to hold the differential actuator slide 390 from moving forward of its normal 0 position and consequently prevent the units order designation type bar from being elevated above its "0" printing position. This will also be true in operations in which none of the keys SK1 to SK27 is depressed, excepting when the hereinafter described key ART (FIGS. 1 and 28) is depressed.

It will now be seen that an additional means is also required to stop the bail rod 395, yoke 396, and stop sector 391 in the 9 position in a machine cycle in which the front key SK in the leftmost row (the 19 key) is depressed. As previously described, the front key SK in the leftmost row, when depressed, closes the contacts of a switch S19 which, as will be later explained more particularly, causes the closing of the energizing circuit of another magnet M19 supported on the left side of the plate 122. The armature 405 on the magnet M19 has a rearward extension engaged under a stud 406 in the rearward arm of a bell crank 407 pivoted on a stud secured in the plate 122. The lower arm of the bell crank 407 is formed with a rearward hook which is normally forward and clear of the bail rod 395, but is moved under the bail rod 395 to arrest downward movement of the latter at its 9 position in a machine cycle performed with the foremost key SK in the leftward row (the 19 key) depressed.

The above provisions effect the proper indexing of the stop sector 391 to arrest the differential slide 390 and the associated units order selection key and register designation type bar in proper position to print the units order numeral of the appropriate one of the designation numbers 1 to 27. It will be apparent that a special control of the tens order selection key and designation type bar is also required.

The indexing of the tens order designation type bar is effected through a gear train in the previously mentioned gear cluster unit actuated by a differential actuator 410 (FIG. 22) which is generally similar to the differential slide 390 but located immediately leftward of the right main frame plate 121, and actuated in the same manner as the amount differential actuators by the drive bail 411 (corresponding to the drive bail 531 of the Butler and the Butler and Runde patents) which similarly actuates the previously mentioned differential actuator slide 390.

Above the rear portion of the actuator slide 410 is a series of three magnets PM19, PM10, and PM20 mounted on a bracket 417 secured to the leftward side of the plate 121. Each of the magnets PM19, PM10, and PM20 has a movable armature 418, 419 and 420 respectively, pivotally supported at its upper end on the magnet frame and normally held by a restoring spring 421 (FIG. 26) in a retracted position such that a downward extension of its lower end is leftward of the paths of three leftward projections 422, 423 and 424 on the leftward flange of an angle piece 425 (FIG. 23) secured to the leftward side of the rear end portion of the differential slide 410. While the slide 410 is in its normal rearward position, the forward edges of the projections 422 and 423 are only sufficiently rearward of the rear edges of the downward projections of the armatures 418 and 419 to provide the necessary clearance to permit either armature to be pulled in front of the corresponding projection 422 or 423 when its magnet PM19 or PM10 is energized, to thus block differential slide 410 from moving forwardly of its normal position when either of the magnets PM19 or PM10 is energized. The rearmost projection 424 on the angle piece 425 is formed with a double step to provide a forward portion which will permit one unit of forward movement of the differential slide 410 when only the magnet PM20 is energized, and a rear, leftwardly extending shoulder which will permit two units of forward movement of the slide 410 when none of the magnets PM19, PM10 and PM20 is energized.

The tens order selection key and register designation type bar has a "1" type in its uppermost type position to print a "1" in a machine operation in which the differential slide 410 is held in normal position, and a "2" type in its second type position to print a "2" in a machine operation in which one unit of forward movement of the slide 410 is permitted, and no other types thereon, so that no tens order selection key and register designation numeral is printed in machine operations in which two steps of forward movement of the slide 410 is permitted.

As will be explained more fully hereinafter, the energizing circuit of the magnet PM10 is controlled by the switch SXS2 so as to be energized to hold the slide 410 in normal position in a machine operation performed with any key SK of the middle row depressed, the energizing circuit of the magnet PM20 is controlled by the switch SXS3 to be energized to limit the forward movement of the slide 410 to one step in any machine cycle in which a key SK of the leftmost row is depressed, whereas the energizing circuit of the magnet PM19 is controlled by the switch S19 to be energized to hold the slide 410 in normal position in any machine cycle in which the foremost key SK in the leftmost row (the 19 key) is depressed.

It will be apparent that the units order register designation type bar will print "0" and the tens order register designation type bar will not print in a machine cycle initiated, as by depression of the crossfooter total key CT, with none of the keys SK depressed.

Computing Function Control Means

As previously indicated, the front or A computing unit of the master machine is like the front crossfooter of the Butler patent, except that it has eleven orders or pairs of pinions to cooperate with the eleven amount differential actuator racks 265 of the present machine and is further provided with a mechanism which will be described hereinafter under the heading "Crossfooter Nonclear Lock." The B, C and D multiple register units are each like the multiple register unit in the C position in the Butler and Runde patent, except that each register of each multiple register unit in the present machine has eleven pinions to cooperate with the eleven amount differential actuator racks of the present machine. As in the above-mentioned patents, the pinions of the A computing unit and the pinions of the selected register of any of the other three multiple register units are movable into and out of engagement with the amount differential actuator racks by means including an arm 430 on the right end of a shaft 431 (FIG. 2) of the respective unit. The arm 430 for the A crossfooter carries coupling pawls 432 and 433 (FIG. 27) and the arm 430 for each of the multiple register units carries corresponding pawls 492 and 505 by which the arm 430 may be coupled selectively with any one of three slides 434, 435 and 436 which are driven rearwardly and forwardly in each machine cycle at the appropriate times for engaging and disengaging the pinions of the respective computing unit with and from the amount differential actuator racks for the performance of addition, subtraction, total-taking and subtotal-taking. The slide 434 is driven with a timing appropriate to addition, the slide 435 with a timing appropriate both to subtraction and total-taking, and the slide 436 is driven with timing appropriate to subtotal-taking. (The above-mentioned elements correspond respectively to the arms 911, shafts 800, coupling pawls 913 and 1008, and slides 444, 924 and 1011 of the Butler patent.) Also, a fourth slide 437 driven forwarly and rearwardly in each machine cycle (and corresponding to the slide 956 of the Butler patent) is automatically connectible (by means not shown herein, but corresponding to those including a pawl 975 and stud 979 of the Butler patent) for cross-shifting the pinions of the A crossfooter automatically at the proper times in a crossfooter total taking operation initiated while the A crossfooter contains a negative total so that the true negative total will be drawn.

The coupling and uncoupling movements of the pawls 432 and 433 for the A crossfooter unit are controlled in part by the keys CT, CST, CNA, CS and CA, and the coupling and uncoupling movements of pawls 492 and 505 for all three of the multiple register units are controlled in part by the keys RT, RST and RNA, but in the present machine, the direct mechanical connections of the Butler patent between the computer function control keys and the coupling pawls 432, 433, 492 and 505 for the several computer units have been replaced, except as specifically stated hereinafter, by electro-mechanical means as next described.

The stem of the crossfooter total key CT terminates above a lateral lug on the forward arm of a bell crank 440 (FIGS. 2 and 4) which is pivoted on a stud 441 secured in and projecting rightwardly from the plate 123. Bell crank 440 has a downward arm which is pivotally connected to the forward end of a link 442 which is forwardly and rearwardly slidably guided at its rear end on a stud 443 secured in the plate 123. Intermediate its ends the link 442 carries a leftwardly projecting stud 444 located immediately in front of the operating member of a switch CTS mounted on a bracket 439 (FIG. 2) secured to the underside of a bracket 439 (FIG. 2) secured to the plate 123. The switch CTS, as hereinafter explained, controls partially the energizing circuit of a solenoid CTSS (FIG. 2) on the right side of the plate 123. The plunger of the solenoid CTSS is connected (FIG. 27) to an upward right side arm of a yoke member 445 (replacing the bell crank 920, 921 of the Butler patent) pivotally mounted on a stud 446 projecting rightwardly from the plate 121 and having a rearwardly extending left side arm carrying a stud engaging the upper edge of the pawl 432 so that upon energization of the solenoid CTSS the pawl 432 is rocked downwardly to disconnect it and the arm 430 of the A crossfooter from the add slide 434 to which they are normally coupled, and to couple them to the subtract and total slide 435.

The link 442, which is moved rearwardly by depression of the crossfooter total key CT, also has a finger 447 (FIG. 5) extending downwardly in front of a stud 448 carried by an upward right side arm of a yoke member 449 pivoted on the rightward end portion of the shaft 137 and having an upward left side arm pivotally connected with the rearward end of a link 450 which, at its forward end, is pivotally connected with a stud 451 (FIG. 27) extending through a forwardly and rearwardly elongated slot in the link 452 and secured in an upward left side arm of a yoke member 453 (corresponding to the yoke member 945 of the Butler patent) pivotally mounted on the stud 446. The yoke 453 has a rearward left side arm extending under a stud in the forward end of the pawl 454 (corresponding to the pawl 975 of the Butler patent) carried by the negative total slide 437 for cross-shifting the pinions of the A crossfooter in a total-taking operation initiated when there is a negative total in the crossfooter. The yoke 453 also has a downward left side arm which, when moved to total taking position by depression of the total key CT, positions zero stop means (not shown) for the crossfooter pinions as disclosed fully in the Butler patent.

The stud 451 normally is in the rearward end of the slot in the link 452 so that upon depression of the total key CT, the link 450 also pulls the link 452 rearwardly. The link 452 (corresponding to the link 948 of the Butler patent) when moved rearwardly operates a means like that disclosed in the Butler patent to hold all of the amount differential stop slides in their normal positions in which the differential stop sectors controlled thereby do not transfer with full forward movement of the amount differential actuator racks.

The stem of the key CST terminates above a lateral lug on the forward arm of a bell crank 460 (FIG. 4) pivotally supported on a stud 461 projecting rightwardly from the plate 123 and having a downward arm pivotally connected with the forward end of a link 463 which, like the link 442, is guided at its rear end on the stud 443. The link 463 carries a stud 464 projecting rightwardly in front of the operating member of a transfer switch CSTS which is supported by the bracket 439 and as hereinafter explained more fully, partially controls the energizing circuit of a solenoid CSTM (FIGS. 2 and 27) mounted on the right side of the plate 123. The plunger of the solenoid is connected with a stud passing through an aperture in the plate 123 and secured in a downward right side arm of a yoke member 465 (replacing the bell crank 1006 of the Butler patent) pivotally mounted on the stud 446 and having a rearward left side arm engaging against the upper edge of the pawl 433. Thus, when the crossfooter subtotal key is depressed, the pawl 433 is rocked downwardly to couple the front crossfooter arm 430 with the subtotal slide 436, and at the same time a downward projection 466 on the pawl 433 acts on a rightward lug of the pawl 432 to move the latter to an intermediate position in which it is uncoupled from the add slide 434 but not coupled to the subtract and total slide 435.

The link 463, like the link 442, has a projection 467 extending downwardly in front of the stud 448 (FIG. 5) so that depression of the crossfooter subtotal key CST also conditions the zero stops for the crossfooter pinions and the amount differential stop slide latch means, as for total-taking.

The projection 447 on the link 442 and the projection 467 on link 463 both extend downwardly also in front of a stud 470 (FIG. 5) extending rightwardly from an upward arm of a lever 471 pivotally mounted on the shaft 137 next rightwardly of the yoke 449 and having a rearward arm carrying a roller 472 engaging the operating member for a transfer switch MCSW which, when operated, normally will close the energizing circuit of the master machine cycling solenoid MCS to initiate a cycle of operation. In other words, the crossfooter total and subtotal keys CT and CST are "live" keys.

The stems of the crossfooter non-add and subtract keys CNA and CS terminate above lugs extending rightwardly over the upper edge of the plate 123 from a forward arm of a lever 475 (FIGS. 4 and 5) pivotally mounted on the left side of the plate 123 on a stud 476 secured in said plate. The lever 475 has a downward arm (FIG. 5) pivotally connected to the rear end of a link 477 having at its forward end a slot embracing the stud which connects the plunger of the solenoid CTSS to the yoke member 445 so that upon depression of the crossfooter subtract key CS the yoke member 445 is rocked far enough not only to uncouple the pawl 432 (FIG. 27) from the add slide, but also far enough to couple it to the subtract and total slide 435. As in the crossfooter of the Butler patent, the pinions of the computing units of the present machine are meshed with and unmeshed from the amount differential actuator slides at the same times in subtracting operations as in total-taking operations, but in subtracting operations the amount differential stop slide latch means and the zero stop means for the pinions remain in normal ineffective condition.

When the lever 475 is rocked by depression of the crossfooter non-add key CNA, the coupling pawl 432 is rocked only to an intermediate position in which it is uncoupled from the add slide 434 but not coupled to the subtract and total slide 435 so that the A crossfooter pinions will remain disengaged from the amount differential actuators throughout the cycle of operation of the machine. The pawl 432 will also be rocked to its intermediate position to non-add the crossfooter by energization of a solenoid CNAS (FIG. 2) mounted on the plate 123, the plunger of said solenoid being connected with the rear end of a link 473, the forward end of which (FIG. 5) has an elongated closed slot embracing a stud 474 secured in the upward right side arm of the yoke member 445.

The lever 475 also has a rearward arm extending under a stud 478 (FIG. 5) extending rightwardly from a forward arm of the lever 471 so that depression of the crossfooter subtract key CS also causes operation of the master machine cycling switch MCSW, i.e., the key CS is also a "live" key. However, the depression of the crossfooter non-add key CNA rocks the lever 475 to a lesser extent so that the lever 471 is not rocked far enough to operate the switch MCSW, i.e., the key CNA is not a "live" key.

The forward arm of the lever 475 overlies the operating member of a normally closed switch CSNA (FIG. 4) in a common portion of the circuits for the solenoids CSTM and CTSS. The switch CSNA is opened by depression of either the crossfooter subtract key CS or crossfooter non-add key CNA to prevent, as later explained, certain misoperations and undesired operations of the crossfooter function controls while either of said keys is depressed.

The stem of the crossfooter add key CA terminates above a lateral lug on the forward arm of a lever 480 (FIGS. 4 and 5) which is pivoted on a stud 481 extending rightwardly from the plate 123 and has a rearward arm also located under the rightward portion of the stud 478 extending through an aperture in the plate 123, so that depression of the cross-footer add key CA likewise operates the master machine cycling switch MCSW. As the coupling pawls 432 and 433 for the A crossfooter are normally in add condition, there is no need to alter their condition by depression of the key CA.

The stem of the register total key RT terminates above a lateral lug on the forward arm of a bell crank 482 (FIG. 4) pivoted on the stud 441 and having a downward arm pivotally connected to the forward end of a link 483 also slidably supported at its rear end on the stud 443. The link 483 carries two studs 484 and 485 projecting rightwardly in front of the operating members of two switches RTS and RTST suported by the bracket 439. The switch RTS, as hereinafter more fully explained, partially controls the energizing circuits of three register subtract and total solenoids SATB, SATC and SATD (FIG. 2) for the three multiple register units respectively, mounted on the right side of the plate 123. The switch RTST partially controls, as explained more fully hereinafter, a register subtotal and total solenoid RSTT (FIG. 27) mounted on the right side of the plate 121. The circuits of the solenoids SATB, SATC and SATD are also controlled, in a manner explained hereinafter, indirectly and partially by means controlled by the selection keys SK.

The plunger of each solenoid SATB, SATC and SATD is pivotally connected to a stud 489 (FIG. 27) carried by an upward right side arm of a yoke member 490 of the function control means for the respective multiple register unit corresponding to the yoke member 445 for the A crossfooter unit and pivotally mounted on a stud 491 extending rightwardly from the plate 121. The yoke member 490 has a rearward left side arm engaging the upper edge of the coupling pawl 492 (corresponding to the pawl 432 for the A crossfooter unit) which, like the pawl 432, is urged counterclockwise by a tension spring 496 toward position for coupling with the add slide 434. However, the yoke member 490 is normally held in a position to hold the coupling pawl 492 in its intermediate or non-add position where it is uncoupled from both slides 434 and 435. For this purpose, a small lever 493, pivoted at its lower end on a stud secured in the plate 123, extends upwardly in front of the stud 489 and is normally held clockwise against a limit stud 494 in the plate 123 by a tension spring 495 so as to position the yoke member 490 and coupling pawl 492 in non-add position, as just above stated. When the associated solenoid SATB, SATC or SATD for the respective register unit is energized, it rocks the yoke member 490 and coupling pawl 492 for that multiple register unit further clockwise to couple the arm 430 for that register unit to the subtract and total slide 435. From the foregoing it will be noted that the function control mechanism for each of the multiple register units B, C and D is normally in non-add condition.

The stem of the subtotal key RST terminates above a lateral lug on the forward arm of a bell crank 498 (FIG. 4) pivotally mounted on the stud 461 and having a downward arm pivotally connected to the forward end of a link 499 also supported at its rear end on the stud 443. The link 499 has a stud 500 extending leftwardly in front of the operating member of a register subtotal switch RSTS supported by the bracket 439 and has a second stud 501 projecting leftwardly in front of the operating member of the previously mentioned register total and subtotal switch RTST. The register subtotal switch RSTS indirectly and partially, as hereinafter, described, controls the energizing circuits of three register subtotal solenoids STSB, STSC and STSD (FIG. 2) mounted on the right side of the plate 123.

The plunger of each of the register subtotal solenoids STSB, STSC and STSD is pivotally connected to a stud extending through an aperture in the plate 123 and secured in a downward left side arm of a yoke member 503 pivotally supported on the stud 491 and having a rearward left side arm engaging the upper edge of the subtotal coupling pawl 505 (corresponding to the pawl 433 of the A crossfooter unit) for the respective multiple register unit. The register subtotal solenoids STSB, STSC and STSD are also controlled partially and indirectly by the selection keys SK. When the subtotal solenoid for any one of the multiple register units is energized it rocks the associated yoke member 503 to rock the subtotal coupling pawl 505 for that register unit to couple the arm 430 for that unit to the subtotal slide 436.

The register total and subtotal switch RTST which, as above described, is operated by the link 483 upon depression of the total key RT and by the link 499 upon depression of the register subtotal key RST partially controls the energizing circuit of the previously mentioned register subtotal and total solenoid RSTT (FIG. 27). The plunger of the solenoid RSTT is connected through a link 506 to the forward portion of a right side arm of a yoke 507 (corresponding to the yoke 453 of the A crossfooter control) which has a downward left side arm for setting the pinion zero stop means of the associated multiple register unit, and an upward left side arm pivotally connected to a respective one of three studs in a link 508, so that when the solenoid RSTT is energized the yoke members 507 for all three multiple register units are moved to render the zero pinion stop means in each of the three multiple register units effective. The simultaneous activation of the zero stop means in all three multiple register units simultaneously is unobjectionable in the present machine in which the register selection function controls are so organized that no more than one register can be operated in a register total or subtotal taking operation of the machine. The stud in the forward end of the link 508 projects also through the rear portion of an elongated slot in the rear end of the link 452 so that upon energization of the solenoid RSTT for a register total or subtotal taking operation the amount differential stop slides are latched in normal position.

The stem of the register non-add key RNA terminates above a lateral lug on the forward arm of a bell crank 512 (FIG. 4) pivotally mounted on the stud 461 between the bell cranks 460 and 498 and having a downward arm pivotally connected to the forward end of a link 515 slidably guided at its rearward end on the stud 443. The link 515 carries two studs projecting leftwardly in front of the operating members of two switches NARS and RNAS, both supported by the bracket 439 and each having a single pair of normally closed contacts which are opened by rearward movement of the link 515 by depression of the register non-add key RNA. The opening of the switch NARS for any machine cycle prevents activation of certain function control relays, referred to later, in that machine cycle, and the opening of the switch RNAS for any machine cycle prevents in that machine cycle the energization of any of the previously mentioned solenoids SATB, SATC, SATD, STSB, STSC, and STSD, as well as preventing the energization of three further register add solenoids ASB, ASC and ASD mounted on the right side of the plate 123 (FIG. 2) forwardly of and in line with the respective one of the register subtract and total solenoids SATB, SATC and SATD.

The rearward end of the plunger of each register add solenoid is pivotally connected to the same stud 489 (FIG. 27) to which the forward end of the subtract and total solenoid for the same register unit is pivotally connected, so that upon energization of the register add solenoid ASB, ASC or ASD the lever 493 and yoke member 490 for that unit will be rocked counterclockwise against the tension of the spring 495 to permit the spring 496 to rock the coupling pawl 492 counterclockwise to couple the arm 430 of the corresponding register unit to the add slide 434.

One or another of the register add relays, as fully explained later, would normally be energized in a machine operation in which none of the other register function control relays is energized. Thus it will be seen that as the register function control members are normally in non-add condition so that it is unnecessary to operate them upon depression of the register non-add key, the switch RNAS is nevertheless required to be opened by depression of the register non-add key to prevent alteration of the condition of the register function control members.

The stem of the additional credit key AC terminates above the operating member of a normally open switch ACS (FIG. 4) which, as hereinafter described, is connected in parallel with a non-clear lock switch CNC operated by a crossfooter non-clear sensing device in the A crossfooter unit and connected in the circuit of the master machine cycling solenoid MCS as described more fully later.

The right hand stem portion of the sorter bin release key SBR terminates above the operating member of a switch SBRS which, as hereinafter described, controls bin release means in the sorter unit.

The right hand stem portion of the correction key COR terminates above the operating member of a switch CORS which, as later described, controls means for reversing computer functions in correction operations.

The above-described function control keys, when released by forward movement of their latching slides 210 and 212 by the bail rod 173, are returned to normal by a restoring spring like that shown at 174 in FIGS. 8 and 9. The bell cranks 440, 460, 482, 498 and 512 and the links 442, 463, 483, 499 and 515 connected therewith are returned to normal upon restoration of the crossfooter and register function control keys which operate them by the restoring springs of the switches operated by said links.

*Function Symbol Type Indexing*

The computing function performed by the A crossfooter in any machine cycle is identified on the master tape by a function symbol for each function other than addition and printed by a crossfooter function symbol type bar which is indexed through a gear train contained in the previously mentioned gear cluster unit by a function symbol differential slide 516 (corresponding to the slide 589 of the Butler patent) having a lug 517 extending leftwardly to cooperate with function symbol selecting stops arranged on rearwardly extending arms of the yokes 445, 453 and 465 and on a yoke 513 (coresponding to the yoke member 1038 of the Butler patent) controlled by the negative total and subtotal control lever 514 (corresponding to the lever 1035 of the Butler patent). Such crossfooter symbol selecting stop shoulders are arranged in essentially the same manner as disclosed in the Butler patent.

The register function symbol selecting stop members are arranged on the corresponding elements of each of the register function control mechanisms for cooperation with the respective one of three leftward lugs 518 on a slide 519 (corresponding to the slide 588 of the Butler patent) for indexing a register function symbol type bar for printing the appropriate symbol for each function other than addition performed by a register operated in any machine cycle. However, as the multiple registers of the present machine are normally in non-add condition instead of in add condition, as is the case for the A crossfooter, the positions of the add stop A and non-add notch NA on the yoke member 490 of each of the three register function control mechanisms have been interchanged relative to the positions of the corresponding notch A and stop shoulders NA on the yoke member 445 for the crossfooter, and the add blank position and the non-add symbol type position on the register function symbol type bar are interchanged relative to the blank position for addition and the non-add type position on the crossfooter function symbol type bar so that the register non-add symbol will be printed in each machine cycle in which all three of the multiple register function control mechanisms remain in normal condition but no register function symbol will be printed in a machine cycle in which an adding operation is performed on the selected register.

*Automatic All Register Total Control Means*

The present master machine unit has, projecting through its case above the upper rear right hand corner of the keyboard, a key lever of an all register total key ART (FIGS. 1 and 28) which, when depressed, initiates a series of 27 successive machine cycles in which totals are automatically taken from each of the 27 registers of the machine in succession.

As shown in FIG. 28, the key lever 520 is pivotally supported at its rearward end on a stud 521 secured in and extending leftwardly from the plate 121 and is urged upwardly to its normal position against a limit stud 522 secured in the plate 121 by a tension spring 523 secured to a stud 524 secured in said key lever and to a stud 525 secured in the plate 121. The stud 524 is eccentrically adjustably secured in the key lever 520 and projects rightwardly into a forwardly and rearwardly slightly elongated slot in the forward end of a lever 526 which at its rear end is also pivotally supported on the stud 521. A forwardly and rearwardly elongated slot in the front end of the lever 526 embraces the rightward end of a stud 527 secured in a lever 528 rockably supported at its lower forward end on a short shaft 530 journaled in the plates 121 and 123, and extending through and beyond both of said plates. The upper rearward portion of the lever 528 carries a stud pivotally supporting a ratchet pawl 531. A tension spring 532, connected at its forward end to a forward arm of the pawl 531 and at its rearward end to the upper rear end of the lever 528, urges the rearward arm of the pawl 531 into engagement with the teeth of a ratchet wheel 533 secured on the shaft 530. The forward arm of the pawl 531 is bent rightwardly and again forwardly and formed with an overthrow stop tooth located above but in alignment with reversely directed teeth of a second ratchet wheel 535 secured on the shaft 530 immediately rightward of the ratchet wheel 533.

A detent lever 537 pivoted on the stud 521 leftward of the key lever 520 is urged clockwise by a tension spring 538 anchored on the stud 525 and carries in its lower rearward end a stud 539 which is pressed against the teeth of the ratchet 535 to yieldingly hold the ratchet wheels, the shaft 530, and other elements mounted on said shaft as hereinafter explained, yieldingly in each of its 28 positions corresponding to the 28 teeth on each of the ratchet wheels 533 and 535. It will be apparent that when the all register total key ART is depressed, it will rock the lever 526 counterclockwise and the lever 528 and pawl 531 clockwise to advance the ratchet wheels 533 and 535 and the shaft 530 from its normal 28th position to the first of its 27 active register total-taking positions.

Secured on the shaft 530 immediately leftward of the plate 123 is a disc 540 having in its periphery a single notch which in the normal 28th position of the shaft 530 receives a stud 541 on the forward arm of a three-armed lever 542 pivotally mounted on a stud 543 secured in the plate 123. The lever 542 also has a rearward arm carrying a stud extending leftwardly under the operating member of a pair of normally open single pole, single throw switches ART1 and ART2, the function of which will be explained more fully hereinafter, both of said switches being closed while the shaft 530 and disc 540 are out of their normal positions. A downward third arm of the lever 542 carries a stud 545 which extends rightwardly through an aperture in the plate 123 and in front of an upward projection 546 on the link 483 so that, as the lever 542 is rocked counterclockwise through its first step of rotation by depression of the key ART, the link 483 is moved rearward to operate the register total switch RTS and the register total and subtotal switch RTST previously described. The switch RTS, as hereinafter explained more fully, indirectly controls the energizing circuit of the master machine cycling solenoid MCS so that when it is operated by the lever 542 and controlled by the disc 540, it causes the machine to perform a series of twenty-seven successive machine cycles.

A lever 550 rockably supported on the shaft 530 leftwardly of the ratchet wheel 533 has a rearward arm connected to a tension spring 551 which is anchored on the stud 525 and urges said arm upwardly and normally maintains it yieldingly engaged against the under-edge of a leftwardly extending lug 553 on the rear portion of the key lever 520. The lever 550 has a second arm 554 extending downwardly and rearwardly under a stud 555 eccentrically adjustably mounted in the end of a forward arm of a bell crank lever 556 which is rockably supported on a shaft 557 replacing the two studs 542 of the Butler patent and journalled in the main side plates on the same centers. The bell crank lever 556 has a second arm extending downwardly behind a stud 558 secured in a cam disc 559 (corresponding to the right hand one of the two cam discs 546 of the Butler patent) secured on the main shaft 135. The stud 558, bell crank 556, and stud 555 also normally block movement of the lever 550 from its normal postion by the spring 551. However, in the initial portion of each machine cycle the stud 558 moves away from the downward arm of the bell crank 556 so that in each of the twenty-seven machine cycles which follow the depression of the key ART the lever 550 is permitted to be rocked first counterclockwise by its spring 551 in the initial portion of the machine cycle, and is again returned clockwise to its normal position in the latter part of the machine cycle as the stud 558 reengages and returns the bell crank 556 to normal position.

The lever 550 has a forward arm carrying a stud pivotally supporting a pawl 560 having a forward arm bent rightwardly and again forwardly and formed with an overthrow stop to be aligned with but normally retracted from the teeth of the ratchet wheel 535 by a tension spring 561 connecting between said forward arm of the pawl and a second stud secured in the last-mentioned arm of the lever 550. The tension spring 561 likewise maintains a ratchet tooth on a rearward arm of the pawl 560 engaged with the ratchet wheel 533. Thus, in the initial portion of each of the 27 machine cycles resulting from depression of the key ART, the pawl 560 ratchets forwardly over one of the teeth of the ratchet wheel 533 as the spring 551 rocks the lever 550 in the initial portion of the machine cycle, and is again moved rearwardly to advance the ratchet wheel 533 with the shaft 530 and other parts secured thereon through one tooth space as the stud 558, bell crank 556, and stud 555 restore the lever 550 in the late portion of the machine cycle.

A fourth arm 563 of the lever 550 extends downwardly behind a stud 564 secured in and extending leftwardly from the plate 121 to prevent overthrow of the lever 550 and overdrive of the ratchet wheel 533 and shaft 530. If at any time the advance movement of the shaft 530 and ratchet wheels 533 and 535 becomes too rapid so that undesired overthrow might result, the rocking of one or the other of the ratchet pawls 531 and 560 by a tooth of the ratchet wheel 533 moving rearwardly under the ratchet tooth on the rear arm of said pawl will rock that pawl sufficiently rapidly to cause it to overthrow and engage the overthrow blocking tooth on its forward arm immediately in front of a reversely formed tooth of the ratchet wheel 535 to arrest the ratchet 535 and shaft 530 and the other parts carried thereby without undesirable overthrow. It will be noted that the lever 550 is stationary as the ratchet wheel 533 is advanced a step by depression of the key ART so that the pawl 560 is effective to prevent overthrow of the shaft 530 at that time. It will also be noted that the lever 528 remains stationary as the ratchet wheel 533 and shaft 530 are advanced by the ratchet pawl 560, so that the ratchet pawl 531 is effective to prevent overthrow of the shaft 530 at those times.

A stud 566 secured in the key lever 520 extends leftwardly in front of a latch arm 567 on the right side of a yoke member pivoted on a stud 568 secured in the plate 121. The yoke member and latch arm 567 are urged counterclockwise by a tension spring 569 anchored on the stud 564 so that as the key ART is depressed and the stud 566 is moved down below a latch shoulder of the latch arm 567, the spring 569 rocks the latch arm into latching position to maintain the key lever 520 in depressed position throughout the 27 all-register total-taking machine cycles. The release of the key lever 520 for return to normal will be described shortly.

Also secured on the shaft 530 are three register selecting control discs 570, 571 and 572 each having a deep notch 575 which in the normal position of the shaft 530 is aligned with the path of rearward movement of a lateral lug 573 on the rearward end of a respective one of the three differential stop slides 270 for the three rows of selection keys SK.

Each of the three discs 570, 571 and 572 is also formed with a further notch, one side of which is formed with a series of nine steps 574, each of said nine steps being located at such a radial distance from the axis of the shaft 530 that, when it is positioned for engagement by the lug 573 on the respective one of the differential stop slides 270, it will arrest rearward movement of that stop slide at the same point at which said stop slide would be arrested by the stem of a respective one of the nine keys SK in its key row. The step 574 farthest from the axis of the shaft 530 is at the same radial distance from the axis of the shaft 530 as the periphery of the unnotched portion of the disc, and is adapted to arrest the differential stop slide 270 at the same point as the foremost key SK in the respective key row, and the step 574 closest to the axis of the shaft 530 is at the same radial distance therefrom as the bottom of the notch 575 and is adapted to arrest the stop slide 270 in position for selection of the 9th register of the respective one of the multiple register units. It is, in fact, the bottom of the notch 575 of the disc 570, 571 or 572 which arrests rearward movement of a stop slide 270 when the rearmost key of its key row is depressed as the stop slides 270 are not provided with stop lugs for cooperation with the rearmost keys SK of their key rows.

Each of the steps 575 has an angular extent of $1/28$ of 360° and the series of steps 574 on each disc 570, 571 and 572 is displaced $9/28$ths of 360° from the series of steps 574 on both of the other two discs. The notch 575 has a width of $1/28$ of 360°. The high step 574 on the disc 570 is located next counterclockwise from the notch 575 in said disc, and the high step 574 on each of the discs 571 and 572 is similarly located next counterclockwise from the low step 574 of the adjacent disc at the right, so that the initial step of clockwise rotation of the shaft 530 by the depression of the key ART places the high step 574 of the disc 570 behind the lug 573 of the differential stop slide 270 for the rightmost row of keys SK and places unnotched portions of the periphery of the discs 571 and 572 behind the lugs 573 of the remaining two stop slides 270. During the next eight steps of rotation of the shaft 530 in the late portions of the first eight of the series of 27 cycles of the machine, the remaining eight steps 574 of the disc 570 are brought successively behind the lug 573 of the stop slide 270 for the rightmost row of keys SK to bring about selection of each of the nine registers of the B multiple register unit in succession in the first nine machine cycles of the series. In the final portion of the ninth cycle an unnotched portion of the periphery of the dics 570 is located behind the lug 573 of the stop slide 270 for the rightmost key row and the high step 574 of the disc 571 is placed behind the lug 573 of the stop slide 270 of the middle row of keys SK. During the next nine machine cycles each of the nine registers of the C multiple register unit is selected for operation. In the final portion of the 18th machine cycle of the series, an unnotched portion of the disc 571 is positioned to limit rearward movement of the middle stop slide 270 and the high step 574 of the disc 572 is placed behind the lug 573 of the leftmost stop slide 270, so that in the remaining nine cycles of the series, each of the nine registers of the D multiple register unit will be selected for operation in succession.

In the final portion of the 27th cycle of the series, the notches 575 of all three discs 570, 571 and 572 are again aligned with the lugs 573 and the notch in the disc 540 is again aligned with the stud 541 and permits the lever 542 to be restored to normal by the return springs in the switches ART1, ART2, RTS and RTST. At the same time a stud 576 in the disc 572 acts upon an upwardly extending lever side arm 577 of the yoke of the latch 567 to rock said yoke to disengage said latch from the stud 566 and permit restoration of the key ART and its key lever 520 by the spring 523. Thus all of the all-register total-taking control parts are restored to normal and the series of automatic total-taking operations is brought to a close following the taking of the total from the 9th register of the D unit.

The key lever 520 has a forward projection 579 which is normally above and just rearward of the bail rod 173 which moves rearwardly at the beginning of each machine cycle and so prevents depression of the key ART between the beginning and the 320° point of the machine cycle when the bail rod 173 returns to normal position. When key ART is in depressed position, the projection 579 is below the path of the bail rod 173.

In taking a single total from a single selected register it is necesary to depress the register total key RT and additionally to depress the selection key SK for the selective register. In that event, not only the register total switch RTS and the register total and subtotal switch RTST, but also the switch SXS for the key row of the depressed selection key SK participates indirectly in the control of the register function control solenoids previously mentioned and in the control of the energizing circuit of the master machine cycling solenoid MCS. Totals taken from the register are also printed by the appropriate tape printer of the multiple printer unit selected under control of the switch SXS and the switch SYS operated by the depressed selection key SK. In the series of all-register total operations initiated by depression of the key ART, no keys SK are depressed and no switch SXS or SYS is operated. It is, therefore, necessary to provide an additional switch means associated with the above described automatic register selecting mechanism control of the circuits of the register selecting magnets SXM1, SXM2 and SXM3 (FIG. 24) to release the slides 305 for control by the stop slides 270 as previously described for selection of the registers and control indexing of the units order designation type bar, to effect control of the circuits of the magnets PM10, PM19 and PM20 (FIGS. 22 and 26) to control indexing of the tens order designation type bar, to effect the necesary control of the register function control mechanisms for the three multiple register units, and to effect selection of the printers of the multiple printer unit.

A switch device for that purpose is shown in FIGS. 28 to 31 and comprises a plate 585 apertured to pass the shaft 530 and having on its right-hand face a plurality of contacts which may be applied thereto by any convenient method such, for example, as a printed circuit technique. Just rightwardly of the plate 585 is a disc 586 of insulating material secured on the shaft 530 and bored to carry five contact plungers 587, 588 and 589 which are pressed yieldingly into engagement with the plate 585 by compression springs located in said bores between the right ends of said contact plunger and a metal plate 590 secured to the right hand face of the disc 586.

During the rotation of the shaft 530, the contact 588 carried by the disc 586 will start from a normal position between the contacts STX1 and STX3 on the plate 585, will bear on the contact STX1 in the first nine cycles of the all-register total-taking series, will bear on the contact STX2 on the plate 585 in the second nine cycles of the series, and on the contact STX3 in the final nine cycles, near the end of the last of which it will again move to the starting position shown in dotted lines in FIG. 29.

Thus each of the contacts STX1, STX2, and STX3 will be electrically connected with the conducting plate 590 during a respective one of the three groups of nine cycles of the 27-cycle series. Also during each of the three groups of nine cycles a respective one of the three contacts 587 in the rotating disk 586 will make conducting engagement with each of the contacts STY of a series of nine such contacts STY1–9 arranged in an arc on the plate 585 and equally spaced within %sths of 360° of the arc. At all times, at least one and sometimes two of the contacts 587 will be in engagement with the arcuate contact 595 on the plate 585. Near the end of the 18th cycle of the all-register total-taking series of operations the contact 589 in the disc 586 will move into engagement with a contact ST19 on the plate 585 and will remain engaged with the latter contact until near the end of the 19th cycle.

The contact 595 serves as a common contact always electrically connected through at least one of the contacts 587 with the plate 590 and all of the remaining contacts 587, 588 and 589 in the disk 586. The three contacts STX1–3 in cooperation with the contact 588 serve during the series of all-register total-taking operations the required functions of the three switches SXS1–3, and the contacts 589 and ST19, which are engaged with each other in the 19th cycle of the series, in which cycle a total is taken from the #19 register, i.e., the #1 register of the D unit, serve the required purposes of the switch S19. As the contacts 588 and 589 are disengaged from all of the contacts STX and STY while the shaft 530 and key ART are in their normal positions, the above-described switch does not interfere in any manner with the other operations performed on the machine.

*Crossfooter Non-Clear Lock*

As previously mentioned, the present master accounting machine is provided with means to sense the numerical positions of the pinions of the A crossfooter and to control a switch for preventing operation of the machine in certain circumstances if the crossfooter pinions are in a zero position. The non-clear sensing means, the switch operated thereby, and the means to operate the sensing means are shown in FIGS. 32 to 36.

The sensing means is supported on a shaft 600 rotatably supported at its ends upon studs 601 (FIGS. 32 and 33) eccentrically adjustably secured in the right and left main frame plates 121 and 122 respectively. The shaft 600 is urged in a counterclockwise direction by a pair of springs 602. Near its ends, the shaft 600 has secured thereto a pair of upwardly extending arms 603 and 604 which are similar except that the right hand arm 603 has at its upper end a rightward and upward extension carrying a stud 605. Both arms 603 and 604 rotatably support the ends of a cross shaft 606 to which are secured, near its ends, two rocker arms 607 which, in turn, rockably support the ends of a pair of sensing blades 608 and 609 in parallel relation above and below the shaft 606. The sensing blades 608 and 609 are thereby supported rearwardly of the position occupied by the axis of the rear line of pinions 610 (the negative total pinions) of the A crossfooter while those pinions are in their normal lowered position. The forwardly directed flanges of the two blades are notched so as at all times to clear the teeth of the pinions 610 and form forward sensing projections 615 which normally bear against the edges of discs 616 on the rightward ends of the hubs of the pinions 610. Each of the discs 616 is formed with a shallow notch 617 which is aligned to receive the sensing projections 615 of the upper sensing blade 608 when the connected pinion is in its zero position or receive the sensing projections 615 of the lower sensing blade 609 if the connected pinion is in its positive 9 position, in which latter position the pinion would stand immediately following a negative total-taking operation.

Rightward extensions of the sensing projections 615 at the rightward ends of both of the blades 608 and 609 are engaged in forwardly opening slots 618 in the arms 603. Each blade is formed with an additional projection at its left end having a leftward extension 619 engaged in a similar slot 620 in the left arm 604 so that the sensing projections 615 will be guided in the desired planes while the rocker arms 607 are permitted to rock a short distance to permit the projections 615 on either blade 608 or 609 to enter the notches 617 while the projections 615 on the remaining blade are stopped by the full periphery of the discs 616.

The extensions 619, which are of irregular shape to provide necessary clearances from certain machine elements, extend still further leftwardly and have their left ends positioned behind the movable spring contact of the switch CNC (FIG. 32) the parts being so proportioned that when the notches 617 of all of the discs 616 are aligned to receive the sensing projections 615 of one or the other of the blades 608 and 609, i.e., when all of the pinions 610 are in their 0 positions or all are in their 9 positions, the extension 619 of that blade 608 or 609 will be far enough forward to hold the contacts of the switch CNC closed, but if sensing projections 615 of both blades 608 and 609 engage the full periphery or peripheries of one or more discs 616, as will be the case when the crossfooter contains an amount other than 000,000,000.00 or 999,999,999.99, the leftward extensions 619 of both sensing blades will be held sufficiently rearwardly to permit the movable contact of the switch CNC to disengage itself from its companion contact.

So that the projections 615 of the sensing blades will not interfere with the pinions 610 or with an aligning bail rod 622 (corresponding to the bail rod 880 of the Butler patent) while the crossfooter pinion frame is moving the pinions either upwardly or downwardly toward or from the amount differential actuators 265, or interfere with rotation of the cross-footer pinions and the discs 616 by the amount differential actuators or by the transfer mechanism following the unmeshing of the pinions from the amount actuators, the timing slide 625 (corresponding to the slide 2887 of the Butler and Runde patent and operated in similar manner by cams on the main drive shaft) is formed at its forward end (FIG. 32) with a lug 626 turned leftwardly in front of the stud 605 on the arm 603. Thus when the slide 625 is moved rearwardly at the beginning of each machine cycle, the lug 626 acts on the stud 605 to pull it rearwardly and retract the projections 615 of the sensing blades from the position of FIGS. 32 and 35 to the rearward position shown in FIG. 34 where a latch shoulder of a latch pawl 627, pivotally supported on shaft 389 (corresponding to the shaft 496 of the Butler patent) and urged counterclockwise by a tension spring 629, drops down in front of the stud 605 to latch the sensing blades 608 and 609 in the retracted position throughout substantially all of the remainder of the machine cycle, when, at the very end of the machine cycle the slide 625 is unlatched, as in the Butler and Runde patent, for being moved forwardly to its normal position by its return spring 630, a stud 631, which has been added to the slide 625 engages a rightwardly turned inclined lug 632 on the latch pawl 627 and elevates the forward end of said latch pawl to release the stud 605, whereupon the spring 602 pulls the sensing blades forwardly again to engage their sensing projections 615 with the discs 616 before a succeeding machine cycle can be initiated. It may be noted that, as in the machine of the Butler patent, there is a short pause between successive machine cycles which results from disengagement of the machine cycling clutch at the end of each machine cycle even when the machine is already conditioned to initiative another machine cycle.

*Printing*

In the master machine there are nineteen vertically indexable type bars 266 (FIG. 37) including, from right to left, a register function symbol type bar, two selection key and register designating type bars, a crossfooter function symbol type bar, eleven amount type bars, and four date printing type bars, the year number type bar of which also carries certain commercial designation character types, for printing on a fanfolded or roll paper strip 110 passing about a platen roller 650. As previously mentioned, the present machine is not provided with the traveling paper carriage of the Butler patent. Instead, the platen roller 650 (FIGS. 37, 41, 44–47) is carried on a shaft 651 journaled in a pair of right and left side plates 652 and 653 supported on the frame cross members 130 and 654 (the latter replacing the front carriage race member 43 of the Butler patent and being mounted on the frame side plates in the same manner).

The plates 652 and 653 are secured in laterally spaced relation by a plurality of cross rods 655 and 656 (FIGS. 41 and 44). A transverse trough-like sheet metal member 660 is formed with a plurality of lugs 661 on its front, bottom and rear wall portions which enter into slots in the plates 652 and 653 and forms, in cooperation with said plates 652 and 653, a lower paper supply bin adapted to hold a supply of fan-folded paper strip 110. Another sheet metal member 662, forming the bottom and rear walls of a printed tape receiving bin, is formed near the front and rear edges of its bottom wall portion with vertically bent ears supported on the cross rod 656 and one of the cross rods 655. A third sheet metal member 665 is formed at the lower ends of its side edges with rearwardly bent ears rockably supported on the cross rod 656. The member 665 is urged to the position of FIG. 41 by a torsion spring 666 (FIG. 44) wound about the cross rod 656. It serves as a front wall for the printed tape receiving bin and, when rolled paper tape is used, it serves as a paper supply roll brake by bearing resiliently against the periphery of the paper supply roll 667 (FIG. 44) carried on a spool supported on a rod 668 removably securable in the side plates 652 and 653.

From the supply roll or from the fanfolded supply in the lower supply bin the paper strip 110 passes between the bottom of the platen roller 650 and a fixed paper shield formed of a sheet metal member 670 having on its end edges lugs entering into slots in the plates 652 and 653. The shield 670 is apertured to accommodate two lines of pressure rollers 671 rotatable on rods supported in front and rear arms of a pair of levers 672 (FIGS. 41 and 44) which are rockably supported on a shaft 673 having half round ends (FIG. 47) located in square openings 674 in the plates 652 and 653 so that when the flatted portions of the shaft ends are parallel to the upper sides of the square openings 674, the shaft is elevated sufficiently by tension springs 675 connected to their end portions and to the stud in the plates 652 and 653 so as to yieldingly press the rollers 671 against the paper strip passing about the platen roller. Upon rocking the shaft 673 by means of a finger lever 676 secured to its left end portion, the shaft 673 is forced downwardly by the camming action of its flatted ends in the squared openings in the plates 652 and 653 to retract the two lines of rollers 671 from the platen.

From the platen roller the paper strip 110 passes upwardly and rearwardly over a flat metal plate 678 supported at its side edges on the upper edges of the plates 652 and 653 and serving as an autographic table. Rearwardly of the table 678 paper passes over and downwardly behind a feed roller 680 secured to a shaft 681 journaled in the plates 652 and 653. On its left end, leftwardly of the plate 653, the shaft 681 has secured to it a small toothed belt pulley 682 around which passes a toothed belt 683 of the kind commonly known as timing belts. The belt 683 also passes around a larger toothed pulley 684 secured on the leftward end of the platen roller shaft 651, the diameters of the pulleys 682 and 684 being so related to the diameters of the platen roller and of the feed roller 680 as to maintain the paper strip always taut on the face of the table 678 without, however, applying excessive tension. The paper strip is maintained in feeding frictional engagement with the feed roller 680 by a line of pressure rollers 687 carried on a rod 688 supported at its ends in the side arms of a bail member 689, said side arms being pivotally mounted on studs 690 secured in the plates 652 and 653. Tension springs 691 (FIGS. 45 and 46) urge the bail 689 counterclockwise to yieldingly press the roller 687 against the paper strip on the upper rear side of the feed roller 680. The bail member 689 is formed with a finger piece 692 by which the rollers 687 may be retracted from the feed roller 680 for threading the paper strip therethrough.

A line spacing ratchet wheel 695 is secured to the platen shaft 651 a little rightwardly of the plate 652, and is engageable by the toothed upper rear end of a line spacing pawl 696 which is pivotally carried at its lower forward end on an arm 697 secured on the shaft 557 which is rocked clockwise prior to the time of printing and returned counterclockwise after the time of printing in each machine cycle by two levers 698 (one of which is shown in FIG. 28, and which correspond to the levers 541 of the Butler patent), which are secured to said shaft and oscillated by cams, one of which is shown at 559 in FIG. 28, secured on the main shaft 135. The pawl 696 is urged toward engagement with the ratchet wheel 695 by a tension spring 699, but is disengaged therefrom near the forward end of its feed stroke by a roller 700 carried by a stud secured in a bracket 701 supporting the shaft 557 and secured on the frame cross member 702 (corresponding to the cross member 42 of the Butler patent).

An arcuate shield flange 705 which extends over a small segment of the periphery of the ratchet wheel 695 is formed on a disk 706 which is rotatably supported on the platen shaft 651 between the plate 652 and the ratchet wheel 695. By means of finger piece 707 secured on a projection of the disk 706, the shield 705 may be moved to either of two positions of adjustment in either of which it is yieldingly held by a detent roller 708 cooperating with a pair of notches in the edge of the disk 706 and carried by the forward arm of a detent bell crank 709 pivotally mounted on a stud 710 secured in the plate 652 and having a downward arm connected to a tension spring like that shown at 711 in FIG. 45. The shield 705, depending upon its position of adjustment, disengages the pawl 696 from the ratchet wheel 695 throughout a greater or lesser portion of its reciprocation to variably control the extent of line spacing drive of the platen roller in each reciprocation of the pawl. The platen roller is yieldingly retained in each line-spaced position by a detent roller 715 pressing against the teeth of the ratchet 695 and carried by the forward arm of a bell crank lever 716 pivoted on the stud 710 and urged counterclockwise by the tension spring 711.

The entire paper feed and platen frame unit supporting the platen may be adjusted forwardly and rearwardly for accurately positioning the platen relative to the printing types to obtain uniform type impressions of the desired intensity and the platen axis may be raised and lowered to adjust the printing line on the platen to the proper level height relative to the type bars. For this purpose, each of the screws 720 (FIG. 42) by which the cross bar 654 is secured to the mounting blocks 721 (corresponding to the blocks 1064 of the Butler patent) passes through a somewhat larger bore in a hexagonally flanged bushing 722 which is threaded into an end portion of the bar 654 so that after rotating the bushings 722 to raise or lower the printing line on the platen to the desired height at each end, the screws 720 may be tightened to secure the bushings 722, bar 654 and the platen axis in the desired positions. Each end of the bar 654 is formed with an outwardly open horizontal slot which receives the reduced neck of an adjusting screw 723 between the head thereof and a shoulder flange 724, said screw being threaded into the block 725 (corresponding to the block 1067 of the Butler patent) secured to the inner side of the respective side plate 121 or 122. After rotation of the screw 723 to shift the respective end of the bar 654 forwardly or rearwardly to the desired position while the screws securing the plates 652 and 653 to the cross member 130 are loose, the parts may be locked in adjusted position by a set screw 726 threaded through the block 725 to engage the screw 723, after which the screws securing the plates 652 and 653 to the member 130 may be tightened.

Forwardly of and adjacent each end of the platen is a chute member 729 having front and rear walls with forwardly and rearwardly flaring upper portions converging downwardly to closely parallel lower portions which extend downwardly between two passes of an ink ribbon 730 extending parallel to the printing line of the platen between the platen and the type bars so that certain documents may be inserted into said chute to receive a ribbon inked impression of the same amount, total, or other data printed on the tape 110 in certain machine cycles. The two ribbon spools 731 and 732 are mounted on the square upper ends of front and rear ribbon spool shafts 733 and 734 (FIG. 38), each having secured to the lower end thereof a ribbon feed ratchet wheel 735 or 736 (FIG. 37).

The front ribbon spool shaft and its ratchet wheel 735 is rotatably mounted on the upper end of the left hand one of two ribbon lift rods 737 and 738 which are raised and lowered by means like that shown in the Butler patent and including the arms 739 (corresponding to the arm 720 in the Butler patent). A bushing (not shown) secured in the forward portion of a plate 740 is pinned to the left ribbon lift rod 738 so that the plate 740 is raised prior to the time of printing and lowered after the time of printing, by the ribbon lift rod 738.

The plate 740 is guided against lateral oscillation in its upward and downward movement by means of a stud 742 extending through a slidably fitting aperture in the plate 740 and secured at its lower end in a plate 743 which is secured at its rear end to the cross member 702 and at its front end to a cross member 744 (corresponding to the cross member 41 of the Butler patent). The rearward portion of the plate 740 carries an upright fixed shaft 741 on which the rear ribbon spool shaft 734 and its ratchet wheel 736 are rotatably mounted. The plate 743 is also formed with a downwardly and rearwardly extending portion 754 having rightward flanges guiding the left ribbon lift rod 738.

From the rear ribbon spool 732 the ribbon extends around the front of an idler guide roller 745 rotatably supported on a stud secured in the plate 740 across the front of and in guided relation to a guide post 746 secured in the plate 740 at the rear of the left hand chute member 729 across the face of the platen, past and in guided relation to a ribbon guide post 747 behind the right hand chute member 729 and secured in a plate 748, thence around a roller 749 rotatably carried on a post 750 secured in the plate 748, and thence along the front side of the right hand chute member 729 and behind another guide post 751 also secured in the plate 748. From the post 751 the ribbon passes across the rear of the type bars parallel to the rear stretch of ribbon 730, past another guide post 752 forwardly of the left hand chute member 729 and carried by the plate 740, thence around another idler guide roller 753 carried on a post secured in the plate 740 and finally to the front ribbon spool 731.

The plate 748 is secured to the upper end of the right ribbon lift rod 737 and is guided in its up-and-down movement with said left rod 737 by a stud 755 secured in said plate and extending slidably through an aperture in the right hand side plate 756 of the printing hammer unit (corresponding to the right hand plate 607 of the Butler patent) supported on the frame cross members 702 and 744, so that the right hand ribbon guide members 747, 749 and 751 carried by the plate 748 are raised and lowered in unison with the left hand ribbon guide members on the plate 740. The right hand chute member 729 is stationarily supported on the upper end of a stud 757 secured on the cross member 702 and the left hand chute member 729 is stationarily carried by a stud 758 secured in the plate 743 and extending upwardly through an aperture in the plate 740. Thus the chute members 729 remain stationary as the two passes of ribbon are lifted and lowered in front of and behind the document inserted in the chute.

The ribbon feed mechanism is operated in each cycle of operation of the machine by means of a link 765 (FIGS. 37 and 38) pivotally connected at its rear end to an upward arm of the left hand one of the two levers 698, previously mentioned, which is oscillated clockwise before printing and counterclockwise after printing in each machine cycle. The forward end of link 765 is connected with the leftward arm of a lever 767 rockably mounted on a vertical stud 768 secured in the plate 743. A rightward arm of the lever 767 has a stud and slot connection with a rightward projection of a slide 770 which is forwardly and rearwardly slidably mounted on a stud 771 extending upwardly from the plate 743. The rearward portion of the slide 770 is urged rightwardly by a tension spring 772 to maintain one or the other of two notches formed in the rear portion of the right edge of said slide 770 in engagement with a stud 773 secured in a second slide 775 forwardly and rearwardly slidably mounted beneath the slide 770 on the stud 771 and a rearward second stud 776 secured in a bracket 777 secured on the plate 743. The slide 775 is formed at its forward and rearward ends (FIGS. 40 and 39 respectively) with outwardly open slots embracing rollers 780 upwardly and downwardly slidably as well as rotatably mounted on studs 781 secured in and extending downwardly from front and rear feed pawl actuator levers 782 and 783 respectively.

The forward ribbon feed pawl actuator lever 782 is rotatably mounted on the bushing secured in the plate 740 and surrounding the left ribbon lift rod 738. It carries a stud 787 projecting downwardly through a short arcuate slot in another lever 784 likewise rotatably mounted on said bushing and having a downwardly projecting stud 785 secured in it rearwardly of the stud 787 and connected to the latter through a short tension spring 786. The front ribbon feed pawl 789 is pivoted on a stud 790 extending upwardly from the lever 784 and is urged counterclockwise toward engagement with its toothed end with the ratchet wheel 735 by means of a tension spring 791 connected between said pawl and another stud 792 secured in said lever 784. The toothed end of the feed pawl 789 carries a headed stud 793 engageable against one or the other of two edge portions 794 and 795 of the plate 740, formed arcuately but with different radii about the axis of the ribbon lift rod 738, the radius of the edge portion 794 being sufficiently large to hold the toothed end of the pawl disengaged from the ratchet wheel 735, and the radius of the edge portion 795 being small enough to permit operative engagement of the toothed end of the pawl 789 with the ratchet wheel 735.

The rear ribbon feed pawl 800 is pivotally mounted on a stud 801 adjustably secured in the rightward arm of the lever 783 which is rotatably mounted on the lower portion of the rear ribbon spool shaft 741 below the plate 740. A tension spring 802 connected between the pawl 800 and a stud 803 also secured in the lever 783 urges the toothed arm of the pawl 800 against the rear ribbon feed ratchet 736. A shield can finger 804 secured on the upper side of the plate 740 controls the operative engagement of the toothed arm of the pawl 800 with the rear ribbon feed ratchet wheel 736. The parts are so proportioned that only one or the other of the ribbon feed pawls 789 or 800 may operatively cooperate with the respective ratchet wheel 735 or 736 at any time, depending upon which of the notches in the rightward edge of the slide 770 engages the stud 773 in the slide 775. Each pawl 789 and 800, when it does operatively cooperate with its respective ribbon feed ratchet wheel, drives the associated ribbon spool in the winding direction.

A pair of ribbon feed reversing pawls 807 and 808 (FIGS. 37 and 38) are pivotally mounted next to the under side of the plate 740 on studs 809 and 810 secured in said plate. Each pawl is formed with an arm extending upwardly past the edge of the plate 740 and having a rightwardly extending finger 811 bent toward the ribbon spool and constantly held yieldingly engaged against the supply of ribbon on the spool by a tension spring 812 connected between a stud on the pawl and a stud in the plate 740. When the supply of ribbon on the unwinding spool is depleted to a predetermined extent, the rightward end of the pawl 807 or 808, as the case may be, moves into the path of a shoulder 813 or 814 on the lever 784 or 783 to block oscillation thereof, so that continuing movement of the slide 775 shifts the stud 773 thereon from one to the other of the notches in the slide 770 to render the previously active feed ribbon pawl 789 or 800 inactive, and the previously inactive pawl active, to thereby reverse the direction of ribbon feed.

The printing hammer mechanism (not illustrated) includes nineteen printing hammers, one for each of the nineteen vertically indexable type bars, and is of substantially the same construction as that disclosed in the Butler patent except for the omission of the carriage controlled selective hammer block mechanism disclosed in the patent.

In addition to the above-mentioned nineteen vertically indexable type bars, the printing mechanism of the present machine includes a consecutive number printing device (FIGS. 37 and 49) of the type wheel counter kind, having six axially aligned type wheels 820 mounted coaxially leftward of the vertically indexable type bars in a frame 821 having a downward left side arm 822 pivotally supported on a shaft 823 journaled at its right end in the plate 756 and, at its left end, in a plate 824 mounted on the cross members 702 and 744. The number type wheels 820 are urged rearwardly toward the printing line on the platen by a tension spring 825 connected between a lug on the frame 821 and a stud 826 mounted in the bar 654. Below the shaft 823 the arm 822 carries a leftwardly extending square stud 828 normally engaged by a latch shoulder on a rearward arm of a latch pawl 830 pivotally mounted on a stud 831 extending rightwardly from the plate 824.

The latch pawl 830 is urged counterclockwise toward latching position relative to the stud 828 by a tension spring 832 connected between a stud 833 in an upward arm of the pawl 830 and a stud secured in the plate 824. The latch pawl 830, when engaged with the stud 828, holds the number type wheels 820 retracted sufficiently, about ¼ of an inch for example, so that when the pawl 830 is rocked to disengage it from the stud 828 the spring 825 will impel the type wheels 820 against the platen with sufficient force to effect a printing impression of the desired intensity from types on said wheels. The latch pawl 830 has a finger 835 extending forwardly above a stud 836 carried in the lower forward end of an arm 837 secured on the shaft 823 and urged counterclockwise by a tension spring 838 which thus also urges the shaft 823 counterclockwise. Near its rightward end the shaft 823 has secured thereon an upwardly and forwardly extending arm 840 having in its upper forward end a stud pivotally supporting a pawl 841 which is urged counterclockwise by a tension spring 842 connected between a stud in a downward arm of said pawl and a stud secured in the arm 840.

In the normal position of the shaft 823, shown in FIG.

49, a forward arm of the pawl 841 is normally engaged on the upper edge of the normally released armature 844 of an electromagnet DCM supported on a rightwardly bent arm of the plate 824. While the pawl 841 is thus held in a clockwise position by the armature 844, the lower end of its downward arm is positioned forwardly out of the path of a shouldered forward finger of a lever 846 freely rockably mounted at its upper end on the shaft 823 and urged counterclockwise by a tension spring 847 to a normal position in which a rearward stop projection 850 on said lever engages against the forward side of the cross bar 702. In such position of the lever 846, its lower end, extending downwardly in front of and past the main shaft 135, is in the path of a stud 848 carried by and extending leftwardly from a cam disc 849 (corresponding to the cam disc 507 of the Butler patent) secured on the shaft 135, so that in each cycle of operation of the machine the stud 848 engages the lower end of the lever 846 moving it forwardly and again permitting it to return rearwardly to normal position. Duing such movement of the lever 846 in any machine cycle in which the electromagnet DCM is not energized, the shouldered forward finger 845 of the lever 846 misses the end of the lower arm of the pawl 841 and passes upwardly behind it.

When the electromagnet DCM is energized, as hereinafter explained, and pulls up its armature 844, the pawl 841 is released to the action of its spring 842 which positions the end of its downward arm in the path of the finger 845 so that in the course of that machine cycle the finger 845 engages the pawl 841 to rock the arm 840 and shaft 823 clockwise. In such clockwise movement of the shaft 823 the stud 836 on the arm 837 acts on the forward finger 835 and pawl 830 to disengage the rearward shouldered arm of the pawl 830 from the stud 828 to permit the type wheels 820 to be struck against the platen by the spring 825.

A stud 852 extends rightwardly from a second rearward arm of the pawl 830 above a forward and downward arm of a small lever 853 pivotally mounted intermediate its ends on a stud 854 secured in the lower portion of the arm 822. A tension spring 855 connected between the upper arm of the lever 853 and a stud secured in the arm 822 urges the lever 853 clockwise to a normal position where said upper arm limits against the bushing 819. In that position of the lever 853 the rear edge of its upper arm engages against a stud 856 carried in a pawl 857 also pivotally mounted on the stud 854 and urged counterclockwise by a tension spring 858. Normally, the lever 853 holds the pawl 857 in a clockwise position such that the hooked end of its lower arm is retracted forwardly from a forward finger of a lever 859 pivotally supported at its upper end on a stud 860 secured in the arm 822 and urged clockwise by a tension spring 861. The lever 859 extends downwardly behind the shaft 135 into the path of the stud 848. While the latch pawl 830 remains in its normal position in latching engagement with the stud 828, the lever 859 may be rocked rearwardly by the stud 848 in the latter part of the machine cycle without moving the arm 822 or type wheels 820.

When the latch pawl 830 is moved to releasing position to cause a printing impression from the type wheels 820, its stud 852 rocks the lever 853 counterclockwise to permit the pawl 857 to be rocked counterclockwise by its spring 858 to position its hooked lower end under the forward finger of the lever 859, thereby latching the lever 859 to the arm 822 so that when the stud 848 moves the lever 859 rearwardly later in the same machine cycle, it will also rock the arm 822 counterclockwise past normal position after the lever 846, shaft 823, arm 837 and stud 836 have been returned to normal position by the springs 847 and 838 so that upon disengagement of the stud 848 from the lever 859 the stud 828 and arm 822 will be relatched in normal position by the latch pawl 830.

A stud 865 extending leftwardly through a slot in the frame 821 into a notch in the plate 824 and carried by a counter advancing lever within the consecutive number printer is actuated by the oscillation of the frame 821 and number printer, and advances the lowest order number type wheel 820 thereof by one unit during the forward movement of the frame 821 following a number printing operation.

Operation Counters

The means for operating the two operation counters 160 and 161 in the upper left corner of the keyboard of the master machine is shown in FIG. 50. A link 870, which is pivotally connected to a crank stud in the operating arm 871 of the counter 160 and has a projection 872 extending upwardly behind a stud in the operating crank arm 873 of the counter 161 is supported at its rearward end by a stud 874 extending through a forwardly and rearwardly elongated slot in said link 870 and secured in a lever 875 rockably supported on the fixed shaft 321 immediately leftwardly of the left hand one of the pair of actuator cranks 320 of the register selecting mechanism. Internal springs (not shown) of the counters 160 and 161 urge their operating cranks 871 and 873 counterclockwise (clockwise in FIG. 50) to urge the link 870 rearwardly and maintain the front end of its slot in contact with the stud 874. A forward arm of the lever 875 is held downwardly in contact with a stud 876 in the forward arm of the lever 320 by a tension spring 877 of sufficient strength to overcome the previously mentioned internal springs of both counters 160 and 161.

An electromagnet SCM, the frame of which is supported on studs 880 extending leftwardly from the plate 122, has an armature 881 which is normally in released position with its upper free end portion positioned rearwardly behind a rightwardly turned lug 882 on the rear end of the link 870.

Early in each machine cycle, as the lever 320 is rocked clockwise (counterclockwise in FIG. 50) the stud 874 is swung rearwardly. If the electromagnet SCM is not energized and its armature 881 remains in normal released position behind the lug 882, the counters 160 and 161 are not advanced. If, however, the electromagnet SCM is energized, it pulls its armature 881 rightwardly out of the path of the lug 882 so that the link 870 is free to be moved rearwardly with the stud 874 by the internal springs of the counters. Later in the cycle, as the levers 320 return to normal, the spring 877 yieldingly drives the stud 874 and link 870 forwardly again to normal position, thereby advancing both counters 160 and 161.

Though the counter 161 is provided with a resetting finger wheel 162 so that it may be set to zero whenever desired, as at the beginning of a work period or beginning of a sorting run, the counter 160 is not provided with any resetting means and thus always indicates a continuously running count.

Control of the energizing circuit of the magnet SCM will be described later.

Data Read-Out

In order that the various printers of the multiple tape printer unit may be controlled, as hereinafter described, to print on appropriate ones of the twenty seven tapes the amounts of items, such as amounts of checks, and register totals printed on the master tape 110, the present master machine is provided with a read-out means which senses the positions to which the amount differential actuator racks 265 and the register function symbol selecting differential actuator slide 519 (FIG. 26) of the master machine are advanced in each machine cycle, and translates the sensed value or symbol representing position of said actuator rack or slide into a four-place binary code represented by the settings of switches adapted to control circuits extending through a cable to the multiple tape printing unit.

The rearward end of each amount differential actuator rack 265 (FIG. 51) and the rearward end of the register function symbol selecting differential slide 519 (FIG. 26) carries a stud 890 engaged in a downwardly open notch in the front end of a read-out coding slide 891 forwardly and rearwardly slidably guided in slots cut in the top and bottom portions of a pair of flattened guide rods 892 and 893 extending through forwardly and rearwardly elongated slots in the slides 891 and removably supported in the side plates 127 and 128 of the read-out section to which they are releasably locked by key plates 894 removably attached to the plates 127 and 128 by screws and notched to engage the front and rear flat sides of the rods 892 and 893 to hold the latter against rotation. The slides 891 are thus, in each machine cycle, moved to the same amount differential or symbol selecting positions to which the amount differential actuators 265 or register symbol selecting differential slide 519 to which they are respectively connected are advanced, and are again returned to normal positions with said amount differential actuators and register symbol selecting slide. Each slide 891 carries on its upper edge a coding plate 896 (FIGS. 52 and 53) formed on its upper face with a number of upward projections 897 arranged in a pattern which will be explained later.

Above the coding plates 897 is a read-out sensing switch unit RO (FIGS. 2 and 51), the supporting plate 900 (FIGS. 2, 26, 51 and 55) of which is carried by the rearward arms of a pair of bell crank levers 901 pivotally supported on a shaft 902 supported in the plates 127 and 128. Each bell crank 901 carries in its forward and upward arms a pair of roller studs 903 and 904 engaging the edges of the two cams 905 and 906 of a respective one of two pairs of such cams secured on a shaft 910 journaled in the plates 127 and 128.

Secured on the rightward portion of the shaft 910 is a bevel pinion 911 meshing with a bevel pinion 912 secured on the rearward end of a shaft 913 journaled in the cross member 130 and in a bracket 914 secured to the frame plate 121. On the forward end of the shaft 913 is another bevel pinion 915 meshing with a bevel pinion 916 secured to a gear 917 rotatably mounted on a stud secured in a forward extension of the bracket 914. The gear 917 meshes with a driving gear (not shown, but corresponding to the gear 1503 of the Butler patent) mounted on the main cycling shaft 135. The gear ratios are 1 to 1 so that the shaft 910 is driven in synchronism with the shaft 135 through one revolution in each master machine cycle.

A detent roller 920 (FIG. 26) is carried by a lever 921 pivotally mounted on a bracket 922 secured to the cross member 130, said roller being spring-urged into engagement with the periphery of a detent disc 923 secured to the shaft 910 and formed with a V notch positioned to cooperate with said roller to accurately position the shaft 910 in normal position between machine cycles.

The two pairs of cams 905 and 906 are shaped so as normally to maintain the sensing switch supporting plate 900 in elevated position and to lower the plate 900 to cause the switches of the sensing switch assembly carried thereby to be set by the projections 897 of the coding plates 896 after the amount differential slides 265, the register function symbol selection slide 519, and the connected slides 891 have been moved forward to differential positions, and to again elevate the plate 900 and sensing switch assembly thereon to normal position prior to the rearward movement of the differential amount actuator 265 and register symbol differential slid 519 toward normal position.

The sensing switch assembly carried by the plate 900 comprises eleven multiple switch units RO1 to RO10 and ROS, one for each of the eleven coding plates 896. Each of the said multiple switch units RO comprises four single-pole, double-throw toggle switches as illustrated in FIGS. 55, 56 and 57. Each individual switch comprises a two-armed switch blade 931 carrying a pair of contacts 932 and rockably engaged with the head of a post 933 between a pair of projections 934 on the head thereof. The post 933 extends through the insulating housing 935 of the switch unit and is connected at its upper outer end with an individual connecting lug 936. One or the other of the contacts 932 of the rockable switch blade 931 is normally held engaged with the respective one of a pair of contacts 937, each provided on the lower end of a post 938 extending through the wall of the insulating housing 935. The posts 938, in each of the two rows of four, are connected to the respective one of two connecting strips 939 located in grooves on the outer side of the housing 935. Each rockable contact blade 931 is engaged on its lower side, on one side or the other of the projections 934, by a spring-pressed plunger 940 carried in a toggle lever 941 formed of insulating material and pivoted on a shaft 942 supported at its ends in the walls of the housing 935. Each individual switch, comprising a rocker blade 931, a pair of contacts 937 and toggle lever 941 is enclosed separately in an individual cell in the housing 935 and separated from adjacent switch cells by intermediate insulating walls (not shown). Two lateral arms of the toggle lever 941 are engaged by respective ones of a pair of reciprocal plungers 943 slidable upwardly and downwardly through passages in the supporting plate 900.

Each multiple switch unit housing 935 is of diamond-shaped horizontal section and is mounted on the supporting plate 900 with its two rows of switch operating plungers 943 arranged diagonally relatively to the paths of the projections 897 on the coding plate of the corresponding slide 891 and with its front and rear surfaces parallel to the front and rear edges of the plate 900 and its side surfaces abutting the side surfaces of adjacent switch unit housings 935. The eleven switch unit housings 935 are secured to the plate 900 by spring clip bands 946 (FIG. 26) extending over the housings 935 and downwardly at the front and rear thereof and engaging under the forward and rear edges of the plate 900. An insulating spacing block 947 is placed in line between the multiple switch unit ROS for the coding plate 896 connected with the register symbol differential slide 519 and the switch unit RO1 for the coding plate connected with the lowest order amount differential actuator and is similarly secured to the plate 900.

It will be apparent that when the plate 900 is lowered after the coding plates 896 have been moved forwardly to differential positions with the differential actuators 265 and slide 519, one or the other of each of the four pairs of switch operating plungers 543 in each switch unit ROS and RO1 to RO10 will be engaged by a projection 897 on the coding plate 896 to operate the respective one of the four rockable switch blades 931 of each of the four switches to one or the other of its two positions and close the circuit from the connecting lug 936 to that switch blade to one or the other of the two connecting strips 939.

In the present machine, the projections 897 have been arranged in the pattern illustrated in FIGS. 52 and 53 so that for the normal 0 position and for each of the advanced positions from 1 to 9 of a slide 891, the four switches of the corresponding multiple switch unit will be operated according to the plan or code diagrammed in the chart of FIG. 54 wherein the four switches in the multiple switch unit are assigned the values 1, 2, 4 and 8 respectively from front to rear, said values being indicated in FIG. 54 at the tops of the respective ones of four columns, and wherein the occurrence of an X in the column indicates that the respective switch is operated to connect its rockable switch blade 931 with the contact 937 connected with the leftward connecting strip 939. It may be noted that, except for the 0 position, the sums of the values of the switches which are operated to connect their switch blades 931 with the leftward one of the pair of contact strips 939 will equal the sum of 3 plus the number of steps which the slide 891 has advanced forwardly of its normal rearward zero position, and it may further be noted that, if desired, a slight change in the arrangement of the projections 897 on the code plates to correspond to the insertion of X's in the 0 line in the 1 and 2 columns of the chart of FIG. 54 will so constitute the code that the 9— complement of any of the ten values from 0 to 9 will be represented by operation of each of the four switches to its opposite position, which would permit of transmitting either the actual numerical value of the advanced differential position of each slide 891 or the 9— complement of that value with the aid of a single-pole, double-throw switch to connect either of the pair of connecting strips 939 to the means to be controlled thereby.

The read-out means also comprises a switch housing 950 (FIGS. 26 and 58) of insulating material secured on the rear side of the frame back plate 129 and supporting a series of eight switches ZE3 to ZE10 comprising a horizontal row of eight contacts 951 (FIG. 58) and a series of eight vertical spring contact levers 952 secured at their lower ends to the housing 950 and each having intermediate its ends a pair of laterally projecting contact arms which is normally held in bridging contact with two adjacent contacts 951 by a rearward projection 953 of a respective one of eight slides 891 for the dollars and higher orders engaging a button 954 formed of insulating material and secured on the upper end of each lever 952. It will be apparent, however, that the contact lever 952 for the dollars order is engageable with only the rightmost one of the contacts 951. Though the projections 953 of the dollars and higher order slides 891, while in their normal zero positions, hold the contact levers 952 engaged with the contacts 951, the latter, by their own spring action, disengage themselves from the contacts 951 as soon as the respective slides 891 move forwardly to or beyond their one positions. The switches ZE3 to ZE10 in the housing 950 are utilized in the manner hereinafter described to eliminate printing of unnecessary zeros to the left of amounts in the multiple tape printing unit.

*Cam Operated Timing Switches*

Leftwardly of the plate 128 is a series of eight cam discs 961 to 968 (FIGS. 26 and 59) secured on the leftwardly projecting end of the shaft 910 for rotation rigidly therewith. The cam edge of each of the cam discs is engaged by a roller 969 carried by an operating spring lever of a respective one of eight switches TS1 to TS8 (FIG. 59) secured on one or the other of two angle brackets 970 and 971 secured to and extending leftwardly from the plate 128, some of said switches having a single pair of either normally open or normally closed contacts and others having two pairs of either normally open or normally closed contacts as indicated in FIG. 59, in which a single illustration serves for both of the cams 963 and 965 and the switches TS3 and TS5 which are of identical form.

MULTIPLE TAPE PRINTING UNIT

FIGS. 60 to 77 illustrate the structure of the multiple tape printing unit 103 of FIG. 1.

*Frame*

The main frame of the multiple tape printing unit comprises two vertical, right and left side plates 1001 and 1002 held in laterally spaced relation by a plurality of cross members including the members 1003 shown in FIGS. 60 and 61B and the members 1096, 1097, 1126 and 1312 which will be referred to more particularly hereinafter. Each of the side plates 1001 and 1002 is secured at its lower edge to cushioned feet 1015, two of which are shown in FIG. 61A, mounted on a base member 1016.

*Power Drive*

The power drive for various elements and mechanisms of the multiple tape printing unit comprises an electric motor TPM (FIGS. 61A and 63) mounted on the outer side of the right side plate 1001. The motor shaft is connected through an overload slip coupling 1021 (FIG. 63) and a flexible coupling 1022 to a shaft 1023 (FIGS. 63, 64 and 65) journaled in anti-friction bearings in a clutch housing 1024 secured against the outer side of the plate 1001. The shaft 1023 is formed with a worm 1025 (FIG. 64) meshing with a worm wheel 1026 secured to a toothed driving disc 1027 of the clutch and freely rotatably mounted on the clutch driven shaft 1028. An arm 1030 secured on the shaft 1028 outwardly of the toothed clutch disc 1027 rotatably carries in its outer end portion a clutch stud 1031 having a half round inner end portion extending over the outer periphery of the clutch disc 1027 with its flat side turned toward and slightly spaced from the toothed disc 1027. The outer head portion 1032 of the clutch stud is formed with teeth meshing with a toothed portion of one end of a clutch control lever 1035 rotatably mounted on the shaft 1028 outwardly of the arm 1030 and urged clockwise relative to the latter by a tension spring 1036 connected between the arm 1030 and lever 1035.

A projection on one end of the clutch control lever 1035 is normally engaged by the half round end of a control stud 1037 rotatably mounted in the clutch housing 1024 to hold the lever 1035 in such angular position relative to the arm 1030 while the shaft 1028 is held against reverse rotation by means mentioned later, that the stud 1031 is held with its flat surface facing and clear of the toothed periphery of the disc 1027. Upon rotation of the control stud 1037 clockwise to permit the spring 1036 to pull the end of the lever 1035 past the flatted portion of the stud 1037, the toothed end of the lever 1035, being moved clockwise relative to the arm 1030 by the spring 1036, rotates the stud 1031 counterclockwise to engage its half round end in a tooth-space of the driving disc 1027 to thereby couple the arm 1030 and shaft 1028 to the disc 1027 and the motor. As the shaft 1028 and arm 1030 are driven clockwise, a projection 1038 on the head of the clutch stud 1031 moves from the open portion of a C-shaped member 1039 secured to the inner side of the clutch housing cover member 1040 (FIG. 63) to engage the inner edge of said C-shaped member 1039 to prevent the clutch stud 1031 from being rotated again to disengaging position during any portion of the machine cycle in which the machine and the shaft 1028 may tend to run ahead of the drive motor.

Very close to the end of a complete revolution of the shaft 1028 the stud 1037, which has meanwhile returned to normal position, is again engaged by the projection on the lever 1035 and arrests the latter, after which a small further rotation of the arm 1030 and shaft 1028 rotates the clutch stud 1031 back to normal position, disengaging it from the toothed disc 1027 and disengaging the clutch at the end of one full revolution.

On a position of the control stud 1037 extending rightwardly from the clutch housing, the hub of a small C-shaped lever 1043 (FIG. 63) is pinned. The lever 1043 is urged counterclockwise by a tension spring 1044 connected between a stud 1045 in the lever 1043 and a stud 1046 in the clutch housing member 1040. A forwardly (leftwardly in FIG. 63) extending upper end portion of the lever 1043 engages over a stud 1047 in a detent lever 1048 pivoted on a stud 1049 secured in the housing member 1040. The detent lever 1048 is urged counterclockwise (FIG. 63) by a tension spring 1050 connected between a stud in said detent lever and another stud secured in the housing member 1040, but is normally retained in the position of FIG. 63 by the lever 1043. A rightward arm of a yoke member 1053 pivoted on a stud 1054 secured in the plate 1001 extends downwardly in front of the stud 1045 in the lever 1043. The yoke member 1053 has a second downwardly extending side arm with a lug 1055 turned leftwardly behind a downward arm of a bell crank 1056 also pivoted on the stud 1054 and having a rearward arm pivotally connected to the lower end of the plunger of a clutch control solenoid PCS.

The operating lever 1060 of a switch TPS is rockably supported on the hub of the lever 1043 surrounding the outer end of the clutch control stud 1037. Said operating lever 1060 has a forwardly extending arm 1061 having a slot embracing an eccentric brushing 1062 rotatably adjustably secured to the lever 1043 and extending through an aperture in a small retaining plate 1063 on the outer end of the hub of the lever 1043 to retain the switch lever 1060 on said hub. The switch TPS is normally held in open position but is operated to closed position by rotation of the lever 1043 and control stud 1037 to clutch engaging position.

The downward arm of the bell crank 1056 is normally held by gravity against a limit stud 1057 secured in the plate 1001, but when the solenoid PCS is energized, the bell crank 1056 and the yoke member 1053 are rocked counterclockwise. The outer downward arm of the yoke member 1053, acting on the stud 1045, then rocks the lever 1043 to release the detent stud 1047, whereupon the detent lever 1048 is pulled into limiting engagement with the stud 1046. The clockwise rotation of the lever 1043 rocks the clutch control stud 1037 to clutch engaging position, releasing the lever 1035 to effect engagement of the clutch as previously described, and such rotation of the lever 1043 likewise rocks the lever 1060 to close switch TPS.

The solenoid PCS is normally deenergized, as explained later, after a partial rotation of the shaft 1028, but the detent stud 1047 engaged by the end of the C-shaped lever 1043 continues to hold the clutch control stud 1037 and switch lever 1060 in operated position until near the end of a full revolution of the shaft 1028 when a cam projection 1065 on a small disc secured on the outer end of the shaft 1028 acts on a stud 1066 of the detent lever 1048 to return the latter to normal position and permit the spring 1044 to return the lever 1043, the control stud 1037, and the switch lever 1060 to normal position. The stud 1066 also acts on a forwardly extending finger of the forward arm 1061 of the switch lever 1060 to forcibly return the latter with the control stud 1037 and the lever 1043 to normal position where they are again retained by the stud 1047 of the detent lever.

A centrifugal governor device, indicated generally by the reference number 1068 in FIG. 63 and operatively connected with the rear end of the shaft 1023, operates the movable contact 1069 of a speed governing switch to prevent excessive speed of the motor.

A coupling disc 1070 (FIG. 65) has a hub portion pinned to the leftward inner end of the shaft 1028, said hub also rotatably receiving the rightward end of the multiple tape printer unit drive shaft 1080 (FIGS. 66 and 67). The disc 1070 is formed with diametrically opposed notches embracing studs 1071 secured in an arm 1072 secured on the shaft 1080. The arm 1072 has a leftwardly turned lug 1073 on its outer end normally engaged against the upper face of a leftwardly turned lug 1074 on the lower end of the downward arm of the bell crank 1056.

When the solenoid PCS is energize to cause engagement of the clutch, the counterclockwise rocking of the bell crank 1056 withdraws the lug 1074 from beneath the lug 1073 to permit rotation of the arm 1072 with the shafts 1080 and 1028. Near the end of each cycling rotation of the shafts 1028 and 1080, the lug 1073 on the arm 1072 engages and swings counterclockwise a detent pawl 1076 which is pivoted on the stud 1054 and urged clockwise by a tension spring 1077 connected between said detent pawl end and the limit stub 1057. Very slightly before the lug 1073 actually strikes the lug 1074, it clears the end of the detent pawl 1076 which is returned clockwise by the spring 1077 to engage its lower end above the lug 1073 to prevent reverse rotation of the shafts 1080 and 1028 which, as previously mentioned, is desirable to prevent unintentional reverse rotation of the clutch stud 1031 into engagement with the toothed clutch disc 1027.

The multiple tape printer cycling shaft 1080 is journaled in bearings in the side plates 1001 and 1002 and has secured thereon a number of operating cams shown in FIGS. 66 and 67 and which will be referred to more particularly later.

*Type Indexing Mechanism*

At the front of the multiple tape printer unit are twenty-seven tape printers arranged in three parallel vertical columns of nine printers each, as indicated in FIG. 60. At the rear of each printer is a group of thirteen axially aligned toothed type wheels 1085 (FIG. 68) each having thirteen teeth, each group comprising, from left to right, one register function symbol type wheel 1085s (FIG. 69) having five symbol types and eight blank teeth, ten amount type wheels 1085a having types for the ten digits 0 to 9 and three blank teeth marked 10, 11 and BL in FIGS. 72 and 73, one printer designation number type wheel 1085d, and one type wheel 1085i for printing identifiction of the machine and proprietor, such as a machine number, and the A.B.A. number of the bank by which the machine is used. The last mentioned two type wheels 1085d and 1085i of each group have in common a single hub 1086 having a ratchet wheel 1087 secured on its rightward end and also extending leftwardly to space those two type wheels by about one type width from the highest order amount type wheels 1085a of the same group. The three groups of type wheels in each of the nine horizontal lines of type wheels are mounted between spacing sleeves 1088 on a respective one of nine horizontal shafts 1089 journaled at their ends in hexagonally headed, outwardly closed, journal cup bushings 1090 secured in the side plates 1001 and 1002 by nuts threaded on the inner ends.

The ten amount type wheels 1085a and the register function symbol type wheel 1085s of each vertical column of nine type wheel groups are customarily meshed with a respective one of three sets of type wheel indexing rack slides 1095 provided for the three vertical columns of type wheel groups. The indexing rack slides 1095 are vertically movably guided in comb slots in the edges of a plurality of frame cross bars 1096 and 1097 extending transversely in front of and behind the indexing slides 1095 and secured at their ends to the plates 1001 and 1002. The type wheel indexing rack slides 1095 are customarily urged upwardly by individual tension springs 1098 (FIGS. 60, 61B, 68 and 70) connected at their lower ends to rearward projections 1099 (FIGS. 68 and 70) of the rack slides 1095 and at their upper ends to spring anchor strips 1100 (FIGS. 60 and 61B) supported at their ends on small brackets 1101 (FIG. 60) secured to the inner sides of the plates 1001 and 1002 adjacent the upper edges of the latter. The indexing rack slides 1095 are normally held in lowered normal positions by a bail rod 1105 passing transversely through vertically elongated closed slot in the lower end portions of all thitry-three rack slides 1095 and secured at its ends to the respective ones of two levers 1106 secured upon a cross shaft 1107 journaled at its ends in the side plates 1001 and 1002.

Each lever 1106 carries a pair of rollers 1108 and 1109 bearing against the edges of two complementary cams 1110 and 1111 of a respective one of two pairs of such cams secured on the shaft 1080 just inwardly of the respective side plates 1001 and 1002. The pairs of cams 1110 and 1111 are shaped to elevate the bail rod 1105 from about the 10° point to about the 150° point, and again lower it from about the 220° point to about the 305° point of the multiple tape printer operating cycle.

Only that one of the three sets of type wheel indexing rack slides 1095 for the vertical column of nine printers containing the printer selected for operation is free to rise with the bail rod 1105 in any cycle of operation of the multiple tape printer unit. Rearward of the lower ends of the rack slides 1095 are three stop bails 1112, each normally located over and slightly above rearward projections 1113 on the lower ends of the rack slides 1095 of the respective set of eleven. The upper ends of the side arms of the stop bails 1112 are pivotally supported on a shaft 1114 carried by a bracket 1115 secured to the under side of the lowermost cross bar 1097 and supporting three solenoids PSX1, PSX2 and PSX3, there being one such solenoid for each of the three stop bails 1112. The normally lowered plunger of each solenoid PSX has a stud and slot connection with a rearward extension of one of the side arms of the respective bail 1112.

The energizing circuits of the solenoids PSX are controlled indirectly by the switches SX1, SX2 and SX3, or by the switches STX1, STX2 and STX3 of the master machine in a manner more fully explained later, so that in each cycle of operation of the multiple tape printer only that solenoid PSX is energized which is associated with the column of nine printers containing the individual printer to be selected. The manner of and means for activating the selected printer in the column of nine printers will be described later.

When a solenoid PSX is energized, it pulls up its plunger to thereby move the connected stop bail 1112 rearwardly against the tension of a restoring spring 1116 to thereby free the projections 1113 of the corresponding group of type wheel indexing slides 1095 for movement upwardly by their springs 1098 when and as the bail rod 1105 rises while the rack slides 1095 of the remaining two sets are arrested slightly above their normal lowermost positions by the bails 1112 connected with the unenergized solenoids PSX. The upper edge of the bail 1112 is slanted rearwardly, and the lower rear portions of the projections 1113 are beveled to cam the bail 1112 rearwardly to permit full restoration of the slides 1095 after the bail 1112 has returned to normal position upon deenergization of the solenoid PSX.

Each of thirty-three auxiliary rack slides 1117 is vertically slidably mounted on the rightward face of a respective one of the thirty-three indexing rack slides 1095 by headed studs 1118 passing through vertically elongated slots in the slide 1117 and secured in the slide 1095. The studs 1118 on each slide 1095 are normally located in the upper ends of the slots in the associated rack slide 1117.

Rearward of the auxiliary rack slides 1117 is a subframe comprising a pair of right and left side plates 1119 and 1120 secured in laterally spaced relation by four pairs of vertically spaced cross members 1121, 1122, 1123 and 1124, said sub-frame being supported on the next to the lowest guide comb cross member 1097 and demountably held in place by small retaining plates 1125 secured by screws to the rear face of the last-mentioned cross member 1097 and to a second cross member 1126 above the upper cross rod 1121, said retaining plates also bearing against the rear sides of said cross rods 1121 to hold notched upper and lower end portions of the plates 1119 and 1120 against said main frame cross members 1097 and 1126.

Near their forward edges the sub-frame plates 1119 and 1120 rotatably support eleven vertically aligned, horizontal shafts 1128 each having secured to it in axially spaced relation at least three pinions 1130 which respectively constantly mesh with the auxiliary racks 1117 of the same order in the three groups of such racks, the pinions on the eleven shafts 1028 each meshing with the racks 1117 of a different one of the eleven orders so that all three auxiliary racks 1117 of the same order will be elevated simultaneously and to the same extent by clockwise rotation of that one of the shafts 1128 carrying the three pinions 1130 meshing with said three auxiliary racks.

Rearwardly of the shafts 1128 are eleven decoding racks 1132 vertically slidably guided in slots in the front and rear portions of the sub-frame cross bars 1122 passing through vertically elongated slots in the rack slides 1132. Each of the decoding rack slides 1132 has, on its forward edge, rack teeth meshing with a pinion on a respective one of the eleven shafts 1128. As may be seen in FIG. 69, six of the decoding rack slides 1132 each mesh with one of the three pinions 1130 on a respective one of the shafts 1128, but the remaining five of the decoding racks 1132 mesh with fourth pinions 1133 secured on five of the shafts 1128. The decoding rack slides are each urged downwardly by a tension spring 1134 (FIG. 70) connected between a stud secured in said rack slide and to an anchor strip 1135 engaged, at its ends, in notches in a pair of levers 1136 pivoted at their rear ends on studs 1137 secured in and projecting inwardly from the plates 1001 and 1002.

The forward ends of the levers 1136 support the opposite ends of a bail rod 1138 against which shoulders on the lower portions of each of the rack slides 1132 are normally engaged. The two levers 1136 are each connected by a link 1139 with the rearward arm of a respective one of the two levers 1106, whereby the bail rod 1138 is in its normal upper position while the bail rod 1105 is in its normal lower position. The parts are so proportioned that as the bail rod 1105 moves upwardly, the bail rod 1138 moves downwardly but at a slightly faster rate and to a slightly greater extent, for a reason which will be explained later.

Each of the eleven decoding rack slides 1132 carries a pair of bails 1142 having downward side arms pivoted at their lower ends on studs 1143 secured in and passing through the rack slide 1132. Each bail member 1142 is urged clockwise by a torsion spring 1144 (FIG. 74) coiled about the stud 1143 and having a center portion engaging the rear edge of the slide 1132 and opposite free ends pressing against the forward edge of the cross portion of the bail 1142, which cross portion is normally located in a wide notch in the rear edge of the slide 1132. The rear edges of the cross portions of the two bails 1142 carried by each decoding rack slide 1132 bear against the five bars 1145 and 1148 (FIGS. 69, 70 and 74) of a respective one of eleven sets of such bars, each set comprising four code bars 1145 vertically slidably guided between spacing collars 1146 on the two sub-frame cross rods 1123 which pass through vertically elongated slots in the bars 1145, and one bar 1148 stationarily mounted on said cross rods 1123 between the second and third code bar slides 1145 of the same set.

Each of the four code bars 1145 of a set has a rearward projection 1149 at an appropriate height to be engaged on the upper free end edge of the pivoted armature 1150 of a respective one of a set of four electromagnets RIM1, RIM2, RIM4 and RIM8, there being one such set of electromagnets for each set of code bar slides 1145. The frames of each set of four electromagnets RIM are mounted on a vertically extending separate channel member 1153, all eleven channel members 1153 being stationarily supported between spacing sleeves on the sub-frame cross rods 1124 which extend transversely through both of the rearward side flanges of all of the channel members.

Each of the code bar slides 1145 is urged downwardly by a tension spring 1155 connected between the lower end of said code bar and an anchor strip 1140 held in notches in the lower ends of the plates 1119 and 1120. A bail rod 1156 (FIGS. 70 and 74), passing through vertically elongated slots in all forty-four code bars 1145 and through slots extending upwardly farther in the stationary bars 1148, is carried at its ends in the forward arms of a pairs of bell cranks 1157 pivoted on studs 1158 secured in and extending inwardly from the plates 1001 and 1002. Downward arms of each bell crank 1157 carry rollers 1159 and 1160 bearing on the edges of the two complementary cams 1161 and 1162 of a respective one of two pairs of such cams secured on the shaft 1080 next inwardly from the cams 1111. The parts are so proportioned that the bail rod 1156 is normally in its lowered position so as not to prevent downward movement of any of the code bars 1145 immediately when it is released from the armature 1150 of its controlling electromagnet RIM.

It will be apparent that upon energization of any electromagnet RIM of a set of four, the energized magnet will pull its armature 1150 rearwardly against the tension of its restoring spring 1151, and thereby retract the upper free edge of said armature from beneath the projection 1149 of the respective one of the four code bars 1145 and thereby permit said code bar 1145 to be pulled downwardly by its spring 1155. The four code bars 1145 of each set, which are further designated by the numbers 1, 2, 4 and 8 in FIG. 74, are controlled respectively by the magnets RIM1, RIM2, RIM4 and RIM8. The cams 1161 and 1162 rock the bell cranks 1157 to swing the bail rod 1156 upwardly to restore all of the code bars 1145 again to their normal upward positions from about the 325° point of the multiple tape printer operating cycle to about the 340° point in said cycle, prior to which time the magnets RIM are again deenergized as explained later.

From FIG. 74 it will be seen that in the forward edges of the stationary plates 1148 there are an upper and a lower set of notches 1165 having downwardly and rearwardly inclined upper edges and substantially horizontal lower edges, each set of notches comprising six equally spaced notches. The notches 1165 in the stationary bar 1148, identified in FIG. 74 by the letters B and X and numbers 0 to 9, are so arranged relatively to the upper and lower bails 1142 respectively of the associated one of the decoding slides 1132 that, during downward movement of the latter, the cross portions of said upper and lower bails alternately will cross the levels of the lower edges of successive notches 1165 of the respective sets in the order B and 0 to 9. In each printer cycle, as will become clear later, the upper or the lower bail 1142 on each decoding slide 1132 will engage respectively in one or another of the six notches of the upper set or in one of the top five notches of the lower set in the associated bar 1148 to arrest downward movement of the slide 1132. The lowermost or X notch 1165 at the bottom end of each stationary plate 1148 is without function in the illustrated embodiment. Which of the notches 1165 of each stationary bar 1148 will receive the cross piece of one of the bails 1142 carried by the decoding slide rack 1132 of corresponding order is determined in acordance with the various combinations of code bar slides 1145 which are in lowered position. Before explaining the arrangement of the notches 1166 on the code bar slides 1145, the general operation of the type wheel indexing mechanism will first be described.

As the bail rod 1138 (FIG. 70) is moved downwardly and the bail rod 1105 is moved upwardly, the decoding rack slides 1132 are permitted to move downwardly and, through the pinions 1130 and 1133 and the shafts 1128, drive the auxiliary rack slides 1117 upwardly slightly ahead of that one set of eleven type wheel indexing rack slides 1095 which is free to move upwardly with the rising bail 1105. As will become clear later, at least one of the notches in each of the eleven stationary bars 1148 will receive the cross member of one of the bails 1142 on the corresponding decoding rack slide 1132 to arrest the downward movement of the latter and the upward movement of the three auxiliary racks 1117 connected thereto by pinions 1130 and 1133 on a shaft 1128. At the time of such arrest of a decoding rack slide 1132, only the said slide 1132, a single shaft 1128, three pinions 1130, possibly one pinion 1133, and three of the light auxiliary rack slides 1117 will be arrested so that the shock of arrest of these parts is not great. Quickly, but slightly thereafter, the heavier slide 1095 of corresponding order and the nine type wheels 1085 of corresponding order being indexed by said slide 1095 will be arrested as the studs 1118 in said indexing rack slide 1095 reach the upper ends of the slots in the associated auxiliary rack slide 1117. All nine type wheels of the same order meshing with the indexing rack slide 1095 will thereby be arrested with the same type teeth or blank teeth corresponding at the printing lines in accordance with the notch in the stationary bar 1148 which has received a bail 1142 to arrest the decoding rack slide 1132 for that order. The 0 and 1 to 9 notches 1165 in each stationary bar 1148 are so located that when the rack slides 1132 and 1095 of the corresponding order are arrested by engagement of a bail member 1142 in any of those nothces, the type wheels 1085 of the same order in the nine sets of type wheels being indexed will be arrested with the corresponding types 0 and 1 to 9 at the printing lines and when a bail 1142 engages in the B notch, the type wheels of corresponding order will be indexed to place their blank teeth BL at the printing lines.

After the platen of a selected one of the nine printers of the column has been moved rearwardly against the associated set of type wheels to effect a printing impression on the paper tape 1170 passing around said platen, the continuing rotation of the shaft 1080 and cams 1110 and 1111 returns the bail rod 1138 upwardly and the bail rod 1105 downwardly, thereby returning the rack slides 1132 upwardly and the rack slides 1117 and 1095 downwardly to normal positions. Thus, although in each cycle of operation of the multiple tape printer unit, a printing impression is made only on one of the twenty-seven tapes from one of the twenty-seven sets of printing wheels 1085, all nine sets of printing wheels in the column containing the set of printing for the selected printer are indexed to the same blank or digit printing positions, order for order.

As explained more fully hereinafter, the energizing circuits for the magnets RIM1, RIM2, RIM4 and RIM8 of the respective set of four for each of the ten amount and one register symbol printing order are controlled, respectively, by the four switches, previously designated 1, 2, 4 and 8, of the switch unit RO of corresponding order, the circuit of the magnet RIM1 for each of the dollars and higher amount orders being also controlled by the switch ZE controlled by the slide 953 of the same order. In the arrangement herein disclosed, the individual magnets RIM cannot be energized except when the corresponding switch in the unit RO for the same order is operated to close its movable switch blade against the left hand stationary contact of that switch. Thus the X's in the columns for the four switches 1, 2, 4 and 8 in the chart of FIG. 54 also denote which of the 1, 2, 4 and 8 code slide bars 1145 will be dropped to lower position when the corresponding switches 1, 2, 4 and 8 of the corresponding unit RO have been closed on their left hand stationary contacts in consequence of the slide 953 connected with amount differential actuator rack 265 or the register symbol differential selecting slide 519 having been moved forwardly of its normal position by the number of steps shown at the left hand margin of the chart.

Accordingly the notches 1166 in each 1 code slide bar 1145 are so located that when the 1 code slide bar 1145 is up, it closes the B, 2, 4, 6 and 8 notches in the associated stationary bar 1148 but does not close the 1, 3, 5, 7, 9 and 0 notches in said stationary bar 1148. When the 1 code slide bar 1145 is down in consequence of the associated magnet RIM1 having been energized, it closes the 1, 3, 5, 7, 9 and 0 notches in the associated stationary bar 1148 but does not close the B, 2, 4, 6 or 8 notches of said bar 1148. By the statement that a code slide bar 1145 closes notches in the associated stationary bar 1148 is meant that unnotched portions of the front edge of said code slide bar 1145 are aligned with the notches in the bar 1148 to prevent a bail 1142 of the associated decoding rack slide 1132 from entering said notch during downward movement of said decoding rack slide 1132 with the bail 1138. A notch in the stationary bar 1148 is not closed by a code slide bar 1145 when a notch in the forward edge of said code slide bar is aligned with the notch in the stationary bar 1148 so as not to prevent a bail 1142 from entering the latter notch.

The notches in the front edge of each 2 code slide bar 1145 are so arranged that the 3, 7, 4 and 8 notches of the associated stationary bar 1148 are closed, whereas the remaining notches in the latter bar are not closed by the 2 code slide bar 1145 while the 2 code bar slide 1145 is up, but the B, 1, 5, 9, 0, 2 and 6 notches in the associated stationary bar 1148 are closed and the remaining notches 3, 7, 4 and 8 in the latter bar are not closed by the 2 code slide bar 1145 when the latter is down. The notches in the front edge of each 4 code slide bar are so arranged that the 1, 3, 9, 2 and 4 notches of the associated stationary bar 1148 are closed and the B, 5, 7, 0, 6 and 8 notches in the latter bar are not closed by the 4 code slide bar 1145 when the latter is up, but the B, 5, 7, 0, 6 and 8 notches in the stationary bar 1148 are closed and the 1, 3, 9, 2 and 4 notches in the latter are not closed by the 4 code slide bar 1145 when the latter bar is down. The notches in the front edge of each 8 code slide bar 1145 are so arranged that the 5, 7, 9, 6 and 8 notches in the associated stationary bar 1148 will be closed, but the B, 1, 3, 0, 2 but 4 notches in the latter will not be closed by the 8 code slide bar when the latter is up, and the B, 1, 3, 0, 2 and 4 notches in said stationary bar 1148 will be closed, but the 5, 7, 9, 6 and 8 notches in the latter bar will not be closed by the 8 code slide bar 1145 when the latter is down. It should also be noted that in the downward movement of the decoding rack slide 1132, one or the other of the two bail members 1142 carried thereby will engage in the first notch of the stationary bar 1148 which is encountered by either of said bails 1142 which is not closed by any of the four code slide bars 1145 associated therewith.

From the foregoing, it follows that if only the 1 code slide bar 1145 of a given set of four code slide bars 1145 is down, the upper bail member 1142 of the associated decoding rack slide 1132 will engage in the uppermost or B notch 1165 of the stationary bar 1148 to arrest that rack slide 1132 and the type wheels of corresponding order with blank teeth opposed to the printing lines of the platens. If no code slide bar 1145 is down, the lower bail member 1142 of the associated rack slide 1132 will engage in the 0 notch in the stationary bar 1148 to arrest the rack slide 1132 when the type wheels of corresponding order have positioned their 0 types opposite the printing lines of the platens. Each of the numbered notches from 1 to 9 in the stationary plate 1148 will receive a bail 1142 to arrest the type wheels of corresponding order with the corresponding digit types at the printing lines each time the sum of the numbers 1, 2, 4 or 8 of the code slide bars 1145, which are in their down positions, is equal to the sum of 3 plus said digit. Thus, when only the 4 code slide 1145 is down, the upper bail 1142 will engage in the 1 notch in the bail 1148 to arrest the type wheels with their 1 types at the printing lines. When only the 1 and 4 code slide bars 1145 are down, the lower bail 1142 will engage in the 2 notch in the bar 1148 to arrest the type wheels with their 2 types at the printing lines. When the 1, 2 and 8 code slide bars 1145 are in their down positions and the 4 code slide bar 1145 is in its up position, the type wheels will be arrested with their 8 types at the printing lines.

As previously mentioned, when the 1 code bar slide 1145 alone in any code bar slide group is dropped to its lower position, the BL blank teeth next to the 0 type teeth on the type wheels of the corresponding order will be placed at the printing lines. It has also been mentioned previously that the energizing circuits of the magnets RIM1 which control the 1 code slide bars 1145 are controlled not only by the 1 switches in the switch units RO of corresponding order, but, in the case of the magnets RIM1 for the dollars and higher amount orders, are also controlled by the switches ZE of corresponding order. As will be explained more fully hereinafter, the movable contact blades of the switches ZE are connected to the windings of the magnets RIM1 of corresponding order, and the leftmost one of the stationary contacts 951 (FIG. 58) of the line of switches ZE is connected to the power supply so that the magnets RIM1 for all orders higher than the highest order in which the slide 891 is moved forwardly to its 1 or a higher value position will be energized to cause the B blank teeth of the type wheels of corresponding orders to be indexed to the printing lines but all of the lower order magnets RIM1, regardless of whether the switches ZE for those lower orders are opened or closed, cannot be energized through those switches ZE to cause the multiple tape printer type wheels of corresponding order to be indexed to their B blank positions. Consequently, 0 will be printed in any such lower order in which a digit from 1 to 9 is not printed, but no 0's will be printed in any order higher than the highest order in which a digit from 1 to 9 is printed.

It will also be remembered that there are no switches ZE for the pennies and dimes orders, and there is no switch ZE for the register function symbol order. Consequently, in any cycle of operation of the multiple tape printer which may be effected in consequence of a master machine cycle in which no amount was set on the amount keys 107 of the master machine, as, for example, a register or crossfooter total or subtotal taking operation of the master machine in which a previous clear register or crossfooter is totaled or subtotaled, .00 and a function symbol will be printed in the pennies, dimes, and register function symbol orders by the operated printer of the multiple tape printer, and those three types will prevent the paper tape from being pressed against blank teeth of any of the higher order type wheels of the operated printer.

As previously mentioned, the amount type wheels 1085 of each group carry types for the ten numerals 0 to 9 and have three blank teeth between the 9 and 0 type teeth. The register symbol type wheels 1085s each carry a subtotal symbol S a total symbol *, a subtract symbol —, an add symbol +, and a non-add symbol # which are positioned in the same positions respectively as the 2, 3, 4, 5 and 6 numeral types of the amount type wheels. As the register symbol selecting differential slide 519 of the master machine moves forwardly in each machine cycle to one of its five positions corresponding to the 2 to 6 positions of the amount differential actuators, a register function symbol is indexed on symbol type wheels of the multiple tape printer in each cycle of operation.

The two type wheels 1085d and 1085i at the right end of each set of type wheels are advanced step-by-step in successive cycles of operation of the multiple tape printer by means which will be described later so that the types carried by those wheels 1085i will print in continuous succession in two lines along that margin of each tape which is at the right as the tape issues from the printer. As all of the amount and register symbol types are inverted, the register symbol type is at the left end of each group of types and the amount order types are arranged with the lowest order type wheel at the left and the highest order type wheel at the right, so that the tape issued from the printer must be inverted for reading, and the lines of identification characters printed by the two type wheels 1085d and 1085i will be along the left margin of the tape as it is held for reading.

*Type Aligning Means*

Because of the number of rack and gear connections between the rack slides 1132 and the type wheels 1085 which are indexed under control of those rack slides, it is desirable to provide means to correct any small inaccuracies of indexing of the type wheels resulting from slight play in the train of parts. For that purpose one means is provided for accurately aligning the indexed rack slides 1095 and other means are provided for immediately thereafter accurately aligning the type wheels.

The rear edges of the type indexing rack slides 1095 are formed above the upper ends of the associated auxiliary rack slides 1117 with a series of aligning notches 1175 (FIG. 70) including an uppermost double-width notch 1176. Rearwardly of the upper ends of the notched portions of the rack slides 1095 is an aligning bar 1177 having a blunt V-pointed forward edge and secured at its opposite ends to the upper ends of a pair of levers 1178 which are located just inwardly of the respective frame side plates 1001 and 1002. Each lever 1178 is pivoted at its lower end on a stud 1179 carried by and extending inwardly from an intermediate portion of another lever 1180 which, at its forward end, is pivoted on a stud 1181 secured in the respective one of the plates 1001 and 1002. The rearward end of each lever 1180 is formed with a rearwardly opening slot snugly embracing a stud 1182 eccentrically adjustably secured in the respective plate 1001 or 1002 to permit accurate vertical adjustment of the respective end of the aligning bar 1177.

Each of the levers 1178 has secured to an intermediate portion thereof an outwardly projecting headed stud carrying a roller 1185 which is normally yieldingly pressed against the rear edge of a downward arm of a lever 1186 by a tension spring 1187 connected between the lever 1178 and the downward arm of the lever 1186. Each of the two levers 1186 is rockably supported on a stud 1188 secured in and projecting inwardly from the respective side plate 1001 or 1002. Each lever 1186 is normally urged counterclockwise (clockwise in FIG. 70) by a tension spring 1190 connected between the rearward arm of the lever 1186 and a stud secured in the respective plate 1001 or 1002. The rearward arm of each lever 1186 is also pivotally connected to the upper end of a respective one of two links 1192, which, at their lower ends, are each connected to the forward arm of one of two levers 1193 each pivoted on a stud 1194 secured in the plate 1001 or 1002. Each of the levers 1193 has on the rearward end of its rear arm a cam portion which is positioned in the path of a respective one or two rollers 1195 each carried by a respective one of the two cam discs 1110.

The parts are so proportioned that immediately after the bail rod 1105 has reached its uppermost position, the rollers 1195 rock the levers 1193 counterclockwise to pull the links 1192 downwardly and rock the levers 1186 clockwise. During such movement of the levers 1186 the springs 1187 pull the levers 1178 forwardly until the forward aligning edge of the bar 1177 seats fully in notches 1175 of the indexed rack slides 1095 after camming downwardly slightly each of the rack slides 1095 which has moved upwardly to or beyond the zero type indexing position. Further clockwise rocking of the levers 1186, after alignment of the indexed slides 1095 has been completed, effects operation of the further means for aligning the type wheels.

Above each of the nine horizontal lines of type wheels is an aligning bar 1200 (FIGS. 70 and 77) having a lower blunted V aligning edge. Each aligning bar 1200 is secured at its ends to the forward arms of a pair of levers 1201 which are pivotally mounted on shouldered screws threaded into the plates 1001 and 1002 from the inner sides thereof. Each of the levers 1201 has a rearward arm which is connected to the lower end of a tension spring 1203 which is connected at its upper end to a stud 1204 secured in a vertical link 1205 and yieldingly holds the rear arm of the lever 1201 upwardly pressed against the under side of the stud 1204. There are two vertical links, one adjacent each of the plates 1001 and 1002, each link 1205 having nine studs engaging the rearward arms of the respective ones of the levers 1201 at the corresponding side of the machine. The vertical links 1205 are slidable on the inner faces of the plates 1001 and 1002 and are held in proper position by the springs 1203 and the levers 1201 without other guidance.

Each link 1205 also carries a stud 1210 which is loosely embraced in a slot in the forward arm of a respective one of the two levers 1186. The stud 1210 in each link 1205 is normally engaged against the upper edge of the slot in the respective lever 1186, but during the further clockwise movement of the levers 1186 after the aligning bar 1177 has completed alignment of the rack slides 1095, the lower edges of said slots engage the studs 1210 to elevate the two links 1205 so that the springs 1203 pull the levers 1201 counterclockwise to press all of the nine aligning bars 1200 downwardly into the tooth spaces in the type wheels 1085 for accurate alignment of the latter in their proper indexed type positions.

To permit the aligning bar 1177 always accurately to align the type wheel indexing slides 1095 notwithstanding that the stationary plates 1148, after arresting the decoding rack slides 1132 and the rack slide 1095, positively prevent any further downward adjustment of the rack slides 1132 and upward adjustment of the rack slides 1095, it is necessary to arrange the parts so that there is assurance of a slight over-indexing of those type wheel indexing rack slides 1095 which are indexed to or beyond 0 position. Then the aligning bar 1177, when it is pressed into the notches 1175 of the rack slides 1095, can always return the rack slides 1095 downwardly through the required few thousandths of an inch to insure exact alignment of the type wheels indexed by said rack slides 1095.

The normal positions of the type wheels with respect to their aligned bars 1200 is illustrated with respect to the second highest horizontal line of type wheels 1085 shown in FIG. 70 where it will be seen that the aligning bar 1200 is above the line of "0" type teeth on the associated line of type wheels 1085. It will also be noted that the stop bails 1112, which are in normal blocking position, are located sufficiently above the rearward projections 1113 of those type wheel indexing slides 1095 which are to be prevented from indexing the type wheels associated with them to rotate those type wheels through a fraction of a tooth space to place in alignment under the aligning bars 1200 the toooth space between the 0 and 1 types. In such position of the type wheel 1085 the middle one of its three blank teeth designated 10, 11 and BL in FIGS. 72 and 73 is opposite the printing line of the platter 1167 as shown in FIG. 72. The B notch 1165 in each stationary notched bar 1148 is so located that when it is entered by the upper bail 1142 on the associated decoding rack slide, it will permit the associated type wheel indexing rack slide 1095 in the set permitted to index the type wheels of the vertical column containing the printer to be operated, to move to one step above the position at which it would be arrested by the stop bail 1112, and to rotate the associated type wheels to place the BL blank teeth at the printing lines as shown in FIG. 73.

As arrest of the rack slides 1095 either by the stop bails 1112 or by B notches 1165 of the bars 1148 places blank teeth of the associated type wheels at the printing lines, alignment of those rack slides 1095 by the aligning bar 1177 is not required. For that reason, the uppermost notch 1176 on the rear edge of each rack slide 1095, which is the notch which is entered by the bar 1177 when the rack slide 1095 are arrested by the bails 1112 or by the B notches in the bars 1148, is made sufficiently wide so that neither of its edges will be engaged by the aligning bar 1177 when the latter moves to aligning position.

*Printer Platens and Platen Operating Means*

Each platen roller 1167 is mounted on an individual short shaft journaled at its ends in two side plates 1215 (FIGS. 68, 75, and 77) rigidly secured in laterally spaced relation by a plurality of rods 1216. The side plates 1215 of the three platen frames in each of the nine horizontal lines of three are rockably supported between spacing sleeves on a respective one of nine shafts 1218 having, except at its reduced cylindrical ends which are journaled in the side plates 1001 and 1002, four flats between four cylindrical surfaces of equal radius upon which journal bushings in the plates 1215 have bearing. Secured to the top edge of each plate 1215 is a curved paper shield 1220 which extends inwardly a short distance over the upper and rear surface of the end of the platen roller 1167 to prevent the free end of the paper from bowing out too far from the platen. The left hand shield member 1220 on each platen frame has a pair of perforated ears, the forward one of which is connected to a tension spring 1222 which yieldingly holds the platen retracted forwardly away from the type wheels to a normal position in which the forward edge of the left hand plate 1215 engages a stop lug 1223 bent leftwardly from the rear edge of a plate 1315 which will be described later.

On the outer side of the left hand frame plate 1215 of each platen frame is a hook pawl 1224 (FIGS. 75 and 77) which is pivotally mounted on a stud 1225 secured in and extending outwardly from said plate 1215. The pawl 1224 is urged counterclockwise by a tension spring 1226 and has on its lower end a forwardly extending hook shoulder which normally is rearwardly clear of a rearwardly finger of a lever 1227 secured to a hub 1228 fitted on the squared portion of the shaft 1218 so as to be rocked thereby. A rearward projection of the lower end of the pawl 1224 carries a roller 1230 which the spring 1226 norally yieldingly maintains engaged against the forward edge of one of three cam slides 1231. There is one such cam slide 1231 for each of the three vertical rows of nine printers. The cam slides 1231 are each mounted leftwardly of a respective group of type wheel indexing slides 1095 and in the same manner as the slides 1095, and are normally urged upwardly by a tension spring 1232 which, like the springs 1098, is anchored on one of the anchor strips 1100 (FIGS. 61B and 77). The bail rod 1105 (FIG. 70) also passes through vertically elongated slots which are formed in the lower ends of the slides 1231 similarly to the slots in the lower ends of the rack slides 1095 so that the bail rod 1105 normally holds the cam slides in downward positions where their forward cam edges, engaging the rollers 1230, permit the hook shoulders of the pawls 1224 to remain rearwardly clear of the fingers 1227. Also, the lower ends of the cam slides 1231 have rearward projections which, like the rearward projections of the rack slides 1095, are normally engaged under a respective one of the three stop bails 1112.

When one of the three magnets PSX is energized to retract the associated stop bail 1112 to permit indexing of the associated set of type wheel indexing rack slides 1095, it also releases the associated cam slide 1231 for movement upwardly by its spring 1232 with the bail rod 1105. In such upward movement of the cam slide 1231, nine cam portions 1235 of its forward edge cam the nine rollers 1230 engaged therewith forwardly to engage the associated hook pawls 1224 with the corresponding finger 1227 on the nine shafts 1218 so as to couple the shafts 1218 the platen frames of all nine printers in the vertical colunm the type wheels of which are being indexed. It will therefore be apparent that when the shaft 1218 which carries the platen frame for the printer which is to be operated is rocked clockwise, it will swing the appropriate platen 1167 rearwardly toward the type wheels.

On the leftward end of each shaft 1218 which extends outwardly through the plate 1002 there is pinned a rearwardly and somewhat upwardly extending lever 1240 (FIGS. 60, 62, 75 and 77) urged counterclockwise (clockwise in FIG. 62) by a tension spring 1239 connected between a stud secured in the plate 1002 and the rightward end of a stud 1238 which is secured in and extends from both sides of the lever 1240 and into an arcuate slot in the plate 1002. A coupling pawl 1241 pivotally supported on the rear end of the lever 1240 is urged counterclockwise (clockwise in FIG. 62) by a tension spring 1242 connected between an upper perforated ear of the pawl 1241 and the stud 1238. Each of the coupling pawls 1241 has a rearwardly extending arm carrying a rightwardly projecting stud 1245 which is normally engaged under a latch shoulder on an arm 1246 projecting downwardly from the free end of the pivoted armature 1247 of a respective one of nine electromagnets PSY1 to PSY9 which are mounted on the plate 1002. The normally released armatures of the magnets PSY normally latch the coupling pawls 1241 in such position that rearwardly projecting hook portions on the lower ends of said coupling pawls are normally clear of the paths of respective ones of nine roller studs 1250 carried in a vertical link 1251 which is pivotally supported near its upper end on the rearward end of an arm 1252 which is pivotally mounted at its forward end on a stud 1253 secured in the plate 1002.

The lower end of the link 1251 is pivotally connected to a rearward arm of a bell crank 1255 which is rockably supported on a stud 1256 secured in the plate 1002. The upper arm of the bell crank 1255 is pivotally connected to the forward end of a link 1257, the rearward end of which has a longitudinal slot embracing a stud 1258 in a downwardly and forwardly extending arm of a lever 1260 which is pivotally mounted on a stud 1261 secured in the plate 1002. The link 1257 is normally urged to its rearward limit on the stud 1258 by tension springs 1262 connected between studs on the lever 1260 and studs on the forward portion of the link. Forwardly and upwardly extending arms of the lever 1260 carry rollers 1264 and 1265 which bear on the peripheries of a pair of complementary cams 1266 and 1267 secured on the leftward end of the shaft 1080.

The energizing circuits of the magnets PSY are controlled by the switches SYS and STY of the master machine, as explained more fully hereinafter. It will be apparent that when a magnet PSY is energized and pulls up its armature 1247, it will disengage its latch arm 1246 from the stud 1245 of the associated coupling pawl 1241 which thereupon will be rocked counterclockwise by its spring 1242 to engage its coupling hook under a stud 1250 on the link 1251, thereby coupling the associated shaft 1218 with the link 1251.

When, during the rotation of the shaft 1080, the lever 1260 is rocked counterclockwise, it will pull the link 1257 rearwardly, rock the bell crank 1255 clockwise, and lower the link 1251 until a laterally turned lug 1269 on the end of the rearward arm of the bell crank 1255 engages a latch shoulder on a downward arm of a latch lever 1270 which is pivotally supported on a stud 1271 secured in the plate 1002 and urged clockwise by a tension spring 1272 to yieldingly maintain a rearward arm of said latch lever engaged against a limit stud 1273 secured in the plate 1002. By such clockwise rocking of the bell crank 1255 and downward movement of the link 1251, the shaft 1218, coupled to the link 1251 by the unlatched coupling pawl 1241, is rocked clockwise sufficiently to move the platen of the selected printer to about .080 of an inch from the type wheels 1085, where it momentarily remains.

During further counterclockwise rocking of the lever 1260 the springs 1262 are tensioned while the bell crank 1255 and link 1251 are arrested by the latch lever 1270 until a stud 1275 in a forward arm of the lever 1260 engages a forward finger of the latch lever 1270 and rocks the latter to disengage its latch hook from the lug 1269. The springs 1262 then impart a rapidly accelerated clockwise movement to the bell crank 1255 and downward movement to the link 1251 which, through the active coupling pawl 1241, rapidly further rocks the associated shaft 1218 and the platen frame which is coupled to said shaft by its hook 1224 to impart a rapidly accelerated rearward movement to the platen to a point within about .04 inch from the type faces of the type wheels. At that point, downward movement of the link 1251 is arrested by engagement of a squared stud 1277 projecting rightwardly from its upper end against an impact plate of a cushion block 1278 carried by a bracket 1279 secured to the plate 1002 and having a slot guidingly embracing the upper portion of the link 1251. The momentum of the thus accelerated platen and platen frame is sufficient to cause the platen to overthrow and strike the paper strip thereon against the indexed types with sufficient force to effect the desired printing impression.

During the remaining portion of the rotation of the shaft 1080 the lever 1260, bell crank 1255, latch lever 1270 and link 1251 are restored to normal, and the operated shaft 1218 and lever 1240 are restored by the associated stud 1250, but prior to such upward restoring movement of the link 1251 the energized one of the magnets PSY is again deenergized to release its armature 1247 so that during the return movement of the lever 1240 carrying the active coupling pawl 1241 the latch arm 1246 will be in the path of the stud 1245 to relatch the pawl 1241 and restore it to normal position.

After each operation of a printer, the proprietor and machine identifying type wheels 1085i and 1085d are rotated one tooth space counterclockwise so that all of the type characters on those type wheels are printed successively along the margin of the tape. In each of the 27 printers a pawl 1285 (FIG. 68) is piovtally mounted at its forward end on a headed stud 1286 secured in the right hand platen frame plate 1215 and passing through a forwardly and rearwardly elongated slot in the pawl. The pawl is urged clockwise by a tension spring 1287 secured to the pawl and to a stud secured in the plate 1215 to maintain a tooth on the rear end of the pawl engaged with the teeth of the ratchet wheel 1087 which is fixed to the common hub 1086 of the two type wheels 1085i and 1085d. The aligning bars 1177 and 1200 engage in the notches 1175 of the racks 1095 and in the tooth spaces of the type wheels prior to the rearward movement of the platen in the printing operation, so that the type wheels are held against rotation while the ratchet tooth of the pawl 1285 is moved rearwardly over a ratchet tooth of the ratchet wheel 1087. After the printing stroke of the platen is completed and prior to the return of the platen frame to normal position, the aligning bars 1177 and 1200 are retracted so that as the pawl 1285 of the operated platen frame returns forwardly to normal position, it rotates the ratchet 1087 and type wheels 1085i and 1085d of the operated printer one type space counterclockwise.

*Line Spacing*

Also, in the return of the operated platen frame to normal position after printing, the platen carried thereby is line-spaced. In each printer, a line-spacing ratchet wheel 1290 (FIGS. 75 and 77) is secured on the leftward end of the platen shaft leftwardly of the left plate 1215. A line-spacing pawl 1291, pivotally mounted on a stud 1292 secured in the forward edge portion of the lever 1227, is urged clockwise by a tension spring 1293, but the ratchet tooth on the upper end of the pawl 1291 is normally held away from the ratchet wheel 1290 by engagement of a leftwardly turned lug 1294 on the pawl 1291 against the upper forward end of an arm 1295 secured on the coupling hook 1224.

When the hook 1224 is moved into coupling position in the path of the lever 1227, the arm 1295 is rocked rearwardly to permit the line spacing pawl 1291 to engage the tooth on its upper end against the ratchet wheel 1290. During the initial portion of the rocking of the shaft 1218 prior to engagement of the end of the lever 1227 against the hook on the coupling pawl 1224, the ratchet pawl is moved past a tooth of the ratchet wheel 1290. After the printing stroke of the platen and during the latter portion of the counterclockwise restoring rotation of the shaft 1218 after the arrest of the platen frame in normal position, the continuing counterclockwise movement of the lever 1227 relative to the platen frame pulls the line spacing pawl 1291 downwardly to rotate the ratchet 1290, the platen shaft, and the platen through one line space.

The platen is yieldingly held against unintentional rotation by a detent roller 1296 (FIG. 75) engaging between teeth of the ratchet wheel 1290 and carried by a lever 1297 pivoted on a stud 1298 secured in the left plate 1215 and urged counterclockwise by a tension spring 1299.

The paper tape 1170 is maintained in frictional linespacing contact with the platen roller 1167 by means of a unitary feed roller 1300 (FIG. 68) having two paper engaging portions of larger diameter and having its reduced end portions loosely embraced in slots in the upper rearward ends of the two side arms of a yoke member 1301 pivoted on a shaft 1302 secured at its ends in the plates 1215. On each side of the yoke member 1301 a lever 1305 is pivoted on the shaft 1302. Each lever 1305 is urged counterclockwise by a tension spring 1306 secured to the lower forward arm of said lever and to a lug on the adjacent plate 1215. The upper rear end of each lever 1305 has a notch receiving the outer end of the platen roller 1300 and accurately aligning it as it presses that end of the feed roller against the paper passing around the platen.

*Paper Tape Supplies*

In each printer a supply roll 1308 of paper tape is supported on a spindle 1309 which is secured at its rightward end in a rearward flange of a plate 1310 having at its lower side portions rearwardly turned ears which are rockably supported between spacing collars 1311 on one of nine cross rods 1312 which are secured at their ends to the forward edges of the plates 1001 and 1002. In the leftward end of the spindle 1309 a conically headed plunger 1313 is mounted for limited axial movement and is spring-pressed leftwardly so that when the plate 1310 is in its normal vertical position, the conical head of the plunger is pressed partially into a small aperture 1314 formed in a stationary plate 1315 which, at its lower end, is apertured for support on a cross rod 1312 and has on the forward portion of its upper edge an upwardly extending lug forked to embrace a spacing collar 1311 on the next higher cross rod 1312. Thus the head of the plunger 1313 normally releasably retains the plate 1310 in its normal vertical position, but permits the plate easily to be swung forwardly to an open position for insertion of a new supply roll of paper tape.

Such forward swinging of the plate 1310 also retracts the feed roller 1300 from the platen to facilitate wrapping the new paper tape around the platen. An eccentric bushing 1317 secured in the right hand rearward ear of the plate 1310 is embraced in an opening in the forward end of a link 1318 which, at its rearward end, has a small slot embracing a stud 1319 carried by a downward extension of the right side arm of the yoke member 1301 so that as the plate 1310 is swung forwardly, the eccentric bushing 1317 pulls the link 1318 forwardly to swing the yoke 1301 to lower the feed roll 1300 from the platen sufficiently to permit easy insertion of the paper tape between the feed roll and the platen roller.

A paper guide shild 1320 has, on its forward edge, lugs bent cylindrically about the rod 1312. The sheild 1320 (FIGS. 68, 75 and 77) extends rearwardly and upwardly to a line adjacent the bight between the feed roller 1300 and the platen roller 1167. The rearward portion of the shield 1320 has on both sides upwardly and inwardly re-bent portions 1321 (FIGS. 75 and 77) to form a guide chute to guide the inserted paper tape 1170 accurately between the platen roller and feed roller, so that the operator, replenishing the paper supply, may merely push the end of the new paper tape through the guide chute until the free end thereof is guided around the platen by the guide flanges 1220 previously mentioned to a position where the operator may grasp it and pull it over the free edge of the plate 1310 which is serrated to permit it to serve as a tear-off blade.

Low Paper Signal Operating Means

It has previously been mentioned that an interlock and signal means is operated when the paper supply in any of the twenty-seven tape printers is diminished to a predetermined low level to temporarily prevent operation of the machine until the operator either replenishes the paper supply or especially conditions the machine for continued operation. A lever 1325 (FIG. 68) pivotally supported on a stud 1326 in the rearward right side flange of each plate 1310 is urged clockwise by a tension spring 1327 to maintain a stud 1328 (FIG. 77), which is secured in said lever and extends leftwardly through an opening in the rearward flange of the plate 1310, engaged against the paper supply roll 1308. As the radius of the paper supply roll 1308 is reduced, the lever 1325 is rocked correspondingly clockwise by its spring 1327.

When the supply roll 1308 is diminished to a predetermined small radius, a stud 1330 secured in the lever 1325 engages a finger of a latch pawl 1331 pivoted on a stud 1332 secured in the rearward flange of the plate 1310. The latch pawl 1331 is urged clockwise by a spring 1333 to place a latch shoulder thereon over an arm of a signal lever 1334 also pivoted on a stud 1335 secured in the rearward flange of the plate 1310. As the radius of the paper supply roll is further diminished, the stud 1330 of the lever 1325 rocks the latch pawl 1331 counterclockwise until it releases the signal lever for movement counterclockwise by a tension spring 1336. An upper forward arm of the signal lever 1334 is thereupon swung forwardly of the front face of the plate 1310 and may be painted in a bright color or otherwise provided with means to attract the attention of the operator to enable the operator to readily determine which printer has the depleted paper supply.

The signal lever 1334 also carries a stud 1337 which, as it swings counterclockwise with the released signal lever 1334, will engage the forward arm of a lever 1339 carried by a shaft 1340 journaled at its ends in the plates 1001 and 1002. There are nine such shafts, one for each horizontal row of three printers, each carrying three levers 1339 one for each of the three printers in the horizontal row. On the leftward end portion of the shaft 1340, just inwardly of the plate 1001, a lever 1341 is secured. Each of the nine levers 1341 extend forwardly through slots in a vertical link 1342 which also has a slot embracing the forward end of the movable contact spring 1343 of a switch LPS. The movable contact of the switch LPS is normally closed against the lower fixed contact of the switch, but when a shaft 1340 is rocked clockwise by a signal lever 1334, the lever 1341 on said shaft elevates the link 1342 to transfer the movable contact of the switch LPS to the upper fixed contact thereof which, as will be explained later, will cause the lighting of the signal lamp PPD on the master machine keyboard and prevent further operation of the machine until the operator either operates the by-pass switch PLB or replenishes the depleted paper supply.

When the plate 1310 is swing forwardly for removal of the remaining paper of the depleted supply and substitution of a new supply roll 1308, a stud 1346 secured in the lever 1325 is engaged and arrested by an upward finger 1347 on the forward end of the link 1318 so that the lever 1325 is rocked counterclockwise on its pivot stud 1326 to such an extent that the stud 1330 in the lever 1325 engages a downward rearward finger of the signal lever 1334 and returns the latter to normal latched position relative to the latch pawl 1331. In the return of the plate 1310 to normal vertical position, the stud 1346 moves away from the finger 1347 permitting the lever to return to normal position with its stud 1328 engaging against the periphery of the newly inserted paper supply roll 1308.

Ink Ribbon Mechanism

Three ink ribbons 1355 (FIGS. 60, 68 and 76) one for each vertical column of nine printers, extend upwardly and downwardly between the platen roller 1167 and the the line of type wheels 1085 in each of the nine printers of that column, the supply spool 1356 (FIG. 60) of each ribbon being readily removably mounted on a shaft 1357, which is readily removably mounted in the forward bottom portions of the plates 1001 and 1002. The shaft 1357 has four flats formed on it 90° apart between four cylindrical surface portions of equal radius and of sufficient width to rotatably support the ribbon spools 1356 between spacing collars 1358 which are internally fitted to the shaft 1357 to rotate therewith. The right hand reduced cylindrical end of the shaft 1357 is journaled in the plate 1001 and the left hand reduced cylindrical portion of the shaft 1357 is journaled in a bearing bushing 1360 having a larger diameter portion abutting the hub of the ratchet 1365 pinned on the outer end of the shaft 1357, and a smaller diameter portion inserted from the outer side of the plate 1002 into the round portion of a keyhole slot in the forward bottom portion of said plate and normally held therein by a compression spring 1361 coiled about the shaft 1357 between the leftmost one of the spacing collars 1358 and a collar 1362 which is slidable on the shaft 1357. The collar 1362 bears against a further collar 1363 which has a running fit on the right end of the small diameter portion of the bushing 1360 and bears against the inner face of the plate 1002. The compression spring 1361 thus maintains the larger flange of the bushing 1360 frictionally pressed against the outer side of the plate 1002 to place a frictional drag on the ratchet 1365 and shaft 1357 sufficient to avoid need for a non-reverse pawl for the ratchet, and it also maintains all of the spacing collars 1358 frictionally engaged against the hubs of the ribbon spools 1356 to urge the pools with moderate torque to rotate with the shaft 1357 while still permitting the spools 1356 to be rotated counter to the shaft 1357 by upward pull on their ribbons.

The toothed periphery of the ratchet wheel 1365 is engaged by the ratchet tooth of a pawl 1366 (FIG. 62) pivoted on the upper arm of a lever 1367 and urged clockwise toward engagement with the ratchet wheels 1365 by a tension spring 1368 connected between a stud in the pawl 1366 and another stud secured in another arm of the lever 1367. The lever 1367 is rockably mounted on the left hand portion of the shaft 1357 and has a downward arm which is pivotally connected to the forward end of a link 1370. The link 1370 is pivotally connected at its rearward end to a stud 1371 in a downward arm of the lever 1260, so that in each operation of the multiple printer, the lever 1367 is first oscillated counterclockwise (clockwise in FIG. 62) prior to the printing stroke of the operated platen, and then clockwise after the printing stroke of the platen to impart an increment of clockwise rotation to the shaft 1357.

A rearward arm of the lever 1367 is pivotally connected to the lower end of a link 1375 which, at its upper end, carries a stud 1376 which is urged rearwardly by a tension spring 1377 into yielding engagement in one or the other of two notches 1378 formed in a forward portion of a plate 1379 rockably mounted on the left end of an upper ribbon shaft 1380.

The upper ribbon shaft 1380 has a reduced cylindrical rightward end portion journaled in the plate 1001 and a longer cylindrical reduced left end to which is secured a hub 1383 (FIG. 76) rotatably supported in the rounded bottom of a vertically open notch 1386 formed in the upper edge of the plate 1002. The hub 1383 and left end of the shaft 1380 are retained against upward movement by a plate 1387 spanning said notch 1386 and secured on opposite sides thereof to the plate 1002. The hub 1383 has two ratchet wheels 1384 and 1385 secured to it and formed with oppositely directed ratchet teeth. The hub of a third ratchet wheel 1390 is rotatably mounted on the shaft 1380 between the hub 1383 and an outwardly squared sleeve 1391 which is pinned to the shaft 1380 and has three outwardly rounded discs 1392 with square openings fitted to its squared outer surface. Between the discs 1392, between the leftmost disc 1392 and the ratchet wheel 1390, and between the rightmost disc 1392 and the hub of the rightmost one of the three upper ribbon spools 1400 pinned on the shaft 1380 are four discs 1393 having round central openings freely passing the squared sleeve 1391 but having radial projections 1394 engaging two squared studs 1395 secured and extending rightwardly from the ratchet wheel 1390 so as to prevent rotation of the discs 1393 relative to the ratchet wheel 1390. A compression spring 1396 coiled about the squared sleeve 1391 between the hub of the leftmost upper ribbon spool 1400 and the rightmost disc 1393 maintains all of the discs 1393 and 1392 frictionally engaged, each with its neighbors, to frictionally couple the shaft 1380 to the ratchet wheel 1390. The latter is always held against counterclockwise rotation by a pawl 1397 pivoted on a stud 1398 secured in the plate 1002 and urged clockwise by a tension spring 1399 to maintain its toothed end against the ratchet wheel 1390.

A ribbon feed pawl 1401 is pivotally mounted on a stud secured in the plate 1379 and urged clockwise by a tension spring 1402 connected between a stud in said pawl and another stud in the plate 1379 to urge a toothed arm of said pawl into engagement with the ratchet wheel 1384. A second ribbon feed pawl 1403 is pivotally mounted on another stud secured in the plate 1379 and urged counterclockwise by a tension spring 1404 to engage a toothed arm of said pawl with the ratchet wheel 1385. An arm 1405 integral with the retaining plate 1387 and extending therefrom leftwardly through the notch 1386 has a downward portion formed with forwardly and rearwardly extending arcuate arms 1406 so positioned that, when the stud 1376 in the upper end of the link 1375 is engaged in the lower end of the two notches 1378 of the plate 1379, a stud 1407 secured in and extending rightwardly from the toothed arm of the feed pawl 1403 will ride on the upper edge of the forward arm 1406 to hold the toothed arm of the pawl 1403 out of contact with the teeth of the ratchet 1385 during oscillation of the plate 1379 in both directions by the link 1375 to thereby hold the pawl 1403 inactive while the pawl 1401 is actively rotating the hub 1383 and upper ribbon shaft 1380. When the stud 1376 is engaged in the upper notch 1378 of the plate 1379, a stud 1408 extending rightwardly from the toothed arm of the pawl 1401 rides on the upper edge of the rearward arm 1406 to hold the pawl 1401 disengaged from the ratchet wheel 1384 while the feed pawl 1403 is actively rotating the hub 1383 and shaft 1380.

A pawl 1410 pivoted on a stud 1409 secured in the plate 1002 is urged clockwise by a spring 1411 to maintain a toothed arm of the pawl 1410 engaged against the lower rear portion of the ratchet wheel 1384 to prevent retrograde movement of the hub 1383 and shaft 1380 while the pawl 1401 is engaged and the pawl 1403 disengaged from the ratchet wheels 1384 and 1385.

The upper ends of the three ribbons 1355 are secured to the respective upper ribbon spools 1400 by being passed under rods 1413 which are then secured in longitudinal grooves in the ribbon spools by means of small screws 1414, but when the stud 1376 is engaged in the upper notch 1378 of the plate 1379 so that the pawl 1401 is disabled and the pawl 1403 enabled, an arcuate edge portion of enlarged radius of the plate 1379 moves over a roller 1412 supported on a stud in the pawl 1410 to hold the pawl 1410 disengaged from the ratchet wheel 1384.

The lower ratchet drive 1365, 1366 and 1367 always urges the lower ribbon shaft 1357 clockwise to tend to wind the three ribbons on the lower spools 1356. The frictional coupling between the lower spools 1356 and the shaft 1357 is sufficient to maintain all three ribbons uniformly taut between their upper and lower spools, but is insufficient to overcome the drag of the frictional coupling between the upper ribbon shaft 1380 and the ratchet 1390 which is held by its pawl 1397 against rotating with the upper ribbon spools during downward feed of the ribbons 1355. The unwinding rotation of the three upper spools 1400 necessary for downward feed of the three ribbons is effected positively by the feed pawl 1403 and ratchet wheel 1385. The positive rotation of the upper ribbon shaft 1380, by the pawl 1401 and ratchet 1384, in upward feed of the ribbon overcomes the frictional coupling of the lower ribbon spools with their shaft 1357. It will be seen that as the lower ribbon spools are individually frictionally coupled to the shaft 1357, all three ribbons will at all times be maintained taut between their upper and lower spools regardless of any inequalities in the dimensions of the ribbons.

When all of the ribbon has been unwound from one or more of the lower spools onto the corresponding upper spools, that ribbon, being securely fastened to the lower spool, will prevent further winding rotation of the upper ribbon shaft 1380. Then, the ratchet and pawl 1384 and 1401 will block clockwise oscillation of the plate 1379, so that the upward movement of the link 1375 forces the stud 1376 into the upper one of the notches 1378 in the plate 1379 to thereby disable the pawls 1410 and 1401 and enable the pawl 1403 to reverse the direction of ribbon feed.

When the supply of ribbon on the leftward one of the upper ribbon spools 1400 is depleted to a predetermined extent, the span of the left ribbon from its spool to and over the upper ribbon guide shaft 1418 supported in the side plates 1001 and 1002 engages the under side of a stud 1419 extending rightwardly from one arm of a yoke member 1420 pivotally mounted on said shaft 1418. The yoke member 1420 has a second arm (FIG. 77) connected by a tension spring 1421 to a pawl 1422 also pivotally mounted on the shaft 1418 and normally held by gravity against the upper side of a stud 1423 secured in the plate 1002. Further unwinding of the left one of the ribbons 1355 from its upper spool causes the ribbon to lift the stud 1419 and elevate the forward end of the pawl 1422 until a lateral lug on the upper forward end of the pawl 1422 bears against the periphery of a notched disc 1425 secured on the hub 1383. When the lug on the pawl 1422 engages in the notch on the disc 1425, it arrests further counterclockwise movement of the hub and the ratchet 1385 so that the pawl 1403 then blocks counterclockwise oscillation of the plate 1379. Downward movement of the link 1375 then forces the stud 1376 again into the lower one of the notches 1378 in the plate 1379 to again reverse the direction of feed of the ribbons.

As the working load of the multiple tape printer mechanisms on its drive motor TPM varies very considerably during the cycle of operation of the unit, it has been found desirable to smooth the load on the motor by means of a cam 1430 (FIGS. 61A and 67) which is secured on the shaft 1080 and has an irregularly curved edge which is constantly engaged by a roller 1431 carried by a lever 1432 which is pivotally mounted at its lower end on a cross rod 1433 secured in the plates 1001 and 1002. A stud 1434 secured in and passing through an intermediate portion of the lever 1432 is connected to the rear ends of the two heavy tension springs 1435 which are anchored at their forward end on the shaft 1107. The springs 1435, by aiding the motor as the roller 1431 rides on declines of the cam 1430 and again adding to the load on the motor as the roller 1431 rides inclines of the cam, substantially smooths the overall load on the motor throughout the multiple tape printer cycle and especially eases the starting load to permit desired rapid starts.

A further cam 1440, coupled with the cam 1430 and secured on the same hub on the shaft 1080, is constantly engaged by the roller 1441 of the operating member of a switch MPI, the function of which will be explained later.

The multiple tape printer unit 103 is enclosed in a casing (FIG. 1) including a front panel 1451 having a rectangular opening which is substantially closed by the plates 1310 of the three columns of printers. The spaces between adjacent columns of plates 1310 and between the left-hand column of plates 1310 and the adjacent edge of the panel 1451 are substantially closed by strips 1452. Spring metal clip 1453 (FIG. 60A) secured to the rear faces of the strips 1452 are snapped about the spacing collars 1311 on some of the rods 1312 to support the strips 1452 substantially flush with the plates 1310. Each strip 1452 bears a series of numerals, each located adjacent and identifying the tape printer at the right thereof.

DOCUMENT SORTER UNIT

The structure of the sorter unit is illustrated in FIGS. 78 to 110, inclusive.

Frame and Casing

The sorting machine frame as shown in FIG. 78 comprises a rectangular base frame formed of right and left side members 1501 and 1502 and front and rear end members 1503 and 1504 and a rectangular top frame composed of right and left side members 1505 and 1506 joined to front and rear end members 1507 and 1508. The top and bottom frames are joined on the right side by four upright frame members 1509 and on the left side by four upright frame members 1510. All of the frame members 1501 to 1510 are preferably L-angle members secured together in any suitable manner, and the members of the lower frame may be braced by corner plates 1511. The bottom frame 1501–1504 extends rearwardly beyond the rear end of the top frame 1505–1508 and the bottom edges of upright right and left side plates 1513 and 1514 are secured to the rear portions of the right and left side of bottom frame members 1501 and 1502, respectively. The front edges of the side plates 1513 and 1514 are secured to the rearmost upright members 1509 and 1510, respectively. Upright angle members 1515 and 1516 are secured at their lower ends to the right and left rear corners of the bottom frame and are also secured against the inward surfaces of the plates 1513 and 1514, respectively, along the rear edges of those plates. At their upper portions the side plates 1513 and 1514 are also connected together by a pair of cross bars 1517 and by another transverse member 1518 of inverted channel section. The bottom frame side members 1501 and 1502 are also connected together by three horizontal transverse plates 1520.

On the right side of the frame, three vertical plates 1521 are secured at their upper and lower ends to the top and bottom frame members 1505 and 1501, respectively, and are secured also to respective ones of the upright members 1509 on the outer sides thereof. At the left side of the frame, three similar plates 1522 are similarly secured to the frame members 1502, 1506 and 1510.

On the right side of the frame immediately below the top frame member 1505, an upper side plate 1523 is connected to the upper portions of each of the plates 1521 and is also connected at its rearward end to the side plate 1513. At the left side of the machine a plate 1524 similar to the plate 1523 is similarly mounted on the upper portions of the plates 1522 and connected at its rear end to the plate 1514.

Each of the pairs of uprights 1509 and 1510 supports the opposite ends of a respective one of four transverse channel members 1525. A front vertically extending member 1526 is secured at its upper end to the rear side of the front transverse channel member 1525 and is formed at the opposite sides of its lower portion with forwardly and outwardly bent flange portions which are secured to the inner side of the upright flange of the front bottom frame member 1503. Two further vertical members 1526 are similarly secured at their upper ends to the next two transverse channel members 1525 and at their lower ends to upright flanges on the forward edges of the foremost two plates 1520.

On the right side of the frame three vertical members 1529 parallel to the foremost three uprights 1509 are secured by screws to a series of threaded bushings 1528 which are secured in the plates 1521. Each of these three members 1529 has an outwardly turned flange to which is secured one leaf of a piano hinge 1530, the other leaf of which is divided into a number of sections, alternate ones of which are secured respectively to the inner face of one side of a metal door frame 1531 and to the outer side of an upright plate 1532. Outward swinging movement of the plate 1532 is normally prevented by a plurality of screws 1533 passing through the plate 1532 and into bushings 1534 secured in the plate 1521. The plate 1532 normally conceals certain mechanical elements hereinafter described, but after opening the door 1531 and removal of the screws 1533, the plate 1532 may be swung outward to permit access to such elements for mechanical servicing. The same hinge 1530 thus serves to mount both the plate 1532 and the door 1531 for opening and closing movement of the door independently of movement of the plate 1532. Each metal door frame plate 1531 has a large aperture closed by a transparent plastic window plate 1535.

Each of the three doors 1531 on the right side of the sorter unit is yieldingly releasably retained in closed position by a plate 1536 secured to the rear edge of the door frame and supporting a door handle or knob 1537 (FIG. 86) and having an inwardly turned and apertured flange positioned to cooperate with a yielding detent 1538 carried on a bracket 1539 secured to the inwardly turned flange of the next rearward member 1509.

The left side of the sorter unit may be provided with three similarly mounted doors directly opposite the three doors on the right side or may be completely closed by a single casing member.

Apart from the doors 1531, the sorter unit is enclosed by a multiple panel casing as shown in FIGURE 1, comprising a top cover member 1540 spaced upwardly from and removably secured to the top frame member 1505–1508 by screws passing through the panel 1540 through spacing collars and into the horizontal flanges of said frames. The casing also comprises a front panel 1541 (FIG. 1), and a rear panel 1542 (FIG. 80), both provided on their inner sides adjacent their lateral edges with hooks 1543 (FIG. 80) engageable over studs 1544 supported on brackets secured to the upright members 1509 and 1510 at the front or to the upright members 1515 and 1516 at the rear. On the right side of the sorter unit, the space between the top edges of the doors 1531 and the edge of the top panel 1540 is enclosed by a further panel member 1545 (FIG. 94) removably secured to the frame, and if the doors are provided on the left side of the machine, a similar casing panel member may be provided above the latter doors. The upper rear portion of the sorter unit is enclosed by a rear top casing member 1546 (FIG. 1) extending across and above the upper ends of the frame plates 1513 and 1514 and provided with a suitable slot to accommodate a document inserting chute which will be described more particularly hereinafter.

An upright plate 1547 (FIGS. 80 and 95) extending transversely between the frame plates 1513 and 1514 and secured to the rearward portion of each of the latter by screws passing through forwardly turned lugs on the lateral edges of said plate supports a number of relays, resistors and other circuit elements as described more particularly hereinafter.

Power Drive

The sorter is driven by an electric motor SM (FIG. 80), the base member 1550 of which is secured to a transverse plate 1551 having at each end a pair of upstanding straps 1552 secured to the respective one of the plates 1513 and 1514 by screws 1553 passing through vertically elongated slots and in the plate 1513 or 1514 and threaded into said straps. The motor shaft 1555 extends rightwardly through a vertically elongated opening 1556 in the plate 1513 and has secured thereto, outwardly of the plate 1513, a pulley 1557. A belt 1558 passes around the pulley 157 and around the smaller diameter portion of a double pulley 1559 which is freely rotatably mounted on the rightward end of a shaft 1560 which passes freely through an opening in the plate 1513. The shaft 1560 is journaled near its rightward end in a bearing 1561 (FIG. 87) mounted in a bracket 1562 supported on the inner side of the plate 1513 and in spaced relation thereto by posts 1563. The leftward end portion of the shaft 1560 extends through and is journaled in a bearing (not shown) mounted in the left side plate 1514.

A belt 1565 passing around the larger diameter portion of the pulley 1559 also passes around a pulley 1566 secured on the outer end of a short shaft 1567 which is journaled in a bearing in the plate 1513 and in a second bearing mounted on a bracket 1568 mounted on the transverse frame member 1518 a short distance from the plate 1513. A small pulley 1570 is secured on the shaft 1567 adjacent the bracket 1568. A belt 1571 passes around the pulley 1570 and around the large pulley 1572 secured on the rightward end of a tubular shaft 1573 which is journaled in bearings in forwardly and downwardly extending portions of a pair of upper side plates 1575 and 1576 (FIG. 81) of the frame of an endorser unit described in detail hereinafter, the plates 1575 and 1576 being secured to the transverse frame member 1518 and to the front one of the two cross bars 1517. The left end of the hollow shaft 1573 extends through and is journaled in a bearing mounted in the left side plate 1514.

The belts 1558 and 1571 are of the toothed variety such as those which are known as "Timing" belts and the pulleys 1557, 1570 and 1572 and the smaller diameter portion of the pulley 1559 are toothed complementarily to the belts 1558 and 1571. The pulley 1566 and the larger diameter portion of the pulley 1559 are non-toothed and the belt 1565 is of the common flat, smooth variety and is normally maintained under tension by an idler roller 1580 mounted on a bracket 1581 which is adjustably mounted on a rear downward arm of a three-armed lever 1582 pivotally mounted on a shouldered screw stud 1583 secured in and extending rightwardly from the plate 1513. A tension spring 1584 anchored at its rearward end on a stud secured in the plate 1513 is connected at its forward end to a stud secured in the upper arm of the lever 1582 so as normally to press the idler roll 1580 against the belt 1565 to maintain the latter under drive tension around the pulleys 1566 and 1559. A forward arm of the lever 1582 pivotally supports a brake shoe 1586 which is normally spaced slightly away from the pulley 1566.

The stem of a manipulative key 1588 is slidably mounted on studs 1589 secured in the outer face of the plate 1513 and extending through longitudinal slots in the stem of the key. A tension spring 1590 connected at its lower end to a stud secured in the key stem and at its upper end to one of the studs 1589 normally maintains the key in elevated position. A roller 1591 mounted on a stud secured in the forward end of the forward arm of the lever 1582 is located under the lower end of the stem of the key 1588 so that by depression of the key 1588 the lever 1582 will be rocked counterclockwise against the tension of the spring 1584 to press the brake shoe 1586 against the pulley 1566 to arrest the latter as the idler roller 1580 slackens the belt 1565 to permit the latter to slip on the pulleys 1566 and 1559 for a purpose which will be described fully hereinafter.

The power circuit of the motor SM, as will be explained more fully hereinafter, is normally closed continuously while the sorter is in use so that the motor and the pulley 1559 are continuously running and the shafts 1567 and 1573 also run continuously except while the key 1558 is held depressed.

Document Insertion

A document insertion chute is provided between a pair of formed plates 1600 and 1601 (FIGS. 81 and 82), which as shown in FIG. 82, are secured together by securing elements passing through forwardly bent lateral flanges of both plates. Rearwardly bent portions of lateral lugs of the rear plate 1601 are secured to the plates 1513 and 1514 by screws (not shown) passing through said lugs and threaded into said plates. The central lower portions of both plates 1600 and 1601 are formed with rectangular cut-outs sufficiently large to accommodate a printing plate 1605 (FIGS. 81 and 84), a line of printing type wheels 1606, and a printing platen 1607 of an endorsing mechanism described in detail hereinafter. The platen 1607 consists of a plate of resilient material and is mounted on the rear face of a block 1609 which is supported on the transverse frame member 1508 so that the rear face of the platen 1607 is slightly forward of the plane of the rear surface of the plate 1601. The printing plate 1605 and type wheels 1606 are normally retracted rearwardly of the plate 1600.

On opposite sides of the opening for the printing elements, the plate 1600 is formed with small apertures to accommodate the rearward portions of respective ones of two smooth surfaced narrow metal friction feed rollers 1610 and 1611, both secured on a shaft 1612, the opposite ends of which are retained in and rotatably supported by small brackets 1613 mounted on the transverse frame member 1508. A pulley 1615 secured on the shaft 1612 near its leftward end is driven by a tensioned coiled spring belt 1616 which also runs around a pulley 1617 (FIG. 81) secured on the hollow shaft 1573 near the inner face of the left frame plate 1514 so that the shaft 1612 and rollers 1610 and 1611 are normally continuously driven in the direction of the arrows in FIGS. 81 and 82.

Opposite the rollers 1610 and 1611, the rear plate 1601 of the document chute is formed with small apertures to accommodate small pressure rollers 1620, each of which is rotatably mounted on a stud secured in a bell crank 1621 which is pivotally mounted on a stud carried by a small angle bracket 1622 secured to the plate 1601 on the rear side thereof. Each of two tension springs 1623 is connected at its upper end to a stud in the rearward arm of a respective one of the bell cranks 1621 and at its lower end to a stud secured in a rearward projection of the associated bracket 1622 and normally holds the respective one of the rollers 1620 pressed forwardly against the adjacent feed roller 1610 or 1611.

When a document such as a check is dropped into the chute between the plates 1600 and 1601 it falls into the bight of each of the pairs of rolls 1610, 1611 and 1620 and is rapidly fed downwardly by the constantly driven rollers 1610 and 1611 until the lower edge of the check rests on a stop member 1624 (FIG. 82) adjacent the roller edge of the chute. When the feed of the document is thus arrested by the stop member 1624 the rollers 1610 and 1611 slip on the document because of the smooth document engaging peripheries of those rollers. The inserted document is thus held in position in the chute until, as hereinafter described in detail, it is either released from the stop 1624 at a predetermined time in a sorting operation cycle or ejected prior to that time.

*Document Ejecting Means*

It may happen now and then that an operator, after having dropped a check or other document into the chute, will wish to re-examine it before it is sorted. When the check is resting on the stop member 1624, the operator is unable to grasp it by inserting the fingers into the chute. However, it is only necessary to depress the document ejecting key 1588 (FIG. 80) to cause the check to be returned upwardly in the chute to a position where the operator may easily grasp it between the fingers and remove it from the chute for re-examination.

A flywheel 1625 is secured on the shaft 1612 just inwardly of the pulley 1615. Inwardly of the flywheel a hub 1626 is secured on the shaft 1612, said hub having a portion of reduced diameter about which a coil spring 1627 is wound. The coils of the spring 1627 are of sufficiently small diameter so that they exert some pressure radially against the hub 1626. One end of the coil spring extends tangentially so that as the shaft 1612 rotates, such end of the spring normally bears against the upper one of two stop members 1628, both secured to the transverse frame member 1508. The direction in which the spring 1627 is wound about the hub 1626 is such that the normal rotation of the hub 1626, while the projecting end of the spring is stopped by the upper stop member 1628, tends to expand the coils of the spring so that the spring slips on the hub as the latter rotates.

When the document ejecting key is depressed the brake 1586 (FIG. 80) will arrest the pulley 1566 and thus also arrest the shafts 1567 and 1573 together with the pulley 1572 and the pulley 1617 (FIG. 81) on the latter shaft. However, the inertia of the shaft 1612 and the parts secured thereto and rotating therewith, and particularly the inertia of the flywheel 1625, will cause the shaft 1612 to rotate a revolution or so further and reverse the relative tensions in the two spans of the coiled spring belt 1616 so that the forward span is considerably stretched and the rearward span is permitted to contract to a substantial extent. When the shaft 1612 and pulley 1615 and the feed rollers 1610 and 1611 come to rest, the tension which has been produced in the forward span of the spring 1616 in bringing the shaft 1612 to rest then reverses the shaft and drives it in the direction reverse to that of the arrows in FIGS. 81 and 82 until, after one-half revolution of the shaft 1612 in the reverse direction, the projecting end of the spring 1627 encounters the lower stop member 1628 which causes the spring 1627 to be tightened about the hub 1626 and arrest shaft 1612, together with the feed rollers 1610 and 1611 thereon. The one-half rotation of the feed rollers 1610 and 1611 in the reverse direction is adequate to lift the document sufficiently high in the chute to permit the operator to easily grasp it between the fingers and remove it from the chute.

Unless the document ejecting key 1588 is depressed, the inserted document will remain in the chute resting upon the stop 1624 until a sorting operation cycle has been initiated and has proceeded to a predetermined point. A sorting operation cycle can be initiated only while a document is present in the chute ready for sorting. Except when conditioned for a non-sort operation, the cycling control circuit, as hereinafter described in detail, is controlled in part by a pair of switches DDS (FIGS. 81 and 82), each mounted on a respective one of two brackets 1632 (one shown in FIG. 81), each secured to the outward face of a respective one of the endorser frame side plates 1575 and 1576. Each switch DDS has a forwardly extending operating arm 1633 on the forward end of which an arm extension 1634 is forwardly and rearwardly slidably mounted. On the forward part of each extension member 1634 there is secured a finger 1635 which extends across the chute through the large central cut-outs in the lower portions of the chute plates 1600 and 1601 adjacent one or the other side of such opening and normally in such position relative to the document stop member 1624, that as a document is moved by the rollers 1610 and 1611 into engagement with the stop 1624, the lower edge of the document will also engage and depress both document feeler fingers 1635 and likewise depress both extensions 1634 and both operating arms 1633 to operate both switches DDS to closed condition. It may be mentioned here that as the two switches DDS are connected in series in the cycling control circuit, a document in the chute must be properly positioned to close both switches before a sorting cycle can be initiated.

*Endorsing Means*

When a sorting cycle is initiated, the inserted document is not immediately fed from the chute 1600, 1601, but is retained therein for a brief but sufficient time to permit an endorsing means to be operated to print a partial or a full endorsement on the back of the document while the latter is still in the chute and in back of the platen plate 1607. The endorsing mechanism is best shown in FIG. 84. One of its two printing devices comprises a line of type wheels 1606 which is operated to print the date and a number when either a full or a partial endorsement is effected and the second printing device comprises the printing plate 1605 which is operated to print non-varying matter including the bank's name and clearing house number and a statement of endorsement when a full endorsement is effected. A shaft 1639 extending through and supporting the line of type wheels 1606 is mounted at its ends in the upper ends of a pair of arms 1640 which at their lower ends are secured to the opposite ends of a sleeve 1641 rotatably mounted on a short shaft 1642 which in turn is rotatably mounted at its ends in the two side plates 1575 and 1576. The type wheels 1606 and the arms 1640 supporting them are normally held in retracted position by a tension spring 1643 connected to a stud secured in the left-hand arm 1640 and to a stud secured in the plate 1576. The left-hand arm 1640 has a downward extension carrying roller stud 1644 which is engageable by an actuating cam 1658, as hereinafter described, for impelling the type wheels 1606 toward the platen.

The second printing device consisting of the plate 1605 for printing the bank's name, clearing house number and statement of endorsement is adjustably mounted by means of four screws 1645 near its four corners on the member 1646 extending across and secured to the upper ends of two arms 1647, each rigidly secured on an individual bushing 1648 pinned on the shaft 1642. The plate 1605 is normally held in a retracted condition by a spring 1650 connected between a pin secured in the right hand arm 1647 and a second pin secured in the plate 1575. A sleeve 1652 formed of a suitable elastomer surrounds a metal rod 1653 (FIG. 81) which is secured at its ends in the frame plates 1575 and 1576 and provides a resilient stop against which the arms 1640 and 1647 are normally held by the springs 1643 and 1650. The right hand arm 1647 has a downward extension carrying a lower stud 1655 which is engageable by another cam 1659 for impelling the plate 1605 toward the platen 1607.

The cam 1658 for operating the printing wheels 1606 and the cam 1659 for operating the printing plate 1605 are each operable by a separate clutch mounted on and driven by the constantly running hollow shaft 1573, both clutches being constructed as illustrated in FIG. 88. The printer operating cam 1658 or 1659, as the case may be, is secured upon the rightward end of a sleeve 1660 against an annular shoulder thereon and in fixed angular relation thereto. The sleeve 1660 is rotatably supported by an anti-friction bearing 1661 upon the extended hub of a small drum 1662 which is secured on the hollow shaft 1573 for rotation therewith. A coil spring 1663 is coiled about the drum 1662 and has one end bent in the axial direction to engage in one of a series of apertures 1664 in the inner portion of an annular radial flange 1665 secured on the leftward end portion of the sleeve 1660, as by welding. The other end of the coil spring 1663 is bent outwardly for engagement against one end edge of a half-annular axially extending flange portion 1666 of the flange member 1665. The parts are retained in assembled relation by means of a split spring retaining ring 1668 which is snapped into a groove in the leftward end of the hub of the drum 1662. The parts are so-dimensioned and the spring 1663 is wound in such direction and with its coils of such diameter that the spring tends to move its radially bent end away from the end of the axial flange 1666 and coil itself about the drum 1682 sufficiently tightly to effect driving engagement with the drum 1662 and thus drive the sleeve 1660 and the cam 1658 or 1659 for operating the respective printing device, the rotation of the shaft 1573 and drum 1662 being in the direction to aid such tightening of the coils of the spring. However, the radially bent end of the spring 1663 extends sufficiently radially beyond the flange 1666 so that it is normally engaged by the laterally turned forward end of a respective one of two clutch control levers 1670 pivotally mounted on a stud 1671 secured in and extending leftwardly from the adjacent one of a pair of lower side plates 1672 and 1673 (FIGS. 81 and 84) of the endorsing mechanism. The plates 1672 and 1673 are formed at the rear portions of their upper edges with laterally turned lugs which are secured to the underside of the transverse frame member 1518, there being one such control lever for each of the two clutches. When the radially extending end of the spring 1663 is so engaged and arrested by the control lever 1670, one end edge of the flange 1666 is also moved against the end of the control lever by momentum, said edge of the flange 1666 being notched to accommodate the radially bent portion of the spring. As the one end edge of the flange 1666 engages the end of the control lever 1670, the end of a non-return pawl 1682 moves into position behind the other end edge of the flange 1666 to prevent retrograde rotation of the sleeve 1660 by the spring 1663 and re-tightening of the coils of the latter about the drum 1662. Each non-return pawl 1682 is pivotally mounted at its rearward end on a stud 1683 secured in the plate 1672 or 1673 and is yieldingly urged to effective position by a tension spring 1684 connected between a stud secured in the pawl and a stud 1685 which is secured in the plate 1672 or 1673 and serves as a limit stop to prevent the edge of the pawl from making wearing engagement with the coils of the spring 1663.

The control lever 1670 is yieldingly urged upwardly out of the path of the radial end of the spring 1663 by a tension spring 1686 connected between a stud in the rearward arm of the control lever and a stud secured in the plate 1672 or 1673, but is normally retained in effective position to engage the radial end of the spring 1663 and thereby uncouple the clutch by means of a latch bell crank 1688 pivotally mounted on a stud 1689 secured in the plate 1672 or 1673. A tension spring 1690 connected between a stud and the latch bell crank 1688 and a stud 1691 secured in the plate 1672 or 1673 normally yieldingly holds the latch bell crank in a limit position in which its upper arm engages against the stud 1691 and is located under a roller stud 1692 mounted on the rearward arm of the control lever 1670. The rearward arm of the latch bell crank 1688 is pivotally connected to the upper end of a link 1693 which in turn is pivotally connected to one end of the plunger of a respective one of two solenoids ECA and ECB by means of which the two endorsement printing clutches may be individually controlled.

It will be apparent that when the solenoid ECA or ECB is energized, the latch bell crank 1688 for the respective clutch will be rocked to disengage it from the roller stud 1692 and permit the spring 1686 to rock the control lever 1670 out of engagement with the flange 1666 and out of engagement with the radial end of the spring 1663 which thereupon will tighten itself about the drum 1662 and drive the sleeve member 1660 and the cam 1658 or 1659, as the case may be. During the rotation of the cam the rise thereof acts on the roller 1644 or 1655, as the case may be, to enable the respective printing device 1606 or 1605 toward the platen. The rise of the cam is of insufficient height to positively drive the printing device into engagement with the platen 1607 but nevertheless sufficient momentum is imparted to the printing device so that the movement of the printing device toward the platen continues after the roller 1644 or 1655 has moved away from the cam 1658 or 1659 until the printing device strikes against the platen with sufficient impact to effect the desired printing impression. The printing stroke of the printing device is effected in the first half of a rotation of the clutch sleeve 1660. As the clutch sleeve 1660 continues to rotate a rise of a second cam 1698 secured to said sleeve acts on a roller stud 1699 mounted on a downward third arm of the control lever 1670 to rock the control lever back to its normal clutch-uncoupling position and thereby elevate the roller stud 1692 sufficiently to permit the latch bell crank 1688 to be returned to latching position by its spring 1690. The energization of the solenoid ECA or ECB is terminated prior to the time the clutch has rotated sufficiently to restore the control lever 1670 to normal position, and permits the spring 1690 to restore the latch pawl 1688 in time for relatching of the control lever 1670 in its normal position.

*Ink Ribbon Mechanism*

The ink ribbon mechanism is assembled on a base frame 1720 (FIGS. 81 and 85) mounted on the two frame cross bars 1517, said plate having a transversely extending central portion rearward of the pairs of arms 1640 and 1647 carrying the printing devices 1606 and 1605, and two side portions extending forwardly on either side of said pairs of arms. On each of the side portions of the plate 1720, the lower end of a respective one of two upstanding ribbon spool shafts 1721 is secured. Rotatable about each shaft 1721 is a ribbon feed ratchet wheel 1722 having secured to its upper face an inverted U-formed metal strip 1723, the transverse central portion of which is apertured to pass the shaft 1721 and is formed with an upwardly turned lug 1724 (FIG. 81) for engagement in an aperture in the lower end of a ribbon spool 1725 so that the ribbon spool may be rotated by the ratchet wheel.

Rotation of the ribbon spool 1725 and ratchet wheel 1722 about the shaft 1721 is yieldingly resisted by a friction brake device comprising a tension spring 1726 connected at its opposite ends, adjacent one side leg of the U-shaped member 1723, to one end of each of two brake arms 1727, each of which is pivotally supported at its other end in an aperture in the opposite side leg of the member 1723 whereby the central portions of the brake arms 1727 are pressed into frictional engagement with the stationary shaft 1721 by the tension of the spring 1726.

From the ribbon spools 1725, the ink ribbon 1730 extends first around ribbon tensioning guide posts 1731, each mounted at its lower end on one end of a ribbon tensioning lever 1732 which is pivotally mounted on a shouldered screw 1733 secured in the upper side of a small plate 1734 mounted on the upper ends of two posts 1735 extending upwardly from the forward end of a side portion of the base plate 1720. A tension spring 1736 connected between a stud in the plate 1734 and a stud in the lever 1732 urges the latter to move the ribbon tensioning guide post 1731 to a rearward limit as shown in FIGURE 85. There are two such ribbon tensioning assemblies, one adjacent each ribbon spool on each side portion of the plate 1720.

From the tensioning guide posts 1731 the ribbon 1730 extends forwardly around and between a pair of fixed guide posts 1738, each mounted at its lower end and extending upwardly from a forward inward corner portion of a respective one of the two plates 1734. The stretch of ribbon between the guide post 1738 extends across the central opening in the rear chute plate 1601 rearwardly of the platen 1607 and sufficiently rearwardly of the plate 1601 so as normally not to contact a document inserted in the chute except when driven against the document by one or both printing devices for inking the printing impression.

The ribbon feed is effected by a pair of ratchet pawls 1740, each formed at its forward end with a ratchet tooth to engage a respective one of the ratchet wheels 1722 and each pivotally supported at its rearward end on a stud in a respective one or two rearward arms of a three-armed lever 1742 pivotally mounted on a shouldered screw stud 1743 secured in the upper side of the central portion of the base plate 1720. The drive pawls 1740 extend a short distance rearward of their pivotable connections of the rearward arms of the lever 1742 and are connected by a tension spring 1741 which normally urges the forward portions of the pawls outwardly against guide studs 1739 secured in the base plate 1720.

The forward end of the forward arm of the lever 1742 is formed with two notches which are separated by an intervening projection with sloping sides and are adapted to receive a stud 1745 secured in and extending downwardly from the forward end of a small slide 1746. The latter is formed with a forwardly and rearwardly elongated slot through which the screw stud 1743 extends, whereby the slide 1746 may slide forwardly and rearwardly on the upper face of the lever 1742 as well as oscillate laterally about the stud 1743. A tension spring 1748 connected between a stud in the rear central portion of the base plate 1720 and a stud on the rear end of the slide 1746 normally holds the slide 1746 rearwardly with the stud 1745 seated in one of the other of the two notches in the forward arm of the lever 1742.

The stud 1745 extends below the lever 1742 through a clearance aperture into a slot in the end of the forward arm of the bell crank 1750 which is pivoted on the lower end of the stud 1743 on the underside of the base plate 1720. The end of the laterally extending arm of the bell crank lever 1750 engages in the forked upper end of an arm 1751 secured on the inward end of a short shaft 1752 rotatably supported by a pair of brackets 1753 secured against the underside of the plate 1720. The rightward outward end of the shaft 1752 is secured there on an arm 1755 which is pivotally connected at its lower end to one end of a link 1756 which at its downward forward end is pivotally connected to a crank stud 1757 carried by a small crank 1758, secured on the rightward end of a shaft 1759 which extends through the interior of the hollow shaft 1573 beyond the leftward end thereof and through the right side frame plate 1514.

Immediately outward of the left end of the hollow shaft 1573 a disk 1765 is secured on the end of the shaft 1759. A three-armed clutch pawl 1766 is pivotally mounted adjacent the inward side of the disk 1765 upon a stud secured in the latter. A tension spring 1767 connected between a stud on the inner side of the disk 1765 and a stud secured in the pawl 1766 urges the pawl in a direction to engage a clutch tooth on one arm thereof with a toothed clutch disk 1768 secured on the leftward end of the constantly driven shaft 1573. However, a second arm on the clutch pawl 1766 normally engages the free end of the pivoted armature 1770 of an electromagnet RFM mounted on a bracket 1772 secured to the outer face of the left side plate 1514. Normally also a stud 1775 secured to the outer face of the disk 1765 is engaged above the end of the upward arm of a latch bell crank 1776 pivotally mounted on a stud 1777 secured in the bracket 1772. The latch bell crank is normally held in latching position against the limit stud 1778 by a tension spring 1179 connected with a stud secured in the latch bell crank and with a stud secured in the bracket 1772. The latch bell crank 1776 holds the disk and thus also a pivot mounting stud of the clutch pawl 1766 against retrograde rotation. The armature 1770 of the electromagnet RFM holds the clutch pawl 1766 rocked to an uncoupled position against a limit stud 1780 secured in the disk 1765.

A return spring 1782 anchored on the frame of the electromagnet RFM normally holds the armature 1770 in its clutch uncoupling position but upon energization of the electromagnet the armature 1770 is pulled up to release the clutch pawl 1766 to engage its clutch to the bottom teeth of the clutch members 1768 to thereby drive the shaft 1759. As the electromagnet RFM is again de-energized, the spring 1782 will return the armature 1770 to a normal position in the path of the clutch pawl 1766 so that at the end of a revolution of the shaft 1759, the clutch pawl will be rocked to disengage it from the toothed clutch member 1768, whereupon the spring 1779 will snap the upper arm of the bell crank 1776 under the stud 1775 again to prevent retrograde rotation of the shaft 1759 and disk 1765 and prevent reengagement of the clutch pawl 1766 with the teeth of the member 1768.

The rotation of the shaft 1759 and crank 1758 will oscillate the link 1756, arm 1755, shaft 1752, arm 1751 and bell crank 1750 to oscillate the stud 1745 and with it the three-armed lever 1742. The ribbon feed pawls 1740 are of such length and shape and are so-guided by the studs 1739 that, in each oscillation of the lever 1742, first clockwise from the position of FIGURE 85 and then counterclockwise back to that position while the stud 1745 is seated in the right hand notch in the forward arm of the lever 1742 as shown in FIGURE 85, the right hand pawl 1740 will effectively act on the ratchet disk 1722 of the right hand ribbon spool to drive it counterclockwise one step while the left hand pawl 1740 reciprocates first rearwardly away from and then forwardly again into engagement with the left hand ratchet disk 1722.

When all of the ribbon has been unwound from the left hand spool 1725, further feed of the ribbon in the same direction is prevented by the securement of the end of the ribbon to the spool. Consequently, further counterclockwise rotation of the right hand ratchet disk 1722 is resisted by the ribbon and as the bell crank 1750 is again rocked clockwise, it will shift the stud 1745 from the right hand notch in the lever 1742 over the intervening projection and into the left hand notch in the lever 1742 so that, as the bell crank 1750 is returned counterclockwise to its normal position shown in FIGURE 85, the lever 1742 will likewise be rocked counterclockwise to advance the left hand ribbon feed pawl 1740 into effective driving relation to the left hand ratchet wheel 1722 and retract the right hand pawl 1740 to an idling position. After the ribbon 1730 has been rewound on the left hand spool and entirely unwound from the right hand spool the resistance to further rotation to the left hand ratchet 1722 will similarly bring about a shift of the stud 1745 from the left hand to the right hand notch of the lever 1742 during the counterclockwise stroke of a further oscillation of the bell crank 1750.

The ribbon feed magnet RFM, as explained hereinafter, is energized at a time sufficiently later than the time at which one or both of the endorsement printing solenoids ECA and ECB may be energized that the ribbon remains stationary until after the printing devices, if they are operated, have completed their printing strokes and have been retracted from the platen.

*Releasing Document From Insertion Chute to Sorting Conveyor*

At a time in the sorting cycle shortly after the time at which the endorsement printing devices may be operated, the document in the insertion chute is released from the stop member 1624 by means which is best illustrated in FIGURES 82 and 83.

The stop device 1624 comprises a transversely extending strip 1780 (FIG. 83) having at each end a short upwardly extension secured to a respective one of two hubs 1781 having outer ends of reduced diameter rotatably supported in the upper ends of upward arms of two brackets 1782 secured respectively to the plates 1575 and 1576 (FIG. 81). Intermediate its ends the strip 1780 has on its upper edge three forwardly bent projections 1783, the central one of which is of considerable width whereas the other two are relatively narrow. The projections 1783 normally extend across the lower end of the document chute to engage and arrest the lower edge of the inserted document. A flat plate 1784 of the same width as the central projection 1783 is secured to the rear face of the strip 1780 behind the central projection 1783 and extends substantially above the rear edge of that projection. Two smaller pieces 1785 secured to the rear face of the strip 1780 behind the outer two projections 1783 are bent first forwardly in engagement with the rear portions of the upper faces of the latter projections 1783 and then upwardly from approximately the centers of the latter projections 1783. The upwardly bent portions of the forward pieces 1785 are normally only slightly rearward of the lower ends of two small guide strips 1786 secured to the rear face of the rear chute plate 1601 on opposite sides of the central aperture therein and extending downwardly below the lower edge of the plate 1601. The upper edge of the plate 1784 is somewhat rearward of the upper edges of the pieces 1785 so that it will not engage the lower edge of a document being inserted in the chute even though the lower edge of the document may extend substantially rearwardly of the rear plate 1601 of the chute because of the document having become bent or crumpled in handling prior to insertion in the chute.

Adjacent the inner end of the rightward hub 1781, the strip 1780 has a short rearwardly bent arm 1789 which is pivotally connected to the upper end of a link 1787 which is pivotally connected at its lower end to the rearward arm of a bell crank 1788 mounted on the rightward end of a shaft 1790 rotatably supported in forward extensions of the plates 1575 and 1576. The upper arm of the bell crank 1788 carries a stud 1791 engaged in the slotted upper end of an arm 1792 which is secured at its lower end on a shaft 1793 rotatably supported in forward arms of the brackets 1782. An arm 1795 is secured at its rear end on the rightward end of the shaft 1793 and is pivotally connected at its forward end to the plunger of a solenoid DRS. A tension spring 1797 connected between a stud in the arm 1795 and a stud secured in the plate 1513 normally holds the forward end of the arm 1795 in an upward position against a limit stud secured in the plate 1513 and thereby also maintains the stop device 1624 in the normal position illustrated in FIGURE 82.

When the solenoid DRS is energized, it pulls its plunger downwardly thereby rocking the arm 1795, shaft 1793, arm 1792, bell crank 1788 and the stop member 1624 counterclockwise (clockwise as used in FIG. 82) to tilt the document supporting projections 1783 thereof downwardly and forwardly while the upper edges of the elements 1784 and 1785 are moved forwardly to release the lower edge of the document from the stop member and thereby permit the document to be fed into the document sorting conveyor means hereinafter described in detail. At the same time the fingers 1635 on the operating arms of the document sensing switches DDS are retracted from the chute so as not to interfere with the release of the document. For that purpose the strip 1780 of the document stop device is formed with two rearwardly and downwardly turned short arms 1800, each carrying in its rearward end a stud extending through an elongated slot in a laterally and downwardly extending portion of the operating arm extension 1634 which is slidably mounted on the arm 1633 of the respective one of the switches DDS. The arrangement is such that as the stop device 1624 is rocked as described above to release the document, the operating arm extensions 1634 are caused to slide rearwardly on the switch operating arms 1633 and thereby retract the document sensing fingers 1635 from beneath the lower edge of the document in the chute and thus also incidentally permit the switches DDS to restore to opened condition.

*Document Sorting Conveyor Drive*

The document sorting conveyor means is driven entirely from the shaft 1560 which normally is not rotating, but in each sorting operation is driven by the continuously running double pulley 1559 through a clutch which is engaged at substantially the same time that the endorser control solenoids ECA and ECB may be energized, and is again disengaged only after the document being sorted has arrived at the proper destination.

The document conveyor drive clutch is shown in FIGURE 87, from which it will be seen that the larger diameter portion of the pulley 1559 is hollow and serves as the drum of a friction clutch comprising three clutch shoes 1809 (two shown in FIG. 87) radially slidably mounted between pairs of guide blocks 1810 carried on the leftward surface of a disk 1811 having a hub secured on the rightward end portion of the shaft 1560. The clutch shoes are also slidably confined between the disk 1811 and an annular plate 1812 secured to the blocks 1810. Each clutch shoe is normally held inwardly separated from the internal surface of the pulley 1559 by a pair of tension springs 1813, each connected at one end to the clutch shoe 1809 and at the other end to one of three studs 1814 secured in the disk 1811, each of said studs serving to anchor two springs connected to adjacent sides of two clutch shoes. Each clutch shoe 1809 is pivotally connected to a respective one of three links 1815, the other end of which is pivotally supported by one of three pairs of lugs 1816 on a clutch control member 1817 axially movably mounted on the shaft 1560 and guided in such movement by studs secured in the disk 1811 and extending into bores in sleeves 1818 secured to the control member 1817. The springs 1813 by normally maintaining the clutch shoes 1809 retracted from the clutch drum portion of the pulley 1559 likewise normally maintain the control member 1817 in a leftward retracted position such that the links 1815 are normally positioned at an angle substantially less than 90 degrees to the axis of the shaft 1560. When the control member 1817 is moved rightwardly toward the disk 1811 it swings the links 1815 to positions more nearly at a right angle to the axis of the shaft 1560 and thus moves the clutch shoes 1809 outwardly into frictional power transmitting contact with the drum portion of the constantly driven pulley 1559 and thereby sets the shaft 1560 into rotation.

For so-engaging the sorting conveyor clutch, the hub of the control member 1817 is connected through an antifriction bearing 1819 with a collar 1820 having at diametrically opposite portions of its periphery, notches receiving the inner squared ends of studs 1821 carried by the two branches of a forked lever 1822 pivotally mounted intermediate its ends on a small bracket 1823 secured to the inner surface of the side plate 1513. The forward forked arm of the lever 1822 is normally urged leftward to clutch releasing position by a tension spring 1824 connected thereto and to the bracket 1562. The end of the rear arm of lever 1822 is pivotally connected to the outer end of the plunger or movable core element 1825 of a solenoid CCS mounted on a leftwardly turned rear portion of the bracket 1562.

It will be apparent that when and as long as the solenoid CCS is energized it will draw its plunger leftwardly thereby moving the collar 1820 and the clutch control member 1817 to and holding them in clutch engaging position for driving the shaft 1560 and other elements of the sorting conveyor means which are driven by that shaft.

Feeding Document Into Horizontal Conveyor

Two conveyor pulleys 1830 (FIG. 82) are secured in such positions on the shaft 1560 that their rearward portions are at the sides of the lower central aperture therein. Each of two conveyor belts 1831 passes around a respective one of the pulleys 1830 and extends forwardly therefrom. The rear surface of each belt 1831 on the rearward side of the pulley 1830 is close to the plane of the rearward face of the chute plate 1600.

Each of a pair of small rollers 1833 is carried on the upper end of an individual arm 1834, the lower end of which is swingably supported on the shaft 1793. In each arm 1834 a short distance above the lower end thereof a stud 1835 is secured and is connected to the rear end of a tension spring 1836 which at its forward end is connected to a stud in an arm 1837 secured to and extending upward and forwardly from the shaft 1793. The spring 1836 for the righthand arm 1834 normally holds the stud 1835 in that arm against the rear edge of the right-hand arm 1837. The left-hand arm 1837 is cut away sufficiently to provide clearance of the stud 1835 in the left-hand arm 1834 and is also formed with an upper rearward extension which is normally held in contact with an eccentric portion of a stud 1838 which is rotatably adjustably mounted in the left-hand arm 1834 to permit adjustment of the left-hand one of the rollers 1833 forwardly and rearwardly relative to the right-hand roller 1833 for a purpose which will be mentioned shortly.

It will be apparent that when the shaft 1793 is rocked by the solenoid DRS to rock the document stop device 1624 to release the lower edge of the document in the chute, the arms 1837 will also be swung forwardly and the arms 1834 carrying the rollers 1833 will be swung forwardly by the springs 1836 until they press the lower portion of the document against the rearward surfaces of each of the conveyor belts 1831 on the rear side of the pulleys 1830 a short distance above the stop device 1624. As, at that time, the shaft 1560, the pulleys 1830 and the belts 1831 are being driven in the direction of the arrows in FIGURE 82, the inserted document will be driven downwardly out of the chute and into the conveyor means.

By adjustment of the eccentric stud 1838, the normal position of the left-hand arm 1834 may be so adjusted relative to the arm 1837 and shaft 1793 and thus also relative to the right-hand arm 1834 that as the solenoid DRS rocks the shaft 1793, both rollers 1833 will engage the document simultaneously and with equal pressure so as to cause the document to be fed downward out of the chute straight and without skewing, which could interfere with proper passage of the document through the conveyor.

Horizontal Conveyor

The two belts 1831 extend forwardly to the front of the sorting machine where they are looped around respective ones of a pair of pulleys 1850 (FIGS. 90 and 94), each mounted on separate short shaft journaled at its ends in a mounting frame 1851 formed metal strap bent into the shape of inverted U and pivotally mounted at the lower ends of its side legs on studs carried by brackets 1852 which in turn are secured to the lower side of a length of angle member 1853 secured to and supported from the upper front transverse frame member 1507 and the upper ends of the foremost vertical frame members 1509 and 1510. A second U-shaped member 1854 is pivotally supported at its ends on the outer ends of the shaft of the pulley 1850 and has secured to the center of its transverse portion a screw 1855 which passes through an aperture in the vertical flange of the member 1853 and through a coil spring 1856 which is compressed between the forward face of the member 1853 and a nut threaded on to the end of the screw 1855 to a greater or lesser extent to adjustably tension the respective one of the belts 1831.

To insure that the belts 1831 will properly track around the pulleys 1830, the upper pass of each belt is guided at a point just forwardly of its pulley 1830 between a pair of guide rollers 1857 (FIGS. 81 and 91) rotatably supported on studs secured to the downward flange of the frame member 1508.

Figure 90:
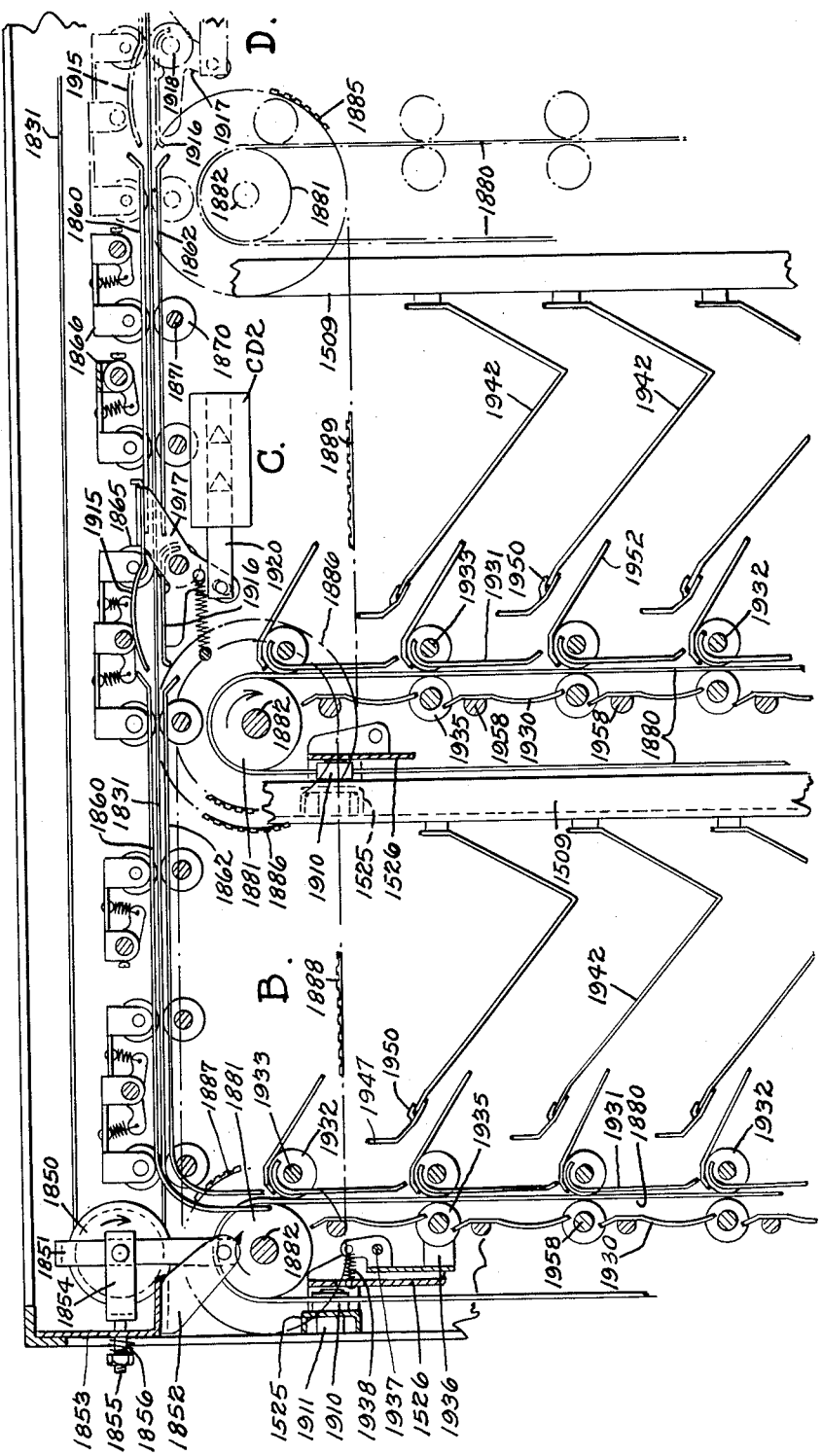
Figure 91:
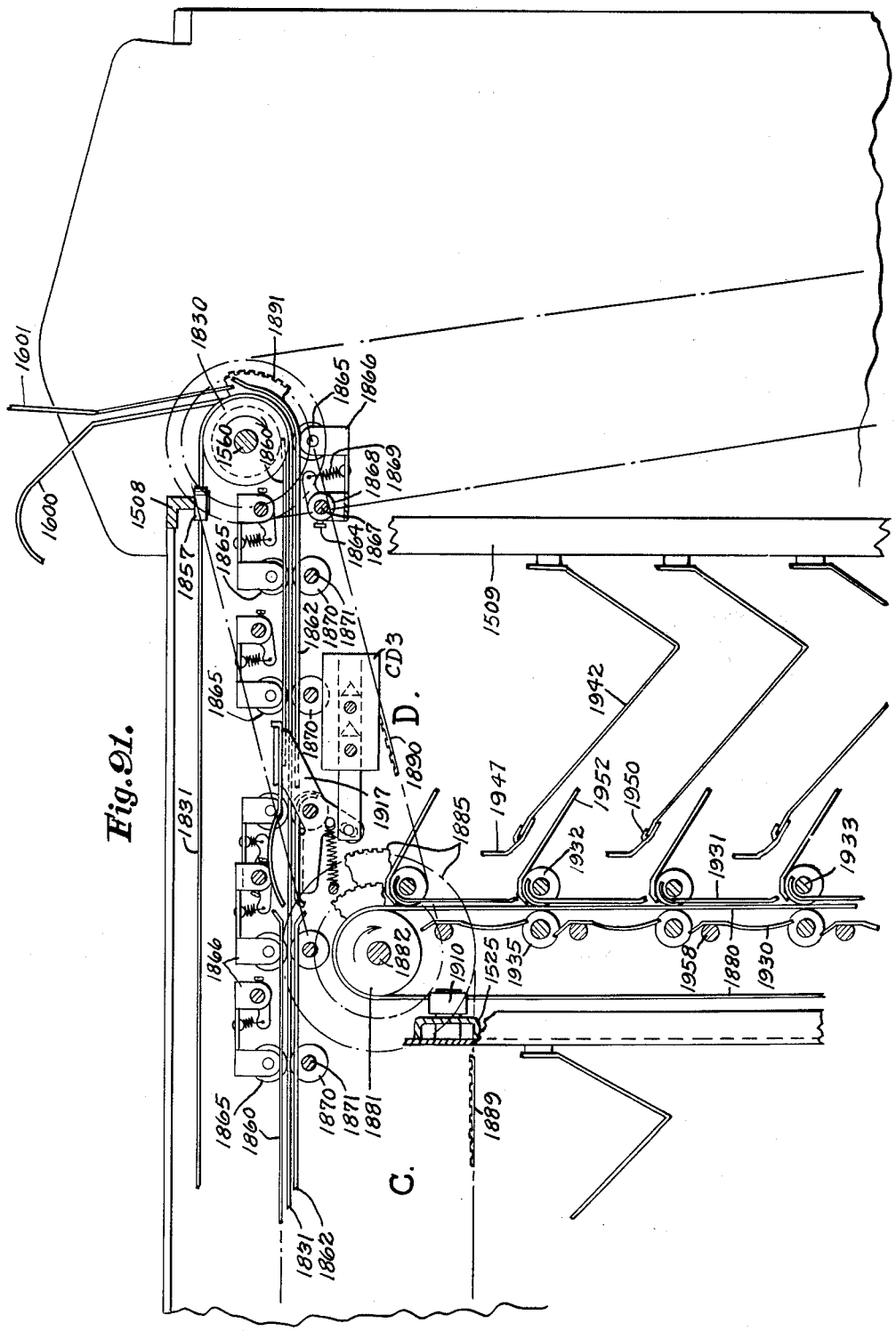
Figure 92:
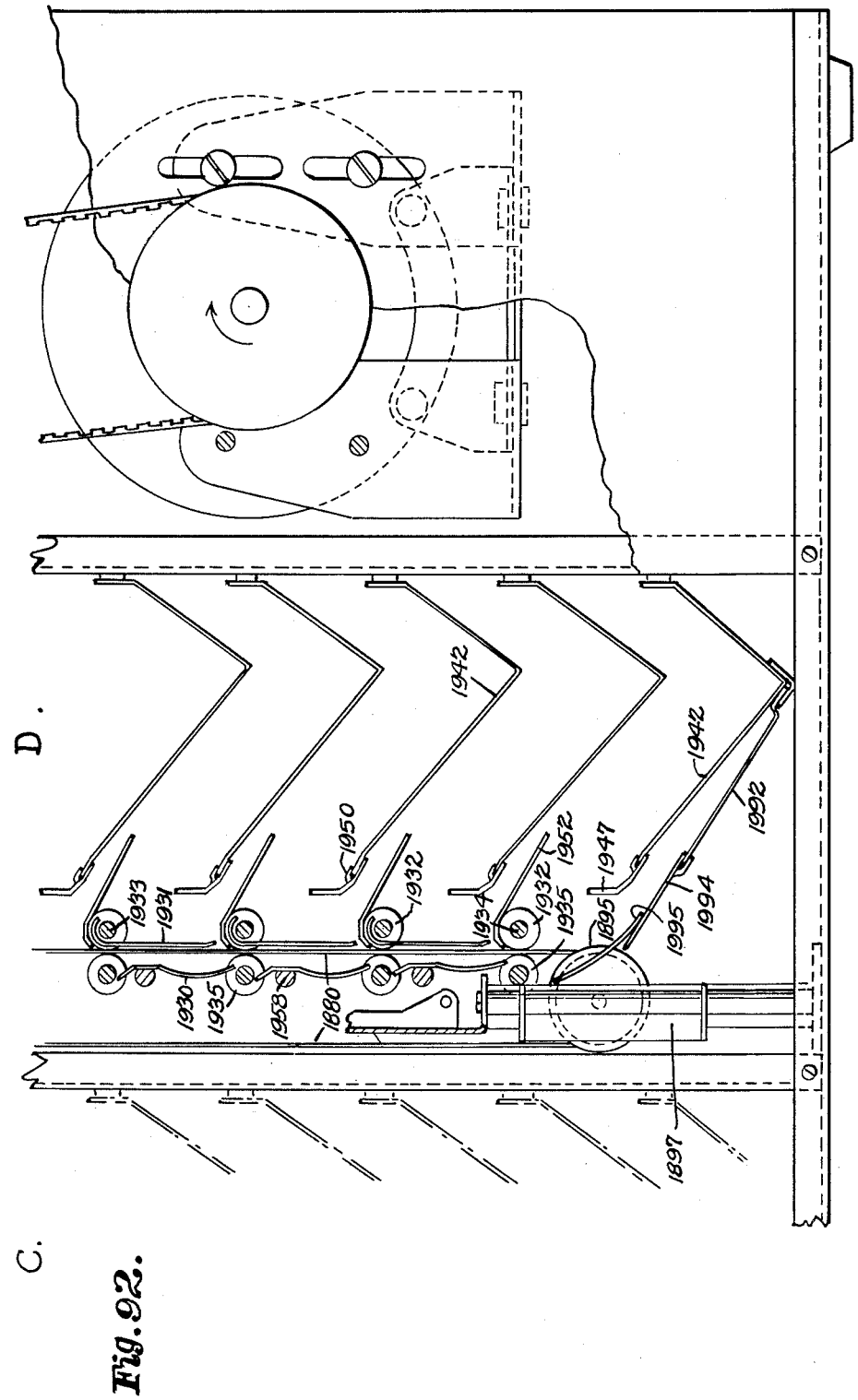
Figure 93:
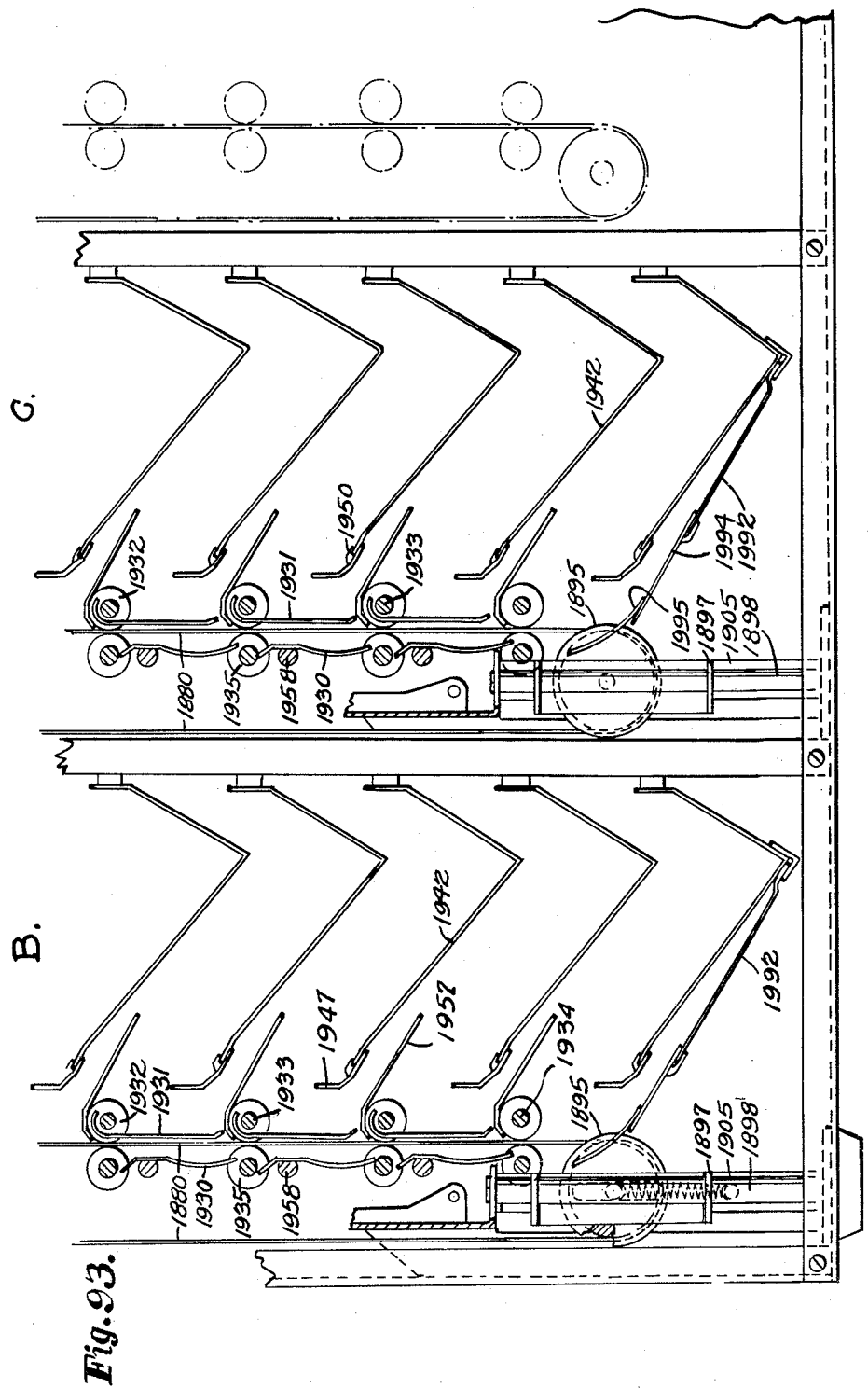

The lower passes of both belts 1831 extend through a document passage between pairs of upper and lower horizontal guide plates as shown in FIGURES 90 and 91, supported on the side plates 1523 and 1524 by screws 1858 (FIG. 96) passing through down-turned lugs on the side edges of said guide plates and threaded into posts 1859 (FIGS. 78 and 96) secured in the side plates. The upper plate 1860 (FIG. 91) of the rearmost pair of horizontal guide plates has its rear edge notched to accommodate the bottom portions of the two pulleys 1830 and is also notched (as shown in FIG. 96) outwardly from the pulleys 1830 to accommodate the bottom portions of two peripherally grooved guide rollers 1861 (FIGS. 82, 91 and 96). The rear edge portions of the plate 1860 between the notches therein are curved upwardly sufficiently to avoid blocking engagement with the forward edges of the documents advancing around the pulleys 1830 and rollers 1861 into the document conveying passage.

The lower horizontal plate 1862 of the rearmost pair has its rearward portion extended rearwardly upwardly partially around the rollers 1861 to a point just rearward of the lower edge of the rear plate 1601 of the document insertion chute. However, the rearward portion of the bottom plate 1862 is cut away to avoid interference with the document stop device 1624, the document sensing fingers 1635 and the rollers 1833 as shown in FIGURE 82. Also, directly beneath the pulleys 1830 the bottom plate 1862 is apertured to permit a pair of small rollers 1865 (FIGS. 81 and 91) to enter the document passage to engage against the belts 1831 at the bottom of each pulley 1830. The rollers 1865 are each mounted on a short shaft rotatably supported at each side of the roller in parallel arms of a small roller supporting frame 1866 having a second pair of arms pivotally supported on a rod 1867 which at its ends is secured in the side plates 1523 and 1524. Intermediate the pairs of arms of the roller supporting frame 1866, a small hub 1868 is supported on the rod 1867, said hub being provided with a short arm connected at its end with one end of a tension spring 1869, the other end of which is secured to the mid section of the frame 1866 so that the pressure of each roller 1865 against the belt 1831 may be adjusted by rotating the hub on the rod 1867 and then securing it in the adjusted rotary position on the rod 1867 by tightening a set screw 1864 threaded through the hub.

Forwardly of the pulleys 1830 the upper guide plate 1860 is formed with two pairs of apertures to permit engagement of the belts 1831 by two pairs of additional rollers 1865, each roller being adjustably mounted in a manner similar to that just previously described. Beneath each roller 1865 of the last mentioned two pairs a supporting roller 1870 engaging the underside of the respective belt 1831 through an aperture in the bottom guide plate 1862 is rotatably mounted on a shaft 1871 secured at its ends in the side plates 1523 and 1524.

From the pair of guide plates 1860 and 1862 described above, the horizontal document conveying passage extends forwardly through the spaces between two further pairs of upper and lower guide plates 1860 and 1862 (FIG. 90) mounted on posts 1859 secured in the side plates 1523 and 1524. The guide plates 1860 and 1862 of the last mentioned two pairs are also similarly apertured to permit both belts 1831 to be engaged by additional pressure rollers 1865 pressing the belts downwardly against supporting rollers 1870, all of the pressure rollers 1865 being mounted in the same manner as the previously mentioned rollers 1865 and all of the additional rollers 1870 being rotatably supported on shafts 1871 or 1918 supported in the side plates 1523 and 1524. The sets of rollers 1865 and 1870 are so-spaced along the bottom pass of each horizontal conveyor belt 1831 that documents in the horizontal conveyor passage will be maintained pressed against the undersurfaces of the belts substantially continuously during their travel through the horizontal conveyor passage.

Between the forward edges of the rearmost pair of guide plates 1860 and 1862 and the rear edges of the middle pair of plates 1960 and 1862 and between the forward edges of the latter pair of plates and the rearward edges of the foremost pair of guide plates, the horizontal conveyor passage extends through two document sorting switches or deflectors, each of which, as hereinafter described in detail, is operable from a normal position for conveyance of documents straight forward to an operating position for deflecting or switching a document downwardly from the horizontal conveyor passage into the upper end of a respective one of two vertical conveyor passages. The forward end portions of the foremost guide plates 1860 and 1862 are bent downwardly on substantial radii to turn the forward end of the horizontal conveyor passage downwardly into the upper end of a third vertical conveyor passage.

*Vertical Column Conveyors*

For each of the three vertical conveyor passages, as shown in FIGURES 90 to 93, there is a pair of vertical conveyor belts 1880 which at their upper ends run around pulleys 1881 secured in laterally spaced relation on a respective one of three shafts 1882, the end portions of which are of reduced diameter and are rotatably mounted in antifriction bearings 1883 (FIG. 79) supported in cups 1834, each extending through an aperture in the side plate 1523 or 1524 and through a registering aperture in a member 1521 and secured to the latter by screws passing through ears on the cup 1884 and through the plate 1523 or 1524. The leftward end of each shaft 1882 extends outwardly beyond the plate 1524 and through the bearing 1383 and cup 1884 and has a drive pulley 1885, 1886 or 17 (FIGS. 94, 91, 94 and 95) secured thereon, the pulley 1887 on the front shaft 1882 being a single pulley and the pulleys 1886 and 1885 on the rearward two shafts 1882 being double pulleys. A drive belt 1888 extends around the pulley 1887 and around one portion of the pulley 1886 on the central shaft 1882. Another drive belt 1889 extends around the other portion of the pulley 1886 and around one portion of the pulley 1885. Another drive belt 1890 extends around the remaining portion of pulley 1885 and around a pulley 1891 secured on the left end of the shaft 1560 just leftward of the plate 1514 so that all three shafts 1882 are driven at the same speed as the shaft 1560 at all times when the conveyor drive clutch is engaged to drive the shaft 1560. As the pulleys 1881 and 1830 are all of the same diameter, the belts 1880 and 1831 are driven at the same linear speed.

The lower portion of each belt 1880 passes around a flanged pulley 1895 (FIGS. 92, 93 and 94), each mounted on a short shaft 1896 (FIG. 94) secured at its outward end to the vertical portion of a bracket 1897 having outwardly turned upper and lower end portions apertured for sliding guidance on a rod 1898. The two guide rods 1898 for each pair of pulleys 1895 are secured at their upper ends to a rearwardly turned horizontal flange 1899 on the adjacent one of the members 1526 near the lower end of the latter and are secured at their lower ends either to the horizontal flange of the adjacent member 1520 or, in the case of the foremost pair of rods 1898, to a rearwardly extending horizontal plate 1900 secured to the bottom front cross member 1503 of the sorter frame. On the inner side of its associated pulley 1895, the shaft 1896 extends inwardly through a vertical slot in a guide strip 1905, the outwardly turned upper and lower ends of which are secured respectively to the flanges 1899 and to the adjacent member 1520 or 1900. The inward end of each pulley shaft 1896 is connected to the upper end of a tension spring 1906, the lower end of which is anchored on a stud secured in the guide member 1905 whereby the pulleys are urged downwardly to maintain the respective belts 1880 under suitable tension.

Just below each pulley 1881 the upwardly running forward pass of each belt 1880 is guided between a pair of rollers 1910 (FIGS. 90 and 91), each rotatably mounted on a stud 1911 secured in the adjacent transverse channel member 1525.

*Column Deflectors*

Each of the two column deflectors is constructed and arranged as shown more particularly in FIGURE 96. It comprises a pair of vertically spaced upper and lower plates 1915 and 1916 secured at their right and left ends to inwardly turned flanges of a pair of end member 1917 having hubs secured on a shaft 1918 rockably supported at its ends in the side plates 1523 and 1524. The rearward edge portion of the bottom plate 1916 is turned downwardly substantially cylindrically about the axis of the shaft 1918 and substantially tangentially to the plane of the lower horizontal guide plate 1862. The curved portion of the plate 1916 has two apertures therein below the belts 1831 to accommodate a pair of belt supporting rollers 1870 rotatable thereon and engaging the undersides of the belt 1831.

The upper plate 1915 has a rearward flat portion extending over the forward edge of the next rearward top horizontal guide plate 1860 and a forward portion curved cylindrically about an axis extending transversely substantially below and forward of the shaft 1918. Above each of the belts 1831 the plate 1915 is formed with a slot opening through the forward edge of the plate 1915 and having sufficient width and length as to avoid interference with the belts 1831 and to avoid interference with the mounting frames 1866 of the two pressure rollers 1865 which engage the belts 1831 above the two rollers 1870 on the shaft 1918.

For stiffening the deflector structure the forward edge of the plate 1916 is formed with a downwardly turned flange and the rear edge of the plate 1915 is formed with an upwardly turned flange. Furthermore, an additional stiffening member in the form of a transversely extending flat bar 1919 having a plurality of forward extensions is secured to the upper face of the rearward portion of the member 1915. The right side member 1917 has a downward arm having a slotted engagement with a stud secured in the plunger or movable core member 1920 of a respective one of two column deflector solenoids CD2 and CD3 secured to the inner side of the plate 1523. A tension spring 1922 connected between a stud secured in the plate 1523 and a stud secured in the downward arm of the member 1917 normally maintains the solenoid plunger 1920 in its outward released position and the deflector in the position shown in FIGURES 90, 91 and 96 wherein the exit slot between the forward edges of the plates 1915 and 1916 is aligned with the slot between the outwardly flaring rear edges of the next forward pair of horizontal guide plates 1860 and 1862 for directing a conveying document into the conveyor passage between the next forward plates 1860 and 1862. When however, the solenoid CD2 or CD3 is energized, the connected one of the deflector assemblies is rocked counterclockwise so that the exit slot between the forward edges of the plates 1915 and 1916 is positioned downwardly to direct the conveyed document into the respective vertical column conveyor.

*Document Bin Deflectors*

Each of the three vertical conveyor passages through which the rear downwardly moving passes of a respective pair of belts 1880 run is formed by the spaced front and rear plates 1930 and 1931 (FIGS. 90–93) of a respective one of three vertical series of document sorting deflectors, each series comprising nine such deflectors. The rear pass of each vertical conveyor belt 1880, immediately below a point at which it leaves its upper pulley 1881, is engaged on its rearward outward surface by the uppermost one of a series of rollers 1932 which are rotatably mounted on the operating and supporting shafts 1933 of the rear deflector plates 1931. At the bottom of each series of nine deflectors the rearward surfaces of the rear passes of the belt 1880 are similarly engaged each by an additional roller 1932 mounted on a further rod 1934.

Directly in front of each roller 1932, excepting the uppermost roller 1932 of each vertical series, the forward front surface of the rear pass of each belt 1880 is engaged by a pressure roller 1935 carried in an individual small frame 1936 (FIG. 90) which is similar to the frames 1866 for the rollers 1865 except that each frame 1936 has a short arm extending upwardly from its axis of pivoted support on a rod 1937 which is secured at its opposite ends in the rearwardly turned flanges of the adjacent member 1526. The short upward arm of the roller supporting frame 1936 carries a stud to which is connected one end of a tension spring 1938, the other end of which is anchored on the member 1526. Thus, at the entrance to each deflector in the three vertical conveyors, the conveyed document will be pressed into frictional conveying contact with each of the two belts 1880 of that conveyor and is thus maintained in frictional contact with the conveyor belts substantially continuously until it is delivered to its destination.

The front and rear plates 1930 and 1931 on all of the document deflectors of each of the three vertical series are normally in the vertical position shown in FIGURES 90 to 93 to form a continuous vertical conveyor passage, but each deflector may be operated to swing its deflector plates 1930 and 1931 simultaneously rearward to deflect a conveyed document rearwardly into a respective one of the twenty-seven document bins associated, respectively, with the twenty-seven deflectors. The nine bins of each of the three vertical columns are formed between successive ones of a series of ten plates 1942 bent at approximately right angles to an obtuse upwardly diverging form along a line intermediate its front and rear edges. The upper rear edge of each plate 1942 is secured at its outward end portions to the inward flanges of a respective one of the rear three pairs of vertical frame members 1509 and 1510. Each of the bin plates 1942 excepting the uppermost plate of the ten in each vertical column supports a document tray which will be described in detail following a description of the construction and operation of the pocket deflectors.

The structural detail of one bin deflector is best illustrated in FIGURE 97. Each bin deflector unit comprises a pair of right and left side members 1945 having at its lower end an inwardly turned flange secured to the upper face of a respective end of a formed transverse member 1947. The latter has at each end a downwardly turned lug in which is secured an outwardly projecting bushing 1948 adapted to seat in a slot 1949 opening upwardly through the upper edge of a rearward projection of the adjacent member 1521 or 1522. An upward forward branch of each side member 1945 is also formed with an inwardly turned lug secured against the underside of a transverse guide plate 1952 at one side edge portion thereof, the forward edge portion of the plate 1952 extending over and being curved partially around the rollers 1932 and the shaft 1933 which is secured near its ends in the upper ends of the forward branches of the members 1945. Both ends of the shaft 1933 extend outwardly beyond the members 1945 to enter into slots 1953 opening downwardly through the lower edge of the rearward projections of the members 1521 and 1522. The slots 1953 are extended upwardly sufficiently far to permit the bushings 1948 to be moved upwardly completely out of the slots 1949 when the assembly 1945, 1947, 1952 is lifted to move the ends of the shaft 1933 to the upper ends of the slots 1953 to facilitate assembly and disassembly. In the assembled position of the parts, the rear edge of the member 1947 extends under and supports the forward edge of the plate 1942 which is next above the pocket into which the deflector can deflect documents. Lugs 1950 struck from the member 1947 overlie the forward edge of the plate 1942.

The deflector plate 1931 is formed adjacent the top of each lateral edge with a rearwardly turned ear 1954 by which it is swingably supported on the shaft 1933. The upper edge of the deflector plate 1931 is formed with notches to accommodate the two rollers 1932 on the shaft 1933. At either side of and between the roller-accommodating notches the upper edge portions of the deflector plate 1931 are bent rearwardly over the shaft 1933 to prevent the upper edges of the deflector plate 1931 from catching and tearing conveyed documents.

The rearwardly turned ear 1954 at the right hand edge of the rear deflector plate 1931 carries a stud engaged in the rear end of a link 1955 which at its forward end is pivotally connected to an arm 1956 rotatably supported on a bushing 1957 secured on the rightward end portion of a shaft 1958 having a flattened portion secured against the forward face of the front deflector plate 1930 just below a forwardly bent top edge portion of the latter. A screw 1959 extends through a small, arcuate slot 1960 in the arm 1956 and is threaded into an arm 1961 which is secured to the bushing 1957 whereby the arm 1956 may be secured in adjusted position relative to the arm 1961 for locating the front and rear deflector plates 1930 and 1931 in adjusted relation to each other.

A shouldered screw 1963 passes through the left plate 1522 and is threaded into the left end of the shaft 1958 to rotatably support the left end of said shaft. The rightward end of the shaft 1958 seats in the leftward end of a bushing 1965 secured on a short shaft 1966 rotatably supported in a bushing 1967 secured in and extending inwardly from the right hand plate 1521. An arm 1968 secured on the leftward end of the bushing 1965 carries a stud 1969 which extends leftwardly through a notch in the arm 1961 so that rocking of the shaft 1966 will cause the shaft 1958 and arms 1961 and 1956 to rock with it.

An arm 1972 is secured to the rightward end of the bushing 1965 and thus also to the shaft 1966. Each of the twenty-seven arms 1972 is pivotally connected at its forward end to the plunger 1973 of a respective one of twenty-seven solenoids BD1 to BD27 which is secured against the leftward face of the right hand member 1521. An arm 1975 secured on the rightward end of the shaft 1966 rightward of the plate 1521 is connected with a tension spring 1976 which is anchored on a stud secured in the member 1529. The spring 1976 normally maintains the deflector plates 1930 and 1931 in the downward forwarding positions shown in FIGS. 90 to 93. Upon energization of one of the solenoids, its plunger 1973 will be drawn downwardly to rock the connected shafts 1966 and 1958 counterclockwise to swing the pair of deflector plates 1930 and 1931 rearwardly from the position of FIGURES 90–93 until the lower edge of the rear deflector plate 1931 nearly contacts the member 1947 and the lower edge of the front deflector plate 1930 is located above the forward portion of the plate 1952 of the next lower deflector assembly and a little rearward of the plane of the axes of the shafts 1933 so as to direct a document into the bin next below the member 1947 and plate 1942 engaged by the latter. As hereinafter described in detail, the energizing circuits of the column deflectors CD2 and CD3 and of the bin deflectors BD1–BD27 are selectively controlled by means controlled by the selection keys SK1–SK27 of the master machine so that documents placed in the sorter are sorted to bins corresponding to the depressed selection keys.

All of the bin deflectors are of the same construction except that all those below the uppermost one in each column have a two-armed lever 1977 on the end of the shaft 1966 as shown in FIG. 101 instead of the single arm 1975 of the uppermost deflector as shown in FIGS. 98 and 101.

The rearward deflector plate 1931 is formed centrally with an aperture 1979 to pass a document detector finger 1980 when the plate 1931 is swung rearwardly to the position shown in FIG. 100. The front deflector plate 1930 is formed with two notches 1981 opening through its bottom edge to clear the vertical conveyor belts 1880 and with a narrower intermediate notch 1982 also opening through the bottom edge of the plate 1930 to clear the lower end of the detector finger 1980 when the plate 1930 is swung rearwardly with the plate 1931 to the position of FIG. 100.

To insure that documents diverted from the vertical conveyors by a bin deflector will be fully positively fed into the bin, two rollers 1948 are each provided with a short shaft 1985 extending from opposite sides of the roller and into slots in upwardly turned side flanges of an individual mounting bracket 1986 which is secured to the upper edge portion of the member 1947. The two upward flanges of each bracket 1986 are apertured to embrace the shaft 1933 on each side of a respective one of the rollers 1932. Tension springs 1987 are anchored at their forward ends on the shaft 1933 and connected at their rearward ends to the projecting ends of the shaft 1985 of the roller 1984 to urge the latter forwardly and upwardly into frictional driving contact with the respective roller 1932. The upper portion of each roller 1984 is located in an aperture in the plate 1952 and rises slightly above the upper surface of the latter plate to make frictional driving engagement with a respective one of two small rollers 1989, each rotatably carried by a mounting member 1990 (FIG. 100) having a resilient mounting arm 1991 extending through a slot in the member 1947 next above and secured to the latter. Thus each roller 1932 which is driven by a belt 1880 in turn drives a roller 1984 which cooperates with a roller 1989 carried by the next upward bin deflector assembly to feed the document deflected from the vertical conveyor by the said next upward bin deflector fully through the slot between the guide plate 1952 and the next higher plate 1942.

The shaft 1934 below each vertical array of shafts 1933 and carrying the lowermost rollers 1932 is, like the shafts 1933, supported in the end plates 1945 of an assembly including also a plate 1952 and a member 1947 of the same form as the correspondingly numbered elements of the above described deflector assembly and similarly supported by the plates 1521 and 1522. However, the shaft 1934 is without a deflector plate 1931.

Below the lowermost plate 1942 for each of the three vertical columns of bins, there is a plate 1992 having upturned flanges along its right and left sides. The plate 1992 is laterally slidably supported along its rear edge on a transverse angle member 1993 and along its front edge on the rear edge of a plate 1994 having retaining lugs overlying the front edge of the plate 1992. The member 1993 is secured at its ends to the base frame side members 1501 and 1502 and the fixed plate 1994 is secured at its right and left sides to the members 1521 and 1522, respectively. A fixed deflector plate 1995 is also secured at its right and left sides to the members 1521 and 1522. The plate 1995 has portions extending forwardly between and at both sides of the belts 1880 and its rearward portion closely overlies the forward portion of the plate 1994 so that any document which might possibly pass through the entire length of a vertical conveyor passage without being deflected into one of the nine sorting bins will be delivered into the removable tray formed by the plate 1992 at the bottom of the column.

Sorted Document Detector

The detector finger 1980 (FIGS. 97 and 100) is secured on the rightward end of a shaft 1996 which is rotatably supported near its rightward end in the leftward one of the pair of mounting brackets 1986 and at its leftward end in the left side member 1945. Adjacent the latter member, an arm 1997 is secured at its upper end to the shaft 1996 and is pivotally connected at its lower end to the rearward end of a link 1998. The forward end of each of the twenty-seven links 1998 is pivotally connected to the upper end of an arm 1999 (FIG. 100) angularly adjustably secured to the pivoted operating lever 2000 of a respective one of twenty-seven switches SD1 to SD27 secured to the left-hand members 1521 on the inward faces of the latter. Each switch SD1-SD27 is a single-pole, double-throw, self restoring switch which is normally closed on one side.

Each detector finger 1980 is normally positioned vertically as shown in FIG. 100 and, when the adjacent deflector is in the normal downward forward position, the deflector finger is rearward of the rear deflector plate 1931 but aligned with the opening 1979 in said plate. When the deflector, by energization of the connected one of the solenoids BD1-BD27, is operated to the deflecting position as shown in FIGURE 100, the detector finger 1980 extends vertically through the opening 1979, across the document passage between the deflector plates 1931 and 1930 and into the notch 1982 in the deflector plate 1930 so that a document passing through the operated deflector and into the entrance of the associated document bin will engage the detector finger 1980 and swing it rearwardly clear of the notch 1982 in the deflector plate 1930 until the document is drawn clear of the deflector plates by the rollers 1984 and 1989. Such rearward swinging of the detector finger 1980 acts through the shaft 1996, arm 1997, link 1998 and lever 1999, 2000 to operate the connected one of the switches SD1-SD27 to open its normally closed contacts and close its normally open contacts. The switches SD1-SD27 as will be described hereinafter, control circuit means for terminating the cycle of operation of the sorter and, inter alia, deenergizing the operated solenoid BD1-BD27 to permit the spring 1976 to restore the operated deflector to normal position. After the sorted document has cleared the detector finger 1980, the latter, together with the parts 1996-2000 are restored to normal by the self-restoring action of the operated switch SD1-SD27.

Sorted Document Trays

In each of the 27 document destination bins there is a removable tray to receive and hold documents sorted into each bin and to permit ready removal of the sorted documents. One such tray is shown in FIGURE 102. It comprises a metal sheet 2002 bent to form a tray floor and a rear wall having forwardly bent side flanges which are secured to the rear edges of transparent sheet plastic side wall members 2003, each of which is secured along its lower edge to the side edges of the floor portion of the plate 2002. Each of the pocket plates 1942 except the lowest one in each column of bins has on each side edge a downward projection 2004 which extends into a slightly larger notch in the upper edge of the adjacent side wall member 2003 of the tray in the next lower bin to prevent documents from flying out over the sides of the trays as the documents arrive in the bins at considerable velocity. Finger knobs 2005 are secured to each of the tray side walls 2003 on the outer side thereof.

To guide the movements of each tray during insertion in and withdrawal from its bin a guide strip 2006 (FIG. 102) has its forward edge portion secured to the plate 1942 and has a slightly elevated rearward flange extending over the forward edge of the tray member 2002. Two laterally spaced rollers 2007 mounted on studs secured in the upper rear portion of the plate 1942 closely overlie the upper rear edge of the tray member 2002.

Within each document tray there is a document packer bail 2010 having at the rear ends of its two sides upwardly turned ears 2011 by which it is pivotally supported on a shaft 2012 having its ends secured in the forwardly turned arms of a bracket 2013 secured approximately centrally to the upper rear portion of the tray member 2002. An irregularly formed operating bail 2015 has at each side a downwardly turned ear by which it likewise is rockably supported on the shaft 2012. A torsion spring 2016 (FIG. 100) coiled about the shaft 2012 has one end engaged over the upper edge of the bracket 2013 and its other end engaged behind the operating bail and urges the operating bail 2015 counterclockwise so that projecting portions of the downwardly turned front edge of the bail 2015 normally press against the packer bail 2010 to depress the forward portion of the latter against documents within the tray. A small light coil spring 2018 is connected between the mid portion of the operating bail 2015 and the mid portion of the packer bail 2010 so that when an upwardly extending finger 2017 of the operating bail is pressed rearwardly, the spring 2018 will raise the packer bail 2010 and keep it in contact with the downward projections of the front portion of the operating bail 2015. The bail 2015 may thus be operated by hand, after removing the tray from the bin, for the purpose of releasing the contained sorted documents for easy removal from the tray. Means for mechanically operating the packer bail during operation of the sorter unit will be described hereinafter.

*Packer Bail Operating Means*

Each packer bail 2010 is operable by an individual operating lever 2020 (FIG. 100) which carries a roller 2021 to cooperate with the finger 2017 of the packer bail. The operating lever 2020 is pivotally mounted on a bracket 2022 secured to the rearward face of the rear portion of the next higher pocket plate 1942. The operating lever 2020 has a bifurcated short rearward arm cooperating with a roller 2023 mounted on a stud secured in a vertical link 2025, there being one such link 2025 for each vertical column of pockets. The lower end of the link 2025 carries another roller 2026 guided in a vertically elongated slot in the upstanding arm of a guide bracket 2027 secured to the forward portion of the adjacent member 1520. The upper end of each link 2025 is pivotally connected to the rear end of an arm 2030 which at its forward end is secured on a respective one of three cross shafts 2031 which, at their ends, are mounted in brackets 2032 secured to the frame side plates 1523 and 1524.

An individual arm 2035 is secured at its rearward end to each shaft 2031 just rightwardly of the left hand bracket 2032, and, on its forward end, carries a roller 2036 bearing against the periphery of a cam 2037 secured to the driven member 2038 (FIG. 89) of one of three clutches 2040, each on the leftward end of a respective one of the three shafts 1882.

As may be seen from FIGURE 89, the clutches 2040 are similar in general construction to the endorser operating clutches as shown in FIGURE 88, although the arrangement and formation of the parts are reversed laterally so that each packer bail operating clutch (FIG. 89) is similar to a mirror image of an endorser operating clutch (FIG. 88). Each packer bail operating clutch is normally held disengaged by the upward forward end of a control lever 2042 (FIG. 100) which is pivotally mounted at its lower rearward end on a stud 2043 secured in the member 1522 and pivotally connected intermediate its ends to the plunger 2044 of a respective one of three solenoids PB1, PB2 and PB3 secured agains the inner face of the left-hand bracket 2032. The control lever 2042 is also pivotally connected intermediate its ends to a link 2046 which, in turn, is pivotally connected to a second control lever 2047 pivotally mounted at its lower rearward end on a stud 2048 secured in the member 1522. A tension spring 2049 anchored on the member 1525 is connected to the control lever 2047 and normally holds a leftwardly turned lug on the upper end of the latter out of and the upper forward end of the lever 2042 in the path of the projecting end of the clutch spring 2050.

It will be apparent that when one of the solenoids PB1, PB2 and PB3 is energized, it will draw its plunger 2044 rearwardly, thereby disengaging the connected control lever 2042 from the clutch spring 2050 and simultaneously pulling the lug on the forward end of the control lever 2047 into the path of the projecting end of the clutch spring 2050. The clutch will thereby be engaged for a half revolution, after which the projecting end of the clutch spring 2050 will be arrested by the control lever 2047 thereby disengaging the clutch 2040. The cam 2037 being driven through a half revolution will depress the roller 2036 thereby rocking the lever 2035, shaft 2031 and arm 2030 to elevate the link 2025 which by its roller studs 2023 operates all nine associated operating arms 2020 to rock the packer bails 2010 in all nine document trays of the associated column clockwise to lift their forward ends upwardly away from the previously sorted documents within the trays.

The operated packer bails remain lifted as long as the associated solenoid PB1–PB3 remains energized, which, as explained more fully hereinafter, is until after the document being sorted operates the document detecting finger 1980 associated with the deflector for the document pocket into which the document is to be delivered. Upon de-energization of the packer bail clutch solenoid, the spring 2049 restores the clutch control levers 2047 and 2042 to normal, thereby disengaging the lever 2047 from the clutch spring 2050 to permit reengagement of the clutch for a second half revolution and simultaneously positioning the lever 2042 to arrest the projecting end of the spring 2050 to disengage the clutch at the end of that second half revolution. In the second half revolution of the clutch 2040 the cam disk 2037 permits the shaft 2031, the link 2025, operating arms 2020 and the packer bails 2010 to be restored to normal by the springs 2016 so that the sorted documents are again compressed against the floors of the trays by the packer bails.

For each packer bail clutch, there is an arm 2054 pivotally mounted at its lower end on a stud 2055 secured in the member 1522. A tension spring 2056 anchored on the stud 2043 and connected to the arm 2054 urges the latter clockwise to press a roller 2057 carried by the upward end of the arm 2054 against the periphery of a disk 2058 secured to the driven member 2038 of the clutch. The disk 2058 is formed with two diametrically opposite shoulders so positioned that at the end of each half revolution of the clutch, the roller 2057 engaged under one or the other of the shoulders of the disk 2058 prevents reverse rotation of the driven member of the clutch.

Each link 2025 near its upper end carries a cam plate 2060 which, when the link 2025 is elevated to lift the packer bails 2010, acts on a roller 2061 carried by the operating arm of a respective one of three normally open switches PS1, PS2 and PS3, to close said switch. Each switch PS1, PS2 and PS3 is mounted on an individual bracket 2062 secured to the adjacent cross member 1525.

*Auxiliary Packer and Full Bin Sensing Bail and Operating Means Therefor*

In each bin there is a bail 2065 (FIGS. 97, 100 and 101) which operates to engage the top of the pile of sorted documents within the tray in each cycle of operation of the sorter prior to the time that the packer bail 2010 in the tray is removed upwardly away from the documents so that the document next to be delivered into the tray may pass over the auxiliary bail 2065 and under the elevated packer bail 2010, after which the packer bail 2010 is again lowered on top of the newly arrived document before the auxiliary bail is restored to normal position in the final portion of the sorter operation. The extent to which the auxiliary bail 2065 may be moved on each operation is determined by the height of the stack of previously sorted documents within the tray.

Whenever the stack of sorted documents within the tray reaches a predetermined height and so limits the operation of the auxiliary bail 2065 to a predetermined extent, means controlled by the auxiliary bail causes operation of a warning means to inform the operator that the tray has reached a full condition.

The auxiliary bail comprises a blade 2065 having at each end an upwardly turned portion in which is secured a stud 2067 pivotally supported in the upper end of a respective one of a pair of arms 2068, each secured on an end portion of a shaft 2070 which is rotatably supported in rear arms of the side plates 1945 of the next lower deflector assembly. As shown in FIGURE 102, the forward edges of the tray plates 2002 and the pocket plates 1942 are both cut away at 2071 to accommodate rearward swinging movement of the bail supporting arms 2068.

The right-hand arm 2068 carries a stud 2072 below the right hand stud 2067 and projecting inwardly through an arcuate slot 2073 in a downward extension of a plate 2066 secured to the right hand upwardly turned end of the blade 2065 to limit rocking movement of the bail blade 2065 relative to the arms 2068. A tension spring 2075 connected between the down-turned forward edge of the blade 2065 and the stud 2072 urges the blade 2065 toward its counterclockwise limit. In the normal position of the arms 2068, an inwardly turned lug 2076 on the forward edge of the downward extension of the plate 2066 is engaged by the member 1947 to aid the spring 2075 to hold the blade 2065 with its rearward edge pressed upwardly against the rear edge of the plate 1952 as shown in connection with the uppermost bin in FIGURES 100 and 101.

The right-hand bail supporting arm 2068 has a downward and forward extension 2078 which carries a stud 2080 which is located a short distance forwardly of the shaft 2070 and extends outwardly under a rearward projection on the lower end portion of a link 2081 (FIG. 101), which at its upper end is pivotally suspended on a stud secured in the rearward end of the arm 1975 or in the rearward end of the lever 1977, as the case may be, which is secured on the rightward end of the shaft 1966 of the deflector for the bin in which the auxiliary bail 2065 under consideration is located. The lower portion of the link 2081 is slotted for guidance on a stud 2082 secured in the plate 1521. A small lever 2085 pivotally mounted on a stud in the lower end of the link 2081 is urged counterclockwise by a tension spring 2086 connected between a lug on the forward edge of the link 2081 and a stud secured in an upward arm of the lever 2085 so as to maintain a rearward arm of the lever 2085 pressed upwardly against the underside of the stud 2080 to yieldingly urge the latter upwardly into engagement against the underside of the lower rearward extension of the link 2081. It will be apparent that when a bin deflector solenoid BD1–BD27 is energized to rock a deflector to position for deflecting a document into a bin, the auxiliary bail 2065 in that bin will be swung rearwardly and downwardly on top of the stack of previously sorted documents within that bin by the elevation of the lever 2085 and link 2081 connected with the arm 1975 or the lever 1977 operated by the energized bin deflector solenoid BD1–BD27.

In the rearward swinging movement of its supporting arms 2068 the rearward edge of the bail blade 2065 is yieldingly pressed against the undersurface of the next higher bin plate 1942 by the spring 2075 so as to scrape off any previously sorted document which may adhere to that plate 1942 because of a static electric charge accumulated by it in its transit through the conveyor. To aid the blade 2065 in so-removing documents from the plates 1942, the latter are preferably formed with downwardly inclined fingers 2088 (FIGS. 100 and 101) struck out of the plates 1942 and so spaced laterally as to permit the forwardly projecting fingers of the packer bail 2010 to pass upwardly between the fingers 2088.

In the continuing rearward swinging of the supporting arms 2068 the rearward edge of the bail 2065 remains pressed against the next higher plate 1942 or its fingers 2088 until the stud 2072 reaches the forward end of the slot 2073, after which time the blade 2065 swings unitarily with the arms 2068 until an inwardly turned lug 2090 on the rear edge of the downward extension of the right-hand plate 2066 engages a stud 2091 adjustably mounted in a slot in an upward arm of a bracket 2092 (FIGS. 100, 101 and 102) secured to the removable tray plate 2002. In the final portion of the rearward swinging of the arms 2068, the stud 2091 rocks the blade 2065 about the supporting studs 2067 clockwise relative to the arms 2068 until the blade 2065 engages the top of the stack of documents pressed under the packer bail 2010 prior to the time the latter is removed upwardly by operation of the appropriate packer bail clutch.

When the rearward swinging of the auxiliary bail 2065 and its arms 2068 and 2078 is limited by engagement of the bail with the pile of sorted documents in the bin, the spring 2086 yields to permit arrest of the rearward arm of the lever 2085 by the stud 2080 without interference with the full upward movement of the link 2081 and full operation of the shaft 1966 and the deflector operated by the latter.

*Full Bin Detecting Means*

During the rearward swinging of the auxiliary bail arms 2068, the forward end of the forward and downward extension 2078 of the right hand arm 2068 will normally engage and elevate a stud 2095 secured in a one of three vertically extending links 2096, each of which at its upper and lower ends is pivotally connected to the rearward ends of a pair of arms 2097 which in turn are pivotally supported at their forward ends on studs 2098 secured in the plate 1521. A finger 2100 secured to the link 2096 near the lower end of the latter extends leftwardly over and normally bears upon the operating element of one of three switches FBS1, FBS2 and FBS3 mounted on the plate 1521. The weight of each link 2096 is sufficient normally to maintain the associated switches FBS1, FBS2 or FBS3 in operated position, the latter being a singlepole, double-throw switch which is self-restoring to open its forward contacts and close its back contacts. When the links 2096 are in their normal lowered positions, the forward contacts of the switches are closed and the back contacts thereof are opened, but when a link 2096 is elevated by the extension 2078 of an operated auxiliary bail supporting arm, the associated switch restores itself, closing its back contacts and opening its forward contacts.

When the pile of sorted documents in a bin grows in excess of a predetermined height and thus limits the rearward swinging movement of the auxiliary bail 2065 in an operation of the sorter for sorting a document destined for the bin under consideration, the rearward swinging of the auxiliary bail is so limited that the arm 2078 fails to lift the link 2096 far enough to permit a restoring operation of the associated one of the switches FBS1, FBS2 or FBS3. These switches are, as hereinafter described in detail, connected in a circuit so contrived as to operate the previously mentioned warning device to notify the operator of the full document bin condition and perform other functions which will be mentioned later.

*Document Tray Latching and Releasing Means*

A pair of small plates 2105 (FIGS. 101 and 102) secured to opposite sides of the lower forward edge portion of the right-hand side wall member 2003 of each document tray extend forwardly from the member 2003 on opposite sides of a rearwardly extending finger of a latch member 2106 (FIGS. 101 and 104). One such latch member 2106 for each bin in a vertical column is pivotally mounted on a stud 2107 secured in a slide 2108 which extends vertically from top to bottom of the column of bins and is slotted near its upper and lower ends for guidance of studs 2109 secured in and extending inwardly from the hinged plate 1532. A tension spring 2112 is connected between a stud secured in the pivoted latch member 2106 and a stud 2113 secured in the slide 2108. The spring 2112 and the studs to which it is connected at each end are so arranged relative to the pivot stud 2107 that the axis of the spring 2112 is rearward of the axis of the pivot stud 2107 when the latch member 2106 is in the normally latching position so that the spring 2110 then yieldingly holds the latch engaged between the forward ends of the latch keeper plates 2105. The latch member 2106 has two projections extending downwardly, forwardly and rearwardly of the stud 2113 in such relation to the stud 2113 as to limit clockwise movement of the latch 2106 at the latching position shown in FIGURE 101 and to limit counterclockwise movement of the latch member only after such counterclockwise movement has carried the axis of the spring 2112 forwardly of the pivot stud 2107 so that if the latch member 2106 is rocked counterclockwise to tray unlatching position in circumstances hereinafter explained, the spring 2112 will yieldingly retain the latch member in such unlatching position until it is again rocked clockwise to latching position by other means.

Each latch member 2106 also has an upwardly extending finger which, while the latch member 2106 is in its clockwise latching position and the slide 2108 and latch members 2106 thereon are in their lowered positions, is located below and rearwardly of a lug 2115 extending rightwardly from a lever 2116 pivotally mounted on a screw stud 2117 (FIG. 97) secured in the right-hand bushing 1948 of the deflector assembly for the same bin. The lever 2116 has an upward arm having on its upper end a stud 2118 which is located above a downwardly and rearwardly inclined cam edge of a cam projection 2119 on the rearward edge of the link 2081 for operating the auxiliary bail 2065 in the bin with which the latch 2106 is associated. The lever 2116 also has a downward arm which is inclined slightly forwardly and is normally engaged against the rear of a lateral projection 2120 on the rear edge of the lower portion of the link 2081. The normal positions of the link 2081 and lever 2116 are shown with respect to the link 2081 and lever 2116 associated with the uppermost bin in FIGURE 101 in which, however, the slide 2108 and latch members 2106 carried thereby are shown in partially elevated positions.

Near its upper end, each slide 2108 has a finger 2125 extending rearwardly over a stud 2126 extending laterally from a plunger of one of three solenoids BL1, BL2 and BL3 each secured to a small bracket 2128 which is in turn secured to a strip 2130 mounted on posts (not shown) extending outwardly from the plate 1523.

As previously explained, whenever the sorter is operated to sort a document, the deflector operating solenoid BD1–BD27 for the bin in which the document is to be delivered is energized to operate the deflector for that bin and at the same time it elevates the associated one of the links 2081 to operate the auxiliary bail 2065 in the same bin. When the link 2081 is elevated, its lug 2120 is moved upwardly away from the lower end of the latch control lever 2116 for the same bin and its cam projection 2119 acting on the stud 2118 rocks that control lever 2116 clockwise so that the lateral projection 2115 on the control lever is moved rearwardly over the upwardly directed finger of the latch member 2106 for that bin to position the projection 2115 rearwardly of the upper finger of the latch member. Then if the bin into which the document being sorted is to be delivered already contains a pile of previously sorted documents exceeding a predetermined height, the rearward and downward swinging of the auxiliary bail 2065 is so limited that the link 2096 is not elevated sufficiently to permit the full bin switches FBS1, FBS2 or FBS3 for the vertical column of bins to restore.

In any operation of the sorter in which the full bin switch for a vertical column of bins fails to restore, the solenoid BL1, BL2 or BL3 for the same vertical column of bins is energized, as will be fully explained hereinafter. It will be apparent that when the plunger of the energized solenoid is drawn upwardly it will lift the associated strip 2108 and all of the latch members 2106 carried thereby for that vertical column of bins. The upwardly directed fingers of the latch members 2106 for all of the bins in the column except that one which is to receive the document being sorted will move upwardly behind the lateral lugs 2115 of the associated latch control levers 2116. In the case of the bin into which the document being sorted is to be delivered, the upward finger of the latch member 2106 moves upwardly in front of the projection 2115 on the lever 2116 which has been rocked clockwise from its normal position by the cam projection 2119 on the elevated link 2081. Such upward movement of the slide 2108 and latch members 2106 by a bin latch solenoid BL1, BL2 or BL3 is insufficient to lift the rearward fingers of the latch members out of the space between the latch keeper plates 2105.

When, after the document being sorted has entered the full bin and has operated the sorted document detecting finger 1980 for that bin, and the deflector solenoid BD1–BD27 for that bin is deenergized to permit the spring 1976 to return the deflector and the link 2081 downwardly to normal positions, the lug 2120 on the link 2081 acts on the lower arm of the latch control lever 2116 and cams the control lever 2116 counterclockwise to normal position as the cam projection 2119 moves downwardly away from the roller 2118. During such restoration of the lever 2116, the lug 2115 thereon acts on the upward finger of the latch member 2106 to rock the latter counterclockwise to releasing position in which its rearward finger is elevated above the forwardly extending portions of the latch keeper plates 2105 of the tray in the bin which has received the sorted document.

The slide 2108 for that column of bins and all of the latch members 2106 thereon remain in the partially elevated position because the bin latch solenoid for that column of bins remains energized, as hereinafter explained more fully, until the right-side door 1531 for that column of pockets is opened and again closed. After opening the door, the operator may remove the unlatched tray from the sorter and empty it. To aid the operator quickly and easily to locate the full bin, that portion of the rearward finger of each latch member 2106 which is normally concealed between the latch keeper plates 2105 is painted with a distinctive bright color so that the latch member 2106 which is in released position clear of the plates 2105 is readily visible to the operator through the transparent door plate 1535.

*Interlock Device to Prevent Sorting Operation Before Opening and Closing Door After Detection of Full Bin or While Door is Open*

The stud 2126 carried by the plunger of each bin latch solenoid also underlies the rearward end of an arm extending rearwardly from a respective one of three slides 2135 (FIGS. 101, 103 and 104), each of which is guided for vertical movement on studs 2136 on the outer side of the upper end portion of the member 1529. A pawl 2137 pivotally mounted on a stud 2138 carried by the slide 2135 is urged counterclockwise by a tension spring 2139 which normally maintains the pawl in contact against a limit stud 2140 secured in the slide 2135 so that the upper end of the pawl 2137 is normally positioned under the rightwardly bent end 2141 of a rearward arm of a three-armed pawl 2142 pivotally mounted on a stud 2143 secured in the member 1529 forwardly of the slide 2135. The pawl 2142 is urged clockwise by a tension spring 2144 which, when the parts are in normal position, the slide 2135 then being in its lowered position, maintains a downward finger of the pawl 2142 engaged against a limit stud 2145 which also serves as anchor stud for spring 2139 and for one of the springs 1976. The upward arm of the pawl 2142 is then located under the downwardly extended rearward end of a rearward arm 2146 of a lever 2147 pivotally mounted on a stud 2148 secured in the member 1529 and urged clockwise by a tension spring 2149 connected between a stud secured in the member 1529 and a stud 2150 secured in a downward arm of the lever 2147.

When a bin latch solenoid is energized, the associated slide 2135 is elevated to the position of FIGURE 101 so that the upward projection of the pawl 2137 carried by the slide 2135 rocks the pawl 2142 counterclockwise far enough to move the upward finger of the pawl 2142 forwardly clear of the downward projection of the rearward arm 2146 of the lever 2147 so that the latter lever is then rocked clockwise by the spring 2149.

When the lever 2147 is rocked clockwise by its spring 2149, its rightwardly bent upper end actuates the operating member 2151 of a respective one of three self-restoring, single-pole, double-throw switches RD1, RD2 and RD3 to open the normally closed contacts and close the normally opened contacts thereof. The latter switches, as hereinafter explained more fully, control an energizing circuit for the previously mentioned full document bin signal lamp FDB on the keyboard of the master machine and also control means for preventing a further operation of the apparatus, for establishing a holding circuit for the energized bin latch solenoid BL1, BL2 or BL3 and for energizing a respective one of three bin column lamps DL1, DL2 and DL3 (FIG. 101) for the column of pockets in which the full bin is located. The three lamps are mounted on the plate 1523, one above each vertical column of bins.

To permit the operated right door switch RD1, RD2 or RD3 to restore to normal condition to permit further operation of the apparatus, it is necessary, as mentioned above, to open and again close the right-hand door 1531 for the column of bins containing the full bin, such door being indicated to the operator by the lighted door lamp DL1, DL2 or DL3 above the door. The upper front edge portion of the door frame plate 1531 extends leftwardly and carries a bracket 2155 (FIGS. 103 and 104) which extends upwardly behind a rightwardly bent lug 2156 and the upper arm of a lever 2157 which is also pivoted on the stud 2148 and is urged clockwise by a spring 2158 so that when the door is swung outwardly the upper end of the bracket 2155 swinging rearwardly permits the spring 2158 to rock the lever 2157 clockwise. In such clockwise movement of the lever 2157, its rightwardly bent upper end engages the switch operating member 2151 to hold it in operating position. Opening movement of the door is limited by engagement of a stud 2160 secured in the leftwardly turned upper front edge portion of the door frame plate 1531 against the rightwardly projecting end of a stop bracket 2161 secured to the member 1529.

As the door approaches its fully opened position, a stud 2165 extending upwardly from a forwardly projecting lower end portion of the bracket 2155 acts upon the stud 2150 of the lever 2147 to restore the latter counterclockwise to normal position and simultaneously causes the stud 2150 to act upon the upwardly and forwardly inclined cam edge of a forwardly extending cam finger 2166 of the pawl 2137 to rock the latter pawl clockwise to move its upward projection rearwardly clear of the rearward finger 2141 of the pawl 2142. The pawl 2142 is thereby released for movement clockwise by its spring 2144 to its normal position where its downward finger limits on the stud 2145 and its upward finger is again positioned under the downward projection on the rearward arm 2146 of the restored lever 2147 to hold the latter in restored position. As the right door switch RD1-3 is then still held in operated position by the lever 2157 the solenoid BL1, BL2 or BL3 remains energized holding the slide 2135 upwardly and also holding the slide 2108 in its partially elevated position and maintaining the latch 2106 of the full bin in releasing position where its brightly colored portion is visible to the operator. The operator may reclose the door either with or without first removing, emptying and reinserting the full tray.

When the door is reclosed the upper end portion of the bracket 2155 engages the lug 2156 and restores the lever 2157 counterclockwise to normal position, thereby permitting the switch operating member 2151 and its switch to restore to normal. When the switch restores to normal, the door signal lamp is extinguished, the interlocked circuit is restored to normal, as hereinafter described, to permit a further operation of the apparatus and the bin latch solenoid is deenergized and permits the operated slide 2135 to be restored downwardly by gravity aided by the spring 2139 which then rocks the pawl 2137 counterclockwise to normal position where its upward projection is under the end portion of the rearward arm of the pawl 2142.

The deenergized bin latch solenoid also permits the slide 2108 to restore downwardly to move the upward finger of the released latch member 2106 downwardly clear of the lug 2115 of the associated lever 2116. During the downward movement of the slide 2108 and latch members 2106 a forwardly extending finger of the released latch member engages a stud 2170 (FIGS. 101 and 104) which is secured in and projects leftwardly from the plate 1532 and rocks the released latch member 2106 clockwise sufficiently to shift the axis of the spring 2112 across the axis of the pivot stud 2107 so that said latch member is restored to latching position.

When left side doors are provided on the sorter, left door switches LD1, LD2 and LD3 (not shown in the mechanical drawings) similar to the right door switches but operated only by the respective left doors are provided and connected in circuit with the right door switches as shown in FIGURE 109E.

*Means for Releasing All Tray Latches*

A long slide 2177 is horizontally slidably supported on shouldered screws 2178 which secure the member 2130 to its supporting posts. A tension spring 2179 connected between a stud in the slide 2177 and a stud 2180 secured in the member 2130 and extending through a slot in the slide 2177 urges the latter forwardly. However, the slide 2177 is normally held at substantially its rearward limit of movement by a squared stud 2181 secured in the slide and engaged by the rear edge of a lug 2182 extending upwardly from the left edge portion of the armature 2184 of a relay BLR. A bell crank 2186 supported on a pivot stud 2187 secured in a downward extension of the member 2130 has one arm extending upwardly in front of a stud 2188 secured in the slide 2177 and another arm extending rearwardly under a stud 2190 secured in the upper end of the slide 2108. When the relay BLR is energized, as hereinafter explained, by means controlled by the all register total key ART on the master machine, the armature 2184 of the relay is pulled downwardly against the tension of its return spring 2183, retracting the lug 2182 below the stud 2181. The slide 2177 is thereby released for movement forwardly by its spring 2179 so that the stud 2188 in the slide rocks the bell crank 2186 to elevate the slide 2108 fully to its uppermost position. Such full upward movement of the slide 2108 is sufficient to lift all of the tray latch members 2106 carried thereby upwardly clear of the latch keeper plates 2105 so that all of the trays in all three vertical columns are unlatched.

After the series of automatic register total-taking operations of the master machine is completed, as previously described, and the all register total key ART restores to normal, the operator may relatch all of the trays in their pockets by manually returning the slide 2177 rearwardly to normal position by means of a finger piece or knob 2192 secured thereto so that the stud 2181 on the slide may be relatched by the lug 2182, the relay BLR having been deenergized, as explained hereinafter, at the conclusion of all register total-taking operations of the master machine. It is of course intended that the operator will remove the trays one by one and reinsert them after having taken the sorted documents therefrom before operating the knob 2192 to relatch the trays.

*Sorted Document Braking and Settling Means*

Documents being sorted are carried through the conveyors at considerable speed by the rapidly driven belts and arrive in the sorting bins with considerable velocity and static electric charge which requires that effective means be provided to arrest and settle the sorted documents in proper position under the packer bails 2010 before the latter are lowered on top of the sorted documents. After various other means for that purpose were tested and found inadequate, the means illustrated in FIGS. 100 and 101 were found to be preeminently satisfactory. Such means comprises a plurality of lengths 2195 and 2197 of very light chain of the character of jewelers' light chain. A number of the chain lengths 2195 (four illustrated in FIG. 99) are attached to and suspended from each packer bail 2010 by passing their upper ends through small apertures in the packer bail and then inserting a thin wire 2196 through the upper end links of the chains. As shown in FIG. 101, additional lengths 2197 of such chains are suspended at both sides of each packer bail 2010 and are attached at their upper ends to the next upward plate 1942.

A document arriving in a bin at high speed strikes edgewise against the light chains which yield without damaging the document but quickly and completely remove the kinetic energy therefrom and probably draw off an effective amount of any static electric charge thereon. In any case, the sorted document, upon striking the light chains, quickly settles and comes to rest under the raised packer bail 2010.

*Program Control and Switchboard*

The program control unit comprises a preferably cast housing member 2200 (FIG. 105) having integral back, bottom and side walls and supported in any suitable manner on or from the left side of the master machine stand 105 (FIG. 1) rearwardly of the back portion of the sorter unit when the latter is located as in FIGURE 1. In the interior of the housing member 2200, a panel 2201 (FIG. 105) is suitably supported in spaced relation to the back wall by screws 2202 passing through the panel 2201 through spacing collars (not shown) and into said back wall. Panel 2201 carries certain control circuit components which will be referred to more particularly hereinafter in the description of the circuit. The front of the housing member 2200 is closed by a front cover member 2205 which is removably secured thereto by screws 2206 passing through the member 2205 and threaded into bosses 2207 of the housing member 2200.

The top of the control unit housing 2200 is closed by a program setting switch panel 2210 (FIG. 106) comprising a top plate 2211 (FIG. 106) which is secured along its rear edge to one leaf of a hinge 2212, the other leaf of which is secured to a flange 2213 extending forwardly from the top of the rear wall of the housing member 2200. The plate 2211 is also secured at its front side corners to the housing member 2200 by the screws 2214 so that after removal of the latter, the switch panel may be swung upwardly about the flange 2213 for inspection and servicing.

In the panel switch panel, there are twenty-seven pairs of multiple position switches AF1–AF27 and SF1–SF27 arranged in nine transverse rows and three columns of pairs, each switch having a finger piece extending upwardly through an aperture 2220 in the plate 2211. The pairs of switches are preferably numbered on the plate 2211 from 1 to 27 as indicated in FIGURE 106 corresponding to the twenty-seven registers of the three lines of registers in the master accounting machine, to the twenty-seven printers in the multiple tape printing unit, and to the twenty-seven sorting bins in the sorting unit. The right-hand switch SF1–27 of each pair is a four-position sorter function control switch, the left-hand switch AF1–9 of each pair numbered from 1 to 9 in the right-hand column is a three-position accounting or computing function control switch, and the left-hand switches AF10–27 of the remaining pairs numbered from 10 to 27 are two-position accounting or computing function control switches. Each of the fifty-four switches has one open position and its remaining position or positions is or are closed.

For each transverse row of three pairs of switches there is a unitary transversely extending inverted channel member 2221 (FIGS. 106 and 107) which is secured to the underside of the plate 2211 by screws 2222 passing through the plate 2211 and threaded into the transverse top portion of the channel members 2221 at each end thereof. Within each channel member 2221 there are six switch blocks 2224 formed of suitable insulating material, each having a stem or finger element 2225 extending upwardly through an individual aperture 2226 in the top of the channel member 2221, and through an aperture 2220 in the plate 2211, the apertures 2220 in the plate 2211 and the apertures 2226 in the channel members 2221, each being laterally elongated sufficiently to permit movements of the switch blocks 2224 and their finger stems 2225 lengthwise of the channels 2221 to the required number of positions for each switch.

Inserted between the top faces of the switch blocks and the under face of the tops of the channel members 2221 are small, thin, flat, movable, dust-excluding closure plates 2227, each formed with an aperture 2228 through which the finger stem 2225 of the associated switch block 2224 passes, the dimension of the aperture 2228 lengthwise channel 2221 being greater than the dimension of the finger stem by an amount equal to the distance of movement of the switch block from one switch position to the next adjacent switch position. The aperture 2228 in each plate 2227 is smaller than the distance from either side of the finger stem 2225 to the opposite end of the block 2224 so that there can never be an open passage through the aperture 2228 past either end of the associated switch block. The length of the plate 2227 is such that, in any position to which the associated switch block may be moved, the plate will extend beyond the ends of the associated switch block sufficiently to close off the aperture 2220 in the plate 2211, the length of the latter aperture being greater than the length of the switch block 2224. Lugs 2229 (FIG. 106) struck out of the top of the channel member 2221 extend downwardly to limit the endwise movements of the plates 2227 so that their end edges always remain beyond the ends of the apertures 2220. Thus, in all positions of the three and four-position switches, the plates 2227 prevent entrance of foreign matter into the interior of the switch panel assembly past either end of a switch block 2224. The openings 2228 in the plates 2227 for the two-position switches are large enough only to freely pass the finger pieces 2225 of those switches.

Lugs 2230 extending downwardly from the lower edge of both sides of each channel member 2221 pass through apertures 2231 in a plate 2232 of suitable insulating material and are each bent toward the adjacent lug 2230 on the opposite side of the same member 2221 on the underside of the plate 2232 to support the latter tightly against the lower edges of the channel members. The plate 2232 carries on its upper surface contact elements 2235 and 2236 for each of the switches, said contact elements being preferably applied thereto together with certain conductor elements (not shown in the mechanical drawings) by means of printed circuit technique and various conductor elements such as 2237, 2238, 2239 (FIG. 107) may also be applied to the undersurface of the plate 2232 in the same manner.

The lower part of each switch block 2224 is formed to accommodate a spring metal contact member 2240 having upturned end portions located in forwardly and rearwardly extending grooves 2241 in the switch block, the upturned end portions of the contact members being notched at 2242 to straddle projections or shoulders 2243 of the switch block within the grooves 2241 to maintain the contact member properly positioned relative to the switch block. Each contact member 2240 also has a pair of contact fingers 2245 struck from the longitudinal body portion thereof and bent downwardly to press yieldingly against contact elements 2235 and 2236 on the upper surface of the plate 2232.

Each switch block is yieldingly detented in each of its switch positions by means of a small helical compression spring 2247 (FIG. 107) inserted in a bore 2248 formed in the switch block, said spring 2247 acting on a ball 2249 located in the outer end portion of the bore 2248 and pressed into one of a number of apertures 2250 formed in the adjacent side of the channel member 2221.

As is apparent from FIGURE 106, for each switch there is one contact member 2235 with which the rear contact finger 2245 of the contact member 2240 makes sliding contact in at least all of the closed positions of the switch. For each closed position of each switch there is an individual contact member 2236 with which the forward contact finger 2245 of the member 2240 makes contact in the respective position of the switch. As shown in FIGURE 106, the four-position right-hand switch SF1 of the No. 1 pair is provided with only three contact members 2236, one for each of the three closed positions of the switch, no contact being provided for the open position. The same is true with respect to the four-position right-hand switch of each of the twenty-seven pairs. Similarly, the three-position left-hand switches AF1–AF9 of each of the pairs from 1 to 9 have contacts 2236 provided for each of two closed positions and no contact 2236 is provided for the one open position. Likewise each two-position switch AF10–AF27 has one contact member 2236 for its one closed position and no contact 2236 for its open position. However, in FIGURE 109B all of the fifty-four switches of the program setting switch panel are shown with contacts 2236 all of their switch positions including the open positions, for the purpose of clearly indicating the open positions as well as the closed positions.

Each contact element 2236 makes contact with a conducting element 2252 which extends through the insulating plate 2232 and in turn makes contact with one or another of the printed conductors on the underside of the base plate. Each conductor 2235 has a rearward extension making contact with a conducting securing element 2253 which secures a conducting mounting bracket or clip member 2254 (FIG. 107) to the underside of the plate 2232. Each member 2254 has a depending portion apertured to receive and make supporting and conducting contact with the cathode terminal of a respective one of two small isolating rectifiers ID, the anode terminals of both of which are supported by and make conductive contact with a similar bracket 2255 mounted on the underside of the plate 2232 by another fastening element 2253 which, however, will not make contact with any contact element on the upper surface of the plate 2232. The bracket 2255 has electrical connection with a conductor 2256 whereby each of the twenty-seven conductors 2256 has unilaterally conductive connections with both contacts 2235 of a respective one of the twenty-seven pairs of switches.

To insure that the twenty-seven switches of the program setting switch panel will always be set to the proper positions for any work being performed with the apparatus, there is provided, for each different work program, a template 2260 formed with twenty-seven apertures 2261 of a size and form to fit snugly about the finger stems 2225 of the switches, each aperture 2261 being so located in the template as to insure that when the template is placed over the switch panel in correct position relative thereto, each switch will be in the proper set position required for the desired work program. To insure correct positioning of the template 2260 on the switch panel, the template is formed at opposite sides with apertures 2262 to pass down over the upper end of a latch lever member 2263 which extends through an opening in the plate 2211 and is pivotally mounted on the vertical side portion of a bracket 2264 secured to the underside of the plate 2211. The latch member 2263 is urged counterclockwise by a tension spring 2265 connected between the lower end of the latch lever and the bracket 2264. The upper end of the latch lever is provided with a forwardly projecting latch nose which, when the template 2260 has been lowered to the proper position, engages over the upper surface of the template forwardly of the aperture 2262 to releasably hold the template accurately positioned on the switch panel.

As the template is lowered to proper latched position on the switch panel, it engages and depresses the operating button 2268 of each of a pair of self-opening switches TL mounted on the underside of the panel plate 2211 adjacent a respective one of the two latches 2263. The switches TL as shown in FIGURE 109A are connected in series with the main power switch MPS (FIG. 6) so that, as more particularly described hereinafter, the main power control circuit will remain open to prevent operation of the apparatus at all times when a program template 2260 is not properly positioned on the program setting switch panel to insure proper positioning of each of the fifty-four accounting function and sorter function control switches for a proper work program.

Control Circuit, Mode of Operation and Example of Work

The control circuit which ties the master accounting machine, the multiple tape printer and the sorter together with the program control panel and governs the operation of the apparatus is shown schematically in FIGURES 109A to 109F, inclusive. The diagram in FIGURE 109 illustrates the position in the complete circuit, of the circuit portion shown in each of FIGURES 109A to 109F.

All circuit components are designated basically by one or more capital letters. Where there are a plurality of corresponding circuit elements provided in similar circuit portions associated with the several accumulating registers of the master machine, the several printers of the multiple tape printer, the several document bins of the sorter or with different decimal orders of the computing mechanisms, those corresponding components are designated by same reference letters with the non-hyphenated addition of an identifying numeral, as for example, in the case of the nine switches SYS1–SYS9 located in the master machine keyboard and operated by the keys SK1 to SK27. Relays and arrays of relays are similarly designated and the contacts operated by each relay are identified by the same reference letters and numbers as the relays with the hyphenated addition of identifying numerals, as for example, in the instance of the hereinafter described relay XR3 and the contacts XR3–1 to XR3–4, inclusive, operated by that relay.

To facilitate locating the hereinafter described circuit components in the circuit diagram of FIGURES 109A to 109F, the reference letters and numerals designating the circuit components will be followed in parenthesis by the capital letter (A to F) of that one of FIGURES 109A to 109F in which such circuit component is shown and, in the case of FIGURE 109A, by the lower case letter $t$, $m$ or $b$ to indicate the portion, top, middle or bottom, of the sheet, in which the component is located. In the case of FIGURES 109B–109F, the figure designating capital letter will be followed by two lower case letters ($t$, $m$ or $b$ plus $l$, $c$ or $r$) to designate that portion of the figure indicated by the same two lower case letters in the diagram in FIGURE 110, in which the component is shown, the letters *t*, *m* and *b* indicating top, middle and bottom respectively and the letters *l*, *c* and *r* indicating respectively left, center and right. Thus, for example, BLR–1 (C*mc*) indicates that the No. 1 contacts of relay BLR will be found in the middle center ninth of FIGURE 109C. However, a series of circuit elements extending from side to side or from top to bottom of a sheet will be located merely by the figure letter plus a single letter to indicate that third of the sheet in which the series of elements are placed, as for example, in the instance of the switches SD1 to SD27 (F*r*).

In the circuit diagram all switches and relay contacts are shown in their normal conditions with the power switches open to disconnect the system from the power supply line.

Preliminarily, it may be pointed out that the twenty-seven pairs of manually settable switches AF1 to AF27 and SF1 to SF27 (B) on the program control panel (FIG. 106) are each associated through the contacts X1–1 to X3–9 (B*r*) of three pairs of relays X1, X2 and X3 (C*tr*), with the switches SXS1, SXS2, SXS3 (C*tr*) and the switches SYS1 to SYS9 (C*l*) in such manner that the sorting and computing function control circuits controlled by each of the twenty-seven pairs of switches is associated with a respective one of the twenty-seven selecting keys SK1 to SK27 (FIGS. 6 and 7) on the master machine keyboard so that, as will be described in detail, each pair of program control panel switches AF and SF will govern certain sorting and computing functions to be performed in operations initiated by depression of a respective one of the selecting switches SK.

The switches SYS1 to SYS9, and the switches SXS1 to SXS3 through the relay pairs X1 to X3, are associated with sorting bin selection relays SY1 to SY9 (C*c*) and SX1 to SX3 (C*tc*) which in turn through their contacts SY1–2 to SY9–4 (F*l*) and SX1–2, SX2–2 and SX3–2 (F*bl*) control bin deflector solenoids BD1 to BD27 (F*l*) and column deflector solenoids CD2 and CD3 (F*tc*), so that each master machine keyboard selecting key SK1– SK27 may select a respective one of the twenty-seven document bins of the sorter to receive a document.

The switches SXS1 to SXS3 through the relay pairs X1 to X3 control the circuits of the master machine register selection control magnets SXM1, SXM2 and SXM3 (L*mr*), control the circuits of the register designation printing control magnets PM10, PM19 and PM20 (E*mr*), and control the relays XR1, XR2 and XR3 (E*mr*) which in turn through their contacts XR1–3, XR2–3, XR3–3, XR2–4 and XR3–4 (E*ml*) control in part the circuits of the register function control solenoids ASB, ASC, ASD, SATB, SATC, SATD, STSB, STSC and STSD (E*ml*).

The switches SYS1 to SYS9 and the switches SXS1 to SXS3 through the relay pairs X1 to X3 and the relays XR1 to XR3 control the circuits of the printer selecting magnets PSY1 to PSY9 (C*l*) and PSX1 to PSX3 (C*br*) of the multiple tape printer so that each selecting key SK1 to SK27 on the master machine keyboard selects a respective one of the printers of a multiple tape printer to function in the operation initiated by depression of the selecting key. Also, the read-out switch units ROS and RO1 to RO10 (D*c*) are associated with the read-in magnets RIM1, RIM2, RIM4 and RIM8 for indexing the corresponding order type wheels of the multiple tape printer so as to control the indexing of the type wheels of the multiple tape printer in accordance with the data entered in or taken from the crossfooter and/or the operated accumulating register or registers of the master machine and printed by the latter in each operation. The contacts STY1 to STY9 (C*l*) of the all register total switch assembly (FIGS. 28, 29 and 30) are connected in parallel to the contacts of the switches SYS1 to SYS9 and the contacts STX1, STX2 and STX) (C*mr*) of the all register total switch assembly are connected in parallel to the relay contacts X1–10, X2–10 and X3–10 so that the all register total switch assembly controls the selection of the printer units of the multiple tape printer and controls the register selection magnets SXM1 to SXM3 and the register designation printing control magnets PM10, PM19 and PM20 of the master machine in the same manner as the selection keys SK1 to SK27, and likewise controls the circuits of the register computing function control solenoids of the master machine except that the selected register is operated for total taking instead of addition because the all register total switch assembly, when functioning, closes the switch RTST (E*tl*) which controls the solenoid RSTT (E*tl*) to enable the latch means for the amount differential stop slides of the master machine, and also operates the switch RTS which control the register subtract and total relay RSAT (E*bl*), the contacts RSAT–1, RSAT–2, and RSAT–3 of which control the register add solenoids ASB, ASC and ASD and the register subtract and total solenoids SATB, SATC and SATD of the master machine.

As previously mentioned, the right-hand switch SF1 to SF27 of each of the twenty-seven pairs of program control panel switches is settable to govern certain sorting functions. Such control is effected, as will be described in detail, through relays NS, NE and FE (B*bl*), the windings of which are connected to contacts of all of the right-hand switches SF of the program control panel switch pairs. The left-hand switches AF1 to AF9 of the program control panel switch pairs control certain computing functions of the crossfooter through relays CBR and DT (B*bc*) and the left-hand switches AF11 to AF18 and AF20 to AF27 of the program control panel switch pairs from 11 to 18 and 20 to 27 control operation of certain registers through a relay RA (B*bl*) as hereinafter described. The left-hand switches AF10 and AF19 control a function of certain registers through the relay RTR (B*bc*) as hereinafter described in detail.

An energizing circuit for the master machine cycling solenoid MCS (E*mc*) is so controlled, as hereinafter explained in detail, by a combination of switches and contacts including the crossfooter non-clear switch CNC (E*mc*), the contacts DT–2 and RTR–2 (E*mc*) of the relays DT and RTR and the contacts DR–1 (E*bc*) of a relay DR (E*br*) which is in turn controlled by the contacts XR1–2, XR2–2 and XR3–2 of the relays XR1, XR2 and XR3, by the document detecting switches DDS (E*br*) of the sorter unit, and by the contacts SR–1 (E*br*) of a relay SR (E*bl*) which is in turn controlled by a combination of switches and relay contacts including the contacts RTR–3 and the contacts NS–1 (E*bl*) of the relay NS, that by appropriate settings of the program control switches AF1 to AF27 and SF1 to SF27, selected ones of the keys SK1 to SK27 can be enabled to initiate cycles of operation without or only with a document in the sorter chute, and selected ones of the keys SK1 to SK9 can be enabled to initiate cycles of operation regardless of the numerical condition of the crossfooter or only when the crossfooter is in the numerical condition (clear) it should be in if the previous work was correct.

Figure 109B:
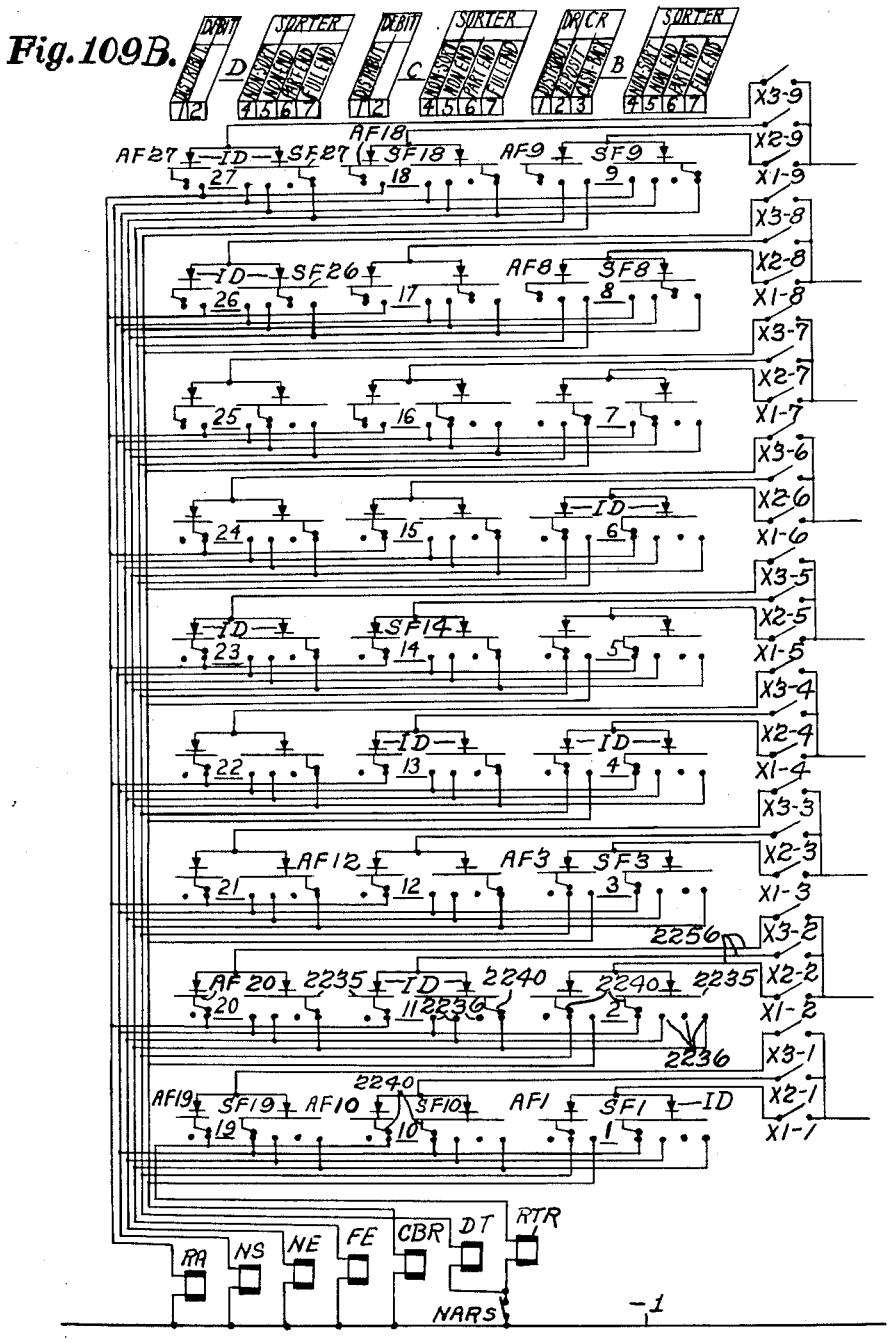

On FIGURE 109B of the circuit drawing, the positions of the left hand switches AF of the switch pairs AF, SF are numbered 1, 2 and 3 and the positions of the right-hand switches are numbered 4, 5, 6 and 7. If the right-hand switch SF of any pair is in its 4 position, depression of the corresponding key SK on the master machine keyboard will initiate a cycle of operation without a document in the sorter chute and without operating the sorter. If the right-hand switch SF of the switch pair corresponding to the depressed selection key SK is in any of its three other positions, 5, 6 and 7, a cycle of operation will not be initiated unless and until a document is inserted in the sorter chute (FIG. 83) and closes the document detecting switches DDS or the key DS (FIG. 6) is depressed to open the sorter disabling switch DIS (E*bl*) as hereinafter explained. If the switch SF corresponding to the depressed selection key is in its 5 position, neither of the two endorser printers will be operated and the document will be sorted to the selected bin without endorsement. If the switch SF is in its 6 position, the type wheels 1606 (FIG. 84) will be operated to print a date and an identification number before the document is released and sorted to the selected bin. If the switch SF is in its 7 position the printing plate 1605 as well as the type wheels 1606 will print on the back of the document before it is sorted to the selected bin.

If the left-hand switch AF of the program control panel switch pair corresponding to the depressed selection key SK is in its 1 position, the amount entered on the amount keys of the master machine will be added in the crossfooter and in the selected register of the master machine. If the depressed selection key SK is one of the nine keys SK1 to SK9 and the left-hand switch AF of the corresponding program control panel switch pair is in either its 2 or 3 position, the relay DT or CBR will be energized and the amount set on the master machine amount keys will be subtracted from the crossfooter and added in the selected register of the master machine and if said switch AF is in its 2 position, the cycle of operation will not be initiated without depression also of the key AC if the crossfooter is not clear. If the depressed selection key SK is one of the sixteen keys SK11 to SK18 and SK20 to SK27 and the corresponding key AF is in its 2 position, the amount set on the master machine amount keys will be added in the selected register and will also be added in the No. 10 register if the depressed key is one of the keys SK20 to SK27 or will also be added in the No. 19 register if the depressed key is one of the keys SK11 to SK18. If the depressed key SK is one of the two keys SK10 and SK19 and the corresponding switch AF10 or AF19 is in its 2 position, a total will be taken from the corresponding register, the crossfooter will be non-added, and the cycle of operation will be initiated only if the crossfooter is clear, but without insertion of a document in the sorter document chute and the sorter will not operate regardless of the position of the right-hand switch SF10 or SK19 of the same switch pair.

The sorted document switches SD1 to SD27 (Fr) control, through the relay SS (Fbc) and others, holding circuit means hereinafter described in detail, which, in a document sorting operation keep the sorter unit operating and prevents initiation of another cycle of operation, in which a document is required to be sorted, until the document being sorted arrives in the sorter bin to which it should be sorted.

The register interlock switches RIS1, RIS2 and RIS3 (Etc) are connected in series in the energizing circuit of the master machine cycling solenoid MCSW so that a cycle of operation cannot be initiated at any time while the multiple pinion register assembly of any of the three lines of registers is displaced from normal position to or beyond its second register position.

The correction key COR operates a switch CORS (Ctr) which controls a relay CR, the contacts CR-2 (Etl) of which are so arranged in relation to the contacts DT-1 of relay DT and contacts CBR-1 of relay CBR that depression of the key COR will in every case reverse the function (add or subtract) of the crossfooter determined by the switch AF1 to AF9 corresponding to any depressed selection key SK1 to SK9. Depressed with any selection key SK10 to SK27, the key COR always causes the crossfooter to subtract. The contacts CR-1 (Ebl) so control the circuits of the relay SR and a relay RSAT having contacts in the circuits of the register add solenoids and register subtract and total solenoids that depression of the key COR prevents operation of the sorter and causes the register selected by the depression of any of the selection keys SK1 to SK9, SK11 to SK18 and SK20 to SK27 to subtract and will also cause the 10 or 19 register to subtract if one of the latter registers is selected for operation by reason of the switch AF for the depressed selection key being in its 2 position.

It is believed that the circuit and the modes of operation of the circuit and apparatus may most clearly and easily be described in conjunction with an abbreviated example of work.

The example which has been selected to illustrate the use of the apparatus of the present invention is an abbreviated example of a kind carried on in the proof department of a bank and involves the proving of deposit amounts, the validation of deposit slips, the sorting of checks accompanying the deposit slips after full endorsement of some and partial endorsement of others, and the production of "float" figures which may be printed upon the deposit slips for later use in analysis relating to the accounts to which the deposits apply. It will be assumed that the operator of the apparatus has received a batch of deposits including "Deposit" slips and accompanying checks, together with, in some instances, "Cash Back" slips or "Cash In" slips prepared by the receiving tellers to record the payment of cash to or receipt of cash from the depositors to balance the deposit totals written at the foot of the "Deposit" slips.

To prepare the apparatus for work, the program control panel switches AF1 to AF27 and SF1 to SF27 are first set to the positions required for the program of work in hand. Notwithstanding the distinctions relative to accounting functions between the switch pairs of the right-hand column of pairs on the program control panel, the switch pairs at the bottom of the center and left columns, and the remainder of the switch pairs in the center and left columns, it is still possible to employ or assign various switch pairs to various types of items with a certain amount of latitude and flexibility, as will be indicated hereinafter, so that the apparatus is in fact usable to perform a variety of different kinds of work and adaptable to the varied needs of different users. However, it will be assumed that, for the particular case to which the present abbreviated example applies, the program control panel switches will be set as shown in FIGURE 109B.

Any of the nine pairs of switches AF1, SF1 to AF9, SF9 may be assigned to deposits received by the several receiving tellers. In the abbreviated example to be considered, only two receiving tellers are involved and switch pairs AF1, SF1 and AF2, SF2 are assigned to deposits received by the respective tellers. The total deposit amount indicated at the bottom of each "Deposit" slip is to be subtracted from the crossfooter and added in the register associated with the assigned switch pair. The "Deposit" slips will not be sorted, but each will be inserted in the validating chute of the master machine formed by the pair of guides 729 (FIG. 37) so that the deposit entered in the crossfooter and register and printed on the master machine detail tape 110 (FIGS. 1 and 37) will also be printed on the "Deposit" slip for verification purposes. Therefore, each of the switches SF1 and SF2 will be set to its 4 position so that the sorter unit will not operate and cycles of operation may be initiated by depression of either one of the keys SK1 and SK2 without insertion of a document in the sorter chute.

Another switch pair of the first column may be assigned to savings accounts deposits slips. Assuming that the sixth switch pair is so assigned and that savings accounts deposits slips are not to be sorted, the switch AF6 will be set to its 2 position and the switch SF6 will be set to its 4 position.

Any of the remainder of the first nine switch pairs of the program control panel may be assigned to "Cash Back" slips, but it will be assumed that only the No. 7 switch pair is assigned for that purpose. Assuming that "Cash Back" slips are to be sorted and as there is no need to endorse them, the right-hand switch SF7 will be set to the 5 position to require sorting of a document without endorsement. Inasmuch as "Cash Back" amounts when added to the total deposit should produce a sum equal to the total of the amounts of deposit items accompanying the "Deposit" slip, the left-hand switch AF7 will be set to its 3 position so a cycle of operation will be initiated upon depression of the key SK7 and insertion of a document in the sorter chute while the crossfooter contains the total amount of the deposit, and so that the amount shown on the "Cash Back" slip and set on the master machine amount keys will be added in the No. 7 register and subtracted from the crossfooter, that is, it will be entered in the crossfooter in the same sense as the deposit total. Any of the remainder of the twenty-seven switch pairs on the program control switch panel may be assigned to deposit items, such as "On Us" checks, requiring sorting and only partial endorsement and representing immediate credit items, but it will be assumed that switch pairs 8, 17 and 26 will be so assigned. "On Us" checks are checks drawn on and received for deposit at the bank in which the proof work is being performed. Partial endorsement will consist of the printing of the date and identifying number on the back of the document. Switches SF8, SF17 and SF26 will each be set to its 6 position to require sorting and to effect partial endorsement and the switches AF8, AF17 and AF26 will be set to their 1 positions so that the amounts of the items set on the master machine amount keys will be added in registers 8, 17 and 26, respectively.

Other checks constituting immediate credit items but requiring full endorsement will be present. These may be checks drawn on other banks in the same town or city with which there are "same day settlement" arrangements. Any of the remainder of the twenty-seven pairs excepting only the 10 and 19 switch pairs may be assigned to such items, but it will be assumed that the switch pairs 9, 18 and 27 will be so assigned. Accordingly, the switches SF9, SF18 and SF27 will be set to their 7 positions to require sorting and to effect full endorsement, and switches AF9, AF18 and AF27 will be set to their 1 positions to effect addition in the 9, 18 and 27 registers, respectively.

"Cash In" slips representing cash received by the tellers for deposit are to be sorted without endorsement and the amounts thereof added in a register. Any of the remainder of the twenty-seven program control panel switch pairs may be allotted to those items but it will be assumed that the switch pairs 16 and 25 will be so assigned. The switches SF16 and SF25 will therefore be set to their 5 positions to require sorting without endorsement, and the switches AF16 and AF25 will be set to their 1 positions.

The remaining switch pairs except the 10 and 19 pairs may be assigned to various banks and clearing houses to which are routed for collection, deposited checks which will require one or more days for collection and credit. It will be assumed that the switch pairs 11 to 15, inclusive, are assigned to the one-day "float" items and the switch pairs 20 to 24, inclusive, are assigned to the two-day "float" items. All of the switches SF11 to SF15 and SF20 to SF24 will be set to their 7 positions to require sorting and to effect full endorsement. All of the switches AF11 to AF15 and AF20 to AF24 will be set to their 2 positions so as to effect addition in the corresponding registers 11 to 15 and 20 to 24, respectively, and also effect addition in the No. 19 register of all of the items added in the registers 11 to 15 and effect addition in the No. 10 register of all of the items added in the registers 20 to 24. Thus at the end of a run, the No. 10 register will contain a total of the two-day "float" amounts and the No. 19 register will contain a total of the one-day "float" amounts.

As the registers 10 and 19 are assigned to "float" totals, the switches AF10 and AF19 are set to their 2 positions so as to cause total taking from the associated register. The SF10 and SF19 switches are shown as set to their 4 positions but it is, in fact, immaterial where these two switches are set while the switches AF10 and AF19 are set at their 2 positions.

After the switches on the program control panel switchboard have all been set to the positions required for the program of work to be performed, the plastic template 2260 (FIGS. 106 and 108) prepared for that particular work program is placed on the program control panel switchboard and latched in place by the latches 2263. This insures that all of the switches on the panel have been correctly set so that their finger pieces 2225 will pass through the apertures cut in the template. The operator will then make sure that the low paper by-pass switch PLB on the master machine keyboard (FIG. 6) is in its normal position and will set the main power switch MPS and the sorter power switch SPS on the keyboard to their "on" positions if they are not already so positioned. If the low paper signal lamps PPD beside the switch PLB on the keyboard lights while the latter switch is in normal position, the operator will look at the multiple tape printer unit to see which of the tape printers has its low paper supply signal flag 1334 (FIG. 68) projected to visible position and will replenish the paper supply in such tape printer before proceeding with the work.

The closing of the program control panel template switches TL (At) by the placing of the template 2260 in latched position on the program control panel, and the closure of the main power switch MPS by the operator will complete the energizing circuit of the main power relay MPR (At). To prevent chattering of the relay MPR, a small selenium rectifier D1 is inserted in series with the relay winding and the latter is shunted by a condenser C1. The relay MPR when energized closes its contacts MPR–1 (At) in the power supply circuit of the multiple tape printer motor TPM (At), the master machine motor MM, the master machine and multiple tape printer control power supply rectifier PR1 (Am), the sorter motor SM (Ab), the sorter door lights DL1, DL2 and DL3 (Ab), and the sorter control power supply rectifier PR2 (Ab). Upon operating the sorter power supply switch SPS to closed position, its contacts SPS1 (Ctc) close the energizing circuit of the sorter power relay SPR (Cmc) which is thereby energized and closes its contacts SPR–1 (Am) to complete the power supply circuit to the sorter motor SM and to the sorter control power supply rectifier PR2. The sorter motor, it will be remembered, is a continuously running motor.

Positive and negative potential power lines +1 and −1 run from the rectifier PR1 across the top and bottom, respectively, of FIGURES 109B to 109E and positive and negative potential power lines +2 and −2 run from the rectifier PR2 across the top and bottom, respectively, of FIGURES 109B to 109F.

The operation of the sorter power switch to the "on" position also closes its contacts SPS2 (Ebl) which completes the energizing circuit of the sort relay SR extending from the positive power line +1 at the top of FIGURE 109E through the normally closed switch RNAS, the normally closed contacts of the switches RSTS and RTS and the normally closed contacts CR–1, BR–1, RTR–3, NS–1, RSAT–4, RSTR–4, the winding of the relay SR, the closed contacts SPS2, the normally closed switch DIS and the normally closed contacts of the switch MCSW to the negative power line −1. The relay SR upon energization transfers its contacts SR–1 (Ebr), thereby disconnecting the winding of the relay DR from the positive power line +1. The relay SR also closes its contacts SR–2 (Fbc) in the circuit of the sort starting relay SS and closes its contacts SR–3 (Fmc) in the circuit of the endorser clutch solenoids ECA and ECB.

To insure that the crossfooter and registers are clear before the work of proving a batch of deposits is commenced, the operator will next depress the all register total key ART on the master machine. The depression of the key ART cause the all register total switch assembly (FIGS. 28, 29 and 30) to operate as previously described and will result in performance of a series of twenty-seven cycles of operation in which the twenty-seven registers of the master machine, one after another, are totaled and the totals printed one below another on the detail tape 110 in the master machine and each register total is likewise printed on the corresponding tape 1170 (FIGS. 60 and 77) of the multiple tape printer unit. As such a series of all register total operations is performed again at the conclusion of the run of work, the detailed description thereof will be deferred until the other operations involved in the example of work have been described.

The series of all register total operations resulting from the depression of the key ART before commencing the run of work for proving a batch of deposits will normally result in the printing of a series of ".00" totals for all of the twenty-seven registers on the master machine detail tape 110 and the printing of a ".00" total on each of the tapes 1170 of the multiple tape printer, thus revealing that all of the master machine registers are in a clear condition. The operator will then depress the crossfooter total key CT on the master machine keyboard, which will initiate a cycle of operation of the master machine in which the crossfooter is totaled and the total printed on the master machine detail tape. Normally it will be found that the ".00" total is printed revealing that the apparatus is ready for performance of the work of proving a batch of deposits. The crossfooter cipher total is shown printed in line 1 of the master machine detail tape 110 in FIGURE 111 and the register cipher totals of certain of the registers are shown printed in line 1d, each of the corresponding multiple printer tapes 1170.

While the apparatus is running through the series of all register total operations, the operator will arrange the batch or "Deposit" slips with the attached checks, "Cash Back" slips, "Cash In" slips, etc., in suitable piles on the top of the sorter unit cabinet to the left of the operator and will place the top "Deposit" slip with its attached documents in a holder (not shown) supported in front of the operator on the front of the master machine. When the series of all register total operations has been completed, the operator will enter on the amount keys of the master machine the deposit total read from the foot of the "Deposite" slip, place the "Deposit" slip in the validating chute 729 (FIG. 37) and, having noted that the deposit was received by receiving teller "1," the operator will depress the key SK1 on the keyboard. Depression of the key SK1, as previously explained in the description of the master machine, will result in closing of the switches SXS1 (Ctr) and SYS1 (Cbl). The closing of switch SXS1 will close the energizing circuit of the pair of relays X1 (Ctr) from the positive line +1 through the normally closed contacts of the master machine cam operated switch TS8 through the contacts of switch SXS1 and the windings of relays X1 to the negative line −1. Relays X1 being energized will close the nine contacts X1–1 to X1–9 (Br) in the circuits governed by the program control panel switch pairs AF1 and SF1 to AF9 and SF9. However, as all of the switches SYS2 to SYS9 are open, and only the switch SYS1 is closed, only the contacts X1–1 will complete a circuit from the positive line +1 through the cam-operated normally closed timing switch TS8 (Ctc), the closed switch SYS1, and contacts X1–1, to the program control switch pair AF1, SF1. The switch SF1 being in its 4 position, the closed circuit will extend through the winding of the non-sort relay NS to negative line −1. The switch AF1 being in its 2 position, a parallel closed circuit will extend through the winding of relay DT and the normally closed switch NARS to negative line −1.

The relay DT, being energized, will transfer its contacts DT–1 (Etl) in the circuit of the crossfooter total and subject solenoid CTSS, which circuit, however, is still open at the contacts of the master machine cam operated timing switch TS5B (Eml). The relay DT also opens its normally closed contacts DT–2 (Emc) in the circuit of the master machine cycling solenoid MCS (Emc) so that the later solenoid will not be energized upon closure of the normally open contacts DR–1 unless the crossfooter is clear so that the crossfooter non-clear switch CNC (Emc), controlled by the crossfooter as previously described, is closed. The relay DT will also close its normally open contacts DT–3 (Ebl) in the circuit of the deposit counter magnet DCM.

The energizing of the relay pair X1 will also result in closing of the contacts X1–10 (Ctr) to close the energizing circuit of the relay XR1 and the register selection control magnet SXM1 of the master machine, said circuit extending from positive line +1 through the cam switch TS8, the contacts X1–10 and the windings of XR1 and SXM1 (FIG. 24) in parallel, to negative line −1. The magnet SXM1, being energized, will release its register selecting plate 305 (FIGS. 24 and 25) for positioning under control of the stop slide 270 (FIG. 21) controlled by the right-hand bank of keys SK so that the "B" line of multiple register pinions will be held in their No. 1 register position under control of the depressed key SK1 as previously described.

The relay XR1, being energized, will close its contacts XR1–1 in the circuit of the printer selecting solenoid PSX1 (Cbr) of the multiple tape printer, which circuit as well as the circuit of the printer selecting magnet PSY1 (Cbl) including the now closed contacts of the switch SYS1 are both still open at the contacts of the master machine cam operated timing switches TS7A (Ebc) and TS7B which are arranged in series to reduce arcing. However, the relay XR1 also closes its contacts XR1–2 (Ebr) which are connected between the switch TS7A and negative line so that the energizing of the printer selecting solenoid PSX1 and magnet PSY1 now awaits only the closing of the timing switches TS7A and TS7B. Contacts XR1–3 (Eml) are also closed in the circuit of the "B" register line add solenoid ASB, which circuit is still open at the contacts of timing switch TS5A (Emr).

The relay NS, being energized, opens its normally closed contacts NS–1 (Ebl), thereby opening the energizing circuit of the sort relay SR so that the contacts SR–3 open in the circuit of the endorser clutch solenoids ECA and ECB, the contacts SR–2 open in the circuit of the sort starting relay SS (Fbc), and the transfer contacts SR–1 restore to close the energizing circuit of the cycle delay relay DR (Ebr), said circuit extending from the positive line +1 through the normally closed contacts SR–1, the winding of the relay DR, the normally closed contacts of the master machine cam operated timing switch TS4A and the closed contacts XR1–2 to negative line.

The relay DR being energized closes contacts DR–4 (Ebr) in parallel to the normally closed contacts of the transfer contacts SR–1, thereby completing a holding circuit for the relay DR. Contacts DR–3 also close in the circuit of the pair of sorter control relays SC, which circuit, however, remains open at the normally open contacts of the restored transfer contacts SR–1. Relay DR also closes its contacts DR–1 (Ebc) which, if all three multiple register assemblies are in normal position and if the crossfooter is clear and the crossfooter non-clear switch CNC is, therefore, then closed, will complete the energizing circuit of the master machine cycling solenoid MCS, said circuit extending from positive line +1 through normally closed error switch ESW (Etc), the three normally closed register interlock switches RIS1, RIS2 and RIS3 (Etc and FIG. 24), normally closed switch TS4B, solenoid MCS, the tape printer cam operated cycle interlock switch MPI, low paper signal switch LPS, by-pass switch PLB, crossfooter non-clear switch CNC, and contacts DR–1 to negative line −1. The solenoid MCS, being energized, will initiate a cycle of operation of the master machine as has previously been described in the description of the master machine. The contacts DR–2 (Ebl) also close in the circuit of the counting magnets DCM and SCM, which circuit, however, still remains open at the contacts of the timing switch TS3B.

At about the 10° point in the cycle of the master machine, the cam operated timing switches TS1A, TS1B, TS3A, TS3B, TS5A and TS5B are all operated to closed position. The switch TS5B (E*ml*) completes the energizing circuit of the crossfooter total and subtract solenoid CTSS from positive line +1 through the normally closed transfer contacts CBR-1 (E*tl*) of the relay CBR, the now closed contacts DT-1, the normally closed contacts CR-2, the winding of the solenoid CTSS, the normally closed contacts of the switch CSTS, switch CSNA and switch TS5B to negative line −1. The solenoid CTSS (FIGS. 4 and 27), being energized, conditions the mechanical function control elements for the crossfooter for subtraction as has been previously explained.

The closing of the switch TS5A (E*ml*) completes the energizing circuit for the add solenoid ASB for the "B" line of multiple registers, said circuit extending from positive line +1 through the normally closed switch RNAS (E*mc*), the previously closed contacts XR1-3, the normally closed contacts RSTR-1 and RSAT-1, the winding of solenoid ASB and the switch TS5A to negative line −1.

The energization of the solenoid ASB, as previously explained, places the mechanical function control elements for the "B" line (of adding registers) in adding condition.

The closing of the switch TS3B (E*bl*) completes the energizing circuit of the counter magnets SCM and DCM, said circuit extending from positive line +1 to the normally closed switch RNAS, the normally closed contacts of the switches RSTS, RTS, CR-1 and BR-1, the closed contacts DR-2, the winding of solenoid SCM and switch TS3B to negative line −1. The previous closing of the contacts DT-3 has also connected the winding of the magnet DCM in parallel to the winding of magnet SCM so that both magnets are energized. The energization of magnet SCM, as previously explained, advances the counter dials 160 and 161 (FIGS. 6 and 50) at the upper left side of the keyboard of the master machine and the energization of the magnet DCM, as previously explained, results in the operation of the numbering type wheels 820 (FIG. 49) of the master machine to cause them to print a consecutive number on the detail tape 110 of the master machine and then be advanced to the next consecutive number during the cycle of operation of the master machine. In the example under consideration, the consecutive number "445020" will be seen printed at the left in the second line of entries on the tape 110 in FIGURE 111. Switches TS3A (F*tl*), TS1A (F*mc*), and TS1B (F*bc*) are located in circuits which are open and will not be closed in the cycle of operation under discussion.

At about the 46° point of the cycle operation of the master machine, the switches TS1A and TS1B reopen but without effect in the cycle of operation under discussion.

At about the 60° point in the master machine cycle, the cam operated timing switch TS4B (E*tc*) opens the circuit of the master machine cycling solenoid MCS. However, the master machine motor switch MS (A*m*) (corresponding to the switch 159—167 of FIGURES 15 and 22 of the Butler patent) remains closed until the end of the master machine cycle. Also, the cam operated timing switch TS4A (E*br*) opens the energizing circuit of the cycle delay relay DR which, being deenergized, opens its contacts DR-1 in the circuit of the master machine cycling solenoid MCS. The contacts DR-2 open in the energizing circuit of the count magnets SCM and DCM, permitting them to restore after having accomplished their functions. The contacts DR-3 also reopen without effect in the operation under discussion and the contacts DR-4 open the holding circuit of the relay DR.

At about the 75° point in the master machine cycle, the cam operated timing switches TS2A and TS2B of the master machine are operated to closed position. Both of these pairs of contacts are located in circuits which are open and will not be closed in the cycle of operation under discussion.

Just before the 95° point of the master machine cycle, the amount differential actuator racks 265 (FIGS. 25, 26 and 51) in those amount orders for which an amount key has been set will advance from their normal "0" positions and thereby move the associated coding slides 891 (FIGS. 26, 51, 52 and 58) forwardly from their normal positions to permit opening of the zero eliminating switches ZE (FIG. 58) of corresponding orders. In FIGURE 109D it will be seen that the zero eliminating switches ZE3 to ZE10 are connected in series in reverse order in a circuit which extends continuously from positive line +1 through all of the zero eliminating switches from ZE10 to ZE3 when all of those switches are closed. When any of these switches ZE3 to ZE10 is open, the circuit from positive line +1 is interrupted at the highest order one of the opened switches. It will also be seen that the movable contact of each of those switches is connected to the multiple tape printer read-in magnet RIM1 of the set of indexing magnets RIM of corresponding order so that as any differential amount actuator rack of the master machine moves forward from its "0" position, it will disconnect the multiple tape printer read-in magnet RIM1 of corresponding order and all lower order magnets RIM1 from positive line +1 but leave all higher order read-in magnets RIM1 connected to positive line +1 so that when the read-in magnet circuit is later completed to negative line −1, the multiple tape printer type wheels of those higher orders will be indexed to place blank spaces instead of "0" types at the printing lines.

As the pinions of the crossfooter, in the subtracting operation, are meshed with the amount differential actuator racks of the master machine prior to the advance thereof from normal position and are rotated by such forward advance of the actuators, the crossfooter nonclear switch CNC (E*mc*) will, as previously described, be opened as the deposit amount is entered into the crossfooter.

At about the 130° point of the master machine cycle, the cam operating the switch TS6 will be operated to closed position. The switch TS6 (F*tr*) is located in a circuit which is open at the contacts SS5 and will not be closed in the cycle of operation under discussion.

At about the 165° point the switches TS2A and TS2B will reopen without effect.

At about the 168° point of the master machine cycle, the printing hammers of the master machine are fired to print the date, amount set on the amount keys, the crossfooter function symbol, the selected register number and the register function symbol as shown in line 2 on the detail tape 110 (FIG. 111).

The same data is printed on the "Deposit" slip inserted in the validating chute 729 so that the "Deposit" slip may be identified by number with the entry on the master machine detail tape 110, if that is later required, and the amount entered in the machine may, if necessary, be compared with the deposit total written at the foot of the "Deposit" slip. After the "Deposit" slip has been validated, the operator will withdraw it from the chute 729.

At about the 170° point of the master machine cycle, prior to which the amount differential actuator racks and the coding slides 891 (FIGS. 26, 51, 52 and 53) have completed their advance to amount differential positions corresponding to the depressed amount keys, and the register function symbol selecting slide 519 (FIGS. 26 and 27) and connected coding slide have completed their advance to the proper symbol selecting position, the readout switch assembly RO (FIGS. 6, 26 and 51) is moved downwardly to effect the setting of the switches of the switch sets ROS and RO1 to RO10 (D*c*) by the projections 897 (FIGS. 52 and 53) of the differentially positioned coding plates 896 of corresponding orders. The four switches of each switch set ROS and RO1 to RO10 are so connected in series with windings of the read-in magnets RIM1, RIM2, RIM4 and RIM8 of corresponding sets of the multiple tape printer that when the energizing circuits for the read-in magnets RIM connected to closed switches of the sets ROS and RO1 to RO10 are later completed to negative line −1, the multiple tape printer type wheels will be indexed, as previously described to print the same amount and same register function symbol as is printed by the master machine.

In each of the switch sets ROS and RO1 to RO10 in FIGURE 109D, the common vertical conductor is the left-hand one of the conducting strips 939 (FIG. 55) of the read-out switch set. It can, therefore, be seen from FIGURES 52 to 55 and 109D that, as each "X" in FIGURE 54 denotes that the read-out switch designated by the number at the top of the column is closed to the contact 937 connected to the left-hand conductor 939 upon setting the switches while the master machine actuator rack and coding plate is in the position indicated by the number at the left, and as the movable contacts 931, 932 of each switch is connected to that read-in magnet RIM of corresponding order which is also designated by the numeral at the top of the column in FIGURE 55, each "X" will also indicate the read-in magnet which will be energized. From the arrangement of the read-in magnets RIM and code bars 1145 presented in the previous description of the multiple tape printer, it will be seen that the selection of read-in magnets energized will be such as to result in indexing of the multiple tape printer type wheels for the correct amount and register function symbol.

At about the 190° point of the master machine cycle, the cam operated timing switches TS7A and TS7B (E*bc*) close the energizing circuits of the printer selecting magnet PSY1 (S*l*) and solenoid PSX1 (C*br*), the energizing circuits of those of the multiple tape printer read-in magnets RIM which are connected to previously closed read-out switches of the switch sets ROS and RO1 to RO10 and of the read-in magnets RIM1 connected to still closed zero eliminating switches ZE of orders higher than the highest order set of read-out switches RO2 to RO10 containing a closed read-out switch, and also close the energizing circuit of the multiple tape printer cycling solenoid PCS (D*br*). The energizing circuit of the printer selecting magnet PSY1 extends from the positive line +1 through the normally closed timing switch TS8 (C*tc*), closed switch SYS1 (C*bl*), magnet PSY1, switches TS7B and TS7A (E*bc*) and closed contacts XR1–2 to negative line −1. The energizing circuit for the printer selecting solenoid PSX1 (C*br*) extends from positive line +1 through closed contacts XR1–1 (C*br*) through solenoid PSX1, switches TS7B and TS7A and contacts XR1–2 to negative line −1. The energizing circuit for the multiple tape printer read-in magnets RIM (D*l*) extend from positive line +1 through closed switches of the switch sets ROS and RO1 to RO10, the magnets RIM connected to said closed switches, switches TS7B and TS7A, and contacts XR1–2 to negative line −1. The energizing circuit for the read-in magnets RIM1 in orders higher than the highest order switch set RO2 to RO10 containing a closed switch, extends from positive line +1 through the closed switches ZE of orders higher than the highest order opened switch ZE, and from those higher order closed switches ZE through the connected magnets RIM1, the switches TS7B and TS7A and the closed contacts XR1–2 to negative line −1.

The energizing circuit of the printer cycling solenoid PCS (D*br*) extends from positive line +1 through said solenoid, the switch TS7B and the TS7A and closed contacts XR1–2 to negative line −1. The printer solenoid PCS being energized causes the printer cycling clutch (FIG. 63) to engage and the printer motor switch TPS (A*t*) (FIG. 63) to close. As previously described, the switch TPS is mechanically maintained in closed position until the motor TPM drives the multiple tape printer through a complete cycle of operation, at the end of which the multiple tape printer clutch is disengaged and the switch TPS is reopened.

The cycle of operation of the multiple tape printer unit has been explained in the brief description of the multiple tape printer unit and need not be repeated. It will be remembered, however, that in the course of the cycle of operation of the multiple tape printer, the energized read-in magnets RIM control the operation of the code bars 1145 for controlling the differential type wheel indexing movements of the set of type wheel indexing rack slides 1095 which are released for indexing by the energized printer selecting solenoid PSX so that the type wheels 1085 of the corresponding vertical column of tape printers will be indexed as determined by the energized read-in magnets RIM. It will also be remembered that the platen 1167 of each multiple tape printer is connectable with the multiple tape printer drive through two normally disengaged couplings 1224, 1227 and 1241, 1250 (FIG. 77) in series, the first being controlled indirectly by the selecting solenoid PSX for the respective column of printers and the second being controlled by the selecting magnet PSY for the respective horizontal line of printers so that only the platen 1167 for the one printer selected by both the energized solenoid PSX and magnet PSY is operated to print on the selected printer tape 1170 the amount and the register function symbol, which is also printed on the master machine detail tape 110, and to then line-space the selected tape 1170. In this particular operation, the amount "180.00" is printed by the #1 printer in line 2 of its tape.

At about the 220° point of the master machine cycle, the cam operated timing switch TS6 (F*tr*) is reopened but without effect in the operation under discussion.

At about the 250° point of the master machine cycle, the cam operated timing switches TS7A and TS7B (E*bc*) are reopened to break the energizing circuits of the printer cycling solenoid PCS, the printer selecting solenoids PSX1 and PSY1 and the read-in magnets RIM, but all of these have completed their functions as previously explained. The multiple tape printer motor switch TPS is mechanically held closed until the multiple tape printer completes its cycle of operation.

At about the 300° point of the master machine cycle, the cam operated timing switches TS5A and TS5B (E*ml*) reopen the energizing circuits of the "B" register add solenoid ASB and the energizing circuit of the crossfooter total and subtract solenoid CTSS, thereby permitting the "B" register and crossfooter mechanical function control elements to restore, but such restoration does not effect either the operation of the crossfooter, the pinions of which are disengaged from the amount differential actuators shortly before the 180° point, or the operation of the selected register, the pinions of which are disengaged from the actuators prior to the 290° point of the master machine cycle.

Also, at about the 300° point of the master machine cycle, the cam switch TS3A (F*tl*) reopens without effect, and the cam switch TS3B (E*bl*) reopens in the energizing circuit of the counting magnets SCM and DCM which, however, was previously opened by the restoring of the contacts DR–2.

At about the 316° point of the master machine cycle, the cam operated timing switch TS8 (C*tc*) is opened in the circuit of the printer selecting magnets PSY and solenoids PSX which was previously opened by the reopening of the cam switches TS7A and TS7B (E*bc*). The opening of the switch TS8, however, opens the energizing circuit of the relays DT and NS. The relay DT (B*bc*) being deenergized restores its contacts DT–1 (E*tl*) in the already opened circuit of the crossfooter total and subtract solenoid CTSS, recloses its contacts DT–2 (E*mc*) to again shunt the crossfooter non-clear switch CNC in the already opened circuit of the master machine cycling solenoid MCS, and its contacts DT–3 (Bbl) in the already opened circuit of the counter magnets DCM and SCM. The relay NS (Bbl) being deenergized, restores its contacts NS–1 (Ebl) to reclose the energizing circuit of the sorter relay SR which reopens its normally closed contacts SR–1 (Ebr) in the already opened circuit of the relay DR, recloses its contacts SR–2 (Fbc) in the circuit of the sort starting relay SS and recloses its contacts SR–3 (Fmc) in the circuit of the endorser clutch solenoids ECA and ECB, which circuit, however, is open at the switch TS1A.

The opening of the switch TS8 also opens the energizing circuit of the pair of relays X1 which restore their contacts X1–1 to X1–11. All of these contacts are in circuits which are opened by the opening of the switch TS8 with the exception of the contacts X1–11 which are in circuits which have remained open at the contacts SC–10 throughout the operation under discussion. The opening of the switch TS8 also opens the energizing circuit of the relay XR1 which opens its contacts XR1–1 in the already opened circuit of the magnet PSX1. Contacts XR1–2 (Ebr) also open in common portion of the already opened circuits controlled by the switch TS7A, TS7B and TS4A. Contacts XR1–3 (Eml) also reopen in the already opened circuit of the "B" register add solenoid ASB. The opening of the switch TS8 also opens the energizing circuit of the register selecting magnet SXM1 to permit it to restore to normal and relatch the "B" register selecting plate 305 (FIG. 24) which has already been restored to normal at about the 245° point of the cycle by the return to normal of the register selecting stop slide 270 (FIG. 21) associated with the right-hand bank of selecting keys SK.

At about the 318° point in the master machine cycle the depressed selection key SK1 restores, reopening the switches SXS1 in the already opened circuit of the relay pairs X1 and reopening the switch SYS1 in the already opened circuit of the printer selecting magnets PSY.

At about the 350° point in the master machine cycle, the cam operated switch TS4A (Ebr) recloses in the circuit of the cycle delay relay DR, which circuit, however, is now open at the contacts XR1–2, XR2–2 and XR3–2, at the contacts SR–1, at contacts RD–4 and at switches DDS. At the same time, the switch TS4B recloses in the circuit of the master machine cycling solenoid MCS, which circuit is now open at the contacts of DR–1.

At about the 352° point, the cam operated timing switch TS8 in the master machine restores to normal closed position, but all of the circuits controlled thereby are now open at other points, as already noted.

Somewhat before the 360° point of the master machine cycle, the master machine motor switch MS is reopened. As the motor, by its momentum, drives the master machine through the small remainder of the cycle and very shortly before the 360° point, the master machine drive clutch is disengaged and the master machine main shaft is arrested at its 0° position and the master machine is ready for a new cycle of operation provided that the multiple tape printer operated interlock switch MPI has also reclosed.

The cam operated switch MPI (Emc) (FIGS. 61A and 67) of the multiple tape printer is opened at the 15° point in the rotation of the multiple tape printer cam shaft 1080 and remains open until the 158° point of the rotation of the multiple tape printer cam shaft 1080 to prevent the initiation of a new cycle of operation of the master machine until the operation of the multiple tape printer has progressed to the point from which it can complete its cycle of operation in time to be ready for a further operation at the 190° point of the new cycle of operation of the master machine.

Prior to the actual completion of the master machine cycle, the necessary data for the next item may be set on the keyboard as explained in the Butler patent. Also, the selection key SK appropriate to the next item may also be depressed as early as the 320° point of the master machine cycle (but must then be held down until it is latched down at about the 350° point) so that after the short pause above mentioned, a new cycle of operation of the master machine may be initiated, provided also that a document is in the sorter chute if a sort is required by the depressed key SK.

Accompanying the "Deposit" slip, a check in the amount of fifty dollars which is drawn on a bank or on one of a group of banks to which the switch pair AF12, SF12 and the selection key SK12 have been assigned. The operator, therefore, will enter the amount "50.00" on the amount keys, depress the key SK12 and drop the check into the document chute of the sorter unit.

Depression of the key SK12, as previously explained, will operate the switches SXS2 and SYS3 to closed position. The switch SXS2, in closing, completes the energizing circuit of the pair of relays X2 which close their contacts X2–1 to X2–9 (Br), in the circuits controlled by the program control panel switch pairs of the middle column. Contacts X2–11 close in the energizing circuit of sort selection relay SX2 (Cmc). The contacts X2–10 (Cmr), in closing, complete the energizing circuit of the magnets SXM2 and PM10 and the relay XR2. Magnet SXM2 releases the register selection plate 305 for the "C" line to control by the register selecting stop slide 270 associated with the middle bank of selection keys SK. The magnet PM10 (FIG. 22) pulls in its armature 419 (FIG. 26) to hold the tens order register designation printing control slide 410 in its normal "1" printing position. The relay XR2 closes its contacts XR2–1 (Cbr) in the circuit of the printer selecting solenoid PSX2, its contacts XR2–2 (Ebr) in the circuit of the cycle delay relay DR and in the tape printer control circuit, its contacts XR2–3 (Eml) in the circuit of the "C" register add solenoid ASC and its contacts XR2–4 (Eml) in the circuit of the "D" register add solenoid ASD.

The switch SYS3 in closing completes, through the now closed contacts X2–3 (Bmr) and the switches AF12 and SF12, the energizing circuits of the relays RA and FE (Bbl). The relay RA closes its contacts RA–1 (Eml) which, by the closing of the contacts XR2–4, are connected in the energizing circuit of the add solenoid ASD for the "D" registers. The relay FE closes its contact FE–1 (Fmc) to connect the winding of the endorser clutch solenoid ECB in parallel to that of the endorser clutch solenoid ECA.

When the operator drops the check into the sorter document chute, the rollers 1610 and 1611 (FIG. 82) feed the check against both of the document detecting fingers 1635 to operate the document detecting switches DDS (Ebr) to closed position, thereby closing an energizing circuit of the cycle delay relay DR, said circuit being traced from positive line +1 through the sorter right and left door switches RD1 to RD3 and LD1 to LD3 (Emr) through the normally closed contacts BLR–2, the now closed switches DDS, the normally closed contacts TR–3, the winding of the relay DR, the normally closed switch TS4A and the contacts XR2–2 to negative line −1. The relay DR in closing its contacts DR–4 establishes a holding circuit for itself as previously described to keep itself energized after the document detecting contacts reopen, as mentioned later. The contacts DR–2 close in the circuit of the counter magnet SCM (Ebc) but the contacts DT–3 in the circuit of the deposit counter magnet DCM remain open.

The contacts DR–3, in closing, complete the energizing circuit of the pair of sorter control relays SC (Ebr), said circuit extending from a positive line +1 through closed contacts SR–1, contacts DR–3 and the windings of both relays SC, in parallel, to negative line −1. The pair of relays SC close their contacts SC–1 to SC–10 (Cc). The contacts SC–10, in closing, complete the energizing circuit of the sort selection relay SX2, said circuit being traced from positive line +1 through switch TS8, contacts SC–10, contacts X2–11, and winding of relay SX2 to negative line −1. The relay SX2 closes its contacts SX2–1 in a holding circuit which will be completed later by the closing of contacts SH–3 (C*tc*). Relay SX2 also closes its contacts SX2–2 (F*bl*) in the energizing circuit of the column deflector solenoid CD–2, which circuit, however, is still open at the contacts SH–1 and SH–2 (F*tc*). Contacts SX2–3 (F*br*) also close in the energizing circuit of the packer bail solenoid PB2, which circuit, however, is still open. Also contacts SX2–4 (F*tr*) close in a still open holding circuit for the relay TR and contacts SX2–5 (E*tc*) close in the energizing circuit of the bin latch solenoid BL2.

The contacts SC–3 (C*bl*) closing, complete the energizing circuit of the sorting relay SY3 traced from positive line +1 through switch TS8, switch SYS3, contacts SC–3 and the winding of relay SY–3 to negative line −1. Relay SY3 being energized closes its holding contacts SY3–1 and its contacts SY3–2, SY3–3 and SY3–4 in the still open energizing circuits of the bin deflector solenoids BD3, BD12 and BD21. Of the latter solenoids, only solenoid BD12 is connected to negative line −2 through the closed contacts SX2–2.

The closing of the contacts DR–1 closes the energizing circuit of the master machine cycling solenoid MCS (E*mc*) as previously described but with the difference that this circuit now extends through the normally closed contacts RTR–2 and DT–2 instead of through the switch CNC which is now open because of the subtraction of the deposit total from the crossfooter in the previous cycle. The cycle of operation of the master machine and the cycle of operation of the multiple tape printer will proceed in the same manner as the previously described cycle of operation of the master machine and the multiple tape printer with the exceptions hereinafter specifically described. In this cycle of operation of the master machine, the check amount of "50.00" will be added in the crossfooter because the mechanical function control elements of the crossfooter are normally conditioned for addition and in this cycle of operation none of the crossfooter function control circuits (E*tl*) is closed. The same amount will be added in the "12" register (third register in the "C" register line) because the register selection control magnet SXM2 is energized and releases the control plate 305 for the "C" line of registers to control by the differential stop slide 270 in the middle row of selection keys SK, which stop slide will be arrested in its "3" position by the depressed key SK12, and the add solenoid ASC is energized to condition the mechanical function control line of registers for the "C" line of registers. The same amount will be added in the number 19 register (first register in the "D" line) because the add solenoid ASD for the "D" line of registers is energized, and the register selecting plate 305 for the "D" line of registers remains latched in its normal position to retain the multiple register pinion assembly for the "D" line in its normal position where the pinions for the first register in that line are aligned with the differential actuator racks. The date, the amount, and the designation number "12" for the depressed selection key and corresponding register are printed on the master machine detail tape as shown in the third line of entries in FIGURE 111. The same amount is printed on the #12 tape by the multiple tape printer. The absence of printed function symbols beside amount entries on the master machine detail tape indicates the performance of addition in the crossfooter and the absence of printed function symbols beside amount entries on the multiple tape printer tapes indicates the performance of addition in the corresponding registers.

In this cycle of operation the sorter unit will be operated to endorse and sort the check inserted in the sorter chute.

At the 10° point in the master machine cycle, the switch TS1A (F*mc*) and TS1B (F*bc*) will close. The closing of the switch TS1A completes the circuit of both endorser clutch solenoids ECA and ECB so that the full endorsement is printed on the back of the check in the sorter chute. The closing of switch TS1B completes the circuit of the sort starting relay SS, said circuit extending from positive line +2 through all of the twenty-seven sorting bin detecting switches SD1 to SD27 in series, through the winding of the relay SS, the contacts SR–2 and switch TS1B to negative line −2. The relay SS, being energized, closes its contacts SS–1 to SS–6. Contacts SS–1 complete a holding circuit for the relay SS around the contacts SR–2 and TS1B. Contacts SS–6 (E*tc*) close in the still open circuit of the bin latch solenoids BL1, BL2, and BL3. Contacts SS–5 (F*tr*) close in the still open circuit of the timing relay TR. Contacts SS–4 (F*tr*) close in the still open circuit of the packer bail solenoids. Contacts SS–3 (F*tr*) close in a holding circuit for the packer bail solenoids and the only immediate effect of the closing of these contacts is the charging of the condenser C2 (F*br*). The closing of contacts SS–2 (F*mc*) completes the energizing circuit of the sort holding relay SH.

The relay SH, being energized, operates its contacts SH–1 to SH–5. Contacts SH–1 and SH–2 (F*tc*), closing, complete the energizing circuits for the bin deflector solenoid BD12, for the column deflector solenoid CD2, and for the conveyor clutch solenoid CCS. The circuit for the bin deflector solenoid BD12 is traced from positive line +2 through the contacts SH–1 and SH–2, normally closed contacts BR–5 (F*tl*), contacts SY3–3 (F*ml*), the winding of solenoid BD12 and contacts SX2–2 (F*bl*) to negative line −2. The bin deflector solenoid BD12 (F*ml*), being energized, swings the document deflector for bin 12 in the sorter to direct the document being sorted into that bin. Through the link 2081 and lever 2085 (FIG. 101) it also swings the auxiliary bail 2065 down on top of the previously sorted documents, if any, in the tray in bin 12 and, if the bail 2065 is not arrested by a stack of sorted documents of more than a predetermined height, the bail arm 2068 lifts the link 2096 far enough to permit the switch FBS2 (E*tr* and FIG. 100) to restore.

The energizing circuit for the column deflector solenoid CD2 (F*tc*) is traced from the normally closed contacts BR–5 through the winding of said solenoid CD2 and contacts SX2–2 to negative line −2. The column deflector solenoid CD–2, being energized, swings the column deflector for the middle column of bins in the sorter to position to direct the document being sorted from the horizontal conveyor into the middle vertical conveyor for the middle column of bins. The energizing circuit of the conveyor clutch solenoid CCS (F*tc*) is traced directly from the contacts SH–2 through the winding of said solenoid to negative line −2. The solenoid CCS, being energized, causes the conveyor clutch (FIG. 87) to be engaged to drive the horizontal and vertical conveyor belts.

Contacts SH–3 (C*tc*), closing, complete holding circuits for the relays SX2 and SY3, said circuits being traced from positive line +1 to contacts SH–3. The holding circuit for relay SX2 continues from contacts SH–3 through holding contacts SX2–1 and the winding of relay SX2 to negative line −1 and the holding circuit for relay SY3 extends from contacts SH–3 through contacts SY3–1 and winding of relay SY3 to negative line −1. Contacts SH4 (F*tr*), being operated, disconnect the front contacts of the switches SD1 to SD27 from the winding of the relay TR and connect them to the still open holding circuit for the packer bail solenoids PB1, PB2 and PB3. Contacts SH–5 (E*tr*) close in the still open circuit of the full bin relay FBR.

Also at about the 10° point in the master machine cycle, the switch TS3A (F*tl*) closes without effect, and the switch TS3B (E*bl*) closes to complete the energizing circuit of the counter magnet SCM as described in previous operation, but the circuit of the deposit counter solenoid DCM remains open because the contacts DT-3 are not closed.

Also at about the 10° point, the switches TS5A and TS5B close. The closing of the switch TS5A (E*ml*) completes the energizing circuits of the add solenoid ASC for the "C" line of multiple registers and the energizing circuit for the add solenoid ASD for the "D" line of multiple registers. Both circuits extend from positive line +1 through the normally closed switch RNAS. The circuit for the solenoid ASC extends from the switch RNAS (E*mc*) through contacts XR2-3, the normally closed contacts of switches RSTR-2 and RSAT-2, the winding of solenoid ASC and switch TS5A to negative line —1. The circuit for solenoid ASD extends from switch RNAS through the normally closed contacts of switches RSTS and RTS, contacts RA-1, contacts XR2-4, the normally closely contacts RSAT-3, the winding of solenoid ASD and switch TS5A to negative line. Consequently, the selected register 12 (which is the third register in the "C" line) and register 19 (which is the first register in the "D" line) will both be operated to add the amount which was entered on the amount keys.

The closing of the switch TS5B is without effect as the circuits of all of the crossfooter function control solenoids are open at other points and will not be closed in this operation. As the crossfooter mechanical function control parts are normally in add condition, the crossfooter also will add the amount which was entered on the amount keys.

At about the 35° point of the master machine cycle, the register indexing slide 345 (FIG. 24) for the "C" line of registers, moving forward, opens the register interlock switch RIS2 (E*tc*), thereby opening the energizing circuit of the master machine cycling solenoid MCS. As previously explained, the master machine motor switch MS (A*m*) is mechanically held closed until the master machine clutch is tripped at the end of its cycle.

At about the 46° point in the master machine cycle, the contacts TS1A and TS1B reopen. The reopening of the switch TS1A (F*mc*) permits the endorser clutch solenoids ECA and ECB to restore in time to permit the latch member 1688 (FIG. 84) to return to normal position to relatch the clutch control member 1670 in restored, clutch-disengaging position before the completion of a single rotation of the driven members of those clutches so that only a single endorsing print is made by each of the endorsers. The reopening of the switch TS1B (F*bc*) is without effect, as its contacts together with the contacts SR-2 are shunted by the holding contacts SS-1.

At about the 60° point, the switch TS4B (E*tc*) opens in the already opened circuit of the master machine cycling solenoid MCS. Also, the switch TS4A opens the energizing circuit of the relay DR, which then reopens its contacts DR-1 in the already open circuit of the master machine cycling solenoid MCS, opens its contacts DR-2 to break the circuit of the counting magnet SCM, opens its holding contacts DR-4 and reopens its contacts DR-3 to deenergize the pair of relays SC. The latter relays, deenergizing, open their contacts SC-1 to SC-10, contacts SC-3 and SC-10 being in the circuit of the relay CY3 and contacts SC-10 being in the circuit of relay SX2, but these circuits remain energized over their previously described holding circuits through their holding contacts SX2-1 and SY3-1 and the contacts SH-3.

At about the 75° point the switches TS2A and TS2B are closed. The closing of the switches TS2A (F*tc*) completes the energizing circuits of the document release solenoid DRS (FIGS. 81 and 82) and of the ribbon feed magnet RFM (FIG. 81). The document release solenoid DRS being energized rocks the stop device 1624 (FIG. 82) counterclockwise to permit the document to be fed downwardly out of the chute and into the conveyor system and retracts the document sensing fingers 1635 out of the path of the document, thereby also permitting the switches DDS (FIG. 82) to restore to normal. The switches DDS (E*br*) reopen in the already opened energizing circuit of the relay DR. The ribbon feed magnet RFM being energized releases the clutch pawl 1766 (FIG. 81) to permit the ribbon feed clutch to be engaged to drive the ribbon advancing means, as previously described.

The switch TS2B (F*tr*), closing, completes the energizing circuit of the packer bail solenoid PB2, said circuit extending from positive line +2 through the switch TS2B, contacts SS-4 and SXP-3 and the winding of the solenoid PB2 to negative line —2. The packer bail solenoid PB2 (FIG. 100) being energized causes the packer bail clutch for the middle line of document bins to be engaged for a one-half rotation to lift the middle link 2025 and elevate all of the packer bails 2010 from the documents in the bins of the middle column. The lifting of the link 2025 (FIG. 105) closes the packer bail switch PS2 (F*mc* and FIG. 100) in parallel to the closed contacts SS-2 in the already closed energizing circuit of the relay SH.

At about the 95° point, advancing actuator racks of the master machine open the associated ones of the zero eliminating switches ZE3 to ZE10 (DR) as described in connected with the previous cycle.

At about the 130° point the switch TS6 (F*tr*) closes, completing the energizing circuit of the timing relay TR extending from positive line +2 through the switch TS6, contacts SS-5 and the winding of the relay TR to the negative line —2. The relay TR being energized closes its contacts TR-1 (F*tr*) to complete a holding circuit for said relay extending from positive line +2 through contacts SX2-4, contacts TR-1 and the winding of the relay TR to negative line —2. Contacts TR-2 (E*tr*) close in the circuit of the relay FBR so that, if the operated auxiliary bail 2065 (FIG. 100) in the selected document bin had been so limited as to prevent restoring of the full bin switch FBS1, the closing of the contacts TR-2 would complete the energizing circuit of the full bin relay FBR with results which will be described later. As stated above, it is assumed that in the present example no previously sorted documents are in bin 12, so that the relay FBR will not be energized.

Normally closed contacts TR-3 (E*br*) open in the already opened circuit of the cycle delay relay DR and, as hereinafter described, will remain open until the document being sorted has arrived in the correct document bin to prevent a further sorting operation from being initiated prior to that time.

Contacts TR-5 open in the circuit of the bin latch release solenoid BR (F*ml*), which circuit, however, is not closed in the presently described cycle of operation.

Contacts TR-4 (F*br*), closing, connect a condenser C2 in parallel to the winding of the energized packer bail solenoid PB2 and close a second energizing circuit for that solenoid, said circuit extending from positive line +2 through contacts SS-3, resistance R1, contacts TR-4 and SX2-3, and the winding of solenoid PB2 to negative line —2.

At about the 165° point in the cycle, switch TS2B (F*tr*) is re-opened in the initial energizing circuit of the packer bail solenoid PB2 but said solenoid remains energized over the above-described second circuit at reduced power as limited by resistor R1 to avoid overheating.

At about the 168° point in this cycle of operation the entries shown in line 3 of the detail tape 110 of FIGURE 111 are printed by the master machine.

At about the 170° point in the master machine cycle the read-out switch assembly RO is operated as has been described in connection with the previous cycle.

At about the 190° point in the cycle of the master machine the switches TS7A and TS7B (E*bc*) close, thereby completing the energizing circuits of those read-in magnets RIM containing closed switches of the read-out switch assembly RO or closed zero eliminating switches ZE which have not been disconnected from positive line +1, and also completing the energizing circuit of the multiple tape printer cycling solenoid PCS (D*br*) to initiate a cycle of operation of the multiple tape printer as has been described fully in connection with the previous operation. Also, the closing of the switches TS7A and TS7B closes the energizing circuit of the printer selecting magnet PSY3 and printer selecting solenoid PSX2 to cause selection of tape printer No. 12 for operation in the cycle of the multiple tape printer to print on the No. 12 tape 1170 the entries shown in line 2 of that tape in FIGURE 111.

At about the 220° point in the master machine cycle the switch TS6 (F*tr*) opens in the initial energizing circuit of the timing relay TR, but said relay remains energized over its holding circuit through the contacts SX2–4, and TR–1.

At about the 250° point of the master machine cycle the switches TS7A and TS7B reopen the energizing circuits of the multiple tape printer selecting magnet PSY3 and solenoid PSX2, the read-in magnets RIM and the printer cycling solenoids PCS, all of which components have, as previously described, completed their functions prior to this time.

At about the 300° point in the master machine cycle the switch TS5A reopens in the energizing circuits of the "C" register line and "D" register line add solenoids ASC and ASD, prior to which time, however, the 12 and 19 registers have added the amount set on the master machine amount keys and have been disengaged from the amount actuators. At the same time the switch TS5B reopens in the crossfooter function control circuits, none of which, however, were closed in this cycle.

At about the 316° point in the master machine cycle, switch TS8 (C*tc*) is opened, thereby opening the energizing circuits of the relays RA, FE (B*bl*), X2 (C*tr*) and XR2 (C*mr*) and magnets SXM2 and PM10 (C*mr*). The relay RA being deenergized reopens its contacts RA–1 (E*ml*) in the already opened circuit of the add solenoid ASD. Relay FE opens its contacts FE–1 (F*mc*) in the already opened circuit of the endorser clutch solenoid ECB. Relay X2 opens its contacts X2–1 to X2–9 (B*l*) associated with the switch pairs AF10, SF10 to AF18, SF18, reopens its contacts X2–10 in the already opened circuit of the relay XR2 and opens its contacts X2–11 (C*tc*) in the circuit of the sort selecting relay SX2 which, however, remains energized over the holding circuit including its holding contacts SX2–1 and the contacts SH–3. The relay XR2 being deenergized open its contacts XR2–1 in the already opened circuit of the printer selecting solenoid PSX2, opens its contacts XR2–2 in the common portion of the already opened circuits of the delay relay DR and the multiple tape printer circuits, and opens its contacts XR2–3 in the already opened circuit of the "C" registers add solenoid ASC.

At about the 318° point in the master machine cycle the depressed key SK12 is released, thereby permitting the switch SXS2 (C*tr*) in the already opened circuit of the relays X2 and the switch SYS3 (C*bl*) in the already opened circuits of the relays RA and FE and printer selecting magnet PSY3 to reopen.

At about the 350° point in the master machine cycle, the switches TS4A and TS4B reclose as described in the previous operation.

At about the 352° point the switch TS8 recloses as described in the previous operation and at the 360° point the master machine cycle is completed as previously described.

Meanwhile, after release of the document from the sorter chute and into the sorter conveyor system at about the 75° point of the master machine cycle, the document is carried forward by the horizontal conveyor belts into the column deflector for the middle column of bins and advanced by the middle vertical conveyor to the deflector for bin 12. Passing through that deflector and into bin 12, the document actuates the operating lever 1980 (FIG. 100) of the sorter destination switch SD12 (F*mr*), which is thereby transferred to open the energizing circuit of the sort starting relay SS (F*bc*) and to close momentarily, until the sorted document clears the switch operating lever 1980, a holding circuit for the packer bail solenoid PB2, said circuit extending from positive line +2 through switches SD1 to SD11 in series, transferred switch SD12, and transferred contacts SH–4 to resistance R1, thereby shunting contacts SS–3 of the deenergized relay SS. The relay SS being deenergized opens its holding contacts SS–1, opens its contacts SS–2 still shunted by the closed packer bail switch PS2, and opens its contacts SS–3.

When the document clears the operating lever 1980 in the deflector for bin 12, the switch SD12 restores, thereby opening the energizing circuit of the packer bail solenoid PB2 which, after a delay caused by the solenoid PB2 being energized for a short time longer by the discharge of the condenser C2, restores and permits the packer bail clutch for the middle column of document bins to engage for another half revolution to lower the link 2025 and permit the packer bails for that column of bins to restore to normal. The delay in deenergizing the packer bail solenoid caused by the condenser C2 gives the sorted document added time to reach a position at the rear of the tray and under the packer bail before the latter is lowered to normal position on top of the document. The lowering link 2025 simultaneously reopens the packer bail switch PS2, which in turn opens the energizing circuit of the sort holding relay SH. The relay SH being deenergized opens its contacts SH–1 to SH–5. Contacts SH–1 and SH–2 (F*tc*) open the energizing circuits of the column deflector solenoid CD2 and bin deflector solenoid BD12 to permit the associated column and bin deflectors and the operated auxiliary bail 2065 for bin 12 to restore to normal forward and upward position. It will be noted that the bail 2065 is lowered to engage the stack of previously sorted documents in the tray before the packer bail 2010 is lifted from the stack and that the packer bail 2010 restores to reengage the stack before the auxiliary bail 2065 is again lifted from the stack. The lifting of the auxiliary bail 2065 also permits the raised link 2096 to fall to normal position and operate the switch FBS2 to normal position. Contacts SH–3 (C*tc*) open the holding circuits of the sort selection relays SX2 and SY3, both of which restore all of their contacts to normal. Contacts SH–4 (F*tr*) and SH–5 (E*tr*) also restore to normal.

Relay SX2, deenergizing, restores its contacts SX2–1 to SX2–6. Contacts SX2–4 open the holding circuit of the relay TR, which, deenergizing, restores its contacts TR–1 to TR–5. Contacts TR–3, reclosing in the circuit of the delay relay DR, no longer delay the initiating of a new sorting operation. It will be noted that the contacts TR–3 are connected in series with the document detecting switches DDS so that they delay, until completion of the sorting operation, only a subsequent operation which also requires a sort.

The apparatus is now again at normal and ready for a further sorting operation.

The second item accompanying the first "Deposit" slip is an "On Us" check for $100.00. The operator enters the amount on the keyboard of the master machine and presses the key SK26. This operation is like the last described operation involving the depression of the key SK12 except that the depression of the key SK26 closes switches SYX3 and SYS8, in consequence of which the 26 register (the next to the last register in the "D" line) will be selected to add the $100.00 amount, the tens order register magnet PM20 will be energized to cause a "2" to be printed by the tens order designation type bar while a "6"

is printed by the units order designation type bar as shown in line 4 of tape 110 in FIGURE 111. The relay FE will not be energized and consequently the endorser clutch solenoid ECB will not be energized while the solenoid ECA is energized to print the date on back of the check. Because of energization of the printer selecting magnet PSY8 and printer selecting solenoid PSX3, the tape printer 26 will be selected to print the entries shown in line 2 of the 26 tape 1170 in FIGURE 111. The sorter column deflector solenoid CD3 and bin deflector solenoid BD26 will be operated because of energization of the sort selecting relays SX3 and SY8. Also, as the relay RA will not be energized, the "C" line register add solenoid ASC will not be energized and the amount will not be added in the No. 10 register. The sequence of operations in the master machine, the multiple tape printer, the sorter and control circuits will otherwise be substantially as described in reference to the previous operation.

The third item accompanying the first "Deposit" slip is a "Cash-In" slip showing the amount of $30.00. The operator will enter the amount $30.00 on the master machine amount keys and depress the selection key SK16. Because the switch SF16 is set at its 5 position, the master machine cycle will not be initiated unless the "Cash-In" slip is inserted in the sorter chute. This operation will be similar to the second and third operations previously described except that the 16 register (seventh register in the "C" line) will be selected to add the 30.00 amount. The depression of key SK16 closes switch SXS2 to complete the energizing circuit for relays X2, contacts X2–10 of which close the energizing circuit of magnet PM10 (C*mr* and FIG. 22) which causes the "1" type of the tens order register designation type bar to be indexed for printing as may be seen from line 5 of tape 110 in FIGURE 111. The 30.00 amount will not be added in the 19 register because, the switch AF16 being in its 1 position, the relay RA will not be energized and will not close its contacts RA–1. Because the switch SF16 is in its 5 position, the relay NE will be energized to open its contacts NE–1 (F*mc*) so that neither endorser clutch solenoid ECA nor ECB will be energized and no endorsement will be printed on the back of the "Cash-In" slip. The tape printer 16 will be selected and operated to print the entries shown in line 2 of the 16 tape 1170 (FIG. 111). The column deflector solenoid CD2 and the bin deflector BD16 will be energized to direct the sorted "Cash-In" slip into bin 16. The relay NE is again deenergized and recloses its contacts NE–1 when the switch TS8 (C*tc*) is opened at about the 316° point in the cycle and after the switch TS1A (F*mc*) has re-opened.

There are no further documents accompanying the No. 1 "Deposit" slip.

Preferably, instructions given to the operator will require that the "Deposit" slip be reinserted in the validating chute of the master machine and that two operations should then be performed in succession, such operations to be initiated, respectively, by depressions of the selection keys SK10 and SK19. Which of the selection keys SK10 and SK19 is depressed first and which last is immaterial apart from determining the order in which "float" figures will be printed on the "Deposit" slip. If the depression of either the key SK10 or the key SK19 initiates an operation, the accuracy of the depositor's item and total entries on the "Deposit" slip and the accuracy of the machine operator's entries of the actual amounts of the deposit items and of the deposit total on the keyboard of the master machine will be proved as will next be explained.

Assume that after reinserting the "Deposit" slip in the validating chute of the master machine the operator depresses the key SK10. Such key depression will operate switches SXS2 and SYS1 to closed position. In addition to other results which will be readily apparent in the light of the descriptions of previous operations, including the energization of the relays X2, the closing of the key operated switches and the contacts X2–1 (B*br*) will complete a circuit through the switch AF10 (B*bc*). As the switch AF10 is in its 2 position, an energizing circuit will be completed for the register total relay RTR so that the latter will close its contacts RTR–1, RTR–2 and RTR–3. The contacts RTR–1 (E*tl*) are in the common portion of the energizing circuits of the crossfooter non-add solenoid CNAS and the register subtotal and total solenoid RSTT so that when the switch TS5B (E*ml*) closes at the 10° point of the master machine cycle the crossfooter will be non-added, the amount differential stop slides of the master machine will be latched in normal position, and the zero stops of all three register lines will be effective for a total-taking operation of the selected register. The depressed key SK10 causes register 10 to be selected.

The transferred contacts RTR–3 (E*bl*) open the circuit of the sorting relay SR and close an energizing circuit for the register subtract and total relay RSAT, said circuit being traced from positive line +1 through normally closed switch RNAS (E*mc*), normally closed contacts of switches RSTS and RTS, closed contacts CR–1 and BR–1, transferred contacts RTR–3 and the winding of relay RSAT to negative line −1. Relay SR, deenergizing, restores its contacts SR–1 thereby completing the energizing cycle of the cycle relay DR which closes its contacts DR–1 to DR–4 so that insertion of a document in the sorter chute will not be required for initiating a cycle of operation. However, contacts RTR–2 (E*mc*), opening, make the initiation of the cycle of operation dependent upon the crossfooter non-clear switch CNC (E*mc*) being closed, i.e., dependent upon the crossfooter reaching a zero total condition in consequence of all of the add and subtract entries made therein with reference to the "Deposit" slip and accompanying items. Thus if a cycle of operation is initiated in consequence of depression of the selection key SK10, it is proved that the total of all of the item amounts which the operator read not from the "Deposit" slip but individually from the item documents and entered on the amount keys of the master machine is truly the same as the deposit total which the operator read from the "Deposit" slip and entered on the amount keys.

The relay RSAT (E*bl*), being energized, transfers its contacts RSAT–1, RSAT–2 and RSAT–3 (E*ml*) in the energizing circuits of the register function control solenoids so that the contacts XR2–3, being closed by reason of the energization of the relay YR2 upon closing of the contacts X2–10 (C*mr*), the energizing circuit of the C register line subtract and total solenoid SATC will be completed at about the 10° point of the cycle when the switch TS5A is closed, whereby a total will be taken from register 10 (the first register in the C line).

When the register 10 total is printed at about the 168° point in the master machine cycle it will be printed not only on the master machine detail tape as shown in line 6 of the tape 110 in FIGURE 111, but will also be printed on the "Deposit" slip which the operator reinserted in the validating chute of the master machine. It will be printed as well on the 10 tape 1170 as shown in line 2 of that tape in FIGURE 111.

When the switch TS8 opens at about the 316° point of the cycle, the relay RTR (B*bc*) is deenergized and restores its contacts to normal. The contacts RTR–3 (E*bl*), restoring, open the energizing circuit of the relay RSAT which restores its contacts RSAT–1, RSAT–2 and RSAT–3 (E*ml*) in the register function control circuits and its contacts RSAT–4 (E*bl*) in the energizing circuit of the sort relay SR which, because the contacts RTR–3 have restored, is again energized and in turn restores its contacts SR–1 (E*br*), SR–2 (F*bc*) and SR–3 (F*mc*).

At the end of the operation, the operator will depress the key SK19 which likewise will initiate a similar operation in which, however, register 19 is selected and totaled and the total printed on the "Deposit" slip, on the master machine detail tape as shown in line 7 in FIGURE 111 and on the 19 tape 1170 as shown in line 2 of the latter.

When reinserting the "Deposit" slip in the master machine validating chute prior to depression of the key SK10, the operator will hold the "Deposit" slip displaced a little from the position it occupied when the deposit total was printed thereon so that the total of register 10 will not be over-printed on the print of the deposit total. Before depressing the key SK19, the operator will displace the "Deposit" slip slightly further so that the print of the total of register 19 on the "Deposit" slip will overlap neither the deposit total or the register 10 total. In connection with this first deposit of the example being described, it will be seen that the register 10 total is a cipher total ".00" showing that the items of that deposit involve no two-day "floats." The register 19 total, however, is $50.00, showing that the deposit involved a one-day "float" total of $50.00. This was because of the $50.00 check which was entered and sorted in the operation initiated by the depression of key SK12 as previously described. When the "Deposit" slip is removed and subsequently forwarded with other "Deposit" slips to the bookkeepers, it bears the "float" figures which will be required for analysis of the account of the deposit.

The operator will now proceed with the next deposit. Picking up the next "Deposit" slip and reading the total therefrom, the operator will place the "Deposit" slip in the validating chute and enter the deposit total on the amount keys. Let us assume that either the operator makes an error in reading the deposit total or in entering it on the amount keys, or that the depositor has not correctly totaled the deposit, and that while the correct amount of the deposit is $210.00 the operator has entered $200.00 on the amount keys. Noting that the "Deposit" slip came from the teller number 2, the operator will depress the key SK2 which will initiate an operation like the previously described operation initiated by the depression of the key SK1 for the first "Deposit" slip, except that the amount $200.00 is subtracted from the crossfooter, added in register 2, printed on the detail tape 110 with the next consecutive deposit number as shown in line 8 of the tape 110 in FIGURE 111, and printed on the #2 tape 1170 as shown in line 2 of the latter. It may be noted that, as was explained in connection with the operation initiated by depression of the key SK1, the operation would not have been initiated if the crossfooter had not been clear. Thus, even if the operator had by any chance omitted to perform the total operations by depressing the keys SK10 and SK19, the previous deposit would still be proved by initiation of a machine operation of the key SK2 or, for that matter, any other key SK1 to SK9 if the corresponding program control switch AF1 to AF9 is in its 2 position. For the program corresponding to the switch settings shown in FIGURE 109B, that is true of the keys SK1 to SK6.

After the operation entering the deposit total from the second "Deposit" slip, the operator will note that the first document accompanying that "Deposit" slip is a "Cash-Back" slip showing an amount of $100.00 paid back to the depositor in cash by the receiving teller. The operator will therefore enter the amount $100.00 on the amount keys and depress selection key SK7. Because the control panel switch SF7 is in its 5 position rather than its 4 position, the cycle of operation will not be initiated until and unless the operator drops the "Cash-Back" slip into the sorter chute where the cycle of operation will be like those previously described in which a sort was required, except that the depression of the key SK7 which operates the switches SXS1 and SYS7 will bring about the selection of register 7, tape printer 7 and the deflector for bin 7, which is the seventh bin from the top in the front column of document bins in the sorter, and because the control panel switch AF7 is in its 3 position, the relay CBR (Bbc) will be energized. The relay CBR will transfer its contacts CBR-1 (Etl) in the energizing circuit of the crossfooter total and subtract solenoid CTSS so that when the switch TS5B is closed at the 10° point in the cycle of the master machine, the crossfooter will be conditioned for a subtract operation while register 7, because of the energizing of relays X1 and XR1, will be conditioned for addition. FIGURE 111 shows the "Cash-Back" slip amount printed in line 9 of tape 110 and in line 2 of the #7 tape 1170. The second item related to this deposit is an "On Us" check in the amount of 135.00. The operator will handle this check in the same manner as the 100.00 "On Us" check which was associated with the first deposit and is recorded in line 4 of the detail tape 110 in FIGURE 111. The amount of this check is shown in FIGURE 111 in line 10 of tape 110 and in line 3 of the #26 tape 1170.

The third item associated with the second deposit is a check in the amount of 175.00 which the operator will handle similarly to the 50.00 check which is the first item associated with the first deposit and recorded in line 3 of tape 110 in FIGURE 111, except only that, as the 175.00 check related to this second deposit is drawn on a different bank, the operator will depress a different selection key, in this instance, the key SK22, in consequence of which the 175.00 check will be sorted to bin 22 and the amount thereof of 175.00 will be added in register 22, and because switch AF22 is in its 2 position so that the relay RA will be energized, will also be added in register 10. The energizing circuit for the add solenoid ASC for the "C" line of registers, which will be established when the switch TS5A is closed at about the 10° point of the cycle, will include the closed contacts RA-1 of the relay RA and the contacts XR3-4 of the relay XR3 which will be energized in consequence of the energizing of the relay X3 by the closure of the switch SXS3 upon depression of the key SK22.

There being no further items associated with the second deposit, the operator, following instructions, will reinsert the "Deposit" slip in the validating chute and depress the key SK10. However, the cycle of operation will not be initiated. The depression of the key SK10 closes the energizing circuit for the float total relay RTR, which thereupon opens its contacts RTR-2 (Emc) so that unless the crossfooter non-clear switch CNC was then in closed condition, the energizing circuit of the master machine cycling solenoid MCS would not be completed when the contacts DR-1 of the delay relay DR were closed when the energizing circuit of the latter relay was completed by the restoration of the contacts SR-1 of the sort relay SR which was deenergized by the operation of the transfer contacts RTR-3 of the total relay RTR. The operator's instructions will require that when either the key SK10 or the key SK19 fails to initiate a cycle of operation, the operator should compare the amounts on the "Deposit" slip with the amounts which have been recorded on the master machine detail tape 110 in association with that "Deposit" slip. Suppose that the total written on the "Deposit" slip by the depositor is $200.00, the amount which the operator correctly entered in the machine, as shown in line 8 of the "B" strip in FIGURE 111. The operator will next check the amounts of the "Cash Back" slip and the amounts of the two checks as shown on the "Deposit" slip and, noting that all three of these amounts as shown in lines 9, 10 and 11 of the detail strip 110 agree with the amounts written on the "Deposit" slip, the operator will check the addition on the "Deposit" slip and will quickly see that the $200.00 total is incorrect and that the total should have been $210.00. The reader will readily understand that the crossfooter contains a positive balance of 10.00 so that the non-clear switch CNC (Emc) is open and prevents initiation of a cycle of operation by depression of any of the keys SK10, SK19 and SK1 to SK6.

The operator will then mark the error on the "Deposit" slip, and correct the entry in the machine in the following manner:

First the operator will depress the error key E (FIGS. 2, 4 and 26) which will operate the switch ESW (Etc)

to close the energizing circuit for the solenoid ESD (FIG. 20) which will assist the error key in operation of the key release means for releasing the depressed key SK10 for return to normal. Next, the operator will re-enter on the amount keys the previously entered incorrect deposit total of $200.00. Then the operator will depress the correction key COR (FIGS. 2, 4 and 26) which will close the switch CORS (C*tr*) to complete the energizing circuit of the correction relay CR which will operate its contacts CR–2 (E*tl*) in the energizing circuit of the crossfooter total and subtract solenoid CTSS and its contacts CR–1 which will open the energizing circuit of the sort relay SR and close the energizing circuit of the register subtract and total relay RSAT. The deenergizing of the relay SR will prevent the sorter from being operated, and the energizing of the relay RSAT will operate its transfer contacts in the register function control circuits (E*ml*). The operator will next depress the key SK2 which will initiate a cycle of operation in which the amount of $200.00 will be re-entered additively in the crossfooter and subtractably in register 2, and printed on the detail tape 110 as shown in line 12 in FIGURE 111, and on the 2 tape 1170 as shown in line 3.

Because the switch AF2 is in its 2 position, depression of the key SK2 will cause the deposit relay DT to be energized to transfer its contacts DT–1 (E*tl*). However, because the contacts CR–2 (E*tl*) of the correction relay CR were transferred by energizing of the relay CR upon closure of the switch CORS by depression of the correction key COR, the energizing circuit of the solenoid CTSS will remain open when the switch TS5B is closed at the 10° point in the cycle so that the crossfooter will add instead of subtracting as it normally does when the relay DT is energized. When the switch TS5A is closed, an energizing circuit for the "B" registers subtract and total solenoid SATB (E*ml*) is closed, said circuit being traced from positive line +1 through normally closed contacts RNAS, contacts XR1–3 of relay XR1 (C*tr*) (which is energized upon closing of the contacts X1–10 of the relay pair X1 energized upon closing of the switch SXS1 by depression of the key SK2) then through the normally closed contacts RSTR–1, transferred contacts RSAT–1, the winding of solenoid SATB and switch TS5A to negative line —1.

Next, the operator will enter the correct deposit total 210.00 on the amount keys, replace the "Deposit" slip in the validating chute, and again depress the key SK2. Because there is an amount in the crossfooter, the switch CNC is open and is also necessary to depress the key AC (FIG. 6) to close the switch ACS (E*mc*) which will initiate another cycle of operation in which the amount of 210.00 will be subtracted from the crossfooter, added in register 2, and printed on the "Deposit" slip, on the detail tape 110 as shown in line 13 thereof in FIGURE 111, and on the 2 tape 1170 as shown in line 4. This operation, recorded in line 13 of the detail strip 110 in FIGURE 111, is exactly like that recorded in line 8 except that the amount is 210.00 instead of 200.00.

After having corrected the deposit total entry in the manner above described, the operator will again depress the key SK10 which, because the crossfooter is now clear and the switch CNC is closed, will initiate a cycle of operation in which the sorter does not operate, in which a total-taking operation is performed on register 10 and the total printed on the "Deposit" slip as well as on the detail tape 110 as shown in line 14 of FIGURE 111, and is also printed on the 10 tape 1170 as shown in line 3.

It will be noted that in the operation initiated by depression of the key SK2 while the error key COR was depressed, a new deposit number was not printed in line 12 of the detail tape 110 of FIGURE 111. The transferring of the contacts CR–1 (E*bl*) prevented the counting magnets from being energized in that operation. However, in the operation initiated by the next depression of the key SK2 for entering the correct deposit total, a new deposit number was printed as shown in line 13 of the detail tape.

Next, the operator will depress the key SK19 which will initiate a machine cycle in which a cipher total will be printed on the "Deposit" slip, on the detail tape 110 in line 15 and on the 19 tape 1170 as shown in line 3 thereof in FIGURE 111.

Next, the operator finds two "Deposit" slips attached to a single check in the amount of $375.00. The deposit was received by teller No. 1 and there is one "Deposit" slip showing that the amount of 225.00 is to be credited to the depositor's checking account and a second deposit slip showing that the remaining 150.00 is to be deposited to another account, which, we will assume, is a savings account. The operator will insert the checking account "Deposit" slip in the validating chute, enter the amount of 225.00 on the amount keys and depress key SK1, which will initiate an operation which will be clearly understood from the previously described deposit entering operations. Next, the operator withdraws the checking account "Deposit" slip from the validating chute and inserts the savings account "Deposit" slip in that chute, enters the amount of 150.00 on the amount keys and depresses key SK6 which has been assigned to savings accounts credits. The depression of key SK6 will not initiate a machine cycle because switch AF6 is in its 2 position so that the deposit relay DT (B*bc*) will be energized to open its contacts DT–2 (E*mc*) in the circuit of the master machine cycling solenoid MCS, and the switch contacts CNC (E*mc*) are open because the crossfooter is not clear but contains the 225.00 just previously subtracted therefrom. However, the operator also depresses the additional credit key AC (FIGS. 2, 4 and 6) which closes the switch ACS (E*mc*) to complete the energizing circuit of the solenoid MCS and thus initiate the cycle of operation in which the savings account credit amount of 150.00 is subtracted from the crossfooter, added in register 6 and printed on the savings account "Deposit" slip, on the tape 110 in line 17 and on the 6 tape 1170 in line 2. Because the switch AF6 is in its 4 position, the sort relay SR is deenergized and the sorter will not be operated.

Next, the operator removes the "Deposit" slip from the validating chute, enters the amount of the check, 375.00, on the amount keys, and noting that it is an "On Us" check, drops it in the sorter chute and depresses key SK26 which initiates an operation in which the amount is added in the crossfooter and in the 26 register, the entries shown in line 18 of tape 110 and in line 4 of the 26 tape 1170 are printed, and the check is sorted to the 26 bin.

There being no other operations, the operator, without reinserting either of the "Deposit" slips in the validating chute, initiates two further cycles of operation by depression of the keys SK10 and SK19, successively, to print the "float" figures on the tapes and prove the deposit. The operator will mark each "Deposit" slip to show whether the amount is or is not a "float."

The fourth deposit involves a "Deposit' slip showing a deposit total of 664.00 received by teller No. 1 and involves checks which the operator enters and sorts as indicated by the entries in lines 22 to 25 on the detail tape 110 in FIGURE 111 and also involves a "Cash-In" slip showing a currency deposit item in the amount of 180.00, in view of which the operator enters 180.00 on the amount key SK16. The amount 180.00 will be added in the crossfooter and in register 16 alone, because the switch AF16 is in its 1 position. The cycle of operation will not be initiated unless the "Cash In" slip is inserted in the sorter chute and the endorsers will not be operated because the switch SF16 is in its 5 position. The "Cash In" slip will be sorted to bin 16. Then the operator depresses the key SK10 as usual at the completion of the entry of the last item of the deposit, but finds that a cycle of operation is not initiated.

Again the operator will re-examine the "Deposit" slips and compare the amounts thereon with the related entries on the detail tape 110. In this instance the operator finds that the amounts shown on the detail tape correspond with the amounts shown on the "Deposit" slip with the exception that "84.00" is shown on the detail tape (in line 24) whereas "48.00" is shown on the "Deposit" slip. Either the operator or the depositor incorrectly read the amount of the check and made an incorrect entry, so that it is necessary for the operator to retrieve the check and examine it. Noting that the check in question was the next to the last check sorted in bin 12, the operator will depress the key SBR and the key SK12.

Depression of the key SBR (FIGS. 2, 4, 6 and 7) will directly operate the switch SBRS (F*ml* and FIG. 4) to closed position, and switch SKE (E*bl*) opens.

The closing of the switch SBRS will complete the energizing circuit of the bin release relay bin BR, which will operate its contacts BR–1 to BR–5. Contacts BR–1 (E*bl*) open the energizing circuit of the sort relay SR so that the sorter unit will not perform a sorting operation and prevent energization of either of the counting magnets DCM or SCM during the operation performed with the key SBR depressed. Contacts BR–2 (E*tr*) close in the circuit of the bin latch solenoids BL1, BL2 and BL3. Contacts BR3 (E*mc*) close in the circuit of the master machine cycling solenoid MCS to short the crossfooter non-clear switch CNC regardless of whether or not the contacts RTR–2 and DT–2 remain closed. Contacts BR–4 (E*br*) are transferred to close the energizing circuit of the sort control relays SC, which in turn close their contacts SC–1 to SC–9 (C*c*) and SC–10 (C*tc*) in the circuits of the sort selecting relays SY1 to SY9 and SX1 to SX3. Contacts BR–5 (F*tl*) are transferred in the common portion of the energizing circuits of the bin deflector solenoids BD1 to BD27.

Depression of the key SK12 will close the switches SYS3 and SXS2. The closing of switch SYS3 (C*bl*) will complete the energizing circuit of printer selecting magnet PSY3 and the energizing circuit of the sort selection relay SY3, which will close its holding contacts SY3–1 and close its contacts SY3–2, SY3–3 and SY3–4 (F*l*) in the circuits of the bin deflector solenoids BD3, BD12 and BD21. The closing of switch SXS2 (C*tr*) will complete the energizing circuit of the relay pair X2, which will close contacts X2–1 to X2–11. The closing of contacts X2–1 to X2–9 (B*r*) will be of no importance inasmuch as no amount is set on the amount keys of the master machine and operation of the sorter is prevented by the deenergization of relay SR by the opening of contacts BR–1. However, contacts X2–10 (C*mr*), closing, will energize magnets SXM2 and PM10 and relay XR2. Contacts X2–11 (C*tc*), closing, will energize sort selecting relay SX2. Relay XR2 will close its contacts XR2–1 (C*br*) in the circuit of printer selecting solenoid PSX2, its contacts XR2–2 (E*br*) to complete the energizing circuit of the delay relay DR, its contacts XR2–3 (E*ml*) in the function control circuit for the "C" registers, and its contacts XR2–4 (E*ml*) in the function control circuits for the "D" registers which, however, is of no importance since no amount has been entered on the amount keys. The relay SX2 (C*mc*) being energized closes its holding contacts SX2–1, its contacts SX2–2 (F*bl*) in the energizing circuit of the bin deflector solenoid BD12 and column deflector solenoid CD2, its contacts SX2–3 (F*br*) in the circuit of the packer bail solenoid PB2, its contacts SX2–4 (F*tr*) in the holding circuit for the relay TR, and its contact SX2–5 (E*tr*) in the circuit of the bin latch solenoid BL2. However, as the sort relay SR is deenergized, only the closing of the contacts SX2–2 and SX2–5 of the relay SX2 will be of importance in this operation.

The energizing of the cycle delay relay DR upon closing of the contacts XR2–2 causes its contacts DR–1 (E*bc*) to close to initiate a cycle of operation in which register 12 will be selected for an idle operation as recorded in line 27 of the detail tape 110 in FIGURE 111 and tape printer 12 will be selected also to record that idle operation as shown in line 6 on the detail tape 1170 in FIGURE 111. While the operation of the crossfooter and of the register are idle operations, the prints on the tapes are desired to provide an easily understandable record of the operations.

At about the 10° point in the master machine cycle, the switches TS1A, TS1B, TS3A, TS3B, TS5A and TS5B are closed. The closing of switches TS1A and TS1B is without effect inasmuch as contacts SR–3 and SR–2 of the deenergized sort relay SR are open. The closing of switch TS5A completes the energizing circuit of the "C" registers add solenoids ASC for the idle operation of the selected register 12. The closing of switch TS5B is without effect since the circuits of all the crossfooter control solenoids are open at other points so that the crossfooter function controls remain in their normal add condition. The closing of the switch TS3B is without effect since the circuit of the counting magnets is open at the contacts BR–1. However, the closing of the switches TS3A completes the energizing circuits of the bin deflector solenoid BD12 and the column deflector solenoid CD2.

The operation of the column deflector solenoid CD2 is of no consequence. However, it will be remembered that when a bin deflector solenoid is energized, it operates a link 2081 (FIG. 101) to actuate the auxiliary bail 2065 in the bin associated with the operated deflector and that the forward arm 2078 of the side lever of the operated auxiliary bail will lift the link 2096 to permit the associated full bin switch to restore. In the operation being described, the full bin switch FBS2 (E*tr*) will restore to close the energizing circuit of the bin latch solenoid BL2 which, it will be remembered, will lift the slide 2108 (FIG. 101) for the middle column of bins with the result that the latch lever 2106 for the tray in bin 12 will be moved to released position when the energizing circuit of the bin deflector solenoid BD12 is broken and the link 2081 and the latch release lever 2116 controlled thereby are permitted to restore to normal.

It will be remembered also that the operation of the bin latch solenoid will lift the slide 2135 (FIG. 101), which will cause the lever 2147 to be released to operate the right door switch. In this case, the right door switch RD2 (E*mr*) will complete the energizing circuit of the full bin relay FBR so that the latter will operate its contacts FBR–1 to FBR–5. The contacts FBR–1 (E*tc*) complete a holding circuit for the bin latch solenoid BL2, the operation of contacts FBR–2 (E*tc*) is of no consequence for this operation, the closing of contacts FBR–3 (C*tc*) around the open contacts SH–3 completes the previously described holding circuit for the sort selecting relays SY3 and SX2, the contacts FBR–4 (F*tl*) open to break the energizing circuit of the bin release relay BR, and the closing of contacts FBR–5 (A*b*) closes the circuit of the door light DL2.

The deenergized relay BR restores its contacts BR–1 to BR–5. The contacts BR–1 (E*bl*), restoring, reclose the energizing circuit of the sort relay SR. The contacts BR–2 (E*tr*) open the original energizing circuit of the bin latch solenoid BL2 which, however, remains energized through the holding circuit including the closed contacts FBR–1 and the power reducing resistor R2. Contacts BR–3 (E*mc*), connected in parallel to the crossfooter non-clear switch CNC, reopen.

Contacts BR–4 (E*br*) restore, thereby opening the energizing circuit of the sorter control relay SC which open their contacts SC–1 to SC–10 (C*c*) in the circuits of the sort selecting relays SY3 and SX2 which, however, remain energized over the holding circuit closed by the contacts FBR–3.

Contacts BR–5 (F*tl*), restoring, break the energizing circuits of the bin deflector solenoid BD12 and of the column deflector solenoid CD2. The bin deflector solenoid BD12 and its link 2081, restoring while the bin latch solenoid BL2 is still energized and holds the link 2108 elevated, causes the latch member 2106 for bin 12 to be moved to and held in tray releasing position as previously described.

At this point it is necessary to take into account the passage of time during the above described train of events initiated by the closing of the switch TS3A at about the 10° point of the cycle of the master machine. The bin deflector solenoid which is energized at that time is required to move a number of mechanical elements as previously described, which elements have a substantial inertia so that the restoration of the full bin switch to close the energizing circuit of the bin latch solenoid is not completed until well past the 46° point in the cycle. Also a considerable inertia is possessed by the mechanical parts operated by the bin latch solenoid as it operates the right door switch to close the energizing circuit of the full bin relay FBR which in turn, opening its contacts FBR–4 deenergizes the bin release relay BR which, restoring its contact BR–1, recloses the energizing circuit of the sort relay SR. The energization of the full bin relay FBR does not occur until well past the 60° point of the cycle. The time required by the bin deflector solenoid to bring about the restoration of the full bin switch cannot of course be made precisely the same for all 27 bin deflector solenoids and full bin switches and, furthermore, the time required by each of the three bin latch solenoids to operate the respective right door switch may vary slightly, but in any case the closing of the energizing circuit of the full bin relay FBR, the opening of the contacts FBR–4, the deenergizing of the relay BR and the restoration of its contacts BR–1 and BR–4 does not occur until well after the 60° point of the master machine cycle, at which time the opening of the switch TS4A (E$br$) opens the energizing circuit of the relay DR which reopens its contacts DR–3 (E$br$) so that the sorter control relays SC will not be reenergized when the contacts BR–4 and SR–1 restore to normal. Likewise the closing of the contacts SR–2 (F$bc$) by the reenergized sort relay SR does not occur until well after the reopening of the switch TS1B at about the 46° point in the cycle so that the sort start relay SS cannot be energized in the operation initiated while the key SBR is depressed. Thus, the open contacts SS–4 (F$tr$) prevent energization of any packer bail solenoid by the closing of the switch TS2B at the 75° point of the master machine cycle, the unoperated packer bail switches and open contact SS–2 (F$mc$) prevent energization of the sort holding relay SH, and the open contacts SS–5 (F$tr$) prevent energization of the relay TR when the switch TS6 closes at the 130° point of the cycle. It will be apparent also that as the contacts SR–3 (F$mc$) are not reclosed until well after the closing of the switches TS1A at the 46° point of the cycle, neither of the endorser solenoids ECA and ECB will be energized. As the contacts BR–1 (E$bl$) are not reclosed until after the contacts DR–2 reopen as the relay DR is deenergized by the opening of the switch TS4A at the 60° point of the cycle, the energizing circuit of the count magnet SCM cannot be closed at any time in this operation, notwithstanding the closed condition of the switch TS3B (E$bl$) from the 10° to the 300° point of the cycle.

At about the 190° point the switches TS7A and TS7B (E$bc$) close and a cycle of operation of the multiple tape printer is initiated as in other operations. These switches reopen again at about the 250° point.

At about the 316° point the switch TS8 (C$tc$) opens to break the energizing circuits of the relays RAFE, X2 and XR2 and magnets SXM2 and PM10.

At about the 318° point, the key SBR is released and restores to normal and reopens the switch SBRS (F$ml$) in the circuit of the relay BR. The depressed key SK12 is also released from its latch slide 170 (FIG. 7), but is prevented from restoring past a partially depressed position by its slide 185 which is held in latched position by the latch 221, 223. The latch member 221 also prevents the slide 211 from restoring to reclose the switch SKE (E$bl$) and holds the slides 185 for the other two rows of keys SK in latching position so that the three slides 185 prevent depression of any other of the keys SK1 to SK27. As previously described, the slide 211 remaining unrestored and the switch SKE remaining open will prevent a new operation from being initiated by any of the live computing function control keys such as the keys CT, CST, CS and CA. The partial restoration of the key SK12 is sufficient to permit the switches SXS2 and SXS3 to reopen.

Thus at the end of the operation the multiple tape printer and its control circuits are again at normal, but in the sorter the bin tray 12 is unlatched and in the sorter control circuits the right door switch RD2 remains transferred and the full bin relay FBR remains energized so that the door lamp DL2 is lighted and the holding circuits established by the contacts FBR–1 (E$tc$) and FBR–3 (C$tc$) remain closed. In the master machine the key SK12 is held partially depressed to prevent depression of any key SK1 to SK27 excepting the key SK12, and in the control circuit the switch SKE remains open to prevent another cycle from being initiated except by depression of the key SK12.

In order to retrieve from sorter bin 12 the check which the operator desires to re-examine, the operator will open the middle right door of the sorter and pull the unlatched tray at least partially out of bin 12, manually release the packer bail 2010 sufficiently to permit removal of the check which is next to the top, and then restore the tray to its fully inserted position within the bin. Then the operator should, and normally will, reclose the middle right door which, as explained in the description of the sorter unit, will operate the right door switch RD2 (E$mr$) to its normal position, thereby breaking the circuit of the full bin relay FBR so that the latter will be deenergized and restore its contacts FBR–1 to FBR–5, thereby extinguishing the door lamp DL2 and breaking the holding circuits of the sort selecting relays SY3 and SX2 and the holding circuit of the bin latch solenoid BL2 which then drops the link 2108 to relatch the tray in bin 12.

Re-examining the withdrawn check, the operator will see that the check is drawn in the amount of 48.00 as shown on the "Deposit" slip and that she had, as previously shown in line 24 of the detail tape 110 in FIGURE 111, incorrectly entered the amount of the check as 84.00. The operator will, therefore, depress the correction key COR, which will close the switch CORS (C$tr$) to energize the relay CR, which will operate its contacts CR–1 CR–2 and CR–3. The contacts CR–1 (E$bl$), transferring, will break the energizing circuit of the sort relay SR, prevent energization of either of the counting magnets DCM and SCM, and close the energizing circuit of the subtract and total relay RSAT, which will operate its contacts RSAT–1, RSAT–2 and RSAT–3 in the register function control circuits and open its contacts RSAT–4 in the already opened circuit of the sort relay SR. Contacts CR–2 (E$tl$) transfer in the circuit of the crossfooter total and subtract solenoid CTSS. Contacts CR–3 (E$mc$) close to short the crossfooter nonclear switch CNC.

The operator will enter the previously entered incorrect amount of 84.00 on the amount keys. The operator will then depress the partially depressed key SK12, which will initiate a cycle of operation in which the amount 84.00 will be subtracted from the crossfooter because of the energization of the solenoid CTSS when the switch TS5B closes at the 10° point of the cycle and will be subtracted from register 12, the register subtract and total solenoid SATC being energized when the switch TS5A closes also at the 10° point of the cycle. Also because of the energization of the relay RA (B$bl$), the same amount will be subtracted from register 19 as the register subtract and total solenoid SATD will also be energized. The multiple tape printer will also be operated to print the entry shown in line 7 on the 12 tape 1170 in FIGURE 111, and the master machine will print the entries shown in line 28 on the tape 110. The sorter will not operate because of the deenergization of the sort relay SR.

In this cycle of operation of the master machine the rearward movement of the bail rod 173 (FIG. 7), as the master machine cycle is initiated, will pull the slides 185 rearwardly to release the lugs 224 from the hooks 223 of the bail 221 so that the latter will be restored to normal by its spring and will permit the slide 211 to restore to normal and permit reclosing of the switch SKE. Thus at the end of this operation the key SK12 restores fully to normal position and the entire apparatus is again in normal condition except that the switch CNC remains in opened condition.

Next, the operator will enter the correct amount of the check 48.00 on the amount keys and will again depress the selection key SK12 and drop the check into the chute of the sorter so that another cycle of operation will be initiated, in which the correct amount 48.00 is added in the crossfooter, added in registers 12 and 19 and printed on the tape 110 as shown in line 29 thereof and on the tape 12 as shown in line 8 thereof in FIG. 111, and the check will be sorted to bin 12. In this operation the endorser solenoids ECA and ECB will both be energized and full endorsement will again be printed on the back of the check.

The last described operation correctly recording and re-sorting the check could not have been initiated if the middle right door had not previously been opened and closed to restore the right door switch RD2. If the latter had remained in its transferred position, the energizing circuit of the relay DR (E*br*) would not have been closed when the document was dropped in the chute to close the switches DDS when the key SK12 was depressed. The previous operation with the key COR depressed when the key SK12 was depressed could have been initiated because the restored contacts SR–1 of the relay SR deenergized in consequence of the depression of the key COR permitted the circuit of the relay DR to be completed by the closure of the contacts XR–2 regardless of the position of the switch RD2.

Next, the operator will initiate two machine cycles, first by depressing the key SK10 and second by depressing the key SK19, thereby proving the deposit as now recorded on the master machine detail tape. The "float" totals are shown printed in lines 30 and 31 of tape 110. No further deposits have been included in the illustrated abbreviated example.

The abbreviated example being described does not include operations involving the depression of selection keys whose corresponding switch pairs AF and SF on the program control panel are set in the manner of the switch pairs 9, 18 and 27 in FIGURE 109B. However, such sorting operations will be like the sorting operation previously described as initiated by the key SK22, except that in an operation initiated by, for example, the key SK27, the relay RA would not be energized because the switch AF27 is in its 1 position so that the amount of the sorted check would be added only in the register 27 and in the crossfooter and not in the 10 register. The switches, AF9, AF18 and AF27 were set in their 1 positions because the keys SK9, SK18 and SK27 were assigned to checks drawn on banks from which credits are obtainable on the same day (without "float").

Usually, the batches of "Deposit" slips and attached documents to be proved and sorted will be quite large. Each document tray in the sorter can accumulate a stack of from 125 to 175 documents before the associated one of the full bin switches FBS1, FBS2 or FBS3 fails to restore in the sorting operation and thus permits the full bin relay FBR to be energized in consequence of a full bin condition as will shortly be explained. The number of documents required to be accumulated in a single bin before a full bin condition results can be varied between the indicated limits by the adjustment of the full bin switches. The illustrated example of work is much abbreviated, as it is not necessary for the purpose of a complete disclosure to describe or show in detail the proving and sorting of all of a normal large batch of deposit documents.

Assume that the stack of checks sorted into sorter bin 12 reaches such a height that it subsequently will limit the operating movement of the auxiliary bail 2065 in that bin to such an extent that in an operation which is initiated by the depression of the key SK12 for sorting another document to bin 12, the link 2096 (FIG. 100) for the middle column of bins of the sorter is not lifted far enough to permit the full bin switch FBS2 to restore, and as the links 2096 for the other two columns of bins are not lifted, all of the full bin switches remain closed on their forward contacts as shown in FIGURE 109E. Consequently, after the sort hold relay SH has been energized at about the 10° point of the cycle and when the relay TR is energized at the 130° point of the cycle, the energizing circuit of the relay FBR is completed through all of the switches FBS1, FBS2 and FBS3 in series and contacts SH–5 and TR–2.

The relay FBR then operates its contacts FBR–1 to FBR–5. Contacts FBR–2 (E*tc*) complete the energizing circuit for the bin latch solenoid BL2 from positive line +1 through the previously closed contacts SS–6, contacts SX2–5 and the winding of solenoid BL2 to negative line —1. The contacts FBR–1 (E*tc*) closing, connect a resistor R2 in shunt to the series combination of contacts FBR–2 and SS–6 to keep the solenoid BL2 energized at reduced current after the contacts SS–6 reopen. The solenoid BL2, lifting the slide 2135 (FIG. 101) as previously described, then transfers the right door switch RD2 to complete the holding circuit for the relay FBR and close an energizing circuit for the glow lamp FDB (E*br*) on the master machine keyboard, said circuit being traced from positive line +1 through the switches RD1, LD1, and RD2, a small rectifier D2, and through the glow lamp FDB to negative line —1. The link 2108 (FIG. 101), also lifted by the solenoid BL2, brings about the unlatching of the tray in bin 12 as previously described. The contacts FBR–3 (C*tc*) close in parallel to the contacts SH–3 in the holding circuit for the sort selecting relays SY3 and SX2. The contacts FBR–4 (F*tl*) open in the circuit of the relay BR, and contacts FBR–5 (A*b*) complete the circuit of the door lamp DL2 which then lights.

At the end of the operation, the master machine and multiple tape printer restore to normal except that the crossfooter non-clear switch CNC may be open and the sorter and control circuits restore to normal as in other sorting operations except that the tray in bin 12 is unlatched, the bin latch solenoid BL2 remains energized and the right door switch RD2 remains transferred so that the full bin relay remains energized and another operation cannot be initiated by depression of any of the selection keys SK1 to SK27 except those corresponding to those of the switches SF1 to SF27 which are in the 4 position. Unless the switch SF corresponding to the depressed key SK is in its 4 position, the relay NS (B*bl*) will not be energized, the contacts NS–1 (E*bl*) will remain closed and the sort relay SR will remain energized so that the energizing circuit for the relay DR cannot be completed through the contacts SR–1 (E*br*). As the right door switch RD2 is in transferred position, the circuit of the relay DR cannot be completed through the document switches DDS when the next document is dropped into the chute.

The operator will note that the cycle of operation has not been initiated by the depression of the key SK12 and will note the lighted lamp FDB (FIG. 6 and E*br*) on the master machine keyboard. If only a comparatively small number of deposits remain to be proved and sorted the operator may elect to proceed with the work after merely opening and closing the middle right hand door which will restore the switch RD2 to normal to deenergize the relay FBR which will restore its contacts. The opening of contacts FBR–1 (E*tc*) will deenergize the solenoid BL2 and the opening of contacts FBR–3 (C*tc*) will break the holding circuits of the sort selecting relays SX2 and SY3. In that case, in each further operation initiated by the depression of key SK12, the full bin switch FBS2 will again fail to restore and the relay FBR and bin latch solenoid BL2 will again be energized so that the operator must again open and close the middle right hand door of the sorter.

A considerable number of documents may still be sorted into the same bin, bin 12 in this instance, without any difficulty except that repeated opening and closing of the sorter door after each sorting operation initiated by the depression of the key SK12 would slow the work too much if there were many documents to sort to the bin. Consequently, if the operator sees that there is a substantial pile of deposit documents still to be proved and sorted, the operator will elect another procedure. In this other procedure the operator will insert a blank piece of paper, a "cut" slip, of about the size of a check in the master machine validating chute and will then depress the crossfooter non-add key CNA (FIG. 6), the register total key RT and the selection key, in this case the key SK12, corresponding to the full bin.

Depression of the crossfooter non-add key CNA mechanically moves the crossfooter mechanical function control elements to position to non-add the crossfooter. When the register total key RT is depressed, it operates, as described in the description of the master accounting machine, the switch RTS (E*bl* and FIG. 4) which opens the energizing circuit of the relay SR and closes an energizing circuit for the register subtract and total relay RSAT (E*bl*). The relay RSAT operates its contacts RSAT–1 to RSAT–3 (E*ml*) in the register function control circuits so that, the contacts XR2–3 being also closed when the key SK12 is depressed, the "C" registers subtract and total solenoid SATC will be energized when the switch TS5A is closed at about the 10° point in the cycle. The transfer of the contacts RSAT–1 to RSAT–3 also prevents energization of any of the register add solenoids so that even though the depression of the selection key for the register to be totaled may, as in the case of the key SK12 in the illustrated example, cause the relay RA (B*bl*) to close its contacts RA–1 (E*ml*), the total taken will not be added in the float total register, the number 19 register in the selected example. The depression of the register total key RT also, as described in the description of the master machine, operates the switch RTST (E*tl* and FIG. 4) so that when the switch TS5B closes at about the 10° point in the cycle, the solenoid RSTT (E*tl* and FIG. 27) will be energized to latch the differential stop slides of the master machine in normal position and render the zero stop elements for the registers effective for a total-taking operation.

The relay SR, deenergizing, restores its contacts SR–1 (E*br*) which, the contacts XR2–2 also being closed, closes the energizing circuit of the relay DR. The relay DR closes its contacts DR–1 (E*bc*) which, the contacts RTR–2 and DT–2 being at normal, close the energizing circuit of the solenoid MCS to initiate a cycle of operation, in which a total will be taken from the 12 register, printed on the 12 tape 1170 in the multiple tape printer and printed on the master machine detail tape 110 and on the "cut" slip which the operator inserted in the master machine validating chute.

In this cycle of operation the sorter is not operated and the tray latch for bin 12 remains in unlatched condition. Now the operator will open the middle right door of the sorter, remove the unlatched tray from bin 12, remove the sorted documents therefrom and reinsert the tray in its bin. The operator will place the "cut" slip, on which the total of the checks sorted to bin 12 has been printed, on top of the stack of checks, place a rubber band about them and place them on top of the sorter. Reclosing of the right door returns the right door switch RD2 to normal, which, as previously explained, deenergizes the full bin relay FBR. The latter restores its contacts FBR–1 to FBR–5, breaking the holding circuits for the sort selecting relay SX2 and SY3 and the bin latch solenoid BL2 so that the apparatus is again at normal for continuance of the work.

It may happen occasionally that a document is encountered which is required to be sorted but will not go through the sorter because, for example, it may be too badly crumpled or torn or it may be too large, as in the case of some voucher checks. When such a document is encountered, the operator, in addition to entering the amount on the amount keys and depressing the appropriate selection key SK1 to SK27, will not drop the document into the sort chute but will instead depress the sorter bin release key SBR which will initiate a cycle of operation like that previously described where the operator wished to retrieve an already sorted document to re-examine it. In this operation the amount set on the amount keys will be entered in the crossfooter and appropriate register and printed on the detail strip 110 of tape 1170 and the tray in the sorter bin corresponding to the depressed selection key will be unlatched as previously explained so that the operator may pull out the released tray and manually insert the non-sortable document. After replacing the tray and closing the sorter door the machine will, as previously explained, not be in normal condition and, particularly, the last depressed selection key will be held in partially depressed position. However, the operator may fully depress that selection key and then depress the correction key CR which will initiate a cycle of operation like that previously described in which the operator re-entered the wrong amount, as shown in line 28 of the detail strip 110. In the present instance, however, as no amount is entered on the keyboard, ".00" will be printed together with the crossfooter symbol "—," the number of the depressed selection key and the register function symbol "—" and a ".00" will be printed on the corresponding one of the tapes 1170. After such an operation, the apparatus will again be at normal as is previously explained.

If it should happen at any time that a document inserted in the sorter chute for its operation does not arrive in the selected bin and does not operate that one of the sorted document switches SD1 to SD27 associated with that bin, the energizing circuit of the relay SS (F*bc*) will not be broken and consequently, the contacts SS–3 (F*tr*) will remain closed in the holding circuit of the energized packer bail PB1, PB2 or PB3 so that the corresponding packer bail switch PS1, PS2 or PS3 will remain closed to keep the sort hold relay SH (F*mc*) energized. Consequently, contacts SH–1 and SH–2 (F*tc*) of the sort relay, remaining closed, will keep the conveyor clutch solenoid CCS energized so that the conveyor will continue to operate. Also the contacts SH–3 (C*tc*) will keep the holding circuits of the energized ones of the sort selecting relays SX1 to SX3 closed so that the contacts SX1–4, SX2–4 or SX3–4 (F*tr*) of the energized sort selecting relay will remain closed to maintain the holding circuit of the timing relay TR which will keep its contacts TR–3 (E*br*) in operated open position to prevent another sorting operation from being initiated upon the insertion of a document in the sorter chute to close the switches DDS.

The operator, noting that the sorter conveyor is still running beyond the time when it should normally stop, can restore the sorter power switch SPS on the master machine keyboard to its normal "off" position, which will restore contacts SPS1 (C*tr*) and stop the operation of the sorter conveyor and release those relays and solenoids which remained energized over holding circuits. The operator, remembering or noting from the detail strip 110, the bin to which the document should have been sorted, may open the appropriate sorter door to see whether the document has been caught at any place in the vertical conveyor or has been delivered to the additional tray 1992 (FIG. 100) at the bottom of the column of bins. The operator can, if necessary, look for the strayed document in the vertical conveyors or trays 1992 for the other two columns of sorting bins. Assuming that the document is located in undamaged condition in one of the trays 1992, the operator, after retrieving the document, should again close all of the opened sorter doors and after again operating the power sorter switch SPS to its "on" position, may again drop the document into the sorter chute and again depress the appropriate selection key SK1 to SK27, which would initiate another cycle of operation for sorting the document to the proper bin. As no amount would be set on the amount keys, no incorrect entries would be made in the crossfooter or selected register. However, if the corresponding switches on the program control panel were adjusted for full or partial endorsement there would be a second print of the endorsement on the re-sorted document. Alternatively, the operator, after retrieving the stray document, could release the latch for the tray for which the document should have been sorted by depressing the key SBR and re-depressing the appropriate selection key SK1 to SK27. The latch of the selected tray is released in the same manner as previously described when the key SBR is depressed together with a selection key (SK12) because the operator wished to retrieve a sorted document from a sorter tray for the purpose of re-examining the document. After pulling out the unlatched tray, manually inserting the stray document therein and restoring the tray and reclosing the door, the operator will fully depress the selection key which is latched in partially depressed position as previously described, and depress also the correction key COR to initiate an operation like that previously described, in which the operator re-entered an incorrect check amount (line 28 on tape 110—FIG. 111) except that as no amount has been entered on the amount keys, no entries will be made in the crossfooter and register.

The entries shown in lines 32 to 64 on the detail tape 110 in FIGURE 111 illustrate the manner of completing a run of work and proving the entire run. When large runs of work are encountered, the same procedure may advantageously be used to effect periodic cut-offs to expedite the transmittal of the sorted checks other than "On Us" checks for clearing and the forwarding of the "Deposit" slips, "Cash Back" slips, and "On Us" checks to the bookkeeping department.

The operations which produce the entries in lines 30 and 31 of the detail tape 110 show that the crossfooter is clear and there is no need for an operation initiated by depression of the crossfooter total key to print a cipher total. The operator will depress the register total key RT and then depress the selection key SK1 to initiate a cycle of operation in which the sorter is not operated, the number 1 register is totalled, and the total is subtracted from the crossfooter and printed by the master machine on the detail tape 110 as shown in line 32 thereof and is printed by the "1" printer of the multiple tape unit on the "1" tape 1170 as shown in line 5 thereof. This operation will be like the register total operation just previously described except that, as the crossfooter non-add key is not depressed for this operation, the switch CSNA (Etl) will remain closed and, as the key SK1 is depressed and the switch AF1 is in its 2 position, the relay DT (Bbc) is energized and operates its contacts DT-1 (Etl) so that when the switch TS5B is closed at about the 10° point in the cycle, the crossfooter total and subtract solenoid CTSS will be energized to place the crossfooter function controls in subtract condition so that the total taken from the number 1 register will be subtracted from the crossfooter as indicated by the "—" printed in line 32 of the tape 110.

Next, the operator will again depress the register total key RT and the key SK2. As the crossfooter now contains the subtracted total from the number 1 register, a cycle of operation will not be initiated until the operator also depresses the additional credit key AC to close the switch ACS (Emc) around the now open crossfooter non-clear switch CNC. This operation is like the preceding operation except that the number 2 register is totaled and its total subtracted from the crossfooter.

Normally, this procedure will be repeated for each of those keys SK1 to SK9 for which the corresponding switches AF1 to AF9 are set in either their 2 positions or their 3 positions. This applies to the keys SK1 to SK7 with the control program setting of switches shown in FIGURE 109B in the present abbreviated example. It is unnecessary to depress the key AC with the key SK7 because the switch AF7 is in its 3 position. In the illustration in FIGURE 111 where the 3, 4 and 5 tapes 1170 are not shown, the printing of the totals of the 3, 4 and 5 registers has also been omitted between lines 33 and 34 of the detail tape 110. In the abbreviated example being described, these totals would be cipher totals, as no items were entered in the 3, 4 and 5 registers. The totals of the 6 and 7 registers subtracted from the crossfooter are shown in lines 34 and 35 of the detail tape.

Having transferred subtractively to the crossfooter the totals taken from all of the registers programmed for recording credit items, i.e., "Deposit" slip totals and "Cash Back" amounts, the operator, in accordance with operating instructions, will next depress the crossfooter subtotal key CST which, as described in the description of the master machine, operates the master machine cycling switch MCSW (Ebl). The operation of the switch MCSW will initiate a cycle of operation, as previously explained, in which the sorter and multiple tape printer will not operate, as the relay SR is de-energized, none of the keys SK1 to SK27 is depressed and none of contacts XR1-2, XR2-2 and XR3-2 is closed. Depression of the crossfooter subtotal key CST operates the crossfooter subtotal switch CSTS (Etl and FIGURE 4) so that closure of the switch TS5B at about the 10° point in the cycle will complete the energizing circuit of the crossfooter subtotal solenoid CSTM which places the crossfooter function controls in subtotal condition as previously described with reference to FIGURES 2, 5 and 27. As shown in line 36 of the detail tape 110 in FIGURE 111, the print of the crossfooter subtotal is accompanied by "CR" to show that it is a crossfooter credit subtotal, and is also accompanied by a "0," which is printed because no register was selected for operation.

The operator, in accordance with instructions, will then enter additively in the crossfooter, the totals from any "cut" slips, such as the one referred to above in connection with the operation following the occurrence of the full pocket signal. To enter a "cut" slip total, the operator will set the amount of the total on the amount keys of the master machine and then depress the crossfooter add key CA (FIGS. 3 and 4), which will operate the master machine cycling switch MCSW (FIG. 5 and Ebl) in the manner previously explained with reference to FIGURES 4 and 5. The operation of the switch MCSW completes an energizing circuit for the master machine cycling solenoid MCS, said circuit by-passing the crossfooter non-clear switch CNC and being traced from positive line +1 through switch ESW (Etc), through the three register interlock switches RIS1, RIS2 and RIS3, closed switch TS4B, the winding of solenoid MCS, closed switch SKE and operated switch MCSW to negative line −1. The operation of the switch MCSW breaks the energizing circuit of the sort relay SR (Ebl) so that the sorter will not be operated in the cycle of operation thus initiated. As none of the keys SK1 to SK27 is depressed, none of the relays XR1, XR2 and XR3 will be energized and none of the contacts XR1-2, XR2-2 and XR3-2 will be closed and the multiple tape printer will not therefore be operated. Also as none of the contacts XR1–3, XR2–3 and XR3–3 is closed, none of the register function control solenoids will be energized and all of the register function controls will remain in their normal non-adding condition. The amount of the "cut" slip total entered on the amount keys will be added in the crossfooter as the crossfooter control circuits (E*tl*) remain at normal and all mechanical function control elements for the crossfooter remain at normal. The printing of such "cut" slip totals is not illustrated following line 36 of the detail strip in FIGURE 111 but, when printed, are accompanied by "0" printed at the right thereof.

The operator will next depress the all register total key ART (FIGURES 1, 6 and 28) which will initiate a series of twenty-seven cycles of operations of the master machine and multiple tape printer in which totals will be taken from each of the twenty-seven registers successively and printed with the total symbol on the respective tapes of the multiple tape printer and with the register number and function symbol "*" on the detail tape 110. The key ART remains latched down until the final part of the twenty-seventh cycle.

As previously described with reference to FIGURE 28 in the description of the master machine, depression of the key ART directly rotates the shaft 530 one twenty-eighth of a revolution which operates switches ART1, ART2, RT and RTST. The closing of the switch ART2 disables the low paper signal switch LPS of the multiple tape printer throughout the twenty-seven cycles. The closing of the switch ART1 (C*mc*) completes an energizing circuit for the bin latch release relay BLR (C*mc*) traced from positive line +1 through closed switch SPS1 (C*tr*), switch ART1, the winding of relay BLR to negative line −1. The relay BLR being energized mechanically releases all of the bin latches and is mechanically latched to lock its holding contacts BLR–1 (C*mc*) closed and its contacts BLR–2 (E*mr*) operated to prevent any sorting operation by preventing the relay DR from being energized by closure of the switches DDS. The contacts BLR–2 also light the lamp FDB (E*br*) on the master machine keyboard.

Also, as explained with reference to FIGURE 28, the depression of the key ART renders operative a mechanical means to advance the shaft 530 through a further twenty-eighth of a revolution in the latter part of each cycle of operation of the master machine (at about the 325° point) so that at the end of the twenty-seventh cycle of operation the shaft 530 is again in normal position. It was previously explained how the rotation of the shaft and the disks 570, 571 and 572 brings about the selection of each of the twenty-seven registers for operation and the printing of the corresponding designation number from 1 to 27 in respective ones of the twenty-seven cycles and advances the rotary switch shown in FIGURES 28 to 31 from normal position to each of twenty-eight successive control positions and again to normal position.

The operation of the rotary switch of FIGURES 28 to 31 by the shaft 530 was described and it was mentioned that the control of the energizing circuits of the magnets SXM1, SXM2, SXM3, M19, PM10, PM19 and PM20 by the rotary switch was still to be explained. That portion of the circuit drawing shown in FIGURE 109C may be equated to the mechanical drawings by noting that all the contacts 587, 588 and 589 of FIGURE 29 are connected with conducting plate 490 and one or another of the three contacts 587 is always in engagement with contact 595 which is connected to the conductor which is connected to the low side of the switch TS8 (C*tc*), that the contacts STY of FIGURE 29 are connected respectively to the lower contacts of the switches SYS1 to SYS9 (C*l*), that the contacts STX1, STX2 and STX3 of FIGURE 29 are connected respectively to the conductors running from contacts X1–10, X2–10 and X3–10 (C*mr*) to the groups of relays and magnets XR1 and SXM1, XR2, SXM2 and PM10, and XR3, SXM3 and PM20, and that the contact ST19 of FIGURE 29 is connected to the conductor running from the switch S19 (C*tr*) to the magnets M19 and PM19. It can be seen from the circuit drawing of FIGURE 109C that so far as the selection of the registers, indexing of designation number printing type bars of the master machine and the selection of the tape printers of the multiple tape printer unit is involved, the positioning of the rotary switch of FIGURES 28 and 31 in each of its twenty-seven out of normal control positions will have the same effect as the depression of respective ones of the keys SK1 to SK27, but none of the relay pairs X1, X2 and X3 will be energized in any position of the rotary switch of FIGURES 28 to 31 so that none of the relays shown at the bottom of FIGURE 109B, the circuits of which are controlled by the contacts X1–1 to X3–9 (B*r*) and by the switch pairs AF1 and SF1 to AF27 and SF27, will be energized.

Figure 109C:
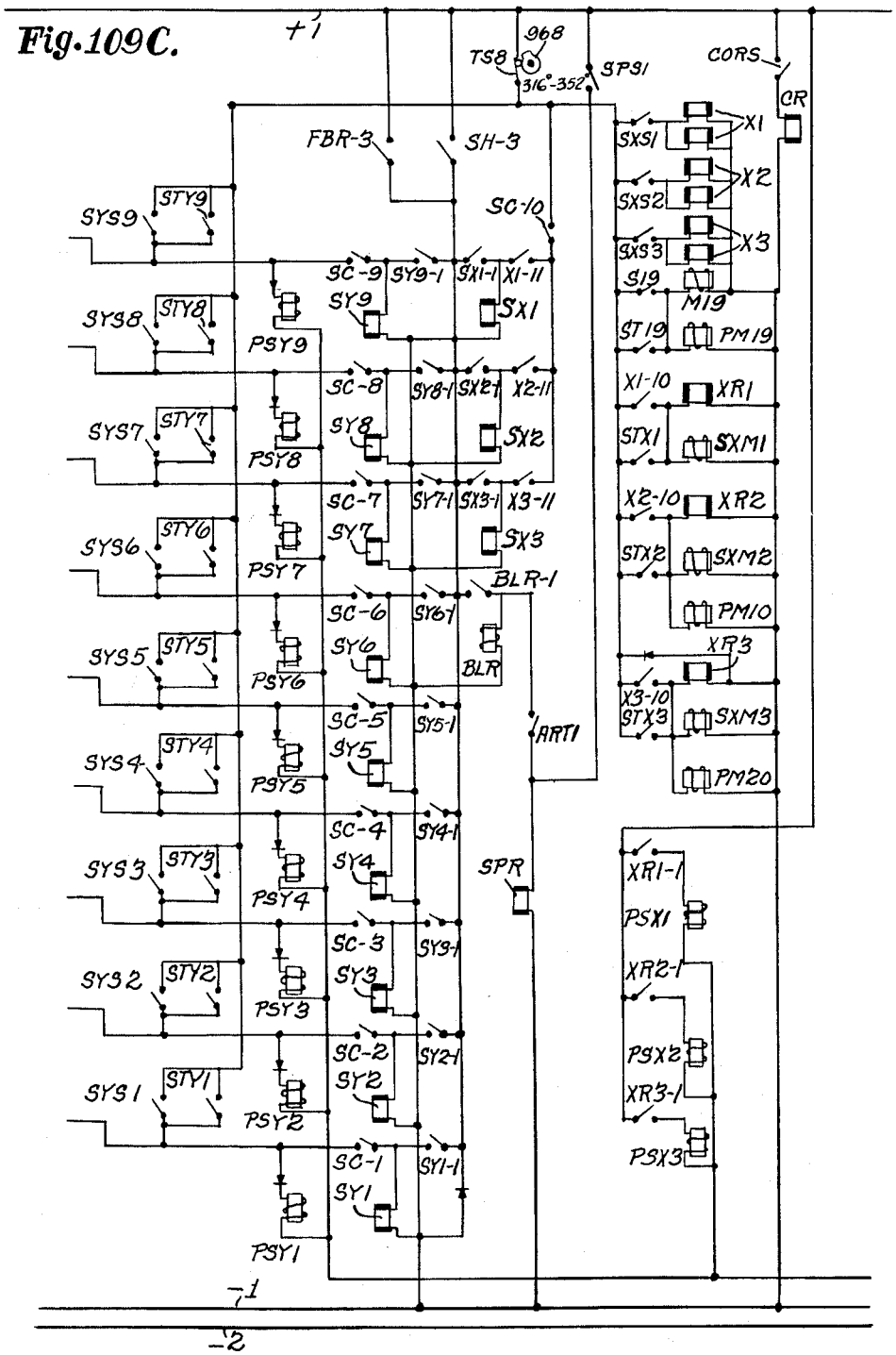
Figure 109D:
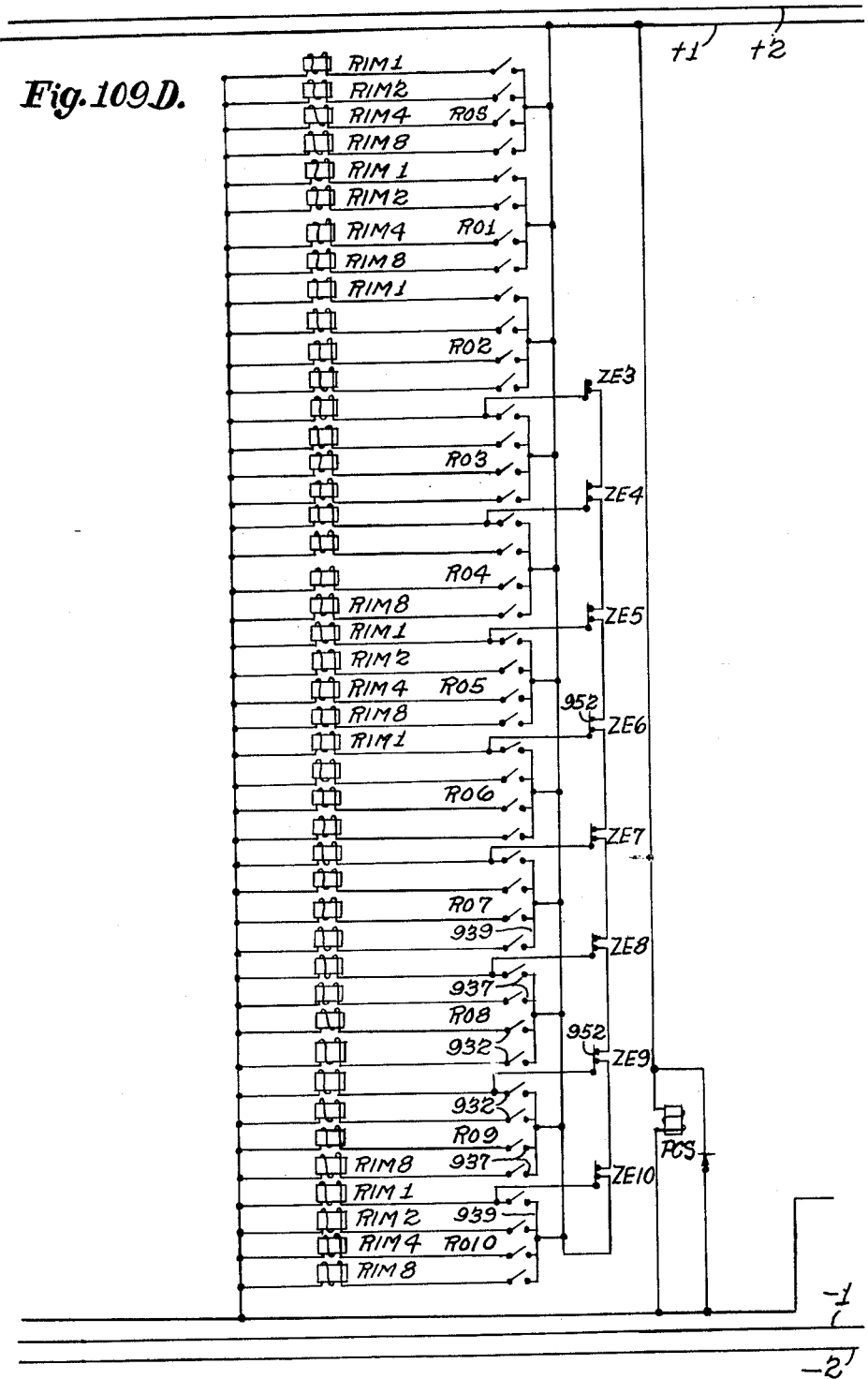
Figure 109F:
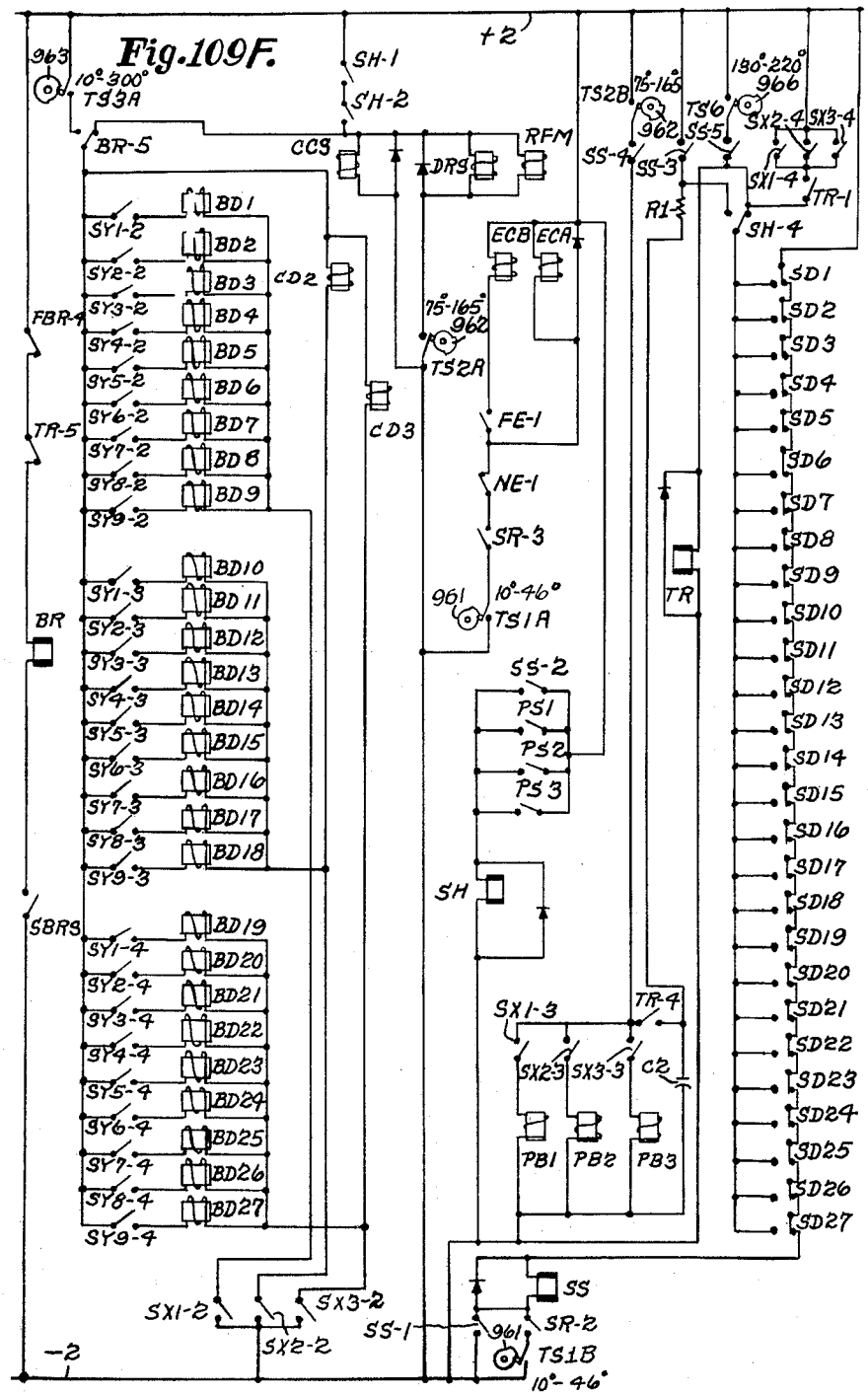

The first step of rotation of the shaft 530 produced directly by the depression of the key ART positions the contact 588 (FIG. 39) on the contact STX1 of FIGURE 29 and places one of the three contacts 587 (FIG. 30) on the contact STY1 of FIGURE 29, i.e., it closes the contacts STX1 (C*mr*) and STY1 (C*bl*) in FIGURE 109C. The closing of the contacts STX1 causes the energization of the relay XR1 and magnet SXM1 in the same way as that brought about by the closing of the contacts X1–10 when any of the keys SK1 to SK9 is depressed. Magnet SXM1 releases register selection plate 305 and stop slide 270 for the "B" registers to control by the stepped disc 570.

The operation of the switch RTS (E*ml*) by depression of the key ART opens the energizing circuit of the relay SR (E*bl*) which opens its contacts SR–2 (F*bc*) to prevent energization of relay SS and operation of the sorter. Relay SR also restores its contacts SR–1 which, the relay contacts XR1–2 (E*br*) having been closed and contacts RTR–2 and DT–2 being in normal closed position, completes the energizing circuit for the cycle delay relay DR. The latter closes its contacts DR–1 (E*bc*) to complete the energizing circuit of the cycling solenoid MCS to initiate a cycle of operation of the master machine. The operation of the switch RTS also closes the energizing circuit of the circuit of the register subtract and total relay RSAT (E*bl*) which operates its contacts RSAT–1, RSAT–2 and RSAT–3 in the register function control circuits. The contacts XR1–3 being closed by the energization of relay XR1 as just above mentioned, an energizing circuit is established for the "B" registers subtract and total solenoid SATB when the switch TS5A is closed at about the 10° point in the first cycle of operation following depression of the key ART. The operated switch RTS also prevents energization of either of the counter magnets DCM and SCM. As the switch RTS is held in operated position through all twenty-seven cycles of operation until the key ART restores after the 325° point of the final cycle, the relay SR and magnets DCM and SCM will remain deenergized and the relay RSAT will remain energized to hold its contacts in operated position throughout all twenty-seven cycles. As none of the crossfooter function controls is operated, the crossfooter will, in each of the twenty-seven cycles, add the total taken from the selected one of the twenty-seven registers.

The operation of the switch RTST by depression of the key ART results in an energizing circuit for the register total and subtract solenoid RSTT (E*tl*) being closed from the time when the switch TS5B is closed at about the 10° point until the latter switch is reopened at about the 300° point in the cycle. As the switch RTST is held in operating condition continuously until about the 325° point in the last of the twenty-seven cycles, the solenoid RSTT will be energized in each cycle.

The relay DR will be deenergized at the 60° point in each cycle and reenergized at about the 350° point in each cycle by the opening and closing of switch TS4A (E*br*). Also, the energizing circuit of the solenoid MCS will be opened by the opening of one of the register switches RIS1, RIS2 or RIS3 at the 35° point or by the opening of switch TS4B at the 60° point of each cycle and reclosed either when the latter switch recloses at the 350° point or when the opened switch RIS1, RIS2 or RIS3 recloses later so that the twenty-seven cycles will follow one after another with only short interruptions between cycles resulting from either the delay in restoring the operated register line to normal or the mechanical construction and operation of the master machine cycling clutch as described in the Butler patent.

As the sorter is not operated, the operation of the switches TS1A, TS1B, TS2A, TS2B, TS3A, TS3B and TS6 is of no consequence in the twenty-seven cycles of operation performed with the switch ART depressed.

The closing of contacts TSY1 and of relay contacts XR1–1 causes energization of the multiple tape printer cycling solenoid PCS and of the printer selecting magnet PSY1 and solenoid PSX1 for selecting the "1" tape printer of the multiple tape unit when, at about the 190° point of the first of the twenty-seven cycles, the switches TS7A and TS7B are closed. The printer selecting magnet and solenoid and the printer cycling solenoid is again deenergized when the switches TS7A and TS7B reopen at about the 250° point.

At about the 316° point of each cycle the switch TS8 (C*tc*) opens in the circuits controlled by the contacts STY1 to STY9, STX1, STX2, STX3 and ST19. In the first of the twenty-seven cycles, the relay XR1 and magnet SXM1 is momentarily deenergized.

At about the 325° point the rotary switch of FIGURE 28 is advanced a step and in the first of the twenty-seven cycles, it thereby opens contacts STY1 and closes contacts STY2 while contacts STX1 remain closed so that when the switch TS8 recloses at about the 350° point, the relay XR1 and magnet SXM1 are reenergized. When the rotary switch is advanced, the disk 570 also advances so that the "2" register will be operated in the second cycle of the twenty-seven cycles and, because of the closing of the contacts STY2, the "2" tape printer unit will be operated. The first nine cycles of the twenty-seven are all identical except that as the contacts STY1 to STY9 are each operated one after another in successive cycles and the disk 570 is advanced a step in each cycle, the registers 1 to 9 and tape printers 1 to 9 are operated one after another in the successive cycles.

In the latter part of the ninth cycle, the tenth step of advance of the rotary switch opens both contacts STY9 and STX1 and closes contacts STY1 and STX2. The closing of contacts STX2 energizes relay XR2 and magnets SXM2 and PM10. Magnet SXM2 releases the selecting step plate 305 (FIG. 28) and the stop slide 270 for the middle row of selection keys to control by the disk 571 which by this time has been advanced to active position for selection of the "C" registers, one after another, during the next nine cycles. The magnet PM10 causes the "1" type of the tens order designation bar to be indexed for printing.

In the final portion of the eighteenth cycle, the contacts STY9 and STX2 are opened and the contacts ST19, STY1 and STX3 are closed, the latter completing the energizing circuits of the relay XR3 and magnets SXM3 and PM20. Magnet SXM3 releases the step plate 305 for the "D" registers and the stop slide 270 for the last row of selection keys to control by the step disk 572. The closing of contacts ST19 (C*tr* and FIGS. 29 and 30) energizes magnets M19 and PM19 which, as explained in the description of the master machine, is necessary for the printing of the designation number "19" for the "19" register. In the latter part of the nineteenth cycle the contacts ST19 are again opened so that in the twentieth cycle of the three magnets PM10, PM19 and PM20, only the magnet PM20 is energized to cause a "2" to be printed by the tens order designation type bar of the master machine.

In the final portion of the twenty-seventh cycle, the contacts STY9 and STX3 are opened and none of the contacts of the rotary switch of FIGURE 28 is closed. The key Art is released and the series of automatic operation stops. The totals taken from each of the twenty-seven registers in succession in the twenty-seven cycles and added in the crossfooter are shown printed in lines 37 to 63 of the detail tape 110 in FIGURE 111 and those taken from the 1, 2, 6, 7, 10, 12, 16, 19, 22 and 26 registers are shown as printed on the corresponding tapes 1170 by the multiple tape printer.

The operator will now depress the crossfooter total key CT which, as previously explained, operates the switch MCSW (E*bl*) to open the circuit of the sort relay SR to prevent operation of the sorter and close the energizing circuit of the cycling solenoid MCS which initiates a cycle of operation of the master machine. Depression of the key CT also closes the switch CTS (E*tl*) so that when, at about the 10° point in the cycle, the switch TS5B is closed. The crossfooter total and subtract solenoid CTSS will be energized to condition the crossfooter for total taking. As none of the relays XR1, XR2, or XR3 is energized, all of the contacts XR1–3, XR2–3 and XR3–3 (E*ml*) remain open and none of the registers is operated. Also, as all of the contacts XR1–2, XR2–2 and XR3–2 (E*br*) are open, the multiple tape printer will not be operated. The total taken from the crossfooter is shown printed in line 64 of the tape 110 in FIGURE 111. After all of the work has been performed correctly, this total will be a cipher total "00CR 0–//–" thus proving the accuracy of the entire run of work.

The operator will tear off the tapes 1 to 6 in the multiple tape printer and attach them to the validated "Deposit" slips for forwarding to the bookkeeping department.

It will be remembered that at the time of depression of the key ART, the relay BLR was energized and latched in operated position to release and hold all of the tray latches in released position. The operator can, therefore, open the sorter doors and remove each of the trays in succession to remove the sorted documents therefrom. In this case where keys SK1 to SK6 were assigned to "Deposit" slip totals and the "Deposit" slips were not sorted, the operator will not touch the trays in bins 1 to 6. The operator will tear off tape 7 and attach it to the "Cash Back" slips removed from the 7 tray for forwarding also to the bookkeeping department. Then the operator will tear off the remaining tapes from the multiple tape printer and, after tearing each tape off will remove the sorted documents from the corresponding tray of the sorter and attach those documents to the tape before tearing off the next of those tapes. The tapes 1170 will each serve as a transit letter to be forwarded with the respective group of sorted checks to the proper destination for settling and clearing.

After all the documents have been removed from the tray and reinserted in the proper bins, the operator will reclose the sorter doors. The opening of the sorter doors operates the right door switches RD1, RD2 and RD3 (E*br*) to establish an energizing circuit for the relay FBR which operated its contacts including FBR–3 (C*tc*). As the holding contacts BLR–1 (C*mc*) of the relay BLR are latched in closed position, the holding circuit for the relay BLR is completed by the closing of the contacts FBR–3. The relay FBR remains energized until all of the sorter doors are reclosed. Even then, the contacts BLR–2 (E*mr*) remain latched in operative position so that the new sorting operation cannot be initiated by inserting a document in the sorter chute to close the switches DDS. To restore the contacts BLR–1 and BLR-2, it is necessary for the operator to release the contacts BLR-1 and BLR-2 by moving the knob 2192 rearwardly to restore the slide 2177 (FIG. 101) to its normal position where it is relatched by the lug 2182 on the armature of the relay magnet BLR.

Before starting another run of work the operator will again depress the key ART, which will bring about another series of twenty-seven cycles of operation of the master machine and multiple tape printer which will cause the printing of twenty-seven register cipher totals on the master machine detail strip 110 and print on each of the tapes 1170 of the multiple tape printer, the cipher total of the corresponding one of the registers to show that all of the registers are clear prior to the start of the next run of work.

If, in the course of the work, the supply of paper tape 1170 in any of the tape printers of the multiple tape printing unit becomes depleted, the switch LPS (E*mc* and FIG. 68) will be operated to open the circuit of the master machine cycling solenoid MCS and to close an energizing circuit for the paper depletion signal lamp PPD on the master machine keyboard. If the operator immediately notices the lighting of the lamp PPD before entering an amount on the keyboard and depressing a selection key SK1 and SK27 and any other keys that might be required to initiate a machine cycle, the operator can immediately replenish the depleted paper supply in the manner previously described in the description of the multiple tape printer unit. It will be remembered that the printer in which the paper depletion has occurred will be marked by a visible flag constituted by the upper colored portion of the lever 1334 (FIG. 68) associated with that printer. However, when an amount has been set on the keyboard and a selection key SK1 to SK27 has already been depressed, the operator will prefer to operate the by-pass switch PLB (E*mc* and FIG. 6) to close the circuit of the cycling solenoid MCS so that the cycle of operation will be initiated. When the low paper signal switch LPS is operated by the depletion of the paper supply in any of the printers of the multiple tape printer, there is still a substantial length of paper tape 1170 present in that printer so that a substantial amount of work can be performed before the paper supply is completely used up. During the further operations while the low paper signal switch LPS and the by-pass switch PLB are in their operated positions, the signal lamp PPD will be turned off in every cycle of operation when any of the register interlocks RIS1, RIS2, or RIS3 is opened and again closed or when the switch TS4B is opened and re-lighted again when both of the switches TS4B and MPI are again closed, to remind the operator of the low paper supply condition.

It should be noted that operation of the switch LPS by paper depletion in the course of the twenty-seven cycles of operation performed with the key ART depressed will not interrupt that series of twenty-seven operations because the switch ART2 (E*mc*) is closed while the key ART is depressed and will prevent the energizing circuit of the solenoid MCS from being opened by operation of the switch LPS. However, the operation of the switch LPS under those circumstances will still cause the signal lamp PPD to be lighted and, after the series of operations is completed and the key ART and switch ART2 restore, further operations by depression of selection keys SK1 to SK27 in the next run of work will be prevented until the low paper supply has been replenished or the by-pass switch PLB operated.

It may sometimes be desired to record an amount or number on the tape 110 and on a tape 1170 without entering it into the crossfooter or in any of the registers. This may be accomplished by depressing the non-add keys CNA and RNA and the appropriate selection key SK1 to SK27 after setting up the desired amount or number on the amount keys. Depression of the key CNA will mechanically non-add the crossfooter controls and will open the switch CSNA (E*tl*) to prevent energization of the solenoid CTSS or solenoid CSTM in the subsequent operation. The depression of the register non-add key RNA opens the switch RNAS (E*mc*) to deenergize the relay SR (E*bl*) and prevent energization of any of the register function control solenoids (E*ml*) in the subsequent operation. Depression of the register non-add key also opens the switch NARS (B*bc*) and prevents energization of either of the relays DT or RTR. If the print is desired only on the tape 110, the cycle of operation may be initiated by the depression of the key CNA without depressing any key SK1 to SK27. The key CNA does not have any effect on the register function controls but operates the switch MCSW (E*bl*) which opens in the circuit of the sort relay SR and initiates a cycle of operation of the machine in which the sorter does not operate because of the deenergization of the relay SR and in which the multiple tape printer does not operate because no key SK1 to SK27 is depressed to bring about the closure of any of the contacts XR1-2, XR2-2 and XR3-2 (E*br*). The print on the tape 110 will appear, for example, as "12.34–//–0–//–". It may, for example, be desired to print either at the top or at the bottom of a section of detail tape 110 on which a run of work is recorded, the same batch number which is printed in the partial endorsement on the backs of the sorted documents by the endorser type wheels 1606 (FIG. 84). If it should be desired to print the same amount of any one of the tapes 1170 for any reason, the cycle of operation may be initiated by depressing the appropriate key SK1 to SK27 simultaneously with the key CNA after depression of the key RNA. In that case the selected printer of the multiple tape printer will be operated in a cycle of operation because the contacts XR1-2, XR2-2 or XR3-2 will be closed.

If it should be desired to subtract an amount from the crossfooter without entering that amount in any register, depression of the crossfooter subtract key CS (FIGS. 2, 4 and 6), after setting the amount on the amount keys, will initiate the cycle of operation of the master machine by operating the switch MCSW (E*bl*). The amount will be subtracted from the crossfooter because the depression of the key CS mechanically adjusts the crossfooter function controls to subtract condition. The sorter will not operate because of the relay SR (E*bl*) is deenergized by operation of the switch MCSW and the multiple tape printer will not operate because none of the keys SK1 to SK27 is depressed and none of the contacts XR1-2, XR2-2 and XR3-2 is closed.

If it is desired to take a subtotal from any one of the registers, the key RST may be depressed and then the appropriate key SK1 to SK27 may be depressed. The depression of the register subtotal key operates the switch RSTS (E*mc*) and the switch RTST (E*tl*). Operation of the switch RTST results in the register subtotal and total solenoid RSTT being energized in the machine cycle and operation of the switch RSTS causes the float register circuits (E*ml*) containing the contacts RA-1 to be disabled regardless of whether the relay RA (B*bl*) is energized as it would be upon depression of a selection key SK11 to SK18 or SK20 to SK27 when the corresponding switch AF is set in its 2 position. As previously explained, if either or both of the switches AF10 and AF19 is in the 2 position and the crossfooter is not clear, no machine cycle will be initiated by depression of the corresponding selection key SK10 or SK19 unless the key AC is also depressed to close the switch ACS to short the crossfooter non-clear switch CNC. The operation of contacts RSTR-1 to RSTR-3 insures that the appropriate subtotal solenoid STSB, STSC or STSD, and not a subtract and total solenoid, will be energized in the machine cycle. Operation of the switch RSTS also causes the sort relay SR to be denergized and the relay RSTR to be energized and prevents energization of either counting magnet DCM or SCM. Upon depression of the selection key, the contacts XR1-2, XR2-2 or XR3-2 will be closed and, the contacts SR-1 being restored because the relay SR is deenergized, the relay DR will be energized and will initiate a cycle of operation unless the depressed selection key is one of the keys SK1 to SK9 and the corresponding ones of the switches AF1 to AF9 is set in its 2 position and the crossfooter is not clear, in which case it will also be necessary to depress the key AC to close the switch ACS (E*mc*) to initiate the cycle of operation. The opening of contacts SR-2 (F*bc*) prevents operation of the sorter. The closing of either contacts XR1-3, XR2-3 or XR3-3 (E*ml*) when the selection key is depressed and the operation of contacts RSTR-1 to RSTR-3 (E*ml*) when the relay RSTR is energized results in the appropriate register subtotal solenoid STSB, STSC or STSD being energized in the machine cycle to cause a subtotal to be taken from the selected register. If no crossfooter function control key is depressed prior to or simultaneously with the selection key following depression of the register subtotal key, the subtotal taken from the selected register will be added in the crossfooter. If the crossfooter subtract key CS is also depressed simultaneously with the selection key after depression of the key RST, the register subtotal will be subtracted from the crossfooter. The register subtotal will be printed on the tape 110 accompanied by the appropriate crossfooter function symbol, the designation corresponding to the depressed selection key and subtotalled register, and the register subtotal symbol which is a dot. If the crossfooter non-add key CNA is depressed with the key RST before or simultaneously with the selection key, the register subtotal will not be entered in the crossfooter and that fact will be recorded by the printing of the crossfooter non-add symbol on the tape 110.

The apparatus which has been illustrated and described is also capable of performing various other varieties of accounting work requiring the rapid and accurate sorting of documents.

As another example, the apparatus of the present invention may be used for the proving and sorting of incoming clearings, i.e., incoming "transit letters" with attached checks. Any of the keys SK1 to SK9 may be assigned to "transit letter" totals. Usually only one key, the key SK1 for example, will be required for "transit letter" totals. In the event that all of the checks attached to the incoming transit letters are "On Us" checks, the other twenty-six keys SK2–SK27 may be assigned to the initial letters of the drawees of the checks or they may be assigned in any other way for sorting the checks to the bookkeepers working on various groups of customers' accounts. The various keys may be assigned in any convenient manner to obtain the desired sorting of documents, it being remembered, however, that only keys of the group SK1 to SK9 can be assigned to credlits. Let us assume that the key SK1 is assigned to "transit letter" totals and the keys SK2 to SK27 are assigned to the drawee's initials. The switches AF1 and SF1 on the control panel will accordingly be set to their 2 and 4 positions. All of the remaining switch pairs may be set to their 2 and either their 5 or 6 positions accordingly as partial endorsement is desired or not desired. The "transit letter" totals will be entered in the master machine in operations initiated by the depression of key SK1 and the "transit letter" totals will therefore be subtracted from the crossfooter. The amounts of checks will be entered and the checks will be sorted in operations initiated by depressing the appropriate keys SK1 to SK27 and dropping the check into the sorter chute.

In the course of such a run, no machine cycle will be initiated when the key RT SK1 is depressed unless the crossfooter is clear, i.e., the transit letter total is equal to the total of all of the checks recorded and sorted since the entry of the previous transit letter total so as to clear the crossfooter in the last previous check sorting operation. Thus, each transit letter and the checks accompanying it are automatically proved by the fact that the machine operates upon depression of the key SK1 to enter the next transit letter total.

When all of the transit letters and checks in the batch have been thus recorded and sorted, the operator will depress the total key and then depress the key SK1 again. It will be remembered that the depression of the total key RT operates the switch RTS (E*mc*) which deenergizes the sort relay SR (E*bl*) which in turn restores its contacts SR-1 (E*br*) so that when the contacts XR1-2 are closed following depression of the key SK1, the master machine will cycle to print the total of the "1" register and, because the switch AF1 is in its 2 position, subtract that total from the crossfooter. The multiple tape printer will be operated to print the total of the "1" register on the "1" tape 1170. Then the operator will depress the key ART so that the totals will be taken successively from all of the registers 1 to 27 (the total from register "1" now being a cipher total) and simultaneously added in the crossfooter, printed on the tape 110 and printed on the corresponding tapes 1170 of the multiple printer. After the series of twenty-seven cycles is completed, the operator will depress the key CT which will initiate an operation of the master machine in which the total is taken from the crossfooter and printed on the detail tape 110. If the work has been done correctly, the crossfooter total will be a cipher total as shown in line 64 of tape 110.

Various other applications of the apparatus of the present invention to other kinds of work involving sorting and accounting procedures will readily suggest themselves to those skilled in the art.

We claim:

1. An accounting and document sorting apparatus comprising computing mechanism including amount differential mechanism, a plurality of registers, means to engage each of said registers with said amount differential mechanism for operation thereby, register selecting means to control said register engaging mechanism to select registers for engagement with said amount differential mechanism, manipulative means to control said register selecting means, a first cyclically operable drive means to operate said amount differential mechanism and said register engaging means in a cycle of operation; a multiple tape printer apparatus comprising differential indexing means, a plurality of tape printers each having a series of printing type members indexable by said differential indexing means, record tape supply means and means to effect printing impression of the indexed types on the record tape, means controlled by said amount differential mechanism to control the differential indexing operation of said differential indexing means, means controlled by said manipulative means to condition for operation the printing impression means of a selected one of said printers corresponding to the selected register, and a second cyclically operable drive means to operate said differential indexing means and the printing impression means of said selected printer in a cycle of operation; means controlled by said first drive means in the course of a cycle of operation thereof to initiate a cycle of operation of said second drive means, and document sorting apparatus having a plurality of sorted document bins; an inserted document receiver, means for conveying an inserted document from said receiver to any of said bins, and means controlled by said manipulative means to direct the document conveyed from said receiver into a selected one of said bins corresponding to the selected register and operated tape printer.

2. An accounting and document sorting apparatus comprising computing mechanism including amount entering means, a plurality of registers, register selecting means to select registers for cooperation with said amount entering means, cyclically operable drive means to operate said amount entering means and selected registers, means controlling said drive means to initiate a cycle of operation thereof, and manipulative means for controlling said register selecting means for selecting registers and normally causing said cycle initiating means to initiate a cycle of operation of said drive means, and document sorting apparatus having a plurality of sorted document bins, an inserted document receiver, means to retain an inserted document in said receiver, detecting means to detect the presence of an inserted document retained in said receiver, means controlled by said detecting means to disable said cycle initiating means while no document is present in said receiver, means for conveying an inserted document from said receiver to any of said bins, means controlled by said drive means in a cycle of operation thereof to operate said retaining means to release the inserted document to said conveying means, and means controlled by said manipulative means to direct the document conveyed from said receiver into a selected one of said bins corresponding to the selected register.

3. An accounting and document sorting apparatus comprising computing mechanism including amount entering means, a plurality of registers, register selecting means to select registers for cooperation with said amount entering means, cyclically operable drive means to operate said amount entering means and selected registers, means controlling said drive means to initiate a cycle of operation thereof, and manipulative means for controlling said register selecting means for selecting registers and normally causing said cycle initiating means to initiate a cycle of operation of said drive means, and document sorting apparatus having a plurality of sorted document bins, an inserted document receiver, means to retain an inserted document in said receiver, detecting means to detect the presence of an inserted document retained in said receiver, means for conveying an inserted document from said receiver to any of said bins, means controlled by said manipulative means to direct the document conveyed from said receiver into a selected one of said bins corresponding to the selected register, program control means including, for each of said registers, a means presettable to any one of at least two states, and means controlled by said document detecting means when said manipulative means has been manipulated to select a register and by the presettable means for the selected register when said presettable means is in one of said states to disable said cycle initiating means while no document is inserted in said receiver.

4. An accounting and document sorting apparatus comprising computing mechanism including amount entering means, a plurality of registers, register selecting means to select registers for cooperation with said amount entering means, cyclically operable drive means to operate said amount entering means and selected registers, means controlling said drive means to initiate a cycle of operation thereof, and manipulative means for controlling said register selecting means for selecting registers and normally causing said cycle initiating means to initiate a cycle of operation of said drive means, and document sorting apparatus having a plurality of sorted document bins, an inserted document receiver, means to retain an inserted document in said receiver, detecting means to detect the presence of an inserted document retained in said receiver, means for conveying an inserted document from said receiver to any of said bins, program control means including, for each of said registers, a means presettable to any one of at least two states, means controlled by said document detecting means when said manipulative means has been manipulated to select a register and by the presettable means for the selected register when said presettable means is in one but not when it is in another of said states to disable said cycle initiating means while no document is inserted in said receiver, and means controlled by said drive means in a cycle of operation thereof, by said manipulative means when it has been manipulated to select a register, and by said presettable means for the selected register when said presettable means is in said other state to operate said retaining means to release the inserted document from said receiver to said conveying means, and means controlled by said manipulative means to direct the document conveyed from said receiver into a selected one of said bins corresponding to the selected register.

5. An accounting and document sorting apparatus comprising computing mechanism including amount differential mechanism, a plurality of registers, register selecting means to select registers for cooperation with said amount differential mechanism, cyclically operable drive means to operate said amount differential mechanism and selected registers, and manipulative means for controlling said register selecting means for selecting registers and initiating a cycle of operation of said drive means; and document sorting apparatus having a plurality of sorted document bins, an inserted document receiver, means to retain an inserted document in said receiver, printing means to print predetermined matter on a document in said receiver, means controlled by said drive means in a cycle of operation thereof and by said manipulative means to effect operation of said printing means when said manipulative means has been operated to select one of a first group of said registers but not when said manipulative means has been operated to select a register not included in said first group, means for conveying an inserted document from said receiver to any of said bins, means controlled by said drive means in a cycle of operation thereof to operate said retaining means to release the inserted document to said conveying means, and means controlled by said manipulative means to direct the document conveyed from said receiver into a selected one of said bins corresponding to the selected register.

6. An accounting and document sorting apparatus comprising computing mechanism including amount differential mechanism, a plurality of registers, register selecting means to select registers for cooperation with said amount differential mechanism, cyclically operable drive means to operate said amount differential mechanism and selected registers, and manipulative means for controlling said register selecting means for selecting registers and initiating a cycle of operation of said drive means; and document sorting apparatus having a plurality of sorted document bins, an inserted document receiver, means to retain an inserted document in said receiver, first and second printing means to print different predetermined matters on a document in said receiver, a first means controlled by said drive means in a cycle of operation thereof and by said manipulative means to effect operation of said first printing means when said manipulative means has been operated to select one of either a first group or a second group of said registers but not when said manipulative means has been operated to select a register not included in either said first or second groups, a second means controlled by said drive means in a cycle of operation thereof and by said manipulative means to effect operation of said second printing means when said manipulative means has been operated to select one of said second group of registers but not when said manipulative means has been operated to select a register not included in said second group, means for conveying an inserted document from said receiver to any of said bins, means controlled by said drive means in a cycle of operation thereof to operate said retaining means to release the inserted document to said conveying means, and means controlled by said manipulative means to direct the document conveyed from said receiver into a selected one of said bins corresponding to the selected register.

7. An accounting and document sorting apparatus comprising computing mechanism including amount differential mechanism, a plurality of registers, register selecting means to select registers for cooperation with said amount differential mechanism, cyclically operable drive means to operate said amount differential mechanism and selected registers, and manipulative means for controlling said register selecting means, for selecting registers and initiating a cycle of operation of said drive means; and document sorting apparatus having a plurality of sorted document bins, an inserted document receiver, means to retain an inserted document in said receiver, printing means to print predetermined matter on a document in said receiver, program control means including for each of said registers a means presettable to any one of at least two states, means controlled by said drive means in a cycle of operation thereof, by said manipulative means when said manipulative means has been operated to select a register, and by the presettable means for the selected register, to effect operation of said printing means when said presettable means is in a first one of said states but not when said presettable means is in a second of said states, means for conveying an inserted document from said receiver to any of said bins, means controlled by said drive means in a cycle of operation thereof to operate said retaining means to release the inserted document to said conveying means, and means controlled by said manipulative means to direct the document conveyed from said receiver into a selected one of said bins corresponding to the selected register.

8. An accounting and document sorting apparatus comprising computing mechanism including amount differential mechanism, a plurality of registers, register selecting means to select registers for cooperation with said amount differential mechanism, cyclically operable drive means to operate said amount differential mechanism and selected registers, and manipulative means for controlling said register selecting means, for selecting registers and initiating a cycle of operation of said drive means; and document sorting apparatus having a plurality of sorted document bins, an inserted document receiver, means to retain an inserted document in said receiver, first and second printing means to print different predetermined matters on a document in said receiver, program control means including for each of said registers a means presettable to any one of at least three states, individual means for each of said printing means controlled by said drive means in a cycle of operation thereof, by said manipulative means when said manipulative means has been operated to select a register, and by the presettable means for the selected register, to effect operation of both of said first and second printing means when said presettable means is in a first one of said states, to effect operation of only the first one of said printing means when said presettable means is in a second one of said states, and operation of neither of said first and second printing means when said presettable means is in a third one of said states, means for conveying an inserted document from said receiver to any of said bins, means controlled by said drive means in a cycle of operation thereof to operate said retaining means to release the inserted document to said conveying means, and means controlled by said manipulative means to direct the document conveyed from said receiver into a selected one of said bins corresponding to the selected register.

9. An accounting and document sorting apparatus comprising computing mechanism including amount entering mechanism, a plurality of registers, register selecting means to select registers for cooperation with said amount entering means, cyclically operable drive means to operate said amount entering means and the selected register, and manipulative means to control said register selecting means to select a register and initiate a cycle of operation of said drive means, and document sorting apparatus having a plurality of sorted document bins, an inserted document receiver, means for conveying an inserted document from said receiver to any of said bins, means controlled by said drive means in a cycle of operation thereof to deliver an inserted document from said receiver to said conveying means, means controlled by said manipulative means to direct the document conveyed from said receiver into a selected one of said bins corresponding to the selected register, means at each of said bins to detect the arrival of a sorted document thereat, and means controlled by said detecting means to prevent a further cycle of operation of said drive means until the document delivered to said conveying means has been delivered to the selected bin.

10. An accounting and document sorting apparatus comprising computing mechanism including amount entering mechanism, a plurality of registers, register selecting means to select registers for cooperation with said amount entering means, and manipulative means to control said register selecting means to select a register, and document sorting apparatus having a plurality of sorted document bins, an inserted document receiver, means for conveying an inserted document from said receiver to any of said bins, means controlled by said register selecting manipulative means to direct the document from said conveying means into a selected one of said bins corresponding to the selected register, each of said bins having means normally held in a position in which it denies manual access to documents in the respective bin by a lock device operable to release said means for movement to a position permitting such access, a single unlock control manipulative means, and means jointly controlled by the latter manipulative means and the register selecting manipulative means to operate solely the lock device of the bin corresponding to the selected register.

11. An accounting and document sorting apparatus comprising computing mechanism including amount entering mechanism, a plurality of registers, register selecting means to select registers for cooperation with said amount entering means, cyclically operable drive means to operate said amount entering means and the selected register, and manipulative means for controlling said register selecting means and initiating a cycle of operation of said drive means, and document sorting apparatus having a plurality of sorted document bins, an inserted document receiver, means for conveying an inserted document from said receiver to any of said bins, means controlled by said drive means in a cycle of operation thereof to deliver an inserted document from said receiver to said conveying means, and means controlled by said manipulative means to direct the document conveyed from said receiver into a selected one of said bins corresponding to the selected register, each of said bins having means normally held in a position in which it denies manual access to documents in the respective bin by a lock device operable to release said means for movement to a position permitting such access, a single unlock control manipulative means, and means controlled by the latter manipulative means, the register selecting manipulative means and by said drive means in a cycle of operation of the latter to operate solely the lock device of the bin corresponding to the selected register.

12. An accounting and document sorting apparatus comprising computing mechanism including amount entering mechanism, a plurality of registers, register selecting means to select registers for cooperation with said amount entering means, cyclically operable drive means to operate said amount entering means and the selected register, and manipulative means operable for controlling said register selecting means and initiating a cycle of operation of said drive means, and document sorting apparatus having a plurality of sorted document bins, an inserted document receiver, means for conveying an inserted document from said receiver to any of said bins, means controlled by said drive means in a cycle of operation thereof to deliver an inserted document from said receiver to said conveying means, and means controlled by said manipulative means when operated to direct the document conveyed from said receiver into a selected one of said bins corresponding to the selected register, each of said bins having means normally held in a position in which it denies manual access to documents in the respective bin by a lock device operable to release said means for movement to a position permitting such access, a single unlock control manipulative means, means controlled by the latter manipulative means and the register selecting manipulative means when operated and by said drive means in a cycle of operation of the latter to operate solely the lock device of the bin corresponding to the selected register, means to retain said register selecting manipulative means in register selecting operated position, means controlled by said drive means to operate said retaining means to release said register selecting manipulative means for return to normal condition in a cycle of operation of said drive means, and means controlled by said unlock control manipulative means and by said drive means in a cycle of operation thereof to retain said register selecting manipulative means in a partially operated position, means controlled by said register selecting manipulative means in its partially operated position to block further manipulation thereof except to return it to the same register selecting and cycle initiating operated condition.

13. An accounting and document sorting apparatus comprising computing mechanism including amount entering mechanism, a plurality of registers, register selecting means to select registers for cooperation with said amount entering means, cyclically operable drive means to operate said amount entering means and the selected register, and a like plurality of manipulative keys each operable for controlling said register selecting means to select a respective one of said registers and initiate a cycle of operation of said drive means, and document sorting apparatus having a plurality of sorted document bins, an inserted document receiver, means for conveying an inserted document from said receiver to any of said bins, means controlled by said drive means in a cycle of operation thereof to deliver an inserted document from said receiver to said conveying means, and means controlled by each of said keys when operated to direct the document conveyed from said receiver into a selected one of said bins corresponding to the selected register, each of said bins having means normally held in a position in which it denies manual access to documents in the respective bin by a lock device operable to release said means for movement to a position permitting such access, a single unlock control key, means controlled by the latter key and the register selecting keys when operated and by said drive means in a cycle of operation of the latter to operate solely the lock device of the bin corresponding to the selected register, means to retain the operated register selecting key in operated position, means controlled by said drive means to operate said retaining means to release said operated key for return to normal condition in a cycle of operation of said drive means, and means controlled by said unlock control key when operated and by said drive means in a cycle of operation thereof to retain said operated register selecting key in a partially operated position at the end of said cycle, means controlled by said register selecting key in its partially operated position to block operation of each of the remaining register selecting keys while permitting return to fully operated register selecting and cycle initiating condition of the one register selecting key retained in partially operated condition.

14. An accounting and document sorting apparatus comprising computing mechanism including amount differential actuator means, a plurality of registers each cooperable with said actuator means for performing either an adding or a subtracting function, register selecting means to select registers for cooperation with said actuator means, cyclically operable drive means to operate said actuator means and selected registers, function control means normally conditioned to cause the selected register to perform a predetermined one of said functions, means controlling said drive means to initiate a cycle of operation thereof, and manipulative means for controlling said register selecting means for selecting registers and normally causing said cycle initiating means to initiate a cycle of operation of said drive means, and document sorting apparatus having a plurality of sorted document bins, an inserted document receiver, means to retain an inserted document in said receiver, detecting means to detect the presence of an inserted document in said receiver, means controlled by said detecting means to disable said cycle initiating means while no document is present in said receiver, means for conveying an inserted document from said receiver to any of said bins, means controlled by said drive means in a cycle of operation thereof to operate said retaining means to release the inserted document to said conveying means, and means controlled by said manipulative means to direct the document conveyed from said receiver into a selected one of said bins corresponding to the selected register, said computing apparatus having also a manipulative correction control means operable to condition said function control means to cause the selected register to perform the other of said functions, and means controlled by said correction control means when operated to prevent said document detecting means from disabling said cycle initiating means.

15. An accounting apparatus comprising computing mechanism including amount differential actuator mechanism, a totalizer cooperable with said differential actuator mechanism, a master tape printer including type carriers indexed by said differential actuator mechanism, a plurality of distribution registers each cooperable with said differential actuator mechanism, register selecting means to select said registers for cooperation with said differential actuator mechanism, manipulative means to control said register selecting means for the selection of registers thereby, a first cyclically operable drive means, means controlled by said manipulative means to initiate a cycle of operation of said first drive means, said first drive means being effective to drive said register selecting means to select a register and operating said amount differential actuator mechanism and the selected register during said cycle of operation, an individual tape printer for each of said registers, each of said individual tape printers including a series of type carriers and means operable to effect a printing impression therefrom, means controlled by said differential actuator mechanism to index the type carriers of said printers, a second cyclically operable drive means to operate the printing impression means corresponding to the selected register during a cycle of operation, means controlled by said first cyclically operable drive means to initiate a cycle of operation of said second cyclically operable drive means, and means directly controlled by said manipulative means to select for operation the printing impression means of the printer corresponding to the register selected by said register selecting means under control of said manipulative means simultaneously with the selection of said register.

16. An accounting apparatus comprising computing mechanism including amount differential actuator mechanism, a totalizer cooperable with said differential actuator mechanism, a master tape printer including type carriers indexed by said differential actuator mechanism, a plurality of distribution registers each cooperable with said differential actuator mechanism, register selecting means to select said registers for cooperation with said differential actuator mechanism, manipulative means to control said register selecting means for the selection of registers thereby, an individual tape printer for each of said registers, each of said individual tape printers including a series of amount type carriers, an identification type carrier with types for successive portions of an identification arranged serially thereon, means operable to effect a printing impression from all of said type carriers, tape feed means operable to advance a tape relative to said type carriers and impression means in each operation of the latter, and means for advancing said identification type carrier from each type position to the next by successive operations of said impression means to print said identification, portion by portion, repeatedly along the tape, means controlled by said differential actuator mechanism to index the amount type carriers of said printers, and means controlled by said manipulative means to select for operation the printing impression means of the printer corresponding to the register selected by said register selecting means under control of said manipulative means.

17. An accounting apparatus comprising computing mechanism including amount differential mechanism, a plurality of registers, means to engage each of said registers with said amount differential mechanism for operation thereby, register selecting means to control said register engaging mechanism to select registers for engagement with said amount differential mechanism, manipulative means to control said register selecting means, a first cyclically operable drive means to operate said amount differential mechanism and said register engaging mechanism in a cycle of operation; recording means comprising differential indexing means, a plurality of printers each having a series of printing type members indexable by said differential indexing means, record medium supply means and means to effect printing impression of the indexed types on the record medium, means controlled by said amount differential mechanism to control the differential indexing operation of said differential indexing means, means controlled by said manipulative means to condition for operation the printing impression means of a selected one of said printers corresponding to the selected register; a second cyclically operable drive means to operate said differential indexing means and the printing impression means of a selected printer in a cycle of operation; and means controlled by said first drive means in the course of a cycle of operation thereof to initiate a cycle of operation of said second drive means.

18. An accounting and document sorting apparatus comprising computing mechanism including amount entering mechanism, a plurality of registers, register selecting means to select registers for cooperation with said amount entering means, and a like plurality of keys arranged in columns and rows and operable to control said register selecting means to select a register, document sorting apparatus having a like plurality of sorted document bins arranged in corresponding columns and rows, an inserted document receiver, conveying means for each column of bins, an initial conveying means to convey an inserted document from said receiver to any of said column conveyors, column selecting means operable to transfer a conveyed document from said initial conveying means to any selected one of said column conveyors, bin selecting means for each bin operable to transfer a conveyed document to said bin from the associated column conveyor, printing mechanism including a like plurality of individual tape printer for each of said registers and arranged in corresponding columns and rows, each of said individual tape printers including a series of type carriers, means for each column of printers controlled by said amount entering mechanism to index the type carriers of the printers of said column, and means for each row of printers to effect printing impression from the indexed type carriers of the same row of printers, and a printer and document bin selecting control circuit including power source connections, a circuit control means for each column of keys operable by any key in the respective column, a circuit control means for each row of keys operable by any key of the respective row, electrically operable means to control operation of said column selecting document transfer means, electrically operable means to control operation of said bin selecting document transfer means, electrically operable means to control effective operation of said printer column indexing means, electrically operable means to control operation of said printer row impression means, and circuit means for interconnecting respective ones of said column circuit control means, respective ones of said column selecting document transfer control means and respective ones of the printer column indexing control means with said power source connections, and respective ones of said row circuit control means, the bin selecting document transfer control means of respective rows of bins and respective ones of said printer row impression control means with said power source connections to effect transfer of a document from said receiver to a selected bin corresponding to the selected register and effective printing operation of a corresponding selected printer.

19. An accounting apparatus comprising a computing mechanism including amount entering mechanism, a plurality of registers, register selecting means to select registers for cooperation with said amount entering means, and a like plurality of keys arranged in columns and rows and operable to control said register selecting means to select a register, printing mechanism including a like plurality of individual tape printers for each of said registers and arranged in corresponding columns and rows, each of said individual tape printers including a series of type carriers, means for each column of printers controlled by said amount entering mechanism to index the type carriers of the printers of said column, and means for each row of printers to effect printing impression from the indexed type carriers of the same row of printers, and a printer selecting control circuit including power source connections, a circuit control means for each column of keys operable by any key in the respective column, a circuit control means for each row of keys operable by any key of the respective row, electrically operable means to control effective operation of said printer column indexing means, electrically operable means to control operation of said printer row impression means and circuit means for interconnecting said row and column circuit control means, respectively with said row and column electrically operable means and said power source connections to effect printing operation of an individual printer corresponding to the selected register.

20. An accounting and document sorting apparatus comprising computing mechanism including amount entering mechanism, a plurality of registers, register selecting means to select registers for cooperation with said amount entering means, cyclically operable drive means to operate said amount entering means and the selected register, and manipulative means to control said register selecting means to select a register and initiate a cycle of operation of said drive means, and document sorting apparatus having a plurality of sorted document bins, an inserted document receiver, means for conveying an inserted document from said receiver to any of said bins, means controlled by said drive means in a cycle of operation thereof to deliver an inserted document from said receiver to said conveying means, means controlled by said manipulative means to direct the document from said conveying means into a selected one of said bins corresponding to the selected register, a first packer device in each bin normally bearing against the top of the accumulation of documents in said bin, a second packer device in each bin normally held clear of said accumulation of documents, means controlled by said manipulative means to move said second packer device against and said first packer device away from the top of said accumulation of documents in the bin prior to delivery of the document being sorted to said bin, detecting means for each bin operable by a document being delivered to said bin, said moving means being controlled by said detecting means when operated by the document being delivered to cause said packer devices to restore to normal, and means controlled by said detecting means to prevent a further cycle of operation of said drive means until the document delivered to said conveying means has been delivered to the selected bin.

21. An accounting and document sorting apparatus comprising computing mechanism including amount entering mechanism, a plurality of registers, register selecting means to select registers for cooperation with said amount entering means, cyclically operable drive means to operate said amount entering means and the selected register, and manipulative means to control said register selecting means to select a register and initiate a cycle of operation of said drive means, and document sorting apparatus having a document conveying means, a plurality of sorted document receiving bins, one for each of said registers, means for each of said bins operable to direct a document from said conveying means into said bin, a movable packer device in each of said bins normally positioned clear of the accumulated pile of documents in said bin, means controlled by said manipulative means when operated to select a register to operate said document directing means for the bin corresponding to the selected register and to move said packer device in said bin against the top of the pile of documents therein prior to delivery of the document being sorted whereby the movement of said packer device is limited by the pile of previously accumulated documents in said bin, and a means controlled by said packer devices to disable said manipulative means from initiating a further cycle of operation of said drive means when movement of a packer device has been limited more than predetermined amount.

22. An accounting and document sorting apparatus comprising computing mechanism including amount entering mechanism, a plurality of registers, register selecting means to select registers for cooperation with said amount entering means, cyclically operable drive means to operate said amount entering means and the selected register, and manipulative means to control said register selecting means to select a register and initiate a cycle of operation of said drive means, and document sorting apparatus having a document conveying means, a plurality of sorted document receiving bins, one for each of said registers, means for each of said bins operable to direct a document from said conveying means into said bin, a movable packer device in each of said bins normally positioned clear of the accumulated pile of documents in said bin, means controlled by said manipulative means when operated to select a register to operate said document directing means for the bin corresponding to the selected register and to move said packer device in said bin against the top of the pile of documents therein prior to delivery of the documents being sorted whereby the movement of said packer device is limited by the pile of previously accumulated documents in said bin, means controlled by said packer devices to disable said manipulative means from initiating a further cycle of operation of said drive means when movement of a packer device has been limited more than a predetermined amount and a means manually operable to restore said disabling means.

23. An accounting and document sorting apparatus comprising computing mechanism including amount entering mechanism, a plurality of registers, register selecting means to select registers for cooperation with said amount entering means, cyclically operable drive means to operate said amount entering means and the selected register, and manipulative means to control said register selecting means to select a register and initiate a cycle of operation of said drive means, and document sorting apparatus having a document conveying means, a plurality of sorted document receiving bins, one for each of said registers, means for each of said bins operable to direct a document from said conveying means into said bin, each of said bins having a means normally positioned to block access to documents therein, locking means normally locking said access preventing means in access preventing position, a movable packer device in each of said bins normally positioned clear of the accumulated pile of documents in said bin, means controlled by said manipulative means when operated to select a register to operate said document directing means for the bin corresponding to the selected register and to move said packer device in said bin against the top of the pile of documents therein prior to delivery of the document being sorted whereby the movement of said packer device is limited by the pile of previously accumulated documents in said bin, means controlled by said packer devices to disable said manipulative means from initiating a further cycle of operation of said drive means when movement of a packer device has been limited more than a predetermined amount and means controlled by said packer devices to operate the locking device for the bin in which the movement of the packer device has been so limited to release said access preventing means for movement to permit access to the documents in said bin.

24. An accounting apparatus having a cyclically operable drive means, amount differential actuator means operable by said drive means in each cycle of operation, a plurality of registers, each of said registers being operable by said drive means to cooperate with said actuator means in one manner for selectively taking totals from each said register and in at least one other manner to selectively enter amounts in each said register, register selecting means to select any register for operation, function control means conditionable to cause the selected register to be operated for cooperation in any of said manners, a member movable from a normal position to each of a plurality of register positions and again to normal position, each of said register positions corresponding to one of said plurality of registers, a means manually operable to move said member from said normal position to a first of said register positions, latch means controlled by said member when moved from normal position to latch said manually operable means in operated position and to release said manually operable means for return to normal unoperated position upon return of said member to normal position, means controlled by said member in each of said register positions to initiate a cycle of operation of said drive means, means controlled by said manually operable means for operation by said drive means in each cycle of operation thereof to advance said member from any one of said register positions to the next register position and from the last of said register positions to said normal position, means controlled by said member in each of said register positions to control said register selecting means to select said corresponding register for operation, and means controlled by said member in each of said plurality of positions to condition said function control means for total taking from the selected register.

25. An accounting apparatus having a cyclically operable drive means, amount differential actuator means operable by said drive means in each cycle of operation, a plurality of registers, each of said registers being operable by said drive means to cooperate with said actuator means in one manner for selectively taking totals from each said register and in at least one other manner to selectively enter amounts in each said register, a like plurality of printers, each having a series of indexable type carriers, record tape supply means and means to effect printing impression of indexed types on said type carriers upon the tape, means controlled by said actuator means to index the type carriers of said printers, selecting means to select any register and the corresponding one of said printers for operation, function control means conditionable to cause the selected register to be operated for cooperation in any of said manners, a member movable from a normal position to each of a plurality of register positions and again to normal position, each of said register positions corresponding to one of said plurality of registers, a means manually operable to move said member from said normal position to a first of said register positions, latch means controlled by said member when moved from normal position to latch said manually operable means in operated position and to release said manually operable means for return to normal unoperated position upon return of said member to normal position, means controlled by said member in each of said register positions to initiate a cycle of operation of said drive means, means controlled by said manually operable means for operation by said drive means in each cycle of operation thereof to advance said member from any one of said register positions to the next register position and from the last of said plurality of positions to said normal position, means controlled by said member in each of said register positions to control said register selecting means to select said corresponding register and the corresponding printer for operation, and means controlled by said member in each of said plurality of positions to condition said function control means for total taking from the selected register.

26. An accounting and document sorting apparatus having a cyclically operable drive means, amount differential actuator means operable by said drive means in each cycle of operation, a plurality of registers, each of said registers being operable by said drive means to cooperate with said actuator means in one manner for selectively taking totals from each said register and in at least one other manner to selectively enter amounts in each said register, printing apparatus including a like plurality of printers, each having a series of indexable type carriers, record tape supply means and means to effect printing impression of indexed types on said type carriers upon the tape, and means controlled by said actuator means to index the type carriers of said printers, document sorting apparatus including a like plurality of sorted document receiving bins, means to convey a document to any of said bins, and means for each of said bins operable to direct a conveyed document from said conveyor into the respective bin, manipulative selecting means, means controlled by said manipulative means to select any register, the corresponding one of said printers and the conveyed document directing means for the corresponding bin for operation, function control means conditionable to cause the selected register to be operated for cooperation in any of said manners and conditioned by said manipulative means when manipulated to cause the selected register to be operated for amount entering, a member movable from a normal position to each of a like plurality of register positions and again to normal position, said member having a separate one of said register positions corresponding to each one of said plurality of registers, a means manually operable to move said member from said normal position to a first of said register positions, latch means controlled by said member when moved from normal position to latch said manually operable means in operated position and to release said manually operable means for return to normal unoperated position upon return of said member to normal position, means controlled by said member in each of said register positions to initiate a cycle of operation of said drive means, means controlled by said manually operable means for operation by said drive means in each cycle of operation thereof to advance said member from any one of said register positions to the next register position and from the last of said register positions to said normal position, means controlled by said member in each of said register positions to control said register selecting means to select said corresponding register and the corresponding printer for operation, and means controlled by said member in each of said plurality of positions to condition said function control means for total taking from the selected register.

27. An accounting and document sorting apparatus having a cyclically operable drive means, amount differential actuator means operable by said drive means in each cycle of operation, a plurality of registers each operable by said drive means to cooperate with said actuator means in one manner for taking totals from said register and in at least one other manner to enter amounts in said register, printing apparatus including a like plurality of printers, each having a series of indexable type carriers, record tape supply means and means to effect printing impression of indexed types on said type carriers upon the tape, and means controlled by said actuator means to index the type carriers of said printers, document sorting apparatus including a like plurality of sorted document receiving bins, an inserted document receiver, means to detect a document in said receiver, means to retain an inserted document in said receiver, means to convey a document from said receiver to any of said bins, means controlled by said drive means in a cycle of operation thereof to operate said retaining means to release the inserted document to said conveying means, and means for each of said bins operable to direct a conveyed document from said conveyor into the respective bin, manipulative selecting means, means controlled by said manipulative means to select any register, the corresponding one of said printers and the conveyed document directing means for the corresponding bin for operation, and to initiate a cycle of operation of said drive means, means controlled by said detecting means to prevent said cycle initiating means from initiating a cycle of operation of said drive means, function control means conditionable to cause the selected register to be operated for cooperation in any of said manners and conditioned by said manipulative means to cause operation of the selected register for amount entering, a member movable from a normal position to each of a like plurality of positions and again to normal position, a means manually operable to move said member from said normal position to a first of said plurality of positions, means controlled by said member when moved from normal position to latch said manually operable means in operated position and to release the latter means for return to normal unoperated position upon return of said member to normal position, means controlled by said member in each of said plurality of positions to disable said cycle preventing means and to initiate a cycle of operation of said drive means, means controlled by said manually operable means for operation by said drive means in each cycle of operation thereof to advance said member from any one of said plurality of positions to the next or from the last of said plurality of positions to said normal position, means controlled by said member in each of said plurality of positions to control said selecting means to select a respective one of said registers and the corresponding printer for operation, and means controlled by said member in each of said plurality of positions to condition said function control means for total taking from the selected register.

References Cited in the file of this patent
UNITED STATES PATENTS

| | | |
|---|---|---|
| 1,874,709 | Perkins | Aug. 30, 1932 |
| 1,966,623 | Fuller | July 17, 1934 |
| 2,044,975 | Evans | June 23, 1936 |
| 2,122,136 | Fuller et al. | June 28, 1938 |
| 2,237,269 | Brand | Apr. 1, 1941 |
| 2,307,108 | Bryce | Jan. 5, 1943 |
| 2,307,150 | Miller et al. | Jan. 5, 1943 |
| 2,416,598 | Spurlino et al. | Feb. 25, 1947 |
| 2,510,626 | Geisheck | June 6, 1950 |
| 2,545,636 | Sundstrand | Mar. 20, 1951 |
| 2,548,715 | Fitzgerald | Apr. 10, 1951 |
| 2,673,735 | Niles et al. | Mar. 30, 1954 |
| 2,690,297 | Read | Sept. 28, 1954 |
| 2,742,286 | Williams et al. | Apr. 17, 1956 |
| 2,780,990 | Gerhan | Feb. 12, 1957 |
| 2,812,902 | Runde et al. | Nov. 12, 1957 |

FOREIGN PATENTS

| | | |
|---|---|---|
| 623,020 | Great Britain | May 11, 1949 |